United States Patent [19]

Kaiser et al.

[11] Patent Number: 4,742,475

[45] Date of Patent: * May 3, 1988

[54] ENVIRONMENTAL CONTROL SYSTEM

[75] Inventors: Frederick P. Kaiser, Orange; Theodore R. Lapp, Mission Viejo, both of Calif.

[73] Assignee: IBG International, Inc., Prairie View, Ill.

[ * ] Notice: The portion of the term of this patent subsequent to Jul. 2, 2002 has been disclaimed.

[21] Appl. No.: 655,081

[22] Filed: Sep. 26, 1984

Related U.S. Application Data

[63] Continuation-in-part of Ser. No. 621,884, Jun. 19, 1984, Pat. No. 4,527,247, which is a continuation of Ser. No. 288,740, Jul. 31, 1981, abandoned.

[51] Int. Cl.$^4$ .............. G06F 13/12; F24F 7/00
[52] U.S. Cl. ........................ 364/550; 165/22; 236/49; 340/310 R; 364/138; 364/493; 364/506; 364/557
[58] Field of Search ............... 364/131, 132, 138, 418, 364/493, 506, 557, 514, 550, 551, 900; 340/310 A, 310 CP, 310 R, 870.03, 870.11, 870.02; 165/22; 98/116; 236/49, 51; 318/603, 640

[56] References Cited

U.S. PATENT DOCUMENTS

| | | | |
|---|---|---|---|
| 1,888,555 | 11/1932 | Hund | 340/310 R |
| 2,457,607 | 12/1948 | Seymour | 171/97 |
| 2,479,243 | 8/1949 | Larsen | 236/49 |
| 2,494,873 | 1/1950 | Hall | 171/97 |
| 2,580,539 | 1/1952 | Goodwin | 177/352 |
| 2,812,141 | 11/1957 | Sueda | 236/49 X |
| 2,860,324 | 11/1958 | Berger et al. | 340/310 |
| 2,962,702 | 11/1960 | Derr et al. | 340/180 |
| 3,063,195 | 11/1962 | Ravich | 47/17 |
| 3,067,405 | 12/1962 | Hurlimann et al. | 340/164 |
| 3,121,859 | 2/1964 | Furniss | 340/150 |
| 3,124,903 | 3/1964 | Truhan | 47/17 |
| 3,181,791 | 5/1965 | Axelrod | 236/44 |
| 3,233,146 | 2/1966 | Vacha | 315/97 |
| 3,234,543 | 2/1966 | Thompson et al. | 340/345 |
| 3,338,519 | 8/1967 | Kreuter et al. | 237/8 |
| 3,388,863 | 6/1968 | Andersen et al. | 236/44 |
| 3,400,374 | 9/1968 | Schumann | 340/172.5 |
| 3,445,814 | 5/1969 | Spalti | 340/151 |
| 3,450,192 | 6/1969 | Hay | 165/1 |
| 3,450,194 | 6/1969 | Barthel | 165/18 |
| 3,460,121 | 8/1969 | Wattenburg | 340/310 CP X |
| 3,462,756 | 8/1969 | Mills | 340/310 |
| 3,478,817 | 11/1969 | Shaw | 165/21 |
| 3,481,073 | 12/1969 | Yoshida et al. | 47/17 |
| 3,483,546 | 12/1969 | Ausfeld | 340/310 |
| 3,508,243 | 4/1970 | Nyfeler et al. | 340/310 |
| 3,509,537 | 4/1970 | Haberly | 340/163 |
| 3,540,030 | 11/1970 | Hartz | 340/310 |

(Continued on next page.)

OTHER PUBLICATIONS

McArthur et al., "The Intelligent Plug," Wireless World, vol. 85, No. 1528, (Dec. 1979), pp. 46–51.

Primary Examiner—Parshotam S. Lall
Assistant Examiner—Kevin J. Teska
Attorney, Agent, or Firm—Fitch, Even, Tabin & Flannery

[57] ABSTRACT

An environmental control system for use in a greenhouse or another structure which requires the control of an ambient condition regulating element in response to a plurality of sensed parameters. The system includes a plurality of sensor elements and actuator elements, which communicate with a central control through communication interface units. In an illustrated embodiment the interface units communicate over previously installed AC power lines by frequency shift keyed signals. The interface units communicate to the peripheral control elements and the central control unit through serial digital signals. The central control maintains a protocol where, in response to operator inputs, time slots are assigned to different peripheral control elements to configure the system. Each peripheral control element is thereby addressed during its time slot and a sensor responds with data corresponding to a sensed parameter and an actuator executes a command. A unique framing character is generated by the central control at the beginning of each assigned time slot for alerting the peripheral control elements an address will next be generated and for synchronizing multiple central controls to a common time slot clock.

21 Claims, 15 Drawing Sheets

U.S. PATENT DOCUMENTS

| | | | |
|---|---|---|---|
| 3,594,584 | 7/1971 | Woods | 307/3 |
| 3,613,092 | 10/1971 | Schumann et al. | 340/413 |
| 3,644,891 | 2/1972 | McCrea | 340/147 |
| 3,644,897 | 2/1972 | McCrea et al. | 340/172.5 |
| 3,673,733 | 6/1972 | Allen | 47/58 |
| 3,683,343 | 8/1972 | Feldman et al. | 340/178 |
| 3,702,460 | 11/1972 | Blose | 340/150 |
| 3,710,373 | 1/1973 | Watanabe et al. | 340/310 |
| 3,721,830 | 3/1973 | Oishi et al. | 307/3 |
| 3,746,080 | 7/1973 | Mallory | 165/20 |
| 3,747,501 | 7/1973 | Honda et al. | 98/33 |
| 3,801,008 | 4/1974 | Wenger | 236/46 |
| 3,807,088 | 4/1974 | Jones | 47/1.2 |
| 3,815,814 | 6/1974 | Burgess | 236/44 |
| 3,826,963 | 7/1974 | Lorenz | 236/49 X |
| 3,840,176 | 10/1974 | Baysinger | 236/44 R |
| 3,870,873 | 3/1975 | Mallory | 240/1.1 |
| 3,913,344 | 10/1975 | Holloway et al. | 62/176 |
| 3,914,677 | 10/1975 | MacWade et al. | 318/640 X |
| 3,933,197 | 1/1976 | Zimmer et al. | 165/2 |
| 3,949,607 | 4/1976 | Nodolf | 73/336 |
| 3,951,625 | 4/1976 | Follette | 55/232 |
| 3,999,329 | 12/1976 | Brais | 47/17 |
| 4,003,160 | 1/1977 | Miller | 47/58 |
| 4,020,358 | 4/1977 | Wyland | 307/39 |
| 4,028,847 | 6/1977 | Davis et al. | 47/65 |
| 4,044,823 | 9/1977 | Biesecker | 165/16 |
| 4,055,113 | 10/1977 | Monroe | 98/116 X |
| 4,073,089 | 2/1978 | Maginnes et al. | 47/17 |
| 4,077,158 | 3/1978 | Clarke | 47/59 |
| 4,078,721 | 3/1978 | Okuhara | 236/49 |
| 4,079,366 | 4/1978 | Wong | 340/309 |
| 4,090,248 | 5/1978 | Swanson et al. | 364/900 |
| 4,090,370 | 5/1978 | Vaughan | 62/91 |
| 4,094,166 | 6/1978 | Jeries | 62/158 |
| 4,113,175 | 9/1978 | Sutton, Jr. | 236/46 |
| 4,123,796 | 10/1981 | Shih | 364/900 |
| 4,136,732 | 1/1979 | Demaray et al. | 165/16 |
| 4,146,993 | 4/1979 | Freeman, Sr. | 47/17 |
| 4,147,002 | 4/1979 | Kautz | 52/306 |
| 4,156,194 | 5/1979 | Mueller | 340/310 A X |
| 4,161,660 | 7/1979 | Gallant | 307/118 |
| 4,162,486 | 7/1979 | Wyler | 340/310 CP X |
| 4,163,342 | 9/1979 | Fogg et al. | 47/58 |
| 4,166,339 | 9/1979 | Heller et al. | 47/17 |
| 4,174,517 | 11/1979 | Mandel | 340/310 CP X |
| 4,186,873 | 2/1980 | Geisler | 340/310 A X |
| 4,189,094 | 2/1980 | Robinson | 236/46 |
| 4,196,544 | 4/1980 | Davis et al. | 47/17 |
| 4,197,991 | 4/1980 | D'Amato | 236/44 |
| 4,200,910 | 4/1980 | Hall | 364/104 |
| 4,205,381 | 5/1980 | Games et al. | 364/505 |
| 4,212,078 | 7/1980 | Games et al. | 165/22 X |
| 4,217,646 | 8/1980 | Caltagirone | 340/310 R X |
| 4,222,035 | 9/1980 | Lohoff | 340/167 |
| 4,232,531 | 11/1980 | Mangam et al. | 62/171 |
| 4,234,926 | 11/1980 | Wallace et al. | 364/900 X |
| 4,253,153 | 2/1981 | Bitterli et al. | 364/505 |
| 4,291,674 | 9/1981 | Comte et al. | 47/17 X |
| 4,293,846 | 10/1981 | Allison | 340/310 |
| 4,294,404 | 10/1981 | Gajjar | 236/49 |
| 4,332,013 | 5/1982 | Chelcun | 364/418 X |
| 4,338,556 | 7/1982 | Hetzel | 318/640 X |
| 4,350,286 | 9/1982 | Sutoh et al. | 236/49 X |
| 4,463,432 | 7/1984 | Carter, II | 364/483 |
| 4,568,934 | 2/1986 | Allgood | 364/483 X |

$S_1$ = START BIT
$d_0$-$d_7$ = DATA BYTE
$S_2$ = STOP BIT
P = PARITY BIT

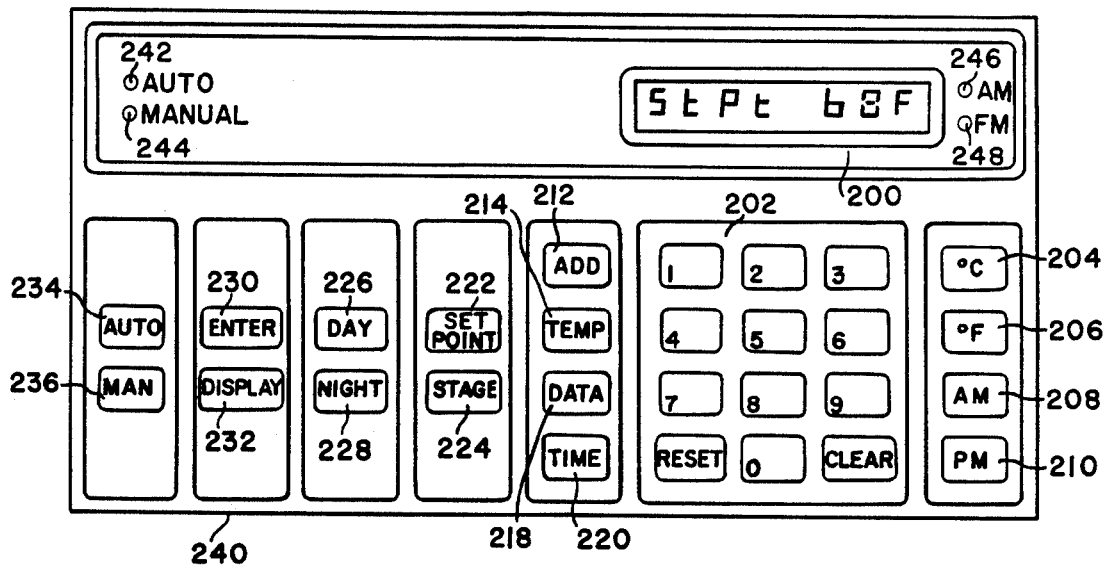

FIG. 4

| STAGE | TEMP. | ROOF VENT OPENING | SIDE VENT OPENING | FAN. 1 | FAN. 2 | PAD PUMP |
|---|---|---|---|---|---|---|
| 7 | 86 | 00% | 99% | on | on | on |
| 6 | 84 | 00% | 99% | on | off | on |
| 5 | 80 | 99% | 80% | off | off | off |
| 4 | 77 | 70% | 15% | off | off | off |
| 3 | 74 | 45% | 10% | off | off | off |
| 2 | 72 | 25% | 5% | off | off | off |
| 1 | 71 | 5% | 0% | off | off | off |
| 0 | 70 | 0% | 0% | off | off | off |

FIG. 5

| PREFIX TABLE OF REMOTE ELEMENTS | |
|---|---|
| PREFIX | REMOTE ELEMENT |
| 1 | VENT MOTOR ACTUATOR |
| 2 | INDOOR SENSOR |
| 3 | OUTDOOR SENSOR |
| 4, 5 OR 6 | ADDRESS RECEIVER-ONE ACTUATOR |
| 7 | ADDRESS RECEIVER-EIGHT ACTUATORS |
| 8 | ADDRESS RECEIVER-PROPORTIONAL CONTROL |

FIG. 3d

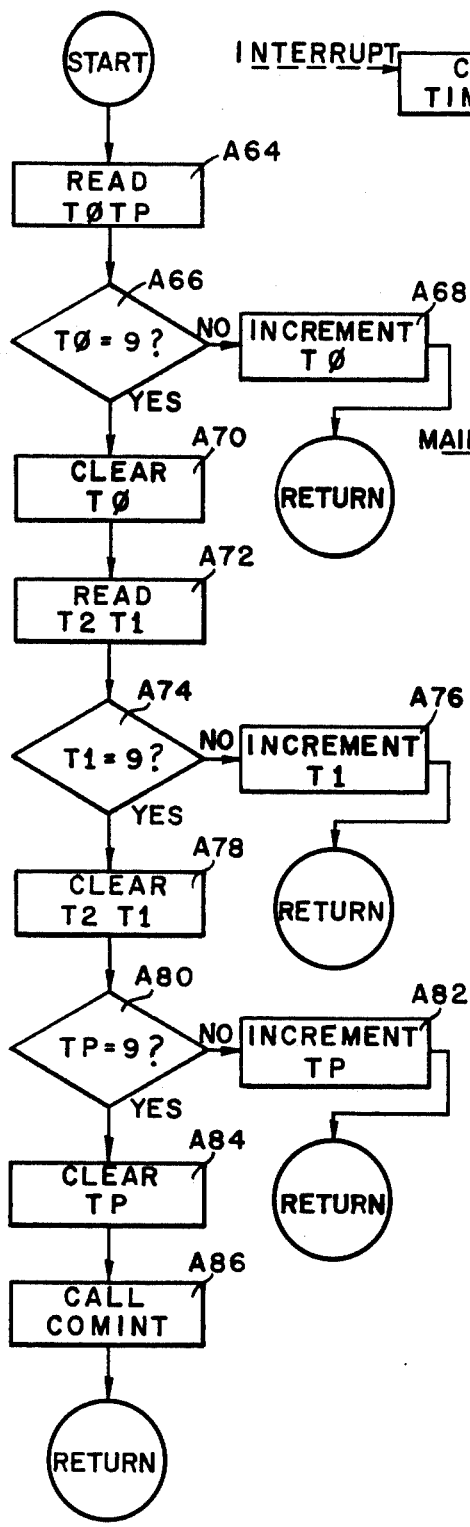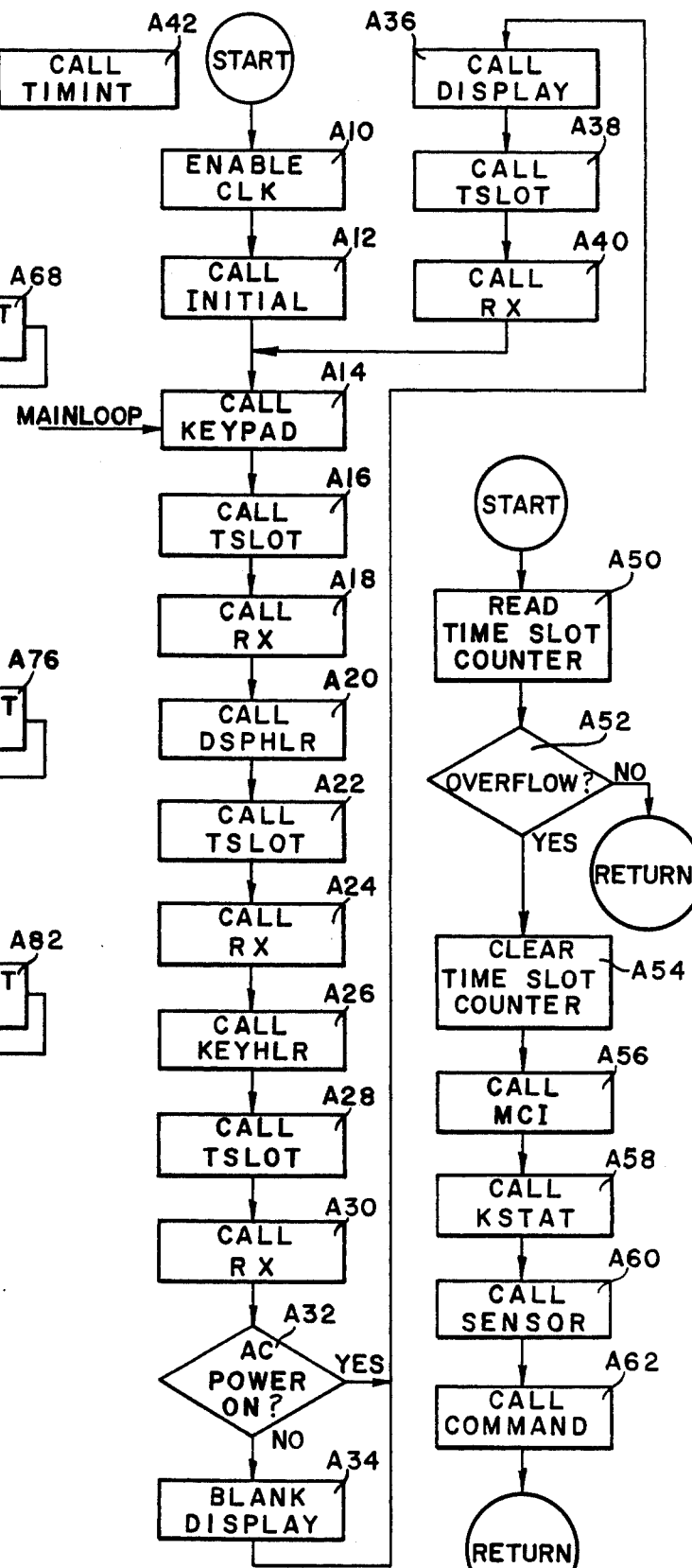
FIG. 15
FIG. 13
FIG. 14

ENVIRONMENTAL CONTROL SYSTEM

CROSS REFERENCE TO RELATED APPLICATIONS

This application is a continuation-in-part of application Ser. No. 621,884 filed 6/19/84, now U.S. Pat. No. 4,527,247, which was a continuation of application Ser. No. 288,740 filed on July 31, 1981 in the name of Fred P. Kaiser and Theodore R. Lapp and which is commonly assigned with the present application and now abandoned. The disclosure of Kaiser, et al. is hereby expressly incorporated by reference.

BACKGROUND OF THE INVENTION

This invention pertains generally to control systems of remote controlled devices, and more particularly to environmental control systems for use in greenhouses or the like which preferably utilize the existing AC power transmission lines for interelement communication within the system.

Control of the temperature, humidity and ambient measurements in a greenhouse, or the like, to enable the control of the environment therein can necessitate monitoring and controlling numerous sensing and control devices at various locations within the structure being controlled. Due to the large number of measurements and functions that are needed to be performed, computer based or computer compatible systems have been used to centrally control the monitoring and operating functions of an environmental control system, such as in a large buildings.

With the advent of complex systems of environmental control a great need has evolved for monitoring systems capable of monitoring a myriad of points with respect to conditions which must be continuously observed in order to assure proper and safe operation. Similarly, alarm conditions at the points must be immediately discovered and corrected, thus requiring systems that are capable of indicating alarm conditions as well as scanning the points.

Due to the great number of remote field points that must be monitored, conventional monitoring systems utilize a control center as a receiving and sending station for monitoring the remote points which generally are scattered over great distances. Some conventional systems utilize pulse width modulation or frequency modulation to address and monitor the field points. However, these prior systems have been extremely complex and expensive and are desirable only where extremely great distances are involved or in underdeveloped or inaccessible locations where the use of cable wires is impractical.

For environmental control in a building or complex of buildings, pulse width modulation and frequency modulation systems are generally impractical, and systems for such application are generally based on the matrix concept as can be seen from U.S. Pat. No. 3,300,759. While the use of matrices and binary coded addresses for field points does reduce the number of wires required below the number of wires required for each point to be individually connected to a central control, the reduction in the number of wires is not as great as is desirable, and the number of wires required is dependent upon the number of points monitored thereby decreasing system flexibility. These conventional systems suffer from the disadvantages of difficult installation due to the different addresses associated with each field location and difficult system modification once the system has been installed as the well as high cost of wiring. That is, each field location must be designed for a specific address thereby increasing inventory and installation time; and, if at any time additional field locations are desired to expand the system beyond the original design, additional wires are required to be installed.

Systems have been devised for reducing the number of dedicated communications wires required, such as shown in U.S. Pat. No. 3,613,092, but still suffer from the cost, time, and reliability disadvantages of requiring dedicated custom installed communication wiring.

Greenhouses provide weather protection and the correct environmental conditions for growing plants. Cultivation of the plants requires the atmosphere within the greenhouse to be maintained at a selected temperature and humidity level. Factors affecting the greenhouse atmosphere include heat gains and heat losses. For example, during long periods of sun exposure, abnormal amounts of solar energy enter the greenhouse which tends to raise the temperature.

Logical control of greenhouse environmental conditions has heretofore utilized, for example, 24 volt control systems with relays and solenoids individually wired together and strung out, or a computer based equivalent system (such as a programmable controller) with dedicated wires for communication and control lines strung out and wired among all control points and sensors. These systems have proved less than adequate in terms of cost, time for installation, and ease of maintenance, repair, and update of equipment. Additionally, communication among elements of the environmental control system is restricted to a dedicated control and custom wiring. Expansion requires new wiring in an installation, and modification requires rewiring the system.

A significant disadvantage of many prior systems involves system reliability and maintainability where a breakdown in one part of the system could effectively shut down other parts of the system. Thus, to increase reliability, redundant or backup equipment is often necessitated.

SUMMARY OF THE INVENTION

Accordingly, a general object of the invention is to provide a new and improved communication and control system which has general applicabilities to environmental control systems for structures of all kinds including, but not limited to, greenhouses.

A further object of the present invention is to provide a control system which does not require dedicated or independent wires for communication.

Another object of the present invention is to permit the expansion of a control system without the necessity of installing additional wires from a control center.

Still another object of the present invention is to utilize similar communication interfaces between elements of the system.

Yet another object of the present invention is to provide an improved environmental control system, especially suited for use in a greenhouse, which provides for communication between one or more central controllers and one or more peripheral elements of the system utilizing the existing AC power wiring.

These objectives are achieved in a preferred embodiment of the invention comprising a controller, or net master, communicating over the existing AC power wiring to a plurality of peripheral control elements including a plurality of sensors and actuators. The sensors can be interrogated to provide information as to the environmental conditions existing inside or outside a structure and the actuators can be commanded to control various actuated devices capable of varying the environment of the structure.

A communication protocol is followed where each peripheral control element is assigned a time slot of a time frame where the net master will only interrogate or command a particular peripheral control element during that time slot. This protocol provides a system which can easily be configured based on its time slot assignment such that a system is defined by the number and type of peripheral control elements assigned. The net master steps through the time slots of a frame and controls the actuators and interrogates the sensors in the order in which they have been assigned. The control cycle then repeats for the next frame and following frames until the system is reconfigured by assigning other peripheral control elements to time slots or by removing some of the elements from an assignment. Time slots which do not have a peripheral control element assigned are not used by the net master and are merely stepped over.

This produces a particularly flexible configuration which the invention uses to advantage in a number of ways. Initially, as an environmental controller for regulating the temperature of a structure, or a zone in a structure, different temperature stages are used which require different configurations of the system. These configurations can be easily programmed by using different time slot assignments for the separate stages.

Additionally, the management of zones in a controlled environment is facilitated by the time slot protocol. Multiple net masters can be provided which address the peripheral control elements of different zones without interference because of the time slot separation. Alternatively, two or more net masters can control different system configurations in one zone of a controlled environment without contention by this protocol. Redundancy is advantageously provided by the system where if one net master becomes inoperative, another can pick up its load by reprogramming the time slot assignments to take into account a different configuration or zone. The new net master for a zone does not even have to be moved to take control because of its remote communication capability.

As an additional feature of the flexible system protocol, all time slot clocks are synchronized adaptively between net masters. Each transmission of a net master contains a certain unique character which is used as a framing or synchronizing character by all other net masters. When a particular time slot which has been assigned to one net master is addressed, the transmission of that net master to the peripheral control element, either being commanded or interrogated, is also received by all other net masters. By decoding the transmission after the framing character, all other net masters synchronize their time slot clocks with the unique character and thereby the transmitting net master for that time slot. For each transmission by a net master the other net masters are thereby adaptively synchronized together maintaining an overall common time slot clock.

Transmission between a system control and a peripheral control element is preferably by means of communication interface units which are adapted to communicate bidirectionally over the existing AC power lines of a structure. In a preferred implementation an interface unit includes a transmitter which converts digital data into a frequency shift keyed signal for application of the AC power line and a receiver which converts a frequency shift keyed signal from the AC power line into digital data. The system control generally utilizes a receiver and transmitter for bidirectional communication as does a peripheral control element for a sensor which is to be interrogated and must reply. A peripheral control element for an actuator which receives commands need only be provided with a receiver.

The system, when used as an environmental control for a greenhouse, preferably includes three types of peripheral control elements which receive communications from a system controller. Initially, a vent actuator control is provided to regulate the opening of a vent in the greenhouse. The vent control receives a command indicative of the % amount that a vent should be opened and independently controls the vent to that opening. A second type of peripheral control element, termed an address receiver, is used to actuate devices which need only on-off switching for operation. A third type of peripheral control element controls the sensors needed by the system and in response to an interrogation will reply with data indicating the value of a sensed parameter.

A system control comprises a microprocessor based controller which has means for receiving operator input, means for communicating with the peripheral control elements of the sensors and actuators of a system configuration, means for displaying information to an operator, and means for controlling the system according to a predetermined control law.

In an illustrated application of the system for the environmental control of a greenhouse, a predetermined control law based upon indoor temperature is used. A plurality of temperature stages using different system configurations are programmed to produce control signals which regulate the inside temperature in the direction of a set point. In an illustrated implementation, exhaust fans, cooling pads, and vents are controlled by the peripheral control elements and actuate those devices for cooling the structure when the temperature is in excess of the set point. The exhaust fans, vents, and a heating means are controlled by the peripheral control elements and actuate those elements for heating the structure when the temperature is below the set point. Various combinations of these elements and various settings for each element are programmed for each temperature stage.

The actual temperature is periodically measured by a temperature sensor interrogated by the system control through a peripheral control element. As the temperature moves toward the set point through the different stages, different configurations of equipment are used to produce a programmed control. The different configurations are easily programmed by assigning particular equipment to separate time slots and addressing those time slots needed for a particular stage.

This operation has an advantage where the stages can be programmed for maximizing the cooling or heating effect the farther the actual temperature is from the set point and gradually reducing the effect through different configurations and stages as the actual temperature approaches the set point. This approach not only saves energy in an environmental control system, but for a greenhouse is particularly advantageous because it reduces the thermal shock to growing plants produced by normal on-off thermostatic controls.

In a greenhouse environment, additional features provided for the control system are a provision for multiple sets points and modification of the control program either by manual overrides or special condition overrides which are sensed. For multiple temperature sets points, a photo cell which is interrogated by the system control through a peripheral control element provides information about the light level in the environment. The system uses this light level information to switch from a day temperature set point to a night temperature set point and a separately staged program. Overrides to control the openings of vents for extreme environmental conditions such as rain and wind are provided by interrogating sensors which detect such conditions with a peripheral control element. Further, the control program can be modified automatically by sensing the outdoor temperature through a suitable peripheral control element. A manual override which directly controls the positioning of the vents is additionally provided to modify the program control.

These and other objects, features, and advantages of the invention will become more apparent and clearly understood from a reading of the following detailed description with reference to the accompanying drawings in which:

BRIEF DESCRIPTION OF THE DRAWINGS

FIGS. 3a, 3b, 3c and 3d are pictorial representations of the system communication protocol for environmental control system illustrated in FIG. 1;

FIG. 4 is a front view of the system control unit for the environmental control system illustrated in FIG. 1 showing the operator control keys and displays available for interfacing with the system;

FIG. 5 is a tabular representation of a generalized control law which is executed by the system control unit to regulate the environment of a greenhouse;

FIG. 13 is a system flow chart of the software executed by the system control unit illustrated in FIG. 1;

FIG. 14 is a detailed flow chart of the subroutine TSLOT called in FIG. 13;

FIG. 15 is a detailed flow chart of the subroutine MCI called in FIG. 13;

DETAILED DESCRIPTION OF THE PREFERRED EMBODIMENTS

Figure 1:
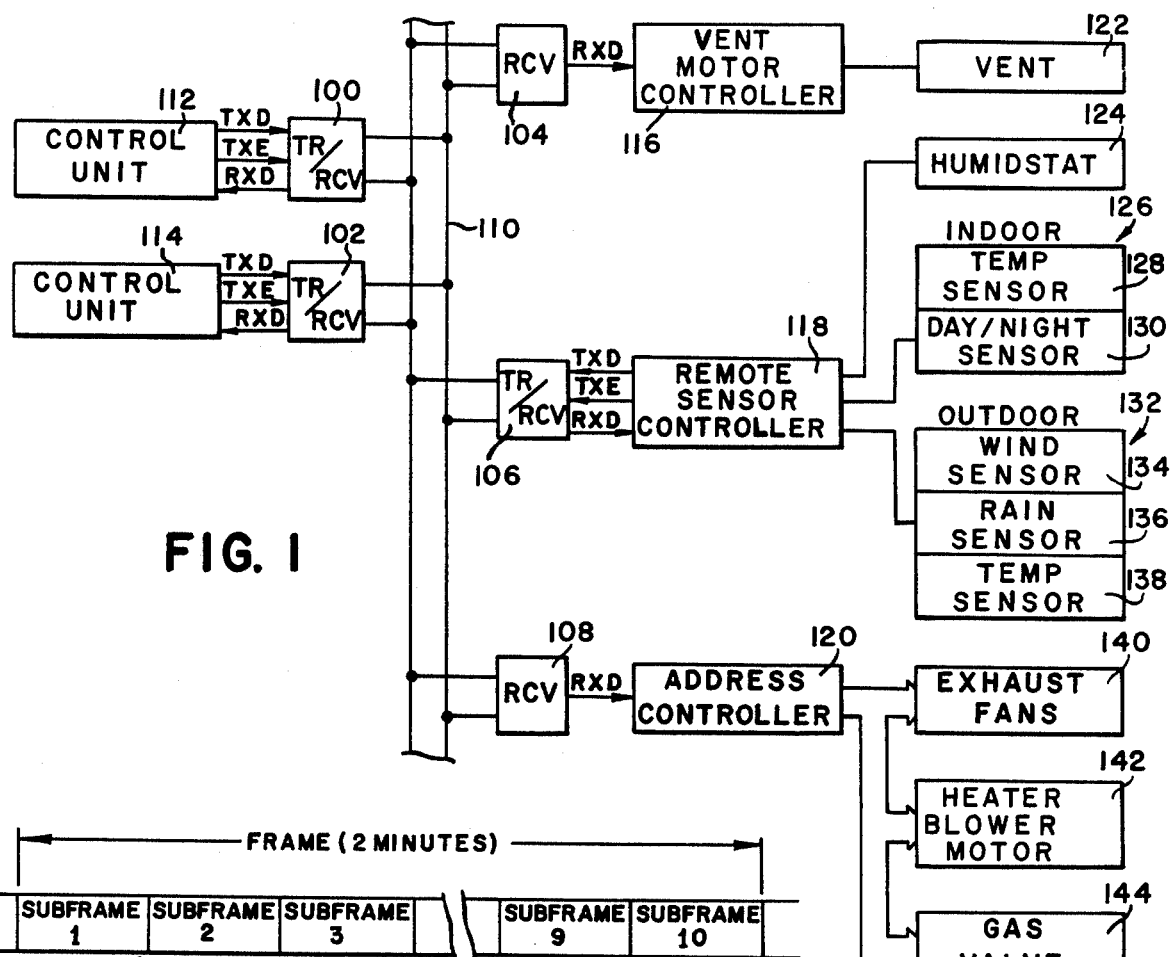
FIG. 1 is a system block diagram of an environmental control system constructed in accordance with the invention.

Referring now to the drawings, and particularly FIG. 1, a system implementation of the present invention is illustrated. A plurality of modular communication interface means 100, 102, 104, 106 and 108 are coupled to an AC power transmission line 110 and are additionally coupled individually to a system control unit 112, a system control unit 114, and peripheral control elements 116, 118 and 120, respectively. The communication interface means provide for bidirectional or unidirectional data communication via the power line between the control units 112, 114 and the peripheral control elements 116, 118 and 120.

In the implementation shown address, command, and data signals are communicated between the elements of the system by utilizing the existing power wiring which eliminates the necessity for special dedicated communication wiring. It will, however, become apparent that it is also possible to use radio frequency communication or dedicated communication lines rather than the installed power lines and still use many of the claimed features of the present invention as will be appreciated hereinafter from reading the detailed description of the system.

The system provides a control in which a number of remote elements comprising the peripheral control elements are remotely controlled by either one or more control units. In this manner, any number of peripheral control elements can be coupled to the power line and remotely controlled by the control units. This produces a system which is very flexible in configuration and which is easily adapted for many environmental control situations. For example, for the environmental control of a greenhouse one or more zones can be assigned to a particular control unit and controlled efficiently thereby or each control unit may have a separate zone to control with a different system configuration based upon the number and types of peripheral control elements which are controlled thereby.

The peripheral control elements can be of many types. In the illustrated implementation there are three types illustrated especially suitable for greenhouse environment control. For example, one of the peripheral control elements may be a remote sensor control 118 which provides communication between one of the control units and a number of sensors, such as, a humidistat 124, an indoor sensor 126, and an outdoor sensor 132. The indoor sensor 126 may have a temperature sensor 128 which can be of the aspirator type and a photo cell which provides a day/night sensor 130 and an indication of when to change set points. The outdoor sensor 132 can include a wind sensor 134, a rain sensor 136, and an outdoor temperature sensor 138.

Another type of peripheral control element includes a vent motor controller 116 which provides regulation of the speed and direction of a motor which opens and closes a vent 122. A third type of peripheral control element is an address controller 120 which controls a number of relays to operate on/off type switching functions for various system elements. In the configuration illustrated, the address controller 120 may be requested to operate such devices as exhaust fans 140, a heater blower motor 142, a gas valve 144 for the heater, a heater louver motor 146, or a cooling pad pump 148.

Because interface means 100 and 102 are bidirectional communication devices which output information to the peripheral control elements and receive information from them, they include a transmitter and receiver. Likewise, the interface control means 106 which communicates with the remote sensor controller 118 contains a transmitter and receiver. The interface means 104 and the interface means 108 which communicate with the vent motor controller 116 and address controller 120, respectively, need only to accept commands from the control units 112, 114 and, therefore, include only a receiver.

The interface means receive digital data from a communicating device and transform that data into a frequency shift keyed signal which can be inductively coupled to the power line 110. For those interface means that contain a transmitter, data is transferred to the interface means by a data line TxD and transmission is enabled by a transmit data signal TxEN. For the receiving function, data is transferred over the data line RxD to the communicating device after it has been converted from a frequency shift keyed signal to digital data. The system protocol and timing of the transmission and receipt of the information which may be addresses, commands, interrogations, or data will be more fully described hereinafter.

In the illustrated embodiment, each control unit performs a number of system functions. First, a control unit 112 provides a microprocessor base control system comprising a central processing unit (CPU) and associated memory coupled to an input means, such as a keyboard, and to a display means, and a communication device for transmitting digital data to the interface means 100. The control unit 112 of the environmental control system in accordance with stored program instructions and user input data performs the functions of system configuration control, task sequencing, communication linkage and protocol, system diagnostics, user interface, storage, and archiving.

The communication and timing protocol used by the system will now be more fully explained with respect to FIGS. 3a–3d. Each peripheral control element, whether controlling a sensor element or an actuator element, is enabled only in response to being addressed by one of the control units. Each control unit allocates time slots each dedicated to communication with a uniquely addressed remote element. Any number of addresses are possible with this system but a capability of 1000 is shown in the illustrated embodiment. A timing diagram illustrating the time slots is shown in the FIG. 3a where a frame of 1000 time slots is disclosed as being two minutes in length. The frame is subdivided into 10 subframes each containing 100 time slots, where each of the time slots is 120 milliseconds in duration.

Therefore, if a peripheral control element is assigned a time slot in one of the subframes, it is addressed once every two minutes in the present scheme. Thereafter, the cycle repeats until the system configuration is changed. It is seen that by using this type of protocol that every remote element can be addressed uniquely during its time slot and further that a system can be configured merely by assigning the time slot. Further, the sequence in which the remote elements are controlled during a frame is dependent upon the time slot assigned. This provides an extremely flexible system for providing control with different configurations of elements and for sequencing the elements at different times. Thus, all remote elements have not only a physical separation by address but a time separation by the the time slots.

Figure 3A:
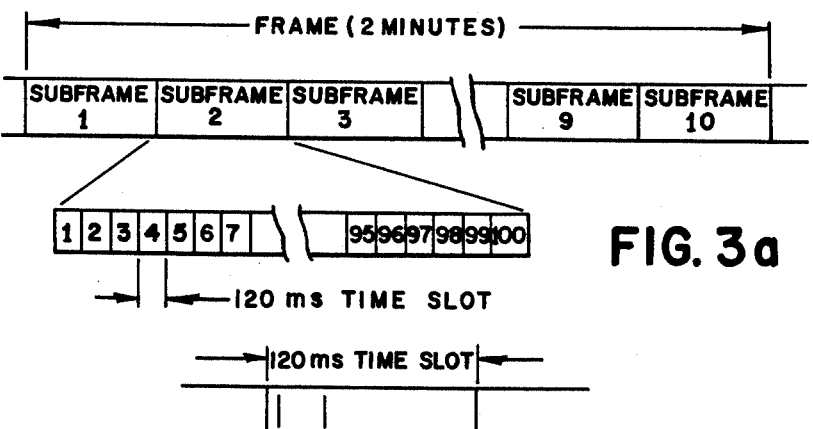
Figure 3B:
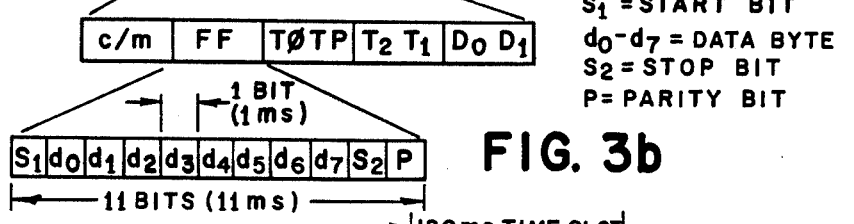

Further, in the protocol for the system is a particular transmission format for each of the control units and peripheral control elements. The nature of the transmissions is dependent upon the type of remote element being addressed. Each piece of equipment has information transmitted into it in the form of a communication data string as shown in FIG. 3b. The communication string initiates with a C/M bit group, a constant mark, which may be as long as 30 bits to be able to lock up the phase locked loop in the receiver of the addressed element. Next, there is a byte FF containing a unique word which allows the time slot clocks of the multiple net controllers to be synchronized. Thereafter, each piece of equipment has an address of the form a byte T0TP and a byte T2T1. TP is a four bit BCD prefix or function code representing the subframe and T0T1 are two four bit BCD nibbles representing the particular time slot 0–99 within a subframe. Each byte is actually eleven bits of 1 millisec/bit. This is standard asynchronous data transmission protocol where each byte is headed by a start bit and ended with a stop bit which is followed by a parity bit.

In the present protocol, all addresses beginning with the prefix 1 (first subframe) are vent motor controllers 116. Since there are 100 time slots within the subframe, there can be as many as 100 different vent motor controllers addressed by the system. Similarly, all addresses with a prefix 2 are indoor sensors 126 and all addresses with a prefix 3 are outdoor sensors 132. All address prefixes between 4–8 are for devices controlled by address controllers 120. FIG. 3d illustrates a table of the present prefixes and their assignments to the peripheral control elements of the present configuration. It should be readily apparent that such assignment is arbitrary and can be changed for convenience, or to order the sequencing of the peripheral control elements if necessary.

Figure 3C:
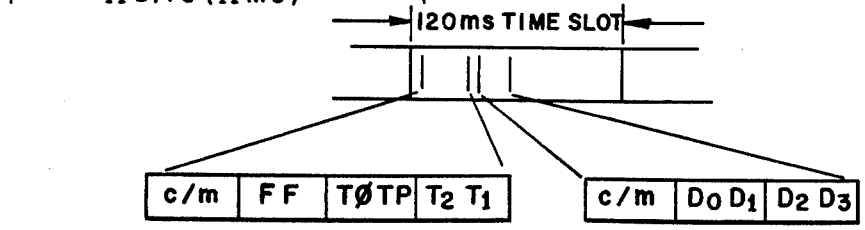

The information is transferred at the beginning of a particular time slot using a burst transmission. The format for the transmission to a sensor is different from that which is used for an actuator command. For an actuator, a byte D0D1 following the address byte consists of a command consisting of two nibbles. The two nibbles, D0 and D1, are used by the peripheral control element to decode a command from the data received, such as the amount of opening for a vent or which particular relay to close. For a remote sensor, the format is that as is illustrated in FIG. 3c where the control unit merely sends in burst transmission the C/M constant mark, the unique character FF, the prefix, and the address byte. This sequence forms an interrogation of a remote sensor and the peripheral control device for a sensor replies to that interrogation. Upon receipt of the transmission from a control unit, the peripheral control element of a sensor will reply with a similar constant mark C/M and two bytes of data D0, D1, D2 and D3.

As an example, for the particular implementation shown when the address prefix is 2, the controller sends an address without any data to an indoor sensor and waits for temperature data D0D1 and a light level D2D3 to be returned to the control unit. In a similar manner, when the prefix is 3 the controller sends the address of an outdoor sensor to a peripheral control element. Temperature data D0D1 and rain or wind data D2D3 is then returned to the control unit immediately upon reception of the interrogation. In instances of transmission for either actuators or sensors to insure reliable data transfer the control unit repeats the transmissions five times before ending the data burst. The remote controlled elements must receive two valid identical messages in sequence before they will be accepted and acted upon.

At the end of each time slot, a control unit will select the next time slot and check to see if that slot has been assigned to the system configuration by a user. If so, it commences transmission in the formats previously described depending upon whether the time slot has been assigned to a peripheral control element which regulates a sensor or an actuator. During the initial transmission, the information is proceeded by the unique word FF which serves to synchronize all remote elements and indicates that some remote element address is forthcoming. The remote element whose address follows the unique word will then take appropriate action while all others go back to waiting for another unique character before they are enabled. The unique word FF also permits all other control units not having been assigned that particular time slot a chance to synchronize their time slot clocks adaptively to the clock of the transmitting control unit.

This system alleviates contention problems between multiple net masters by this facile method. If there are other multiple network masters or control units present on the network contemporaneously there are no contention problems as long as: (1) their respective users assign no remote addresses in common, and (2) the controllers share a common time slot clock. The latter consideration is of course the more difficult one to implement. Since even stable crystal oscillators exhibit drift phenomena, an adaptive time slot synchronization scheme is utilized in the present system. In this scheme each net master continually monitors all transmissions of the other net masters for the unique character FF. As soon as the unique character is detected and the ensuing address information is received, a net master which is synchronizing to the transmission is given precise information regarding the state of the time clock of the transmitting master. Thus, in an adaptive manner all net masters can count the time slots of the frame in lock step with one another. With this communication technique provision is included for digital data communication with multiple net controllers without contention problems.

Figure 2:
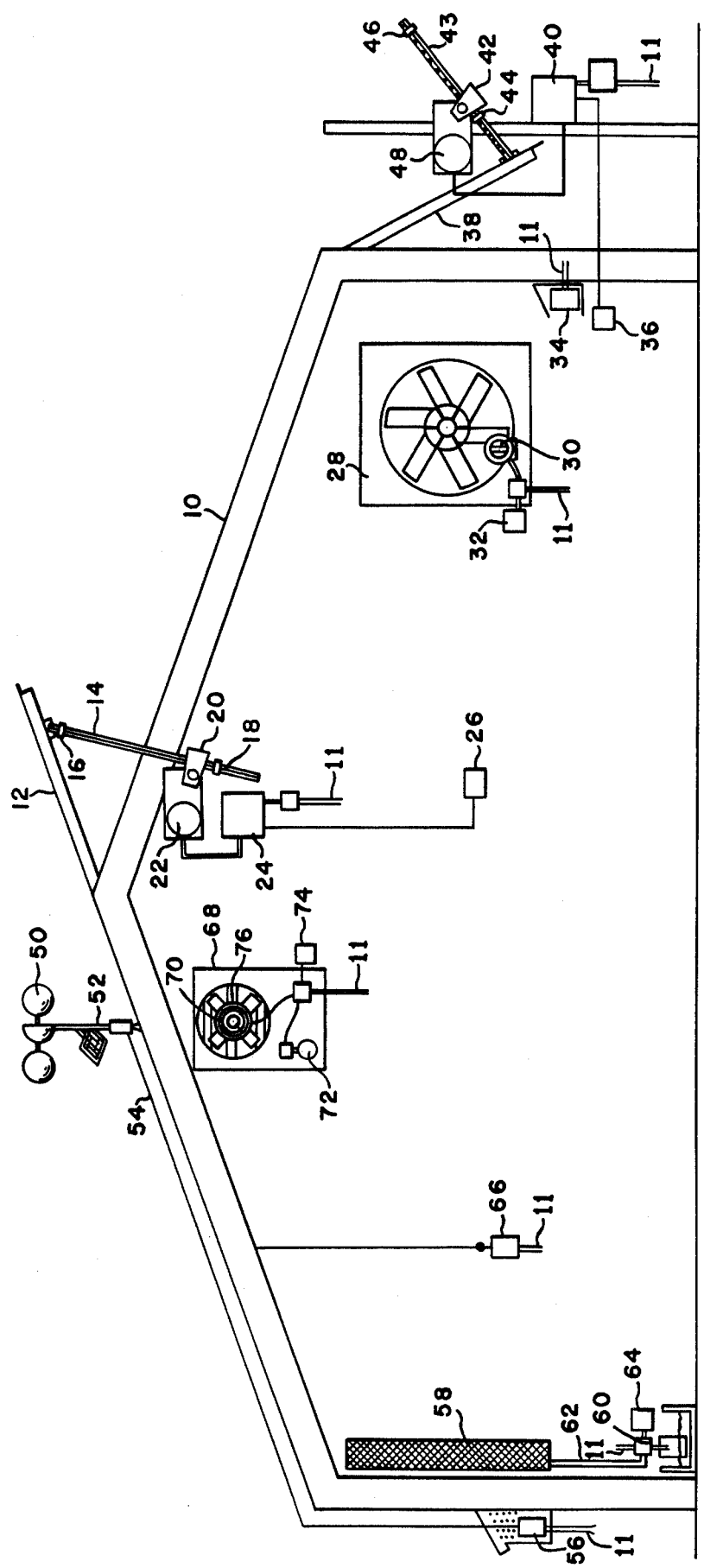
FIG. 2 is a pictorial diagram of a greenhouse with a plurality of peripheral elements for heating and cooling the structure which are controlled by the environmental control system illustrated in FIG. 1.

FIG. 2 shows a structure, more particularly a greenhouse, advantageously using an environmental control system according to the present invention. The implementation shown is merely illustrative and many other remote controlled elements or different configurations could be used with the present system. The greenhouse structure 10 includes a number of ventilation structures to provide circulation of inside and outside air, including a top vent 12 and a side vent 38. Generally these vent structures are operated by a motor 22, in the case of vent 30, operating a rack 14 and pinion assembly 20. The motor rotates the pinion of the assembly 20 to position the rack 14 and open or close the vent as determined by a vent motor controller 24.

The open position and closed position of the vent are sensed by striking plates 18 and 16 contacting limit switches on the pinion assembly 20. Further, the pinion of assembly 20 has a group of magnets disposed in opposition to a sensor which, when the pinion rotates, counts the teeth of the gear so as to provide a position indication to the vent motor controller 24. Further, a manual vent control 26 is provided to override any remote control signals to the vent controller 24.

In a similar manner the vent 30 operates by means of a rack 43 and pinion assembly 42 positioning the vent between the full open position, as indicated by striking plate 44, and the full closed position, as indicated by striking plate 46. The vent motor 48 rotates the pinion of the assembly 42 to provide positioning in response to commands from a vent motor controller 40. The vent motor controller 40 receives feedback signals from the pinion assembly 42 indicating the number of teeth sensed on the pinion gear by a magnetic sensing assembly and the extreme position signals for the full open and full closed positions. As was the case for the vent motor controller 24, the vent motor controller 40 is connected to a manual control unit 36 which may override the remote signals to the vent motor controller.

A master or net control unit 34 remotely controls the two or more vent motor controllers shown in the drawing to open and close the vents according to a programmed control. In addition the control unit 34 can interrogate a number of remote sensors such as an indoor sensor 66 and an outdoor sensor 56. The indoor sensor 66 comprises a temperature sensor and a day/night sensor for indicating the light level in the greenhouse structure 10. The temperature sensor indicates the indoor or actual temperature of the greenhouse structure 10 which can be used to control that actual indoor temperature to any particular point. Another remote sensor that is interrogated by the control unit 34 is the outdoor sensor 56. The outdoor sensor 56 is coupled to a roof mounted structure including an anemometer 50 and a rain pad 52. The anemometer 50 gives information as to wind speed as an electrical signal and the rain pad transmits information as an electrical signal with respect to rain conditions via a cable 54 to the outdoor sensor 56. In addition the outdoor sensor 56 comprises a temperature sensor to give an indication of the outside temperature conditions.

For air circulation purposes, an exhaust fan 28 is used in combination with an address controller 32. The address controller 32 is adapted to switch the fan motor 30 on and off according to instructions from the control unit 34. The exhaust fan 28 may be used in combination with either heating or cooling means and the vents to produce an increase or a decrease in the indoor temperature of the greenhouse structure 10. Normally, several exhaust fans for a particular zone of a greenhouse will be controlled in this manner.

Generally, the cooling means are embodies as a cooling pad 58 through which water is circulated by a pump 60 fed by conduit 62. The pump 60 is remotely actuated by means of a address controller 64 which is under control of the central control unit 34. Turning on the cooling pad motor 60 allows water to circulate through the cooling pads and by evaporation provides an air conditioning effect for the inside of the greenhouse structure 10.

Additionally, a heating unit 68 is supplied to raise the ambient temperature when needed. The heating unit 68 includes a blower motor 70 for exhausting heated air through a controllable louver structure 76 which directs the heated air flow. In addition a gas valve 72 may be proportionally opened to provide the fuel for burning needed to heat the air. These devices are remotely actuated by address controller 74 which is under the supervision of the central control unit 34.

In a programmed sequence having different stages and temperature set points, the vents, exhaust fans, and cooling pads may be used to reduce the temperature in the greenhouse structure. The vents, exhaust fans, and the heating unit can be used to increase the temperature in the greenhouse structure 10. The indoor sensor 66 allows a switch from two temperature programs on the basis of whether the light level indicates a day or night condition in the structure. In addition the indoor sensor 66 provides a signal for indicating the actual temperature of the structure. The outdoor sensor may provide wind and rain overrides for the particular program executed by the central control unit 34 or a modification of that program because of outdoor temperature.

The peripheral control elements of the greenhouse environmental control shown in FIG. 2 communicate over the existing AC power lines shown schematically as connections 11. It is evident that other devices could additionally be included in this control and that more than just one or two of each device could be used. For example, if a number of vents or exhaust fans are to be used together, although they have different physical peripheral control elements, they can be operated simultaneously by assigning the devices the same address or time slot in the protocol. Each peripheral control element communicates with the control unit 34 over the AC power lines as described previously to provide an integrated environmental control for a greenhouse. Further, it should be noted that the equipment shown will allow control of only one zone for a greenhouse. Of course, similar zones could be set up by duplicating the equipment shown and controlling them with either the control unit 34 illustrated or another net master.

The operator input means and the display of information to the operator for the control unit 34 are more fully disclosed in FIG. 4 where the front panel of the control unit is illustrated. A key pad is used for the entry of information and has touch sensitive keys for numerical inputs 0-9 and for sixteen function inputs. A reset key is provided to clear an entire program of the control unit out of memory and a clear key is provided to zero a particular entry out of the memory.

Other keys allow the input of the program variables into the memory of the control unit 34. For example, to enter the address programming, the address key 212 is pressed and then a series of two digit numbers are entered upon request from the display 200 until all peripheral elements have been assigned addresses or time slots. At that point the address key is again pressed and the address entries are closed. The operator can assign any of the addresses 0-99 for any remote element depending on its prefix. Only one address, however, is assigned to any one element unless it is to act in parallel with another. To proofread the entries, the display key 232 is pressed in combination with the address key 212. The display 200 in response to this keyed request sequence produces the programmed addresses in sequence and numerical order. Input of the starting time for a real time clock is produced by pressing the enter key 230 and then the time key 220. Thereafter, four digits can be entered for hours and minutes and either the AM or PM keys 208 and 210 are pressed.

The programming of the day set point temperature and the stage temperatures may then take place by pressing the enter key 230, the day key 230, the set point key 222, the temperature key 214, two digits for the set point temperature and either the Centigrade or Fahrenheit keys 204 or 206. This is the entry of the stage 0 or day set point and will provide the temperature which the controller will attempt to maintain in the program. Next, a stage temperature entry is produced by pressing the enter key 230, the day key 226, the stage key 224 with a digit identifier, the temperature key 214 and two digits identifying the beginning of the stage temperature in either the Fahrenheit or centigrade degrees.

The same sequence is produced for entering the data for the remaining stages until the programming for all day stages has been accomplished. As was the case for the addresses, the stage temperatures may be proofread by pressing the display key 232, the day key 226, the set point key 222, and the temperature key 214. With this sequence the entry in the memory for the day set point may be determined. Additional temperature set points for any stage can be determined in a similar manner. If the memory must be altered after the display, the clear key can be pressed and the variable reprogrammed as described previously.

Following the entry of the addresses for the peripheral elements and the program temperature stages, the actual elements are assigned to the stages by another entry process. The operator presses the enter key 230, the day key 226, the stage key 226, a digit indicating the stage desired, and then the data key 218. The display responds with an address request to which the operator replies with the numerical keys in three digits. The display then requests either the percentage that a particular vent should be open or whether the actuated element of an address should be on or off. The display then calls for the address of the next device and the operator enters information as to the percentage opening or whether the device is to be on or off.

The process continues until all the elements for a particular stage have been entered and then the process is repeated for all the remaining day stages. The entries may then be proofread by pressing the display key 232, the day key 226, and the stage key 224 with an identifier number and the data key. Incorrect entries can be removed from memory with the clear key and then reentered as described previously. The night programming may be performed in a similar manner by setting the night set point and stage temperatures and then assigning the particular elements to the stages.

A manual key 236 is provided to allow the system to be forced into a particular stage. An operator may select a stage out of sequence, or temporarily drop a stage from the program, or lock the current stage into operation for an indefinite period of time. When the control is switched to the manual mode, the system operates only as programmed for the particular stage until another stage is called for manually or the system reverts to the automatic mode by pressing the auto or clear key 234.

In the automatic mode, the controller steps through the programs for the day and night entries controlling the elements as set forth in the sequential operation. Day to night program change is provided by the light level indication from the indoor sensor. During the automatic mode the display is in a roll over mode where particular information about the stage is being output continuously for five seconds each. The real time, set point temperature, inside and outside temperatures, and the current stage of operation are displayed. This display sequence will then be repeated until one of these parameters changes.

An example of a program and the operating conditions for each element in a program of seven stages is shown in FIG. 5. The ideal temperature of a structure at any given time is known as the set point and is the temperature boundary for stage zero of the control. Thereafter, temperature is controlled in stages or bands which can be of any temperature range desired. For each temperature band or stage, the percentage of vent opening and all remote on/off and proportional control functions are determined thereby fully configuring the system for each stage. Whenever the temperature rises above or falls below a stage temperature, the system begins operating all of the equipment which is assigned to the new stage. A built in delay avoids excessive cycling of the equipment as the temperature passes through the stage thresholds. Light levels are metered by the indoor sensor and determine whether the control unit operates in either the day or night program. The day program can be run during the night or the night program can be run during the day by either covering the photocell developing the light level control signal or by shining a light on the photocell as needed. It is also possible to adjust the threshold of the light sensor so that during dark cloudy periods when photosynthesis is not occurring the control unit will switch to the night mode and reduce the use of energy by the control elements.

The program shown illustrates a sample warm weather (Summer) program for pot mum production in a warm location such as the sun belt. The program is intended to conserve energy by using the mechanical cooling of the evaporation pad system only when all other less energy consuming cooling measures have been taken. For example, the side and roof vents are opened progressively through stages 1-5 until the temperature inside the greenhouse exceeds the 84° threshold. In stage 6, the roof vent opening is completely closed to maintain any cooling effect that is provided by turning fan number 1 and the cooling pad pump on. As the temperature increases to 86° at stage 7, the roof vent opening remains closed, the side vent is fully opened, both fans are on, and the cooling pad pump is fully on. It is noted that for a different section of the country, for different growing crops, or even at the same location but under spring, fall, or winter conditions the program would be quite different. The system can advantageously be programmed for all of these conditions or for many other structures, thereby providing the flexibility needed for various situations.

Figure 6:
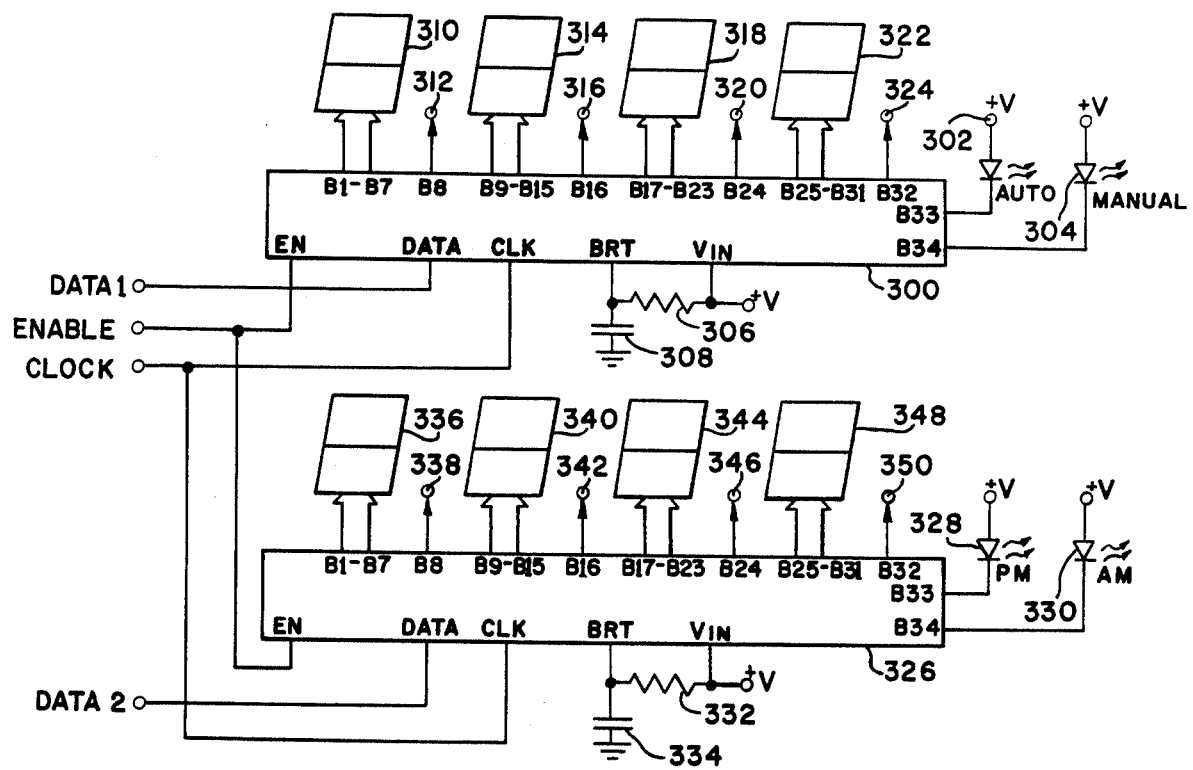
FIG. 6 is a detailed electrical schematic diagram of the display of the system control unit illustrated by FIG. 1 and FIG. 4.
Figure 7:
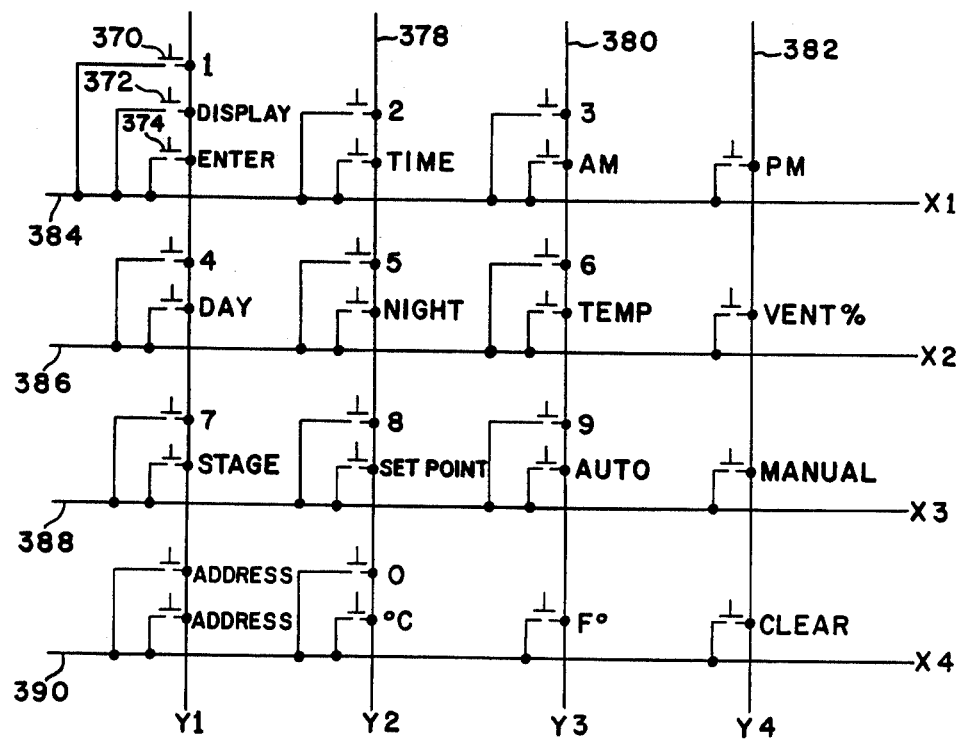
FIG. 7 is a detailed electrical schematic diagram of the control keys of the system control unit illustrated in FIG. 1 and FIG. 4.

Referring to FIGS. 6 and 7 the front panel illustrated in FIG. 4 is shown in a detailed schematic form. The display comprises two parts which are a keyboard portion shown in FIG. 7 and a display portion shown in FIG. 6. The display as illustrated in FIG. 6 is used to drive eight 7-segment displays 310, 314, 318, 322, 336, 340, 344, and 348, along with their decimal points 312, 316, 320, 324, 338, 342, 346 and 350. In addition, light emitting diodes 302, 304, 328 and 330 are controlled for producing indications of an automatic mode, a manual mode, and for PM or AM indications, respectively.

The display elements are driven by two identical display driver chips 300 and 326. Each display driver chip, for example the one referenced 300, contains a brightness circuit including resistor 306 and capacitor 308 which couples between the power supply input +V of the driver device 300 and the brightness terminal BRT. Display driver 326 has a similarly connected circuit comprising resistor 332 and capacitor 334. Depending upon the values of the resistors and capacitors, the brightness of the particular display is controlled by the amount of current that is drawn through its elements.

The display driver devices also include an enable input EN, a data input DATA, and a clock input CLK. Serial data in digital form is provided on the communication line DAT1 to the data input DATA and is clocked into the driver device 300 by means of a clock signal CLOCK when the device is enabled with an enable signal ENABLE. The central processing unit of the system control outputs the serial data words to the device 300 over the DATA1 line which are applied to the outputs B1-B34 to light those particular elements in the display which have a logical one in their bit position. Those elements which have a logical zero in their bit position of the transmitted word are not lighted. Similarly, the central processing unit communicates with the device driver 326 via the enable signal ENABLE, the clock line CLOCK, and a data line DATA2. The displays are updated when necessary by the program to display the addresses, set points, stages and the peripheral control element assignments.

In FIG. 7, the keyboard connections for the display unit are illustrated. The keyboard comprises a 4×4 matrix including lines 376-382 which form inputs Y1-Y4 for the central processing unit and lines 384-390 which form inputs X1-X4 for the central processing unit. The central processing unit can strobe the inputs X1-X4, Y1-Y4 to determine the continuity between two lines because of the pressing of a key. The keys displayed indicate those matrix points which are connected together for a particular character or command. For example, lines 376 and 384 are connected by pressing push button 370 to indicate the numeral 1. Further, those lines are connected together to indicate a DISPLAY command with push button 372 or an ENTER command with push button 374. The particular lines which have continuity are decoded by the central processing unit into the particular character or command. For more than one character or command, the sequence of the entry determines the decoding process in the control unit.

Figure 7A:
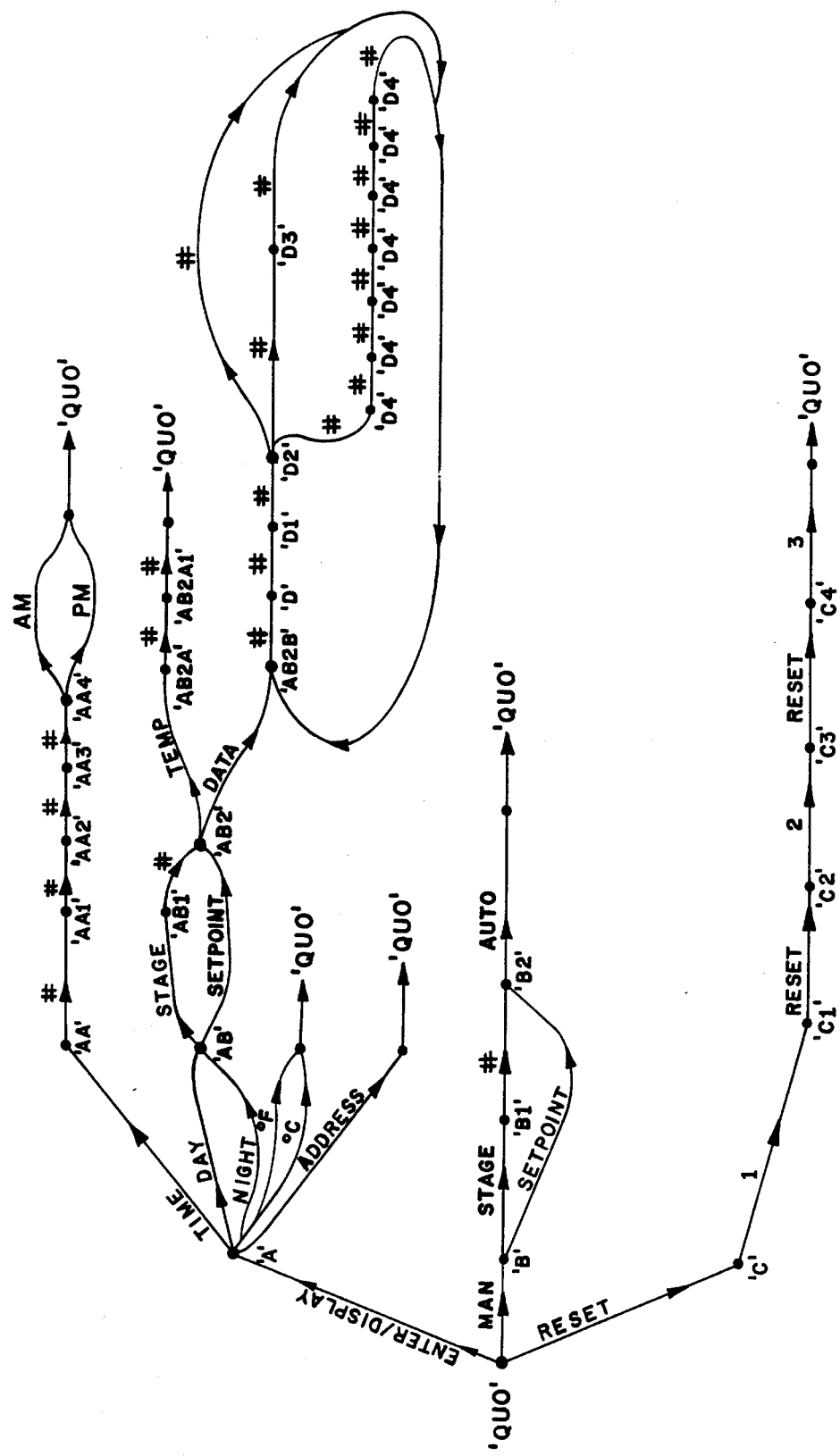
FIG. 7a is a schematic flow diagram of valid sequences for the keys illustrated in FIG. 7.

FIG. 7a illustrates a flow diagram of the valid sequences from the keyboard. The decoding of the flow diagram sequences which have been described previously with respect to the entry of the addresses, stages, and equipment assignments are accomplished by a software decoding program. The sequence of key strokes are indicated on the top of the flow diagram connectors and the specific routines in the decoding program are represented by the dots between connectors and have the names given them. A specific listing for the decoding program is found at the end of the specification.

Figure 8:
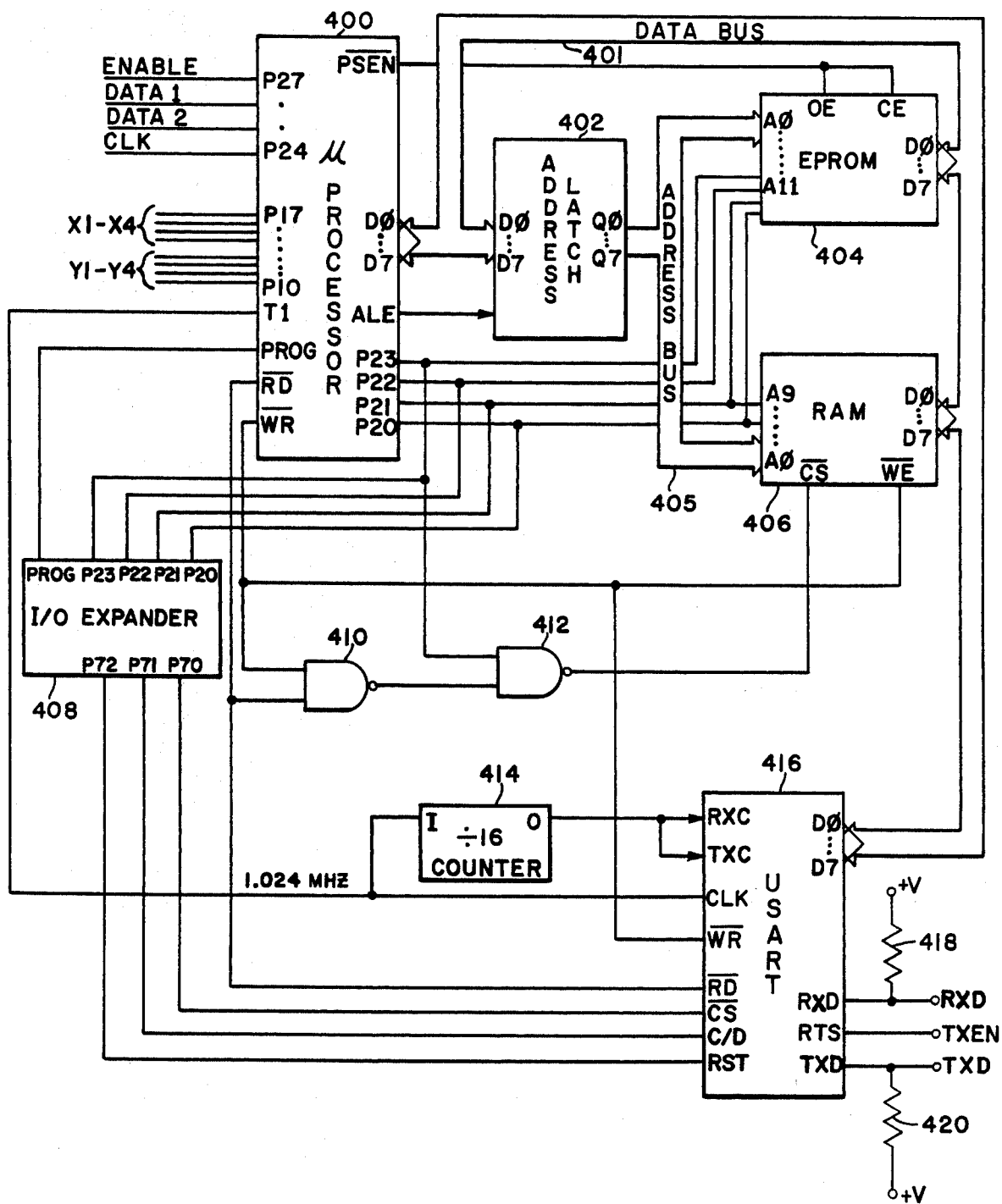
FIG. 8 is a detailed electrical schematic diagram of the circuitry for the system control unit illustrate in FIG. 1 and FIG. 4.

Referring now to FIG. 8 an electrical schematic diagram of the system control unit is illustrated. A central processing unit (CPU) 400 performs the keyboard and display interface functions in accordance with a stored program and provides communication to the peripheral control elements. In the illustrated embodiment the microprocessor 400 may be a model 8035 microprocessor manufactured and commercially available from the Intel Corp. of Santa Clara, Calif.

The program for the control of the system is provided in an EPROM 404 and a random access memory 406 is included for storing intermediate variables, flags, and the operator program for control of the system. The processor 404 has a multiplexed address and data bus D0-D7 and thus requires the utilization of an address latch 402 to prolong the address outputs while placing data signals on the bus. The EPROM 404 is addressed by twelve digits including the eight bits supplied by the Q0-Q7 outputs of the address latch 402 and four bits supplied by the port 2 pins, P20-P23. Upon enablement of its output enable and chip enable terminals OE, CE, respectively by a program store enable signal PSEN from the microprocessor 400 the EPROM 404 outputs an instruction onto the data bus. The microprocessor 400 receives the instruction via the data bus 401 and executes the instruction to perform a program cycle.

A random access memory RAM 406 may be addressed in a similar manner via the address latch 402 and two address lines P20 and P21 applied to its address inputs A0-A9. When the RAM 406 is addressed and selected, via its chips select input CS, a data word will be output on the data bus to microprocessor 400. Alternatively, when the RAM 406 is addressed and selected with the CS input it will accept data from the data bus 401 if its WE input is enabled. The RAM 406 is selected for either reading or writing from the output of a NAND gate 412 which has as one of its inputs the logic level on line P23 and as its other input the output of NAND gate 410. NAND gate 410 decodes the outputs of the microprocessor 400 to produce either read or write memory cycles from terminals RD and WR, respectively. The logic level on line P23 is used to choose between the RAM 406 and another I/O device 416.

The inputs from the keyboard X1-X4, Y1-Y4 are read by the microprocessor into the port 1 inputs P10-P17. The port 1 lines P10-P17 are able to read the bit inputs from the keyboard display indicating which lines are connected together by individual keys. Outputs for control of the display by the microprocessor 400 are port 2 lines P24-P27. P24 applies the clock signal CLOCK to the display while lines P25 and P26, respectively output serial data for the DATA1, DATA2 signals, respectively. Line P27 applies the signal ENABLE at the correct times to produce a display under program control of the microprocessor 400.

The microprocessor 400 also controls a universal synchronous-asynchronous receiver transmitter (USART) 416 which communicates with the interface means 100. The USART device 416 receives and transmits digital data in byte form from the microprocessor 400 and converts it into serial data which can be then converted by the communication interface bit by bit into a frequency shift keyed signal for coupling to the power line. Received digital data from the interface in serial format is input to the RxD terminal of the USART device 416 through a pull up resistor 418. For transmission to the communication interface the USART 416 provides an enabling signal TxEN from its ready to send terminal RTS. Serial data in digital form is transmitted to the communication interface via the line TxD from the transmit terminal of the device. The transmit line TxD is provided with a pull up resistor 420.

The transmission frequency of the data is determined by the input of a clock to the receive clock, RxC, and transmit clock, TxC, terminals of the USART device 416. The clock in this particular embodiment is derived from a 1.024 MHz clock output from the T1 output of microprocessor 400. The clock signal is applied to the CLK input of USART device 416 and is further divided by 16 before being input to the receive and transmit clock terminals of that device. The division is provided by a four bit counter 414 connected between the terminals, RxC, TxC and the T1 output of the microprocessor 400.

The control of the USART device 416 is supplied by the read, write outputs RD, WR, respectively, connected to similarly labeled inputs of the device and three outputs P70-P72 of an I/O expander device 408. The P70 output signal is applied to the chip select input CS, P71 is applied to the command or data select input C/D, and P72 is applied to the reset input RST of the device 416. These P70-P72 signals are generated from the address outputs P20-P23 of the microprocessor 400 by transferring of a nibble to the I/O expander device 408 upon a strobe from the PROG output of the microprocessor 400.

To send a data byte over the power lines the microprocessor 400 first selects the USART device 416 with the chip select input CS and thereafter brings the write line WR low and outputs the data byte on the data bus D0-D7. This will cause the USART 416 to receive the data byte and load it into a holding register for transmission. The microprocessor 400 can by writing a command over the data bus cause the stored data byte to be transmitted via data line TxD. For receiving data, the USART 416 inputs the data via the RxD input asynchronously into a holding register until the microprocessor 400 is ready to receive that data. Upon a command generated by bringing the RD output of the microprocessor 400 to a low level, the USART device 416 will place the received data byte on the data bus for input to the microprocessor. The transmission protocol of the USART 416 is such that during transmission a start bit, stop bit and a parity bit are added to the eight bits of a data byte. Additionally, upon reception these bits are stripped from the data by the USART 416 before being input to the microprocessor 400.

Figure 9:
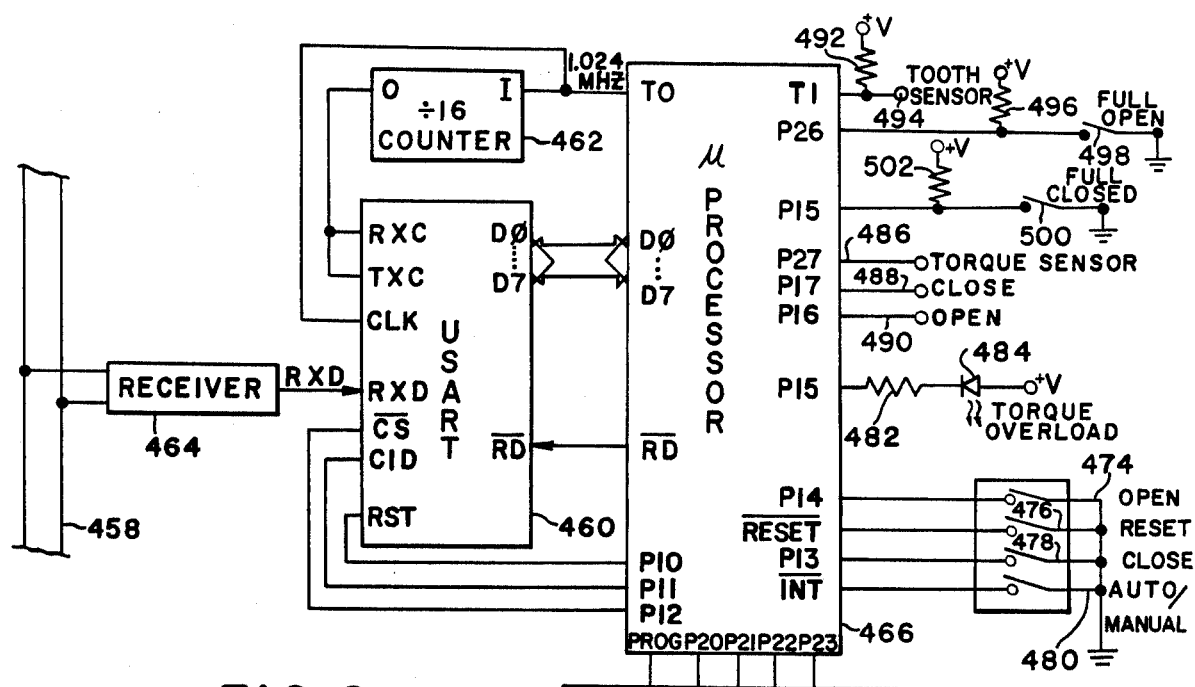
FIG. 9 is a detailed electrical schematic diagram of the circuitry comprising the vent motor control illustrated in FIG. 1.

With reference now to FIG. 9 there is shown a detailed schematic diagram of circuitry implementing a vent motor controller such as the one shown as 116 in FIG. 1. The vent motor controller comprises a microprocessor based controller which communicates with a system control unit via an interface comprising a communication device including a receiver 464 and a USART 460. Since the vent motor controller only receives commands just a receiver is required for the communication interface. Digital data is received by the USART 460 from the communication interface via its RxD input. The USART 460 receives a clock from the T0 output of the microprocessor 416 as a 1.024 MHz signal. As previously described this clock signal can be divided by a divide by 16 counter 462 before being applied to the receive clock and transmit clock inputs RxC, TxC, respectively. This produces a clock for reading in serial digital data from the receiver 462 which has decoded the frequency shift keyed information from the power line 458.

The microprocessor 466 can then request that the data which is stored in the USART 460 be read by lowering its RD output and thereby transmitting a signal to the RD input of the device 460. If the device is selected via P12 and its chip select input CS and is in a data mode via a signal on the P11 input to its C/D input, then a read signal RD will cause the data byte stored in the USART 460 to be transferred to the D0-D7 inputs of the microprocessor 466.

This data is an address indicating whether this particular vent is being commanded and a command byte indicating the percent opening for the vent if it is the one selected. The address sent from the control unit is matched against an address input to the microprocessor 466 from terminals P20-P23. The address for the particular vent can be set by a pair of thumb wheel switches 472 and 470 which input two BCD digits to terminals P50-P53 and P60-P63, respectively of an I/O expander device 468. The I/O expander device 468 has its input terminals P20-P23 connected to the terminals P20-P23 of the microprocessor 466 and when strobed with a PROG signal are able to transfer the BCD digits from the thumb wheel devices.

In general, the microprocessor 466 controls the vent through a signal OPEN generated on line 490 from P16 and a signal CLOSE generated on line 488 from P17 of the microprocessor 466. By knowing the position of the vent and by applying a CLOSE or OPEN signal for a predetermined time, the microprocessor 466 can position the vent at any desired % opening. The microprocessor 466 senses the position of the vent via inputs to its T1, P15, and P26 terminals. The input to T1 is from a magnet sensor via input line 494 and a pull up resistor 492. The magnet sensor produces a ground signal upon the passage of a magnet in the pinion gear by the sensor. In addition, a limit switch 500 is connected to input P15 via a pull up resistor 502 and produces a ground on P15 when the limit switch is closed by hitting a striking plate. A switch 498 is connected to P26 via pull up resistor 496 and produces a ground level signal when the striking plate of the rack hits it indicating the vent is fully open. These three signals, whether the vent is fully open, fully closed, or has a magnet signal, provide information to the microprocessor 466 about the actual position of the vent. The microprocessor thereafter modifies this information in accordance with the command given by the control unit over the power line to position the vent. In addition, the microprocessor 466 receives a signal via line 486 to input P27 from a torque sensor to indicate a torque overload on a vent motor. If a torque overload is sensed, then the microprocessor 466 includes programming to protect the motor and to light a torque overload LED 484. The LED 484 is connected between a source of positive voltage +V and output P15 via resistor 482. The microprocessor by producing a low level signal on output P15 can activate the LED 484.

In addition, the microprocessor 466 receives four inputs from switches 474, 476, 478 and 480 which comprise a manual override unit for the vent motor controller. Switch 476 can be closed to ground the reset terminal RESET of the microprocessor 466 thereby producing a jump in the programming to the beginning of the vent controller program. This will cause a reinitialization of the control program and may be needed if the processor is hung up in a loop or has stopped the vent motor because of a torque overload which has cleared. Switch 480 provides a ground signal to the INT or interrupt input of the microprocessor 466 to transfer control of the program to a manual control program. This is the automatic/manual switch and produces an automatic mode when the switch is opened and a manual mode when closed. In the manual mode, switch 474 via a ground signal to the input P14 of the microprocessor or switch 478 via a ground signal to the input P13 will produce an OPEN and CLOSE signal, respectively. The microprocessor 504 will receive these signals and generate the OPEN and CLOSE control signals therefrom to provide manual movement of the vent. After positioning the vent at any desired opening, the operator may revert to automatic control by opening switch 470.

Figure 10:
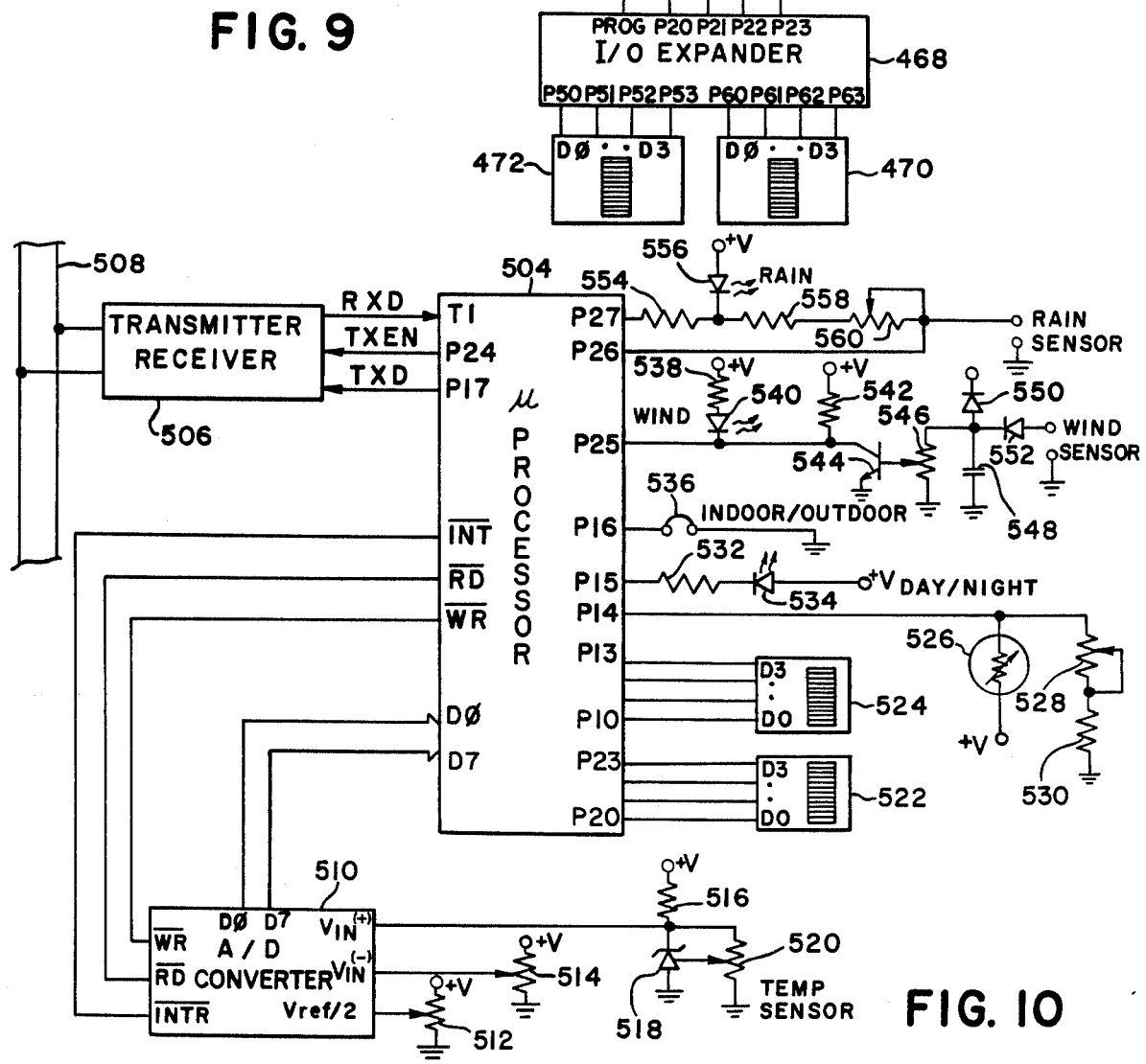
FIG. 10 is a detailed electrical schematic diagram of the circuitry comprising the remote sensor controller illustrated in FIG. 1.

FIG. 10 illustrates a schematic electrical diagram for a remote sensor controller such as the one referenced as 118 in FIG. 1. A number of remote sensors may be interrogated for their parameter inputs by this controller. A microprocessor 504 communicates directly with a control unit via a communication interface 506 including a transmitter and receiver as previously described. The transmitter/receiver 506 converts digital data from the microprocessor 504 into frequency shift keyed data for transmission over the power line 508 and decodes frequency shift keyed data from the power line into digital data for the microprocessor 504. Serial data is received by the microprocessor 504 via the RxD line and is input to terminal T1 of the device. Serial data is transmitted from the microprocessor via output P17 over transmission line TxD with a transmit enable signal TxEN from output P24.

Input P16 of the microprocessor 504 and jumper 536 are used to describe whether the remote sensor controller is connected as an indoor sensor or an outdoor sensor. If the input P16 is jumpered to ground with the jumper 536, then the device will be connected as an indoor sensor and, conversely, if input P16 is left floating this indicates that the device is controlling an outdoor sensor. Through the receiver of the communication interface the microprocessor 504 receives an address which is to be matched with the address of the remote sensor controller. This address is provided at pins P10-P13, P20-P23 via the outputs of two thumb wheel switches 522 and 524. The adjustable address adds flexibility to the remote sensor controller where addresses from 00-99 BCD can be assigned to either an indoor sensor or an outdoor sensor or a humidistat.

If the device is an indoor sensor, input P14 is connected to a photo cell 526 which has a bias network including a variable resistor 528 and resistor 530. In general, for night time conditions, the photo cell 526 presents a low level logic signal to the input P14 and when irradiated with enough light decreases its resistance to where a high level input is generated to input P14 thus indicating a day condition. The microprocessor senses the different logic level signals on P14 and lights LED 534 to produce an indication of the logic level decoded on terminal P14. The LED 534 is operated by pulling current from a source of positive voltage +V through resistor 532 when output P15 is at a low logic level.

On the other hand, if the remote sensor controller is connected as an outdoor sensor, then a rain sensor and wind sensor are provided. A rain sensor is connected between the input P26 and ground and receives a bias current via the serial connection of a LED 556 a resistor 558, and variable resistor 560. If rain is sensed, the sensor lowers its resistance and produces a low level logic for input to P26. Additionally, this action will draw current through the LED 556 and the bias network to light that device. Terminal P27 and resistor 554 are connected to the cathode of the LED 556 to provide a software operation of the LED 556 whether or not the rain sensor is producing a low resistance.

In addition, a wind sensor or anemometer is connected through a diode 552 to produce a voltage signed on the parallel connection of a resistor 546 and a capacitor 548 which filters the signal. A clamping diode 550 is connected between the cathode of the diode 552 and a source of positive voltage +V to prevent the voltage on the capacitor and resistor from exceeding the logic level +V. The voltage signal produces a bias on the base of an NPN transistor 544 connected by its collector through a resistor 542 to a logic voltage +V and by its emitter to ground, such that a signal is generated to input P25 indicating when the anemometer is producing a voltage in excess of a threshold. A low logic level on P25 of the microprocessor 504 indicates that the wind is in excess of the threshold. At this point, because of the connection of an LED 540 to a source of positive voltage +V via resistor 538, a visual indication of wind in excess of the threshold is generated.

For either an indoor sensor or an outdoor sensor, the temperature is read by the microprocessor 504 via an analog/digital converter 510 and a temperature sensor 518 whose voltage output is dependent upon temperature. The temperature sensor 518 is connected at its anode to ground and by its cathode to a source of positive voltage +V through a resistor 516 and provides a variable voltage output at the junction thereof depending upon the ambient temperature. The calibration of the temperature sensor 518 is adjusted by a variable voltage applied to its gate terminal via the wiper of a calibration resistor 520. The voltage output from the junction of the cathode and resistor 516 is applied to the voltage input Vin(+) of an A/D converter 510. The differential input Vin(−) of the A/D converter 510 is connected to the wiper of a reference resistor 514 which produces a voltage level referenced to ground. Another reference voltage is developed at the wiper of resistor 512 and is input to the Vref/2 input of the A/D converter 510 to produce a midlevel for the conversion process.

The converter 510 has data output D0-D7 connected to the data input lines D0-D7 of the microprocessor 504 and provides a data word indicating the temperature in digital form of sensor 518 when requested by a read signal on the RD output of the microprocessor 504. The conversion process is initiated by strobing the WR input of the A/D converter 510 from the WR output of the microprocessor 504 and waiting until the A/D converter replies with an interrupt signal from its interrupt request output INTR. The interrupt signal is applied to the INT terminal of the microprocessor 504 and indicates temperature data is ready. The handling of the interrupt will produce a branch to a program whose execution which generates a read request from the microprocessor 504 and a storage of the temperature word.

Figure 11:
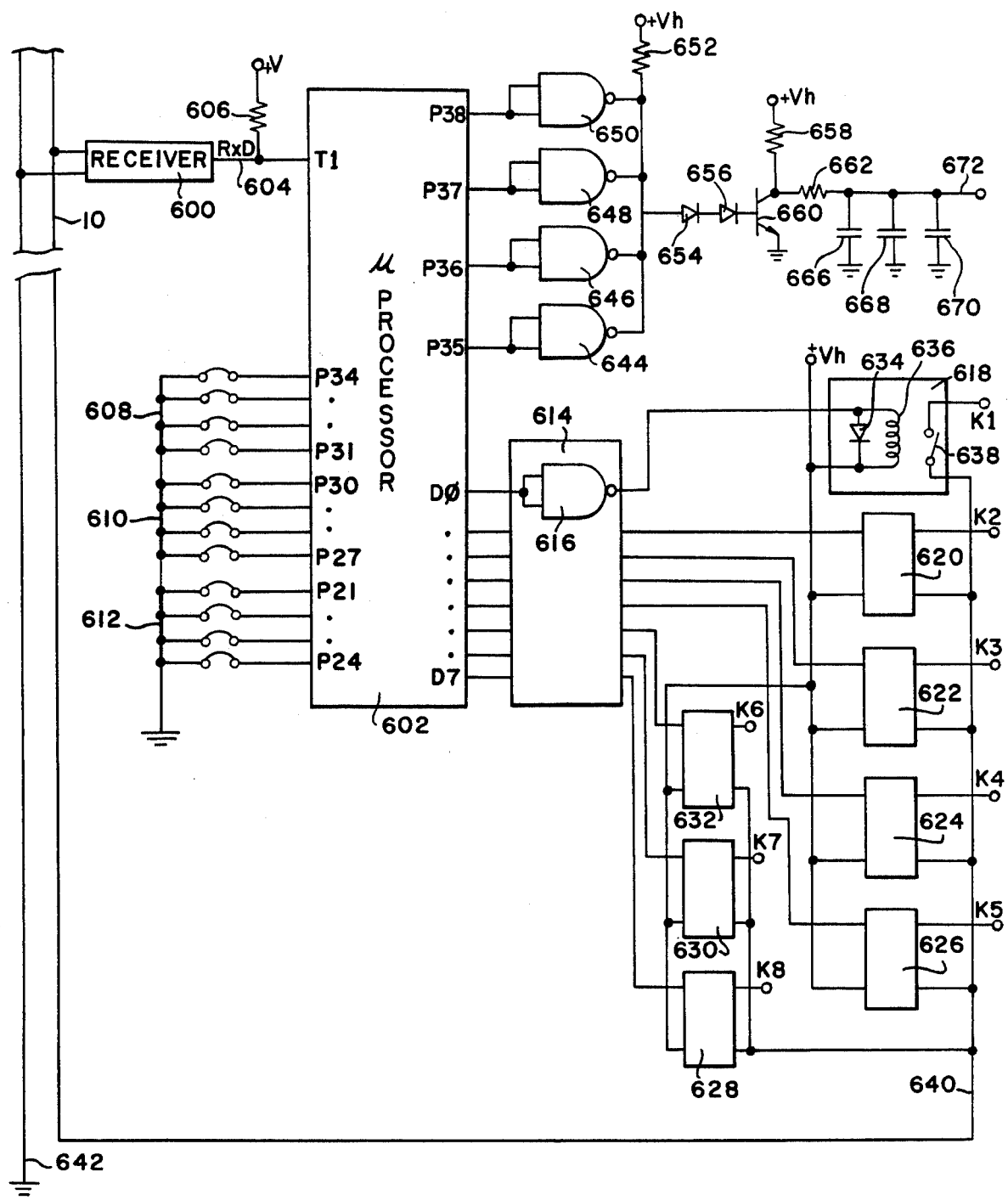
FIG. 11 is a detailed electrical schematic diagram of the circuitry comprising the address controller illustrated in FIG. 1.

With reference now to FIG. 11 there is shown a detailed schematic diagram for an address receiver controller such as that referenced 120 in FIG. 1. The address receiver controller is a microprocessor based remote controller which receives commands over the power line 10 in a frequency shift keyed format. The frequency shift keyed commands are decoded by a receiver 600 into serial digital data which is then input to a microprocessor 602 via a received data line RxD and the input T1. A resistor 606 is provided between the receive data line RxD and a voltage +V in order to provide active pull up for the transmission line. The receiver 600 is constructed as previously described for a communication interface means and applies serial digital data to the input T1 to provide signals to the microprocessor which are then decoded as data.

The microprocessor 602 further has four sets of jumpers 608, 610 and 612 which are connected in groups of four to input port pins P31-P34, P27-P30, and P21-P24, respectively. These jumpers can be connected to a terminal which is grounded in order to provide a low level signal on each of the port pins of the microprocessor 602. In this way the address of a particular remote peripheral control element is easily setable. The four bits of jumpers 612 provide the prefix, whereas the four bits of jumper sets 608 and 610 provide a method for programming the lower and higher nibble of an address T0T1. Because an address receiver may have a different prefix depending on its function, jumpers 612 are provided to easily program the prefix function of the device. As can be seen from the table in FIG. 3d, A prefix of 4, 5, or 6 indicates an address receiver having a single actuated device. A prefix of 7 indicates an address receiver with eight actuated devices, and a prefix of 8 indicates an address receiver with proportional control capabilities.

The microprocessor 602 receives the commands from a central control unit and generates a plurality of on/off control signals via its data bus D0-D7. These on/off control signals are transmitted to a corresponding group of driver inverters 614 one of which is illustrated as 616. The driver inverter 614 produce a inversion and current amplification of the output signal for driving the coil of a relay. Each of the drivers is attached to relays 618-632 which have switch outputs K1-K8, respectively. Each of the relays is similar and only one will be described for exemplary purposes such as the one labeled 618. The output of the driver 616 is applied to one terminal of the relay coil 636 whereas the other terminal of the relay coil is connected to a coil voltage source +Vh. A diode 634 is placed between the two terminals of the coil 636 to provide a path for the flyback pulse when the relay is switched off.

The output terminal of the relay switch K1 is attached to the power supply input of the operative device which it is to switch ON and OFF, and the switch terminal 638 is connected to one of the power supply lines, for example 640. The other power supply line 642 acts as a cold or common terminal for the relay outputs K1-K8 and is coupled to the power supply return of the operative device. When a logical 1 is output on one of the data lines for example D0, the output of inverter driver 616 produces a low level signal which sinks current through the coil 636 from the supply +Vh causing the closure of relay contact 638 and thereby operating the device connected to that particular relay. The microprocessor by outputting a different word on the data bus and latching that word can operate one or any of the relays 618-632 in this manner.

An address receiver for operating eight actuated devices (prefix 7) has been described but it is evident that if the prefix were set to 4, 5, or 6 the same configuration could operate the single actuator implementation with a single relay coupled to one of the data lines. In the implementation shown in FIG. 2 these devices control those remote elements which necessitate on/off control such as the exhaust fans, cooling pad pump, heater blower motor, heater louvers, and the heater gas valve. It should be noted, however, that any remote device needed on/off type switching can be controlled in this manner.

Additionally the microprocessor 602 of the address receiver controller can provide for a proportional control based upon commands received over the power lines. This implementation will be provided when the prefix is set at 8. Pins P35-P38 of port 3 of the microprocessor 602 connect to the input of inverting NAND gates 644-650, respectively. The outputs of the NAND gates are tied commonly to one terminal of a resistor 652 whose other terminal is connected to a source of positive voltage +V. The common junction of is further connected to the base of a NPN transistor 660 through two diodes 654 and 656. The transistor 660 is connected as a common emitter amplifier with a collector resistor 658 tied to a power supply +Vh. The output of the amplifier, at the collector terminal, is connected to a filter circuit comprising resistor 662 and a group of parallel capacitors 666, 668 and 670. Operationally, the microprocessor 602 by generating different digital words through port 3 on pins P35-P38 provides a variable drive to the base of transistor 660 which produces a voltage on the collector which is filtered through the resistors and capacitors of the output. By varying the digital word, a proportional voltage output from terminal 672 can be provided to a controlled device.

To produce operation of an address receiver, the central control will address the peripheral control element during the time slot which has been assigned to it. The address is decoded by matching the jumper pins to the inputs via the jumpers 608, 610 and 612. Depending upon the prefix the address controller determines whether it should be providing proportional control or controlling one or more of the relays 618-632. The command word which is received after the address prefix and the unique framing character indicates to the address receiver controller which of the relays are to be operated or what the voltage on the output terminal 672 is to be. The microprocessor 602 decodes and follows these instructions by outputting the necessary digital words through the data terminal D0-D7 or the port 3 outputs P35-P38.

Figure 12:
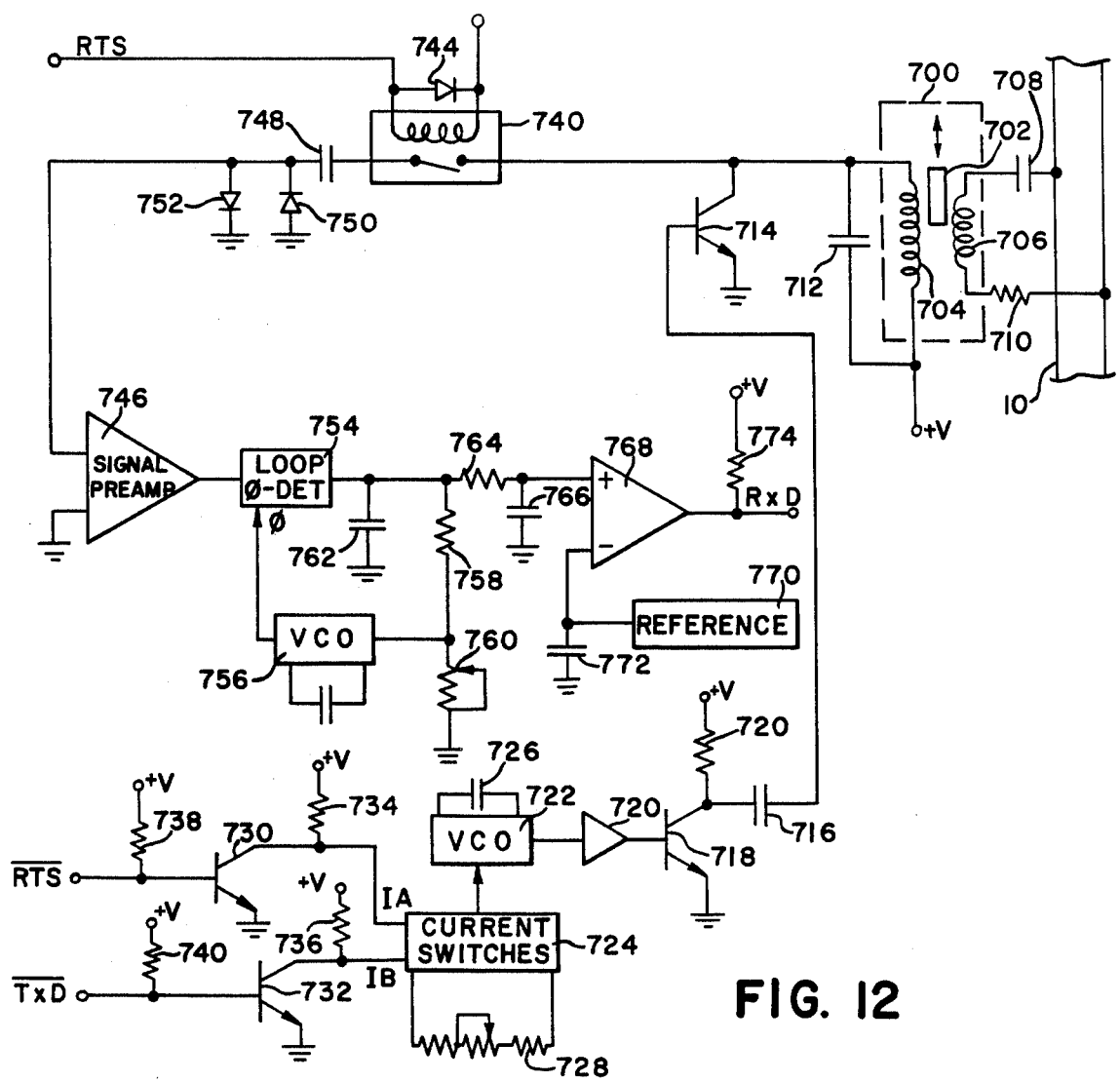
FIG. 12 is a detailed electrical schematic diagram of the circuitry comprising an interface means illustrated in FIG. 1.

FIG. 12 shows the detailed circuitry implementing the communication interface means. The embodiment shown includes both a receiver and transmitter, but it will be seen that either can be used independently without the other. The receiver/transmitter is inductively coupled to the power line 10 by an isolation transformer 700 which has a tuning slug 702 for varying the coupling between the secondary and primary of the transformer. The tuning slug 702 is used to vary the coupling parameter and thereby the inductance of the transformer to fine tune the frequency of the transmission and the frequency for detection of the information. The secondary winding 704 of the isolation transformer 700 is connected to the power line 410 at one terminal through a coupling capacitor 708 and at the other terminal through a load resistor 710. A tuned circuit is provided for the primary winding 704 of the transformer 700 by a parallel capacitor 712 connected in parallel with the winding.

A transmit channel is coupled to the low voltage terminal of the primary winding 712 of the isolation transformer 700 via a NPN transistor 714. The transistor 714 by being switched on and off produces a oscillation in the tuned circuit comprising the primary winding 704 of the transformer and the capacitor 712. The oscillating voltage which switches the transistor 714 on and off is provided to the base of the device through a coupling capacitor 716 from a common emitter amplifier comprising an NPN transistor 718 and a collector resistor 720. The common emitter amplifier is driven by a linear preamplifier 720 which amplifies the output of a voltage controlled oscillator 722.

The voltage controlled oscillator 722 produces one of two frequency tones depending upon the digital input of the microprocessor on the transmit line TxD and transmit enable line TxEN. The voltage controlled oscillator 722 outputs a frequency dependent upon the current input from a current matrix comprising switches 724 and the value of a timing capacitor 726, and a network of timing resistors 728. The present configuration allows four different frequencies to be output. The frequencies are selected by the two digital inputs from the ready to transmit enable line TxEN and the transmit data line TxD. THe digital inputs from these lines are amplified by common emitter amplifiers comprising NPN transistors 730 and 732 with collector resistors 734 and 736, respectively. Base resistors 738 and 740 are supplied with a positive bias voltage +V which normally produces conduction from the transistors on a 00 digital input to the current switches 468.

When the microprocessor of a particular device wishes to send information over the power lines, it will lower the TxEN signal and produce a high logic level from the inversion of the amplifier 730 on the input IA. This high level on the input IA will select the two higher frequencies of the VCO to be the FSK frequency output. Because the data line TxD is generally at a high logic level the terminal IB will be at a low logic level and thus provide the higher FSK frequency for digital data which are ones. By lowering the data line Txd for digital bits, the VCO 726 will change frequencies to its lower frequency and output FSK zeros. The FSK signal is coupled through the amplifiers 720, 718 and the transistor 714 to the isolation transformer 700 and onto the power lines to be received by the peripheral control elements.

The second portion of the communication interface is a receiver channel which is normally disconnected from the isolation transformer 700 by means of a relay 740 when the communication interface is transmitting. The relay contacts are closed by drawing current through the coil 742 of the relay via the ready to transmit enable line TxEN. A diode 744 is poled across the coil 742 of the relay 740 to absorb the inductive spike when the TxEN line is released. Frequency shift keyed signals are coupled to a signal preamplifier 746 via a coupling capacitor 748 and clipping diodes 750 and 752. The clipping diodes prevent the input signal to the preamplifier 746 from exceeding a predetermined level of 0.6 V. The output of the signal preamplifier 746 is coupled to a loop phase detector 754 which outputs a signal dependent upon the phase difference between the input signal and the output signal of a voltage control oscillator 756. The frequency of the voltage control oscillator 756 is controlled by a voltage developed between a filter resistor 758 and filter resistor 760.

The filter resistors 758, 760 in combination with a capacitor 762 form a filter which is frequency sensitive to the tone or FSK bit that is being detected. The VCO 756 phase detector 754 form a phase locked loop which outputs a certain voltage level if the correct tone frequency is being received. Otherwise, the voltage level output from the phase detector 754 is lower. This output level is passed through another filer comprising resistor 764 and capacitor 766 to the noninverting input of a comparator 768. The inverting input of the comparator 768 is connected to a reference voltage 770 in combination with a capacitor 772. The comparator 768 compares the filtered voltage from the loop phase detector 754 with the reference voltage 770 and produces a logic level 1 or 0 on its output depending upon the detection of the correct tone. The output of the comparator 768 is supplied with a pull up resistor 774 which drives the received data line RxD.

It is seen that the receiver/transmitter combination provides an advantageous communication interface for transforming serial digital data to frequency shift keyed information and for decoding frequency shift keyed information into serial digital data. The device is suitable for many uses and will operate on many frequencies but preferably a tone of 205 KHZ is a digital one and a tone of 195 KHZ is a digital zero. The relay 740 maintains the receiver portion of the apparatus in a disabled condition only while the transmitter is operative. This allows a greater communication distance over the power lines as the transmitter does not perceive a loading from the receiver which would be detrimental at such a close distance.

A detailed description of the software program executed by the microprocessor 400 of the control unit will now be more fully set forth with respect to the flow chart of FIG. 13. After the hardware timer clock is enabled in Block A10, the program begins by calling an initialization routine INITIAL in block A12. During the initialization routine, the addresses as for the equipment used are accepted and stored in memory. After the initialization has been accomplished, the program continues by calling the subroutine KEYPAD in block A14 which is responsible for scanning the keypad. The parameters related to the key bounce properties of the pad are accommodated by portions of the subroutine. The keypad routine buffers those active keys for further handling in subsequent routines.

Next, the program calls the time slot routine TSLOT in block A16 which produces an interrogation of the remote sensor controllers and commands the peripheral control elements including the vent motor controllers and address receiver controllers. Thereafter, the subroutine, the receiver routine RX is called in block A18. Rx is a general purpose receive data handler for interface with the USART device. When data is ready for the microprocessor, this routine places a received data byte into a particular location of the RAM memory. The subroutine monitors transmissions of any other net masters which may be present on the network and continuously updates the time slot synchronization for the control unit in concert with those transmissions.

Subsequently, a display handler routine DSPHLR is called in block A20 which directs the display as to which information is shown. The display handler routine DSPHLR is a combination of subroutines which are selected by placing their labels in a particular RAM locations and then calling the routine DSPHLR. Next in the sequence, the subroutines TSLOT and RX are again called in blocks A22 and A24. Thereafter, a key handler routine KEYHLR is called in block A26. This routine is a sequence of instructions which handles the key stroke sequencing as the operator inputs the commands. It decodes these key strokes into different commands which are used by the other various routines to change the data stored for programming the peripheral control devices into a control program and for general operation of the system. FIG. 7a was used to illustrate the valid key sequences and routines used for this operation. In block A28 and A30 the subroutines TSLOT and RX, respectively, are called for the third time in the loop.

The microprocessor 400 then tests a pin on one of its ports which is coupled to the rectified output of the main power supply. By decoding whether this port pin is at a high or low level the system may determine whether it is being supplied an AC power from its normal power supply or from a battery backup. In block A32 this test is made and, depending upon the result, the program will transfer control either to block A34 or block A36. If the AC power is not on, then block A34 produces the storage of a constant in a memory location which is read by the display routine. The entry of the constant into memory causes that routine to blank the display and conserve power.

After the execution of block A34, or if an affirmative response was the result of the test in block A32, the program calls the display routine DISPLAY in block A36. This routine provides a serial data stream compatible with the display module shown in FIG. 6. Eleven bytes of RAM are dedicated to providing the necessary source data. As mentioned previously, on finding the battery backup indicator in memory, the display is blanked and a standby power indicator enabled on the display. The program continues in block A38 and A40 by once more calling the subroutines TSLOT and RX, respectively.

It is seen that the time dependent routines TSLOT and RX which are used for communication purposes between the central control unit and the peripheral control elements are called periodically. The sequence envisions a non time dependent routine such as KEYPAD, DSPHLR, KEYHLR, or DASPLA being called and thereafter the subroutines TSLOT and RX called before the next non-time dependent routine. This alternation of the time dependent routines with the non-time dependent routines provides a facile manner for maintaining the system control in real time without a complicated interrupt structure.

The main loop constantly repeats the sequence while the system is in operation thereby keeping communications from the central control unit current through the use of the subroutine TSLOT and the information received from other net masters current with the subroutine RX. In a normal automatic operation, the system operates by stepping through the time slots while interrogating sensors or commanding actuated elements with the subroutine TSLOT and receiving messages from other net master controls with the receive routine RX. During this time the display handler routine DSPHLR is normally providing the rolling display as previously described. Only for manual operation or for a change in the programming are the KEYPAD and KEYHLR routines called.

The program maintains its time slot clock by addressing a RAM storage location used as a counter. The counter is kept periodic and indicates portions of a time slot in the preferred embodiment in three increments. The counter or register is incremented by a hardware timer on the microprocessor which causes an interrupt every 33 milliseconds. An interrupt will cause the program to transfer control back to block A42 where the subroutine TIMINT is called to service the clock sequences. The update of the time slot register and a real time clock are accomplished by this routine when a timer interrupt occurs. After the clock has been updated and the time slot register incremented the program will return to the instruction which it was executing when called from the main loop.

The subroutine TSLOT will now be more fully described with respect to FIG. 14. The routine initially, in block A50, reads the RAM location that is used for the time slot counter. If the counter has a count equivalent three it indicates that a new time slot is beginning. This condition is recognized as an overflow condition in block A52. If the counter has not overflowed, the routine returns to the main loop where the subsequent operations of the main loop are performed.

If an affirmative answer is the result of the test in block A52, then it is the beginning of a new time slot and the controller will address the peripheral control elements. Before proceeding, the time slot counter is cleared in block A54 and the program continues to a subroutine MCI in block A56. The subroutine MCI is a routine which updates the previous time slot address as stored in the locations containing T0TP and T2T1. After the time slot address is incremented, the subroutine KSAT is called in block A58. The routine KSAT checks the keyboard status to determine whether the system is receiving a keyboard sequence or possibly is in a manual mode. If a keyboard sequence is taking place then the system will wait until that sequence is finished before communicating with the peripheral control devices. The program will also finish a manual mode before continuing with communications.

In block A60 the subroutine SENSOR is called to interrogate a sensor if the particular time slot is an address of one of those devices. If the present time slot is not addressing a sensor, then it could be assigned to a actuator device and, therefore, the program calls the subroutine COMMAND in block A62 to provide commands to the actuated devices. Both the SENSOR and COMMAND routines determine whether the addres is active in the particular system configuration stored in memory before interrogating or commanding.

The subroutine MCI called as block A56 in the routine TSLOT and which increments the time slot address will be more fully detailed if reference is now directed to FIG. 15. The routine initiates by reading the prefix and first nibble address, T0TP, in block A64. Thereafter, the TP nibble is stripped from the byte and a test initiated in block A66 to determine whether T0 is nine. If T0 is not at its highest level, then it is incremented in block A68 and the program returns. If T0 is nine, then a carry must be added to the next address nibble T1. First, the nibble T0 is cleared in block A70 before the next address nibble is read by obtaining T2T1 from memory in block A72. The test in block A74 determines whether T1 is also nine, and if not, the carry is executed by incrementing T1 in block A76. In this path the program then returns because it has accomplished the incrementation of the address.

However, the path to block A78 is taken if T1 is also nine where the second address nibble T1 ia cleared by clearing the byte T2T1. Subsequently, in block A80 the prefix TP is tested to determine whether it is nine and if not the program sequences to block A82 where the carry from T1 is implemented. If all three nibbles TP,T1 and T0 are nine then the path sequences to block A84 where TP is cleared thereby producing the address for the first time slot 000. This is the overflow condition and provides a wrap around to the start of the next two minute frame. Because it is the beginning of a frame the subroutine COMINT is called in block A86 before the routine returns to the main loop. The routine COMINT provides an initialization of the communication device, in this case the USART which is shown in FIG. 8. This provides an initialization for the USART 416 device, once every frame, upon the sensing of the overflow condition.

Figure 16:
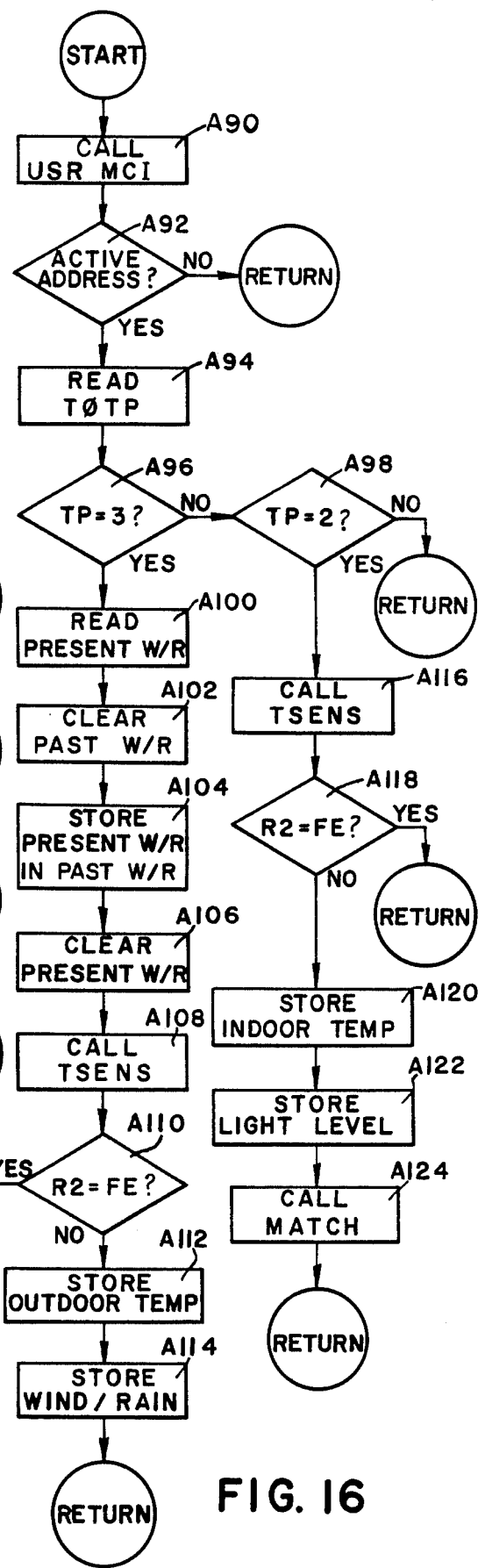
FIG. 16 is a detailed flow chart of the subroutine SENSOR called in FIG. 13.

The subroutine SENSOR is more fully detailed in the flow chart illustrated in FIG. 16. The routine begins in block A90 by calling the subroutine USRMCI which checks to determine if the current time slot has been assigned by the operator. This indicates that the current time slot addresses a device in the present system configuration and, therefore, requires control from the program. If the routine determines that the address is an active device in block A92, the accumulator will return with a one and if not an active device the accumulator will return with a zero. If the address is not active the program returns immediately. Otherwise, the operation in block A94 is used to read the prefix, TP, from the byte T0TP. The prefix TP is then tested in block A96 to determine whether it is 3 which indicates a outdoor sensor. If not an outdoor sensor, then in block A98 the prefix is tested once again to determine whether it is an indoor sensor by checking to see if the prefix is 2. If the prefix is neither 2 or 3, then a sensor is not being addressed and the program returns.

If the test in block A96 produces an affirmative answer, the program has found that the current time slot is assigned to an outdoor sensor and the sensor will be interrogated for wind/rain information and for the outdoor temperature. Therefore, the program continues in block A100 by first reading the present wind/rain value from memory and performing an intermediate storage of that value. The past wind/rain value is cleared in block A102 and the present is stored in the vacated location by block A104. Thereafter, the storage location for the present wind/rain value is cleared in block A106 to make room for the new value which will be read.

In block A108 the subroutine TSENS is called to interrogate the outdoor sensor and receive the data therefrom. The routine will return with a hexadecimal value FE in register R2 if there is no reply to the interrogation. This value is tested for in blocks A110 and, if present, the program returns immediately as no valid communication has taken place. The program will thereafter interrogate the temperature sensor during its assigned time slot in the frame but will not return any invalid value. The past value for the outdoor temperature will be used in all the control calculations if a new temperature value cannot be read. If the TSENS routine has returned valid information then in block A112 the outdoor temperature is stored and the wind/rain indication is additionally stored in block A114.

Returning now to the test in block A98, an affirmative response to the test contained therein indicates that the current time slot addresses an indoor sensor. Thereafter, in block A116, the subroutine TSENS is called to interrogate the indoor sensor and a test performed in block A118 determine if a valid reply was received by that routine. As previously indicated the TSENS routine will return with a hexadecimal FE in register R2 if no valid communication is returned in response to the interrogation. Therefore, if register R2 contains FE, the program will return without storing a temperature or light level indication. The previous value for the indoor temperature will be used in all control calculations if a new temperature value cannot be read.

However, if the response in block 118 is negative the sequence continues to blocks A120 and A122 where the indoor temperature and light level indication are stored in the correct RAM locations. After the two indicators have been stored in memory the routine calls the subroutine MATCH in block A124. The subroutine MATCH takes the indoor temperature and matches it against the stage temperatures as recorded in memory to determine which stage the control should be operating in.

Figure 17:
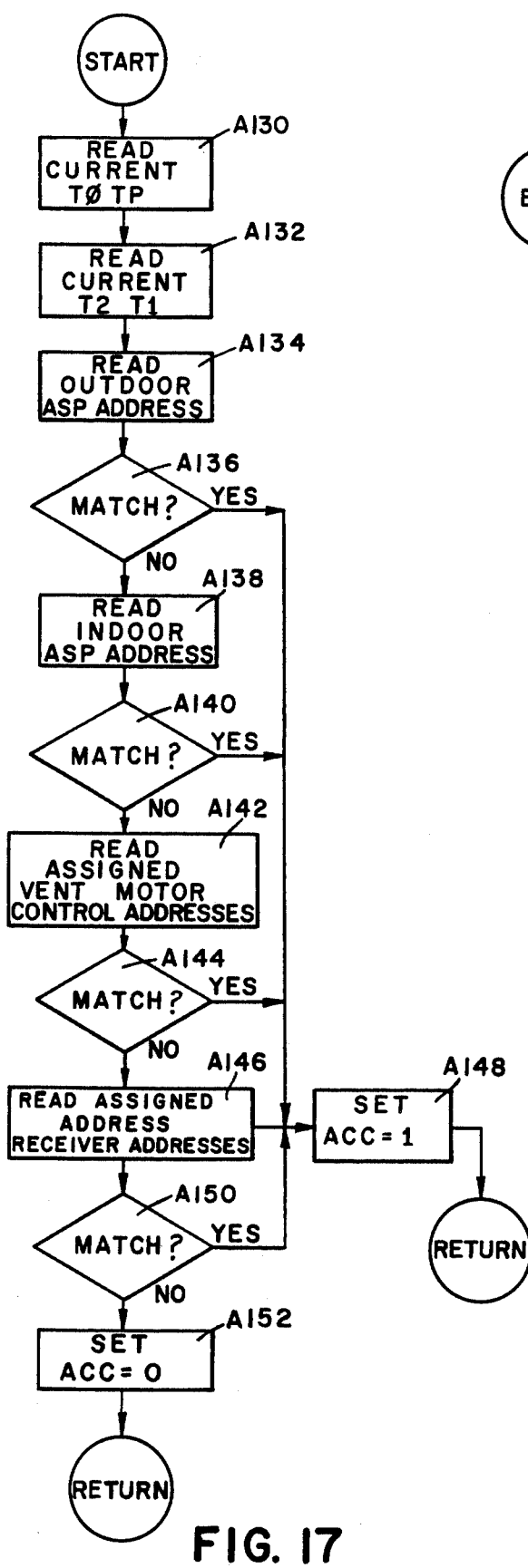
FIG. 17 is a detailed flow chart of the subroutine USRMCI called in the subroutines SENSOR and COMMAND.

The next subroutine that will be explained is the USRMCI routine embodied in the flow chart of FIG. 17. The current prefix and address (time slot) are read into intermediate memory locations in blocks A130 and A132 by reading the currently stored bytes for T0TP, T2T1. Next the address of the outdoor temperature sensor is read from memory in block A134 so that it can be matched against that address in the intermediate memory which represents the current time slot. The test in block A136 attempts to match th two addresses. A match will cause the accumulator to be set equal to one in block A148 and the program to return.

If there is no match in that test, then the address of the next device, an indoor sensor, is read into intermediate memory in block A138. A match is again attempted in block A140 with the same consequences. If the current time slot address is equivalent to the indoor sensor address, the program will exit after setting the accumulator equal to one in block A148. Otherwise, the program will continue to block A142 where the addresses assigned to the vent motor controllers are read. If any of these addresses match that of the current time slot, then the program again exits through block A148 after setting the accumulator equal to one.

Subsequent to the testing for assigned vent motor controllers, the program will test for assigned address receivers in block A146. If any of these addresses match the current time slot address, as tested in block A150, then the accumulator is set equal to one in block A148 and the program returns. Otherwise, the accumulator is set equal to zero in block A152 before the program returns.

Thus, the subroutine USRMCI will set the accumulator equal to one if the current time slot address is a device which has been assigned an address in the present system configuration. Otherwise the accumulator will return containing a zero to indicate that this is not an assigned time slot and the system need do nothing until the next time slot is present.

Figure 18:
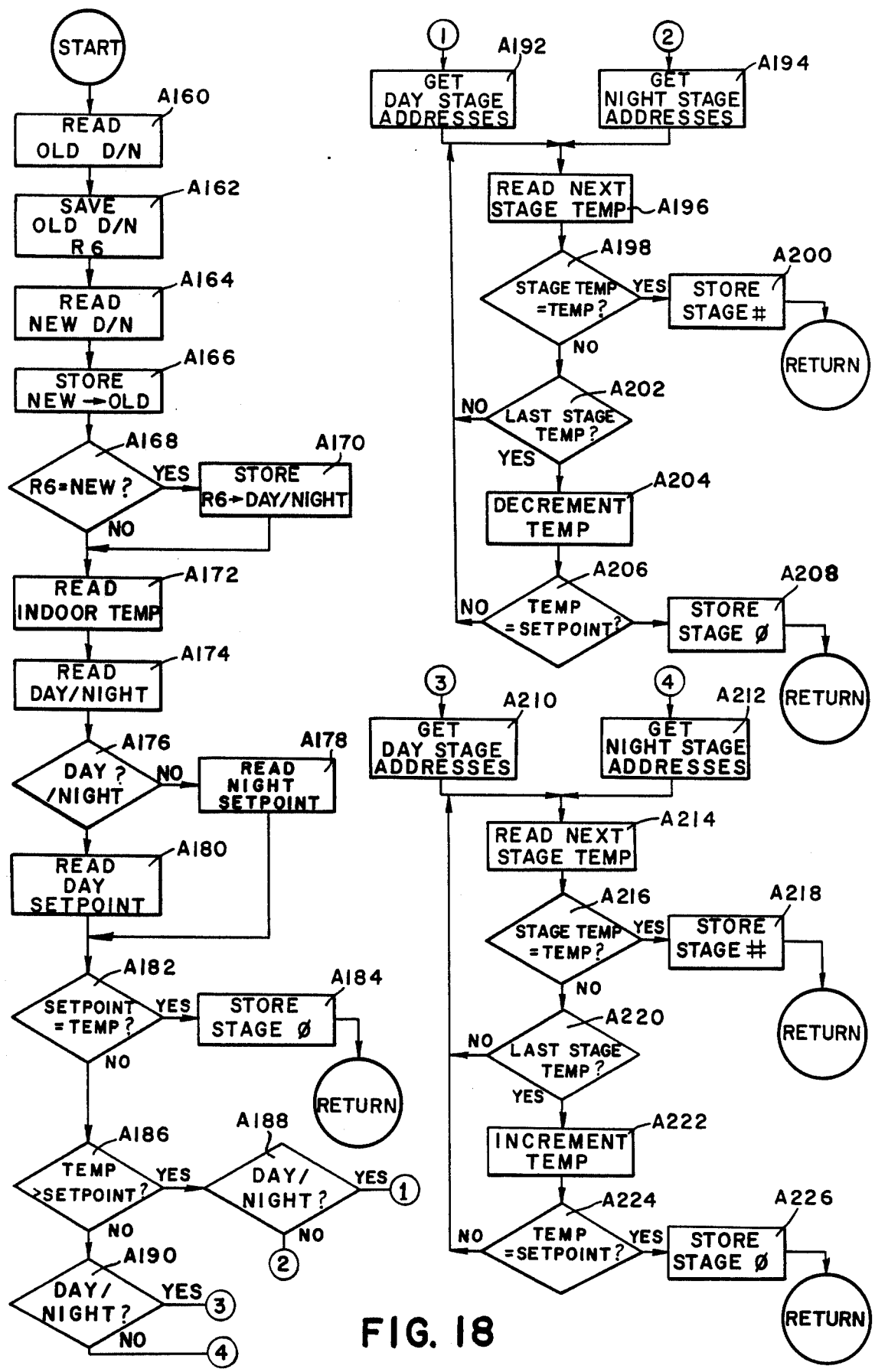
FIG. 18 is a detailed flow chart of the subroutine MATCH called in the subroutine SENSOR.

The next routine that will be discussed with reference to FIG. 18 is the subroutine MATCH. This routine takes the day/night indication and the indoor temperature reading and matches them against the particular stage number in the program. From the stage number the system can then determine the commands that are stored for that stage to control the peripheral actuated devices accordingly.

In blocks A160-A166 the old day/night value is saved in a register R6 and the new day/night value read in and stored in the old location. The old and the new values for the day/night variable are then compared in block A168 to determine if they are equal. If the new value for day or night does not equal the old value, then the program continues immediately to block A172. If they are equal, then in block A170, the value of the old (in register R6) is placed into the day/night location. This operation provides a hysteresis such that during threshold light levels, such as twilight and dawn, the day/night indication will not oscillate between two values. The program requires that the new value, if it is different than the old value, match twice before the old indication is changed.

Thereafter, the indoor temperature is read from the location in which it was stored at the return from the TSENS routine. The stored indication for day/night is then read in block A174 and that indication is tested in block A176 to either read the night set point in block A178 or the day set point in block A180 depending on its value. The determination of whether the light level reading indicates day condition or night condition determines which of the two stored programs and set points are used for controlling the actuated devices. After the correct set point is chosen, it is compared to the actual temperature in block A182 to determine whether they are equal. If the two values are equal, then the indoor temperature is at the set point and stage zero is stored as the current stage indicator in block A184. However, if they are not equal, then the program must determine what the current stage should be and continues to block A186. Initially, block A186 determines whether the indoor temperature is greater than or less the set point since it is not equal.

If it is greater than the set point the program transfers control to block A188 where a decision is made whether the light level indicates day or night. For a day indication, in block A192 the program loads the starting location of the day stage addresses. Likewise, for a night indication the program loads the beginning location for the night stage addresses in block A194. The program then converges at block A196 where the threshold temperature for either the beginning of the night or day stages is obtained from memory. The stage temperature is then matched to determine whether it is equal to the actual indoor temperature in block A198. If the result of the test is affirmative, then the current stage number should be stage number presently addressed and such indication is stored by block A200 before the routine exists.

However, if the threshold temperature for the stage currently addressed is not equal to the present indoor temperature and this is not the last stage temperature, as tested in decision block A202, then the next stage temperature is read in block A196 and the comparison process repeated. The entire group of stage temperatures is thereby tested and, if no match is found, then the indoor temperature is decremented in block A204. After being decremented, the temperature is again compared to the set point in block A206. If equal to this set point, the stage number is set equal to zero in block A208 and the program exits. If the indoor temperature is still not equal to any of the threshold temperatures or to the set point, then control is transferred to block A196 where the process of comparison with all of the stage temperatures is again accomplished. By decrementing the indoor temperature in block A204 the program will finally find either a comparison to one of the stage temperatures in block A198 or to the set point in block A206. At that point the currently addressed stage number is stored as the stage indicator either by block A200 or by block A208.

A similar loop is set up to find the stage number in blocks A190 through blocks A226 if the actual indoor temperature is less than the set point. The only difference between this loop and the previous loop, where the temperature was greater than the set point, is that the temperature is incremented every time the comparison steps fail to find a match in blocks A214–A220. The incrementation of the temperature occurs in blocks A222.

Figure 19:
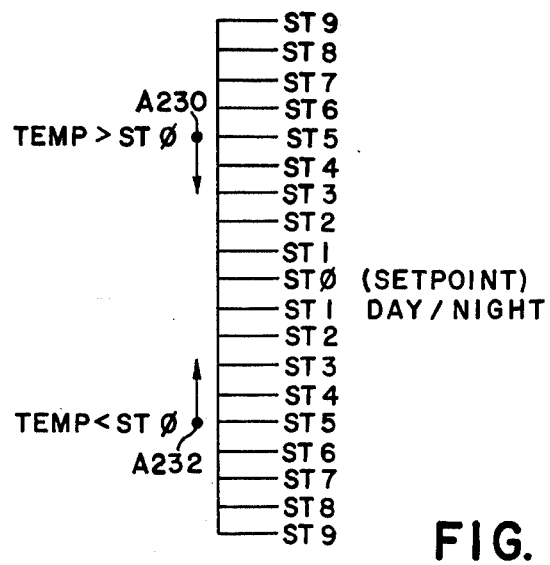
FIG. 19 is a pictorial representation of the operation of the subroutine MATCH which locates the current stage in the temperature control program.

To more fully understand the operation of the MATCH program FIG. 19 will be referenced. The set point ST0, is the temperature to which the control attempts to regulate the actual temperature of the structure. Because the actual temperature of a structure cannot be brought to the set point instantaneously, and it would waste energy to attempt to use all available cooling or heating means to approach the set point as rapidly as possible, the control provides regulation of the temperature toward the set point in the stages ST1–ST9 above and below the set point. The set point or stage zero can either be the day or night set point and the staging will be exactly the same. The difference between the day and the night programs will be the different temperatures for each transition between stages and the type and quantity of equipment that is operated during those stages.

To illustrate control of the system and operation of the MATCH program in particular, take the case where the temperature is greater than the set point ST0. What the program accomplishes is to locate the actual temperature in the range of temperatures forming the stages to determine which equipment should be actuated during that phase. A temperature A230 greater than the set point ST0 is illustrated between the boundaries of stage 4 and stage 5 in the illustration. Since the temperature is greater than the stage 4 threshold, and less than the stage 5 threshold, the the indication of the current stage number should be set to stage 4.

As indicated previously, the MATCH program retrieves the stage temperatures for either the day or night program by reading the light level that has previously been stored in a location in RAM. These stage temperatures are then compared to the actual temperatures starting with ST0 and ending with ST9, to determine if there is a match. Since the temperature A230 is between the temperatures stored for the boundary conditions of stage 4 and 5 there will be no match. However, after all the stage temperatures have been compared to the temperatures A230 it will be decremented and the process continued. After a number of interactions through the matching process the temperature A230 will have been decremented to where it equals the boundary condition for the stage 4. Finding this match, the program will then store the stage 4 indication so that the program may regulate the structure with the peripheral control elements programmed for that stage.

In a similar manner, temperature A232 is shown as between the stage 4 and stage 5 boundary conditions for temperatures less than the set point. The program acts in a manner similar to that described above to match this temperature against the boundary temperatures for each stage. When no match is found, the program will increment the actual temperature A232. Thereafter, the actual temperature is incremented after each matching interaction until it equals the stage 4 boundary condition and produce an indication of the actual stage desired.

Figure 20:
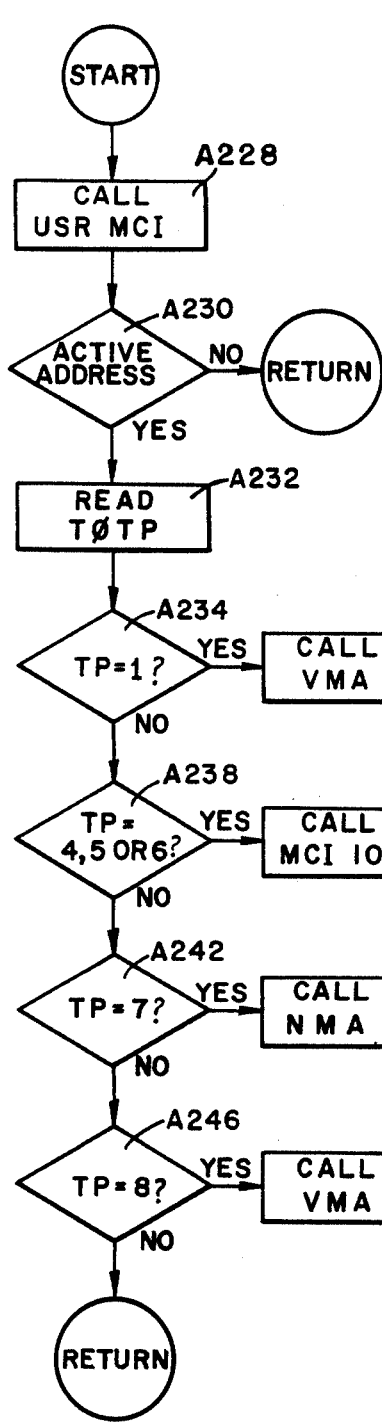
FIG. 20 is a detailed flow chart of the subroutine COMMAND called in FIG. 13.

The detailed flow chart for the subroutine COMMAND will now be more fully explained with respect to FIG. 20. The subroutine COMMAND is similar to the routine SENSOR in that a transmission to a peripheral device must take place but is different in that an answer need not be received. Therefore, the present routine calls the subroutine USRMIC in block A228 to determine whether the current time slot is an active device in the configuration of the system. The subroutine USRMCF has been previously described with respect to FIG. 17. In block A230 the subroutine USRMCI returns with an indication in the accumulator of whether the current time slot is an active address. If the answer to the test in block A230 is negative the program will return to the main loop immediately.

However, once the program determines that the current time slot defines an active device within the system, it must now determine whether or not that device is an actuated element which it must command. To accomplish this function, the program sequences to block A232 where the prefix TP is read from memory by calling the byte T0TP. Next, in block A234 the prefix TP is tested to determine whether it is equal to one. An affirmative response to this test transfers control to block A236 where the subroutine VMA is called. A prefix of 1 indicates that the current time slot is an active vent motor controller and the subroutine VMA will transmit the required command to that type of actuator dependent upon the programming of the current stage.

If the current time slot is not a vent motor controller then in block A238 the prefix TP is tested to determine whether it is equal to 4, 5, or 6. An affirmative result for any one of these prefix numbers is an indication that the current time slot addresses an active address receiver controller with one actuated element. The program transfers control in this instance to block A240 where a subroutine MCI101 is called which is used to handle the data transmission to command a single actuator address controller. If, however, the answer to the test in block A238 is negative, then the program will flow to block A242 where the prefix is tested to determined whether it is a 7. The prefix 7 is used for address receiver controller with eight actuator devices and thus are commanded by calling the subroutine VMA. The VMA routine which was used to command the vent motor controllers can be used in this instance since the data command structure for an eight actuator address controller is identical to that of a vent motor controller.

In the last test block A246, a prefix of 8 is tested for using the byte T0TP. An affirmative response again calls the subroutine VMA in block A248 since the device address by a prefix of 8, an address controller with proportional control, uses the same data format that the vent motor controller uses. As was the case for the vent motor actuator, the address controllers are commanded according to the instruction stored for that device in the current stage.

Figure 21:
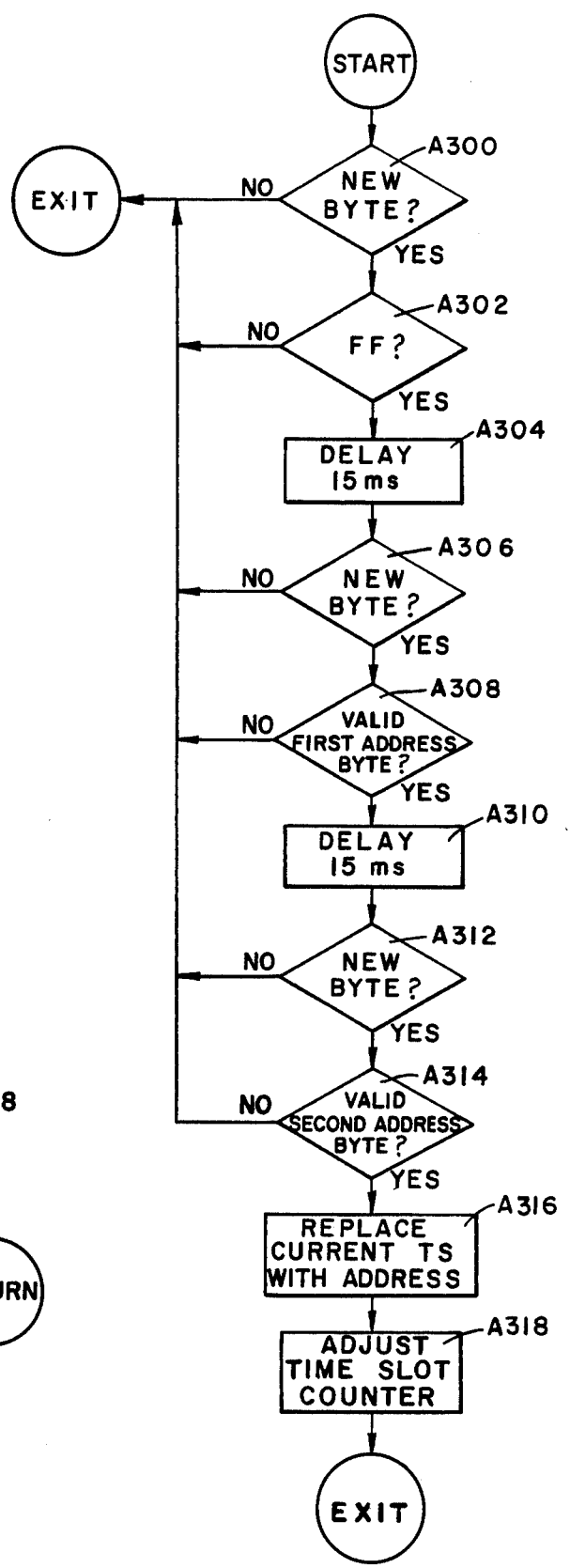
FIG. 21 is a detailed flow chart of the subroutine RX called in FIG. 13.

The subroutine for receiving data by the control until will now be more fully discussed with reference to FIG. 21. The receive subroutine is referenced as RX and is the program used by the control unit to monitor the power line for transmissions from other net masters. The routine initiates in Block A300 by determining when a new byte is received by USART Device 416. If the USART 416 has not indicated that a complete byte has been assembled for transmission to the microprocessor 400, then the program exits immediately so that other programs in the main loop may be executed. Because the receive subroutine RX is executed periodically, the operation provides a convenient method of monitoring the power line until a full byte is assembled for decoding without overburdening the microprocessor 400. When a new byte is assembled, the program transfers control to Block A302, where the byte is tested to determine if it is the unique framing character FF. If not, then the program exits immediately and only returns to this block after another new byte has been assembled.

When a framing character FF is found, a sequence to decode the address bytes of that message which follows is then initiated by first entering Block A304 where a delay of 15 milliseconds is inserted between bytes. After the delay, Block A306 then tests the USART 416 to determine whether a new byte is present. The 15 millisecond delay in Block A304 is the correct timing between the framing character and the next address byte such that if no new byte has been assembled by that time, then the transmission has an error in it. Therefore, the program will exit immediately and require a new transmission beginning with a framing character to initiate another decoding sequence. If, however, a new byte is present and the timing is correct, the program will test it to determine if the message received is a valid first address byte in Block A308.

If not, the program immediately exits as before, and requires that a new message to begin with the framing character FF. Upon finding a valid first address byte, the program will continue the decoding process and transfer control to Block A310, where another 15 millisecond delay is inserted. Again, this delay is the correct timing between the first address byte and the second address byte, such that the second address byte should be available at the end of the delay. This condition is tested for in Block A312, where the USART 416 is again requested whether a full byte has been assembled. As before, if the timing for receiving the new byte has expired, the program will exit immediately back to the main loop. If, however, the timing of the reception of a new byte of information is correct, the received byte will be tested to determine whether it is a valid second address byte in block A314.

If both address bytes are valid, then they are used in Block A316 to replace the circuit time slot address. This causes a synchronization of all the receiving central controllers with the central controller that is transmitting at that time slot. Further, in Block 318, the time slot counter which segments every individual time slot is adjusted to take into consideration the time between the receipt of the unique framing character FF and the end of the decoding process. This time is added to the start of the time slot counter, such that a substantially accurate locking of the time slot clocks between net controllers is provided. The program, thereafter, exits to the main loop to further execute the control program.

Figures 22, 22A:
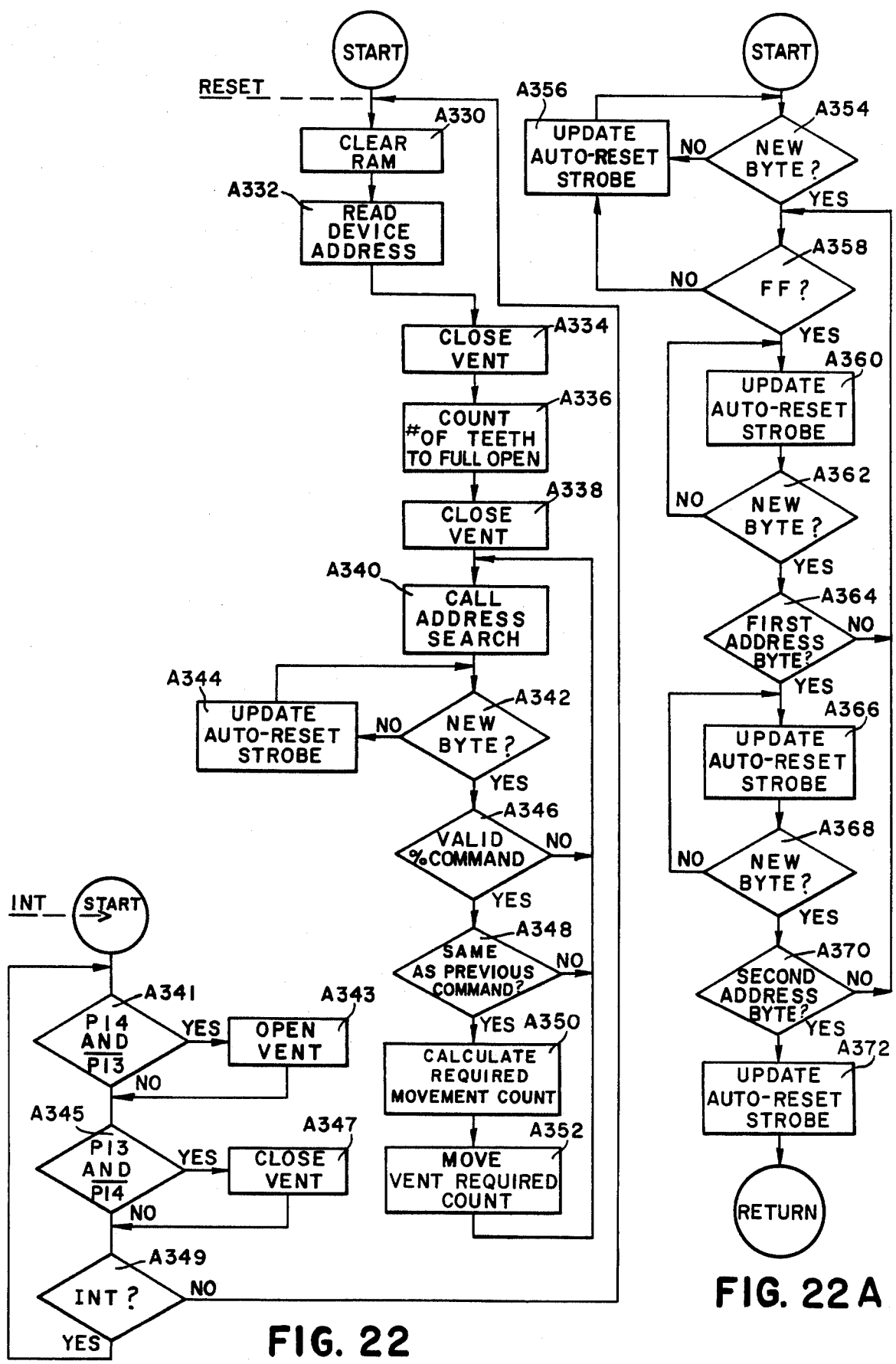
FIG. 22 is a detailed flow chart of the software executed by the vent controller illustrated in FIG. 1.
FIG. 22A is a detailed flow chart of the ADDRESS SEARCH SUBROUTINE.

The program stored within the microprocessor 466 of the vent motor controller will now be more fully described with reference to FIGS. 9 and 22. FIG. 9, as previously discussed, illustrates the schematic diagram for a vent motor controller and FIG. 22 shows a detailed flow chart of the program which regulates that controller.

Upon the powerup of the device, a number of functions are accomplished for calibration purposes. Initially in Block A330, the RAM is cleared to provide storage space for the variables and constants which the program generates. In Block A332, the program reads the address of the particular vent motor controller through pins P20–P23. This address is then stored and can be used by the program to determine whether a central control unit is addressing this device or some other. A calibration sequence is then started in Blocks A334–A338 where the vent is fully closed by setting pin P17 high thereby generating the CLOSE signal on line 488. The program is able to determine when the vent is fully closed by monitoring pin P15 until a ground level is found.

This completes the operation of block A334, and the program then sequences to the operation in Block A336 where the CLOSE signal is brought to a low logic level and the OPEN signal is brought to a high logic level on pin P16. This causes the vent to begin to open and while the movement is taking place, the software monitors the T1 input to determine the number of the pinion magnets that are counted between the fully opened limit of the vent and the fully closed limit. As was the case with the closure, a fully opened vent is detected by monitoring Pin P26 until a ground level is found.

After the number of magnets between the fully opened and fully closed limit of the vent is calculated, this number is stored for further reference. The number is used as a reference when the vent motor controller is commanded to open or close the actuated vent to a particular position. The calibration sequence is completed by closing the vent in Block A338. Blocks A330-A338 are called once upon powerup and thereafter, the program enters a main programming loop which searches for the address of the device. When the loop recognizes the device address it will accept a command for positioning the vent control.

This portion of the loop is entered in Block A340 and begins by calling the subroutine ADDRESS SEARCH. The ADDRESS SEARCH routine continuously monitors the information from the USART 460 until it finds a command from one of the central control units that requires action by this device. Other addresses on the power line are ignored by the ADDRESS SEARCH routine and causes it to continuously loop until the correct time slot assigned to this particular device is recognized.

When the correct address has been found, the program will return to Block A342 where a test is performed to determine whether a new byte has been received after the address match has been accomplished. If the new byte has not yet been received, the program sequences to Block A344 where the auto-reset strobe is updated and a loop is entered until the rest of the bits of the new byte are accumulated. This new byte is the data byte D0D1 which forms the command for the particular vent motor controller currently addressed. Therefore, when the byte is received in Block A346, a test is accomplished to determine whether it is a valid percentage opening command. If not, the program transfers control back to the ADDRESS SEARCH routine in Block A340 until the next access of this device. If the byte received is valid, the command is stored and tested in Block A340 against the previous command received by the device. If the present command is not the same as the previous command, the program transfer control back to the ADDRESS SEARCH routine in block A340. This accomplishes a command structure where the device will not operate differently until it has received two similar commands in a row. Thus, it is unlikely that the transmitted commands because of noise, the loss of bits, or other data errors will cause the vent motor controller to position the vent incorrectly.

When the vent motor controller has determined that the percent opening command is valid as seen by the progression to Block A350, the number of counts to move the vent to the required commanded position is calculated. In the next step, Block A352, the vent is moved the required number of counts, based upon its present position. Thereafter, the program returns to the ADDRESS SEARCH routine having completed the command.

For a manual override of the normal operation of the vent motor controller, the automatic/manual switch can be closed producing an interrupt to the microprocessor 466. When this occurs, the microprocessor transfers control to an interrupt handling routine beginning at Block A341 which determines if the switch 474 has been closed indicating that the operator desires to operate the vent manually. If a high level signal on P14 is present and a signal on P13 is not, then an OPEN signal is generated at Block A343. Next, a logical test is performed in Block A345 which determines whether there is a high level signal on in P13 and not a signal on in P14. If this logical condition is present, then in Block A347 the microprocessor 466 generates the CLOSE signal to the vent motor.

The next step in this sequence is Block A349 where the INT input is again tested to determine whether the automatic/manual switch is open or closed. If the switch is still closed, the program loops back to Block A341 where the interrupt routine is executed again. To exit the interrupt loop, the operator must open the switch 480 to further control from Block A349 to Block A330 of the routine.

When the switch 480 is opened the program reverts back to the atomatic mode, but first the system has to go through the calibration sequence because the constant stored indicating the position of the vent may have been lost during the manual control. Therefore, Blocks A330-A338 are executed once more before the main program loop beginning with the ADDRESS SEARCH routine at Block A340 is entered.

The subroutine ADDRESS SEARCH will now be more fully described with respect to FIG. 22A. The ADDRESS SEARCH subroutine is used to monitor the information transmitted over the power lines and watch for the particular address assigned to the monitoring device. During powerup, the device loads its address into a location of memory which can be accessed by the address search routine. The routine begins in Block A354 by monitoring the power line until a byte of information has been received. Until then, a loop is set up through Block A356 where the auto-reset strobe is continuously updated until information is received.

Once a byte has been received, Block A358 is executed to determine if the byte is the unique framing character FF. If not, then the new byte loop of Block A354 and A356 is reentered. If, however, the framing character FF is recognized by the program, then this is an indication of the beginning of a transmission from one of the central control units. The program enters another waiting loop for the next byte and updates the auto-reset strobe in Block A360 while waiting. As soon as the next byte has been received, the test in Block A362 is passed and the sequence transfers control to Block A364. In that block, the first byte of the device address, including the prefix TP and nibble T0 is tested against the byte received from the communication interface. If they match, then the program proceeds to the next waiting loop comprising Block A366 and Block A368. If the first addresses do not match, the program returns to Block A358 to determine whether the byte received is the unique framing character FF.

The waiting loop in Block A366 and A368 is similar to the previous two where until the next byte is received, the auto-reset strobe is continuously updated. When the next byte is received, the program sequences to Block A370 where the byte is compared to the second address byte, including T1 and T2. If a match is found the routine exits after the auto-reset strobe is updated in Block A372. If a match is not found then the program loops back to Block A354 for further testing to see if the byte received is the unique framing character FF.

Figure 23:
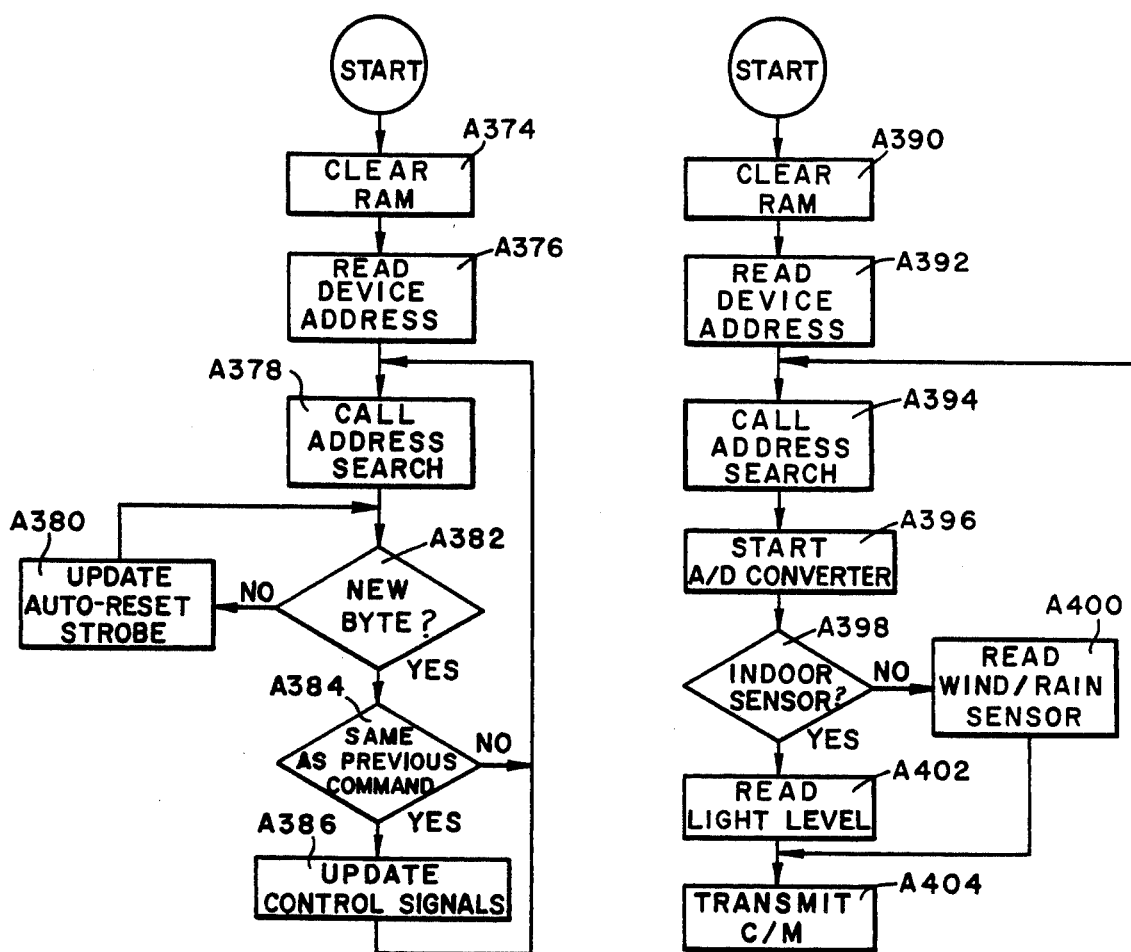
FIG. 23 is a detailed flow chart of the software executed by the address receiver controller illustrated in FIG. 1.

In FIG. 23 there is illustrated the detailed flow chart of the program stored in the microprocessor 602 of the address receiver shown in FIG. 11. Both of these figures will be referenced with the following discussion to more fully describe the operation of that device.

The program for the address receiver controller is similar to the vent motor controller where it includes an initializing portion comprising Blocks A374 and A376 and a main loop portion which is constantly executed after the powerup phase. In the initial phase, in Block A374, the RAM of microprocessor 602 is cleared and the device address read into memory in Block A376. Depending upon the jumpers set for pins P21-P24, P27-P30, and P31-P34, the address of a single actuator device, an eight actuator device, or a proportional control device will be stored in memory.

After the beginning sequence, in Block A378 the program calls the ADDRESS SEARCH routine, more fully described in FIG. 22. The ADDRESS SEARCH routine monitors the power line for the particular time slot and address of the device and when a match occurs, transfers control to Block A382. Block A382 and Block A380 form a waiting loop until the next byte of the information being transferred over the power line is received. During the waiting loop, the auto-reset strobe is constantly updated by Block A380. When the next byte is received, a test is made in Block A384 to determine whether this byte is the same as the previous command to the address controller. As with the vent motor controller, the address receiver controller will not act on a command unless it matches twice in a row to prevent noise and other data loss from providing a incorrect command. Thus, if the present command is not the same as the previous command, then the program loops back to the ADDRESS SEARCH routine in Block A378. otherwise, the program progresses to Block A386 where the control signals are updated.

A command to the address controller is in byte form and can be output directly onto the data bus D0-D7 of the microprocessor 602, if the address receiver is a eight actuator device. If the address receiver is a single actuator device, then 7 of the bits of the command byte are masked off before the byte is output on the data bus. If the address receiver is being used as a proportional controller, then one half of the byte is masked off before output to the Port 3 pins P35-P38.

Figure 24:
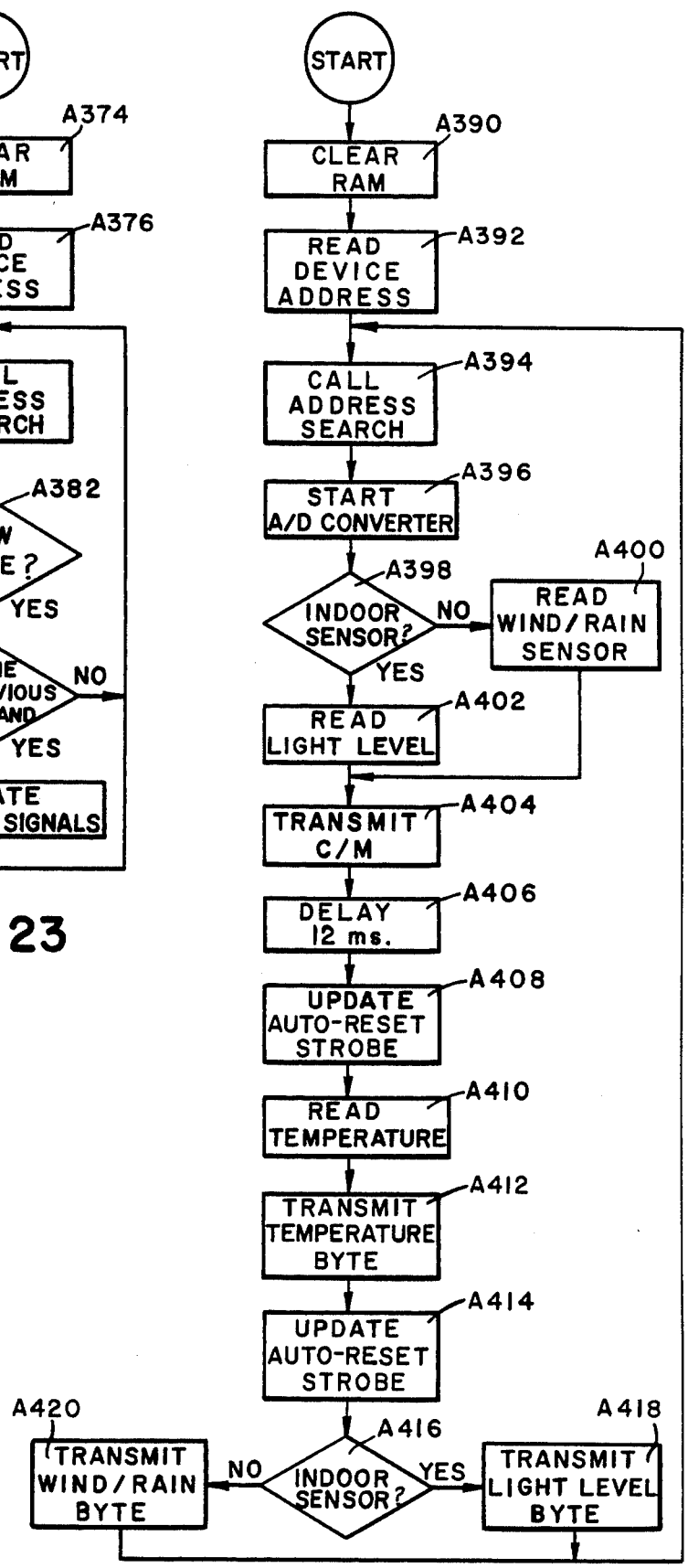
FIG. 24 is a detailed flow chart of the software executed by the remote sensor controller illustrated in FIG. 1.

With reference to FIGS. 10 and 24 the operation of the remote sensor controller will now be more fully described. FIG. 24 is a detailed flow chart of the program which is stored in the microprocessor 504 shown in FIG. 10. Initially, upon powerup, Block A390 is executed to clear the memory. Thereafter, the program begins an operation in Block 392 which reads the address of the device from the thumbwheel switches 522 and 524. The address is input through pins P10-P13 and P20-P23 and thereafter, stored in a location accessible by the subroutine ADDRESS SEARCH.

The program then enters its main loop by calling the subroutine ADDRESS SEARCH in Block A394. The ADDRESS SEARCH subroutine has been previously described with respect to FIG. 22A and will not further be discussed. After the ADDRESS SEARCH match of the stored device address with a transmitted address, the program continues to Block A396 where the A/D converter 510 will be started by issuing a write command.

The program will then determine whether the remote sensor controller is configured as an indoor sensor or an outdoor sensor in Block A398. If the device is configured as an indoor sensor, then the light level is read in Block A402 by accessing pin P14. If the device is configured as an outdoor sensor, the program sequences to Block A400 where the wind/rain sensors are read by accessing Pins P25 and P26, respectively. These sensor values are then stored prior to the program initiating a transmission sequence.

The transmission sequence begins in Block A404 where the microprocessor 504 causes the transmitter 506 to transmit the constant mark C/M over the power line 508. After the constant mark has been transmitted, the program delays 12 ms. to provide the correct spacing between the mark and the data bytes. Thereafter, in Block A408, the auto reset strobe is updated prior to reading the temperature byte in Block A410. The temperature byte is read by generating a READ signal from the microprocessor 504 to the A/D converter 510 and inputting the byte from the data bus. Again, in Block A414, the auto-reset strobe is updated before continuing the program.

Thereafter, the proram tests to determine what type of sensor configuration the device is presently in and continues either to Block A420 or A418 as a result of the test. If the device is configured as an indoor sensor, then the stored light level byte is transmitted by having the microprocessor 504 send data to the communication interface 506. If the device is not an indoor sensor then it is an outdoor sensor, and in Block 420 the microprocessor transmits the wind/rain byte over the power line 508. At the end of the transmission sequence, the program loops back to ghe beginning of the routine where ADDRESS SEARCH is called in Block A394.

Although the invention has been described with reference to specific embodiments, this description is not meant to be construed in the limiting sense. Various modifications of the disclosed embodiments, as well as other embodiments of the invention, will become more apparent to persons skilled in the art upon reference to the appended claims and it is contemplated such will cover any such modifications or embodiments which fall within the true scope of the invention.

```
LOC  OBJ        LINE         SOURCE STATEMENT 1
                 2
                 3
                 4
                 5
                 6 ;      FILE NAME: ECU.SRC           VERSION: 2.1
                 7 .
                 8 ;      COPYRIGHT 1984 BY Q-COM, INC.
                 9
                10 ;      AUTHOR: T. LAPP
                11
                12
                13
                14
                15 ; ################################################
                16
                17 ;              ENVIRONMENTAL CONTROL UNIT SOFTWARE...
                18
                19 ;              FOR USE WITH 8035/2732 AND
                20 ;              A CRYSTAL FREQUENCY OF 3.072 MHZ.
                21
                22 ;              M68 CONTAINS PRIMARILY UTILITIES AND
                23 ;              KEYSTROKE SEQUENCING ROUTINES.
                24
```

```
25 ;                    MB1 IS RESPONSIBLE FOR TIME SLOT
26 ;                    ASSIGNMENT, ENVIRONMENTAL SENSING,
27 ;                    STAGE SELECTION, AND COMMAND FUNCTIONS.
28
29
30 ; ****************************************************************
31
32
33
34
35 ;               ENVIRONMENTAL CONTROL UNIT — MAIN PROGRAM
36
0000                    37              ORG 0
0000 75                 38              EN T0 CLK
0001 7463               39              CALL INIT
                        40
0003 8409               41              JMP MAINLP
                        42
0007                    43              ORG 7D
0007 0436               44              JMP TIMINT          ; TIMER/COUNTER INTERRUPT
                        45                                  ; SERVICE ROUTINE.
                        46      MAINLP:
                        47
0009 3400               48              CALL KEYPAD
                        49
000B F5                 50              SEL MB1
000C 1400               51              CALL TSLOT
000E 7423               52              CALL RX
                        53
                        54
                        55
0010 9425               56              CALL DSPHLR
0012 1400               57              CALL TSLOT
0014 7423               58              CALL RX
                        59
0016 E5                 60              SEL MB0
0017 9400               61              CALL KEYHLR
                        62
0019 F5                 63              SEL MB1
001A 1400               64              CALL TSLOT
001C 7423               65              CALL RX
                        66
001E E5                 67              SEL MB0
                        68
001F 8A0B               69              ORL P2,#00001011B
0021 B864               70              MOV R0,#100D
0023 80                 71              MOVX A,@R0
0024 530F               72              ANL A,#00001111B
0026 90                 73              MOVX @R0,A
0027 562C               74              JT1 ACPWR
0029 43F0               75              ORL A,#0F0H
002B 90                 76              MOVX @R0,A
                        77      ACPWR:
                        78
002C 5400               79              CALL DISPLA
                        80
002E F5                 81              SEL MB1
```

```
002F 1400      82              CALL TSLOT
0031 7423      83              CALL RX
               84
0033 E5        85              SEL MB0
               86
               87
0034 8409      88              JMP MAINLP
               89
               90
               91 $EJECT
               92      TIMINT:
0036 D5        93              SEL RB1
0037 AF        94              MOV R7,A
0038 0A        95              IN A,P2
0039 AE        96              MOV R6,A
               97
003A 2383      98              MOV A,#00000011B
003C 3F        99              MOVD P7,A
               100
003D 8A0B      101             ORL P2,#00001011B    ; SELECT RAM, PAGE 3.
003F 988B      102             MOV R0,#139D
0041 80        103             MOVX A,@R0
0042 17        104             INC A
0043 90        105             MOVX @R0,A
               106
               107
               108
0044 18        109             INC R0
0045 80        110             MOVX A,@R0
0046 17        111             INC A
0047 90        112             MOVX @R0,A           ; TIME SLOT TIMER.
               113
0048 18        114             INC R0
0049 80        115             MOVX A,@R0
004A 17        116             INC A
004B 90        117             MOVX @R0,A           ; DISPLAY HOLD TIMER.
               118
004C B855      119             MOV R0,#85D
004E 80        120             MOVX A,@R0
004F 3253      121             JB1 TINT1            ; SATURATE.
0051 17        122             INC A
0052 90        123             MOVX @R0,A           ; NET-SYNC TIMER.
0053 2458      124     TINT1:  JMP TIME
               125
               126
               127 $EJECT
               128
               129     INITFL:                      ; INITIALIZE FLAGS
               130                                  ; FOR CHECKING
               131                                  ; TEMPERATURE-
               132                                  ; REASONABLENESS.
0055 23FF      133             MOV A,#0FFH
0057 B853      134             MOV R0,#83D
0059 90        135             MOVX @R0,A
005A 18        136             INC R0
005B 90        137             MOVX @R0,A
005C 93        138             RETR
```

```
                139
                140 $EJECT
                141
                142
                143
                144 $EJECT
                145
0363            146             ORG 363H
                147     INIT:
                148
0363 35         149             DIS TCNTI
0364 74E1       150             CALL CONINT
                151
0366 BF04       152             MOV R7,#4D
0368 BE08       153             MOV R6,#08H
036A BDF8       154             MOV R5,#0F8H
                155     ICLR:
036C FD         156             MOV A,R5
036D 4E         157             ORL A,R6
036E 3A         158             OUTL P2,A
036F D3FA       159             XRL A,#11111010B
0371 9677       160             JNZ ICLR0
0373 27         161             CLR A
0374 37         162             CPL A
0375 6478       163             JMP ICLR1
                164     ICLR0:
0377 27         165             CLR A
                166     ICLR1:
0378 B8FF       167             MOV R0,#0FFH
                168     JCLR:
037A 90         169             MOVX @R0,A
037B E87A       170             DJNZ R0,JCLR
037D 90         171             MOVX @R0,A
037E CE         172             DEC R6
037F EF6C       173             DJNZ R7,ICLR
                174
0381 8A0B       175             ORL P2,#00001011B
                176
                177
0383 1455       178             CALL INITFL      ; FLAG INITIALIZE.
                179
0385 F4F0       180             CALL INITAD      ; INITIAL MCI ADDRESS: 1-99
                181
0387 27         182             CLR A
0388 B80F       183             MOV R0,#15D      ; KEY DEBOUNCE VARIABLE
038A 90         184             MOVX @R0,A       ; INITIALIZATION.
                185
038B B81F       186             MOV R0,#31D      ; KEY REFRACTORY INITIALIZATION.
038D 90         187             MOVX @R0,A
                188
038E 2310       189             MOV A,#16D       ; KEY BUFFER INITIALIZE.
0390 A8         190             MOV R0,A
0391 90         191             MOVX @R0,A
                192
0392 232A       193             MOV A,#(LOW QUO) ; KEYHLR INITIALIZE.
0394 B820       194             MOV R0,#32D
0396 90         195             MOVX @R0,A
```

```
                196
0397 23AD       197             MOV A,#(LOW D07)    ; DISPLAY INITIALIZE.
0399 B87A       198             MOV R0,#DCTRL
039B 90         199             MOVX @R0,A
                200
                201
039C 2301       202             MOV A,#1
039E B891       203             MOV R0,#145D
03A0 90         204             MOVX @R0,A
03A1 18         205             INC R0
03A2 90         206             MOVX @R0,A
03A3 B895       207             MOV R0,#149D
03A5 90         208             MOVX @R0,A
                209
03A6 23FF       210             MOV A,#0FFH
03A8 B904       211             MOV R1,#4D
                212     TEMP1:
03AA 18         213             INC R0
03AB 90         214             MOVX @R0,A
03AC E9AA       215             DJNZ R1,TEMP1
03AE B828       216             MOV R0,#40D
03B0 B914       217             MOV R1,#20D
                218     TEMP2:
03B2 18         219             INC R0
03B3 90         220             MOVX @R0,A
03B4 E9B2       221             DJNZ R1,TEMP2
                222
03B5 F5         223             SEL MB1
03B7 9400       224             CALL DBLANK
03B9 E5         225             SEL MB0
                226
03BA B86E       227             MOV R0,#110D
03BC 2340       228             MOV A,#40H
03BE 90         229             MOVX @R0,A
03BF C8         230             DEC R0
03C0 2350       231             MOV A,#50H
03C2 90         232             MOVX @R0,A
03C3 C8         233             DEC R0
03C4 2330       234             MOV A,#30H
03C6 90         235             MOVX @R0,A
03C7 C8         236             DEC R0
03C8 90         237             MOVX @R0,A
03C9 C8         238             DEC R0
03CA 2320       239             MOV A,#20H
03CC 90         240             MOVX @R0,A
03CD 5400       241             CALL DISPLA
03CF F5         242             SEL MB1
03D0 F40D       243             CALL ADDR
03D2 E5         244             SEL MB0
03D3 74D6       245             CALL TMRS
03D5 93         246             RETR
                247
                248
                249
                250     TMRS:
03D6 35         251             DIS TCNTI
03D7 27         252             CLR A
```

```
03D8 B88B       253             MOV R0,#139D
03DA 90         254             MOVX @R0,A
03DB 18         255             INC R0
03DC 90         256             MOVX @R0,A
03DD 62         257             MOV T,A
03DE 25         258             EN TCNTI
03DF 55         259             STRT T
                260
03E0 93         261             RETR
                262
                263     COMINT:                         ; USART INITIALIZATION.
03E1 23FF       264             MOV A,#0FFH
03E3 B83F       265             MOV R0,#63D
03E5 A0         266             MOV @R0,A               ; STORE PORT 7 REPLICA.
03E6 3F         267             MOVD P7,A
03E7 9AF7       268             ANL P2,#11110111B       ; RAM DE-SELECT.
03E9 2302       269             MOV A,#00000010B        ; 8251 CS, CMD MODE.
03EB A0         270             MOV @R0,A
03EC 3F         271             MOVD P7,A
03ED 237F       272             MOV A,#01111111B        ; SET UP: ASYNX64, 8-BIT CHAR,
                273                                     ; EVEN PARITY, SINGLE STOP BIT.
03EF 90         274             MOVX @R0,A              ; 8251 MODE INSTRUCTION.
03F0 2315       275             MOV A,#00010101B        ; TX ENABLE, RX ENABLE,
03F2 90         276             MOVX @R0,A              ; ERROR RESET.
03F3 27         277             CLR A
03F4 A0         278             MOV @R0,A
03F5 3F         279             MOVD P7,A               ; DATA MODE.
03F6 80         280             MOVX A,@R0
03F7 80         281             MOVX A,@R0              ; CLEAR RX BUFFER.
03F8 2303       282             MOV A,#00000011B
03FA A0         283             MOV @R0,A
03FB 3F         284             MOVD P7,A
03FC 8A0B       285             ORL P2,#00001011B       ; RE-SELECT RAM.
03FE 93         286             RETR
                287
                288
                289
                290
                291 $INCLUDE (INCFYL.SRC)
=               292
=               293     ;       FILE OF INCLUDED SUB-PROGRAMS...
=               294
=               295 $EJECT
0100 =          296             ORG 256D
=               297 $INCLUDE (KEYPAD.SRC)
1=              298
1=              299
1=              300     ;***********************************************
1=              301
1=              302     ;               "KEYPAD"
1=              303
1=              304     ;***********************************************
1=              305
1=              306     ; THIS MODULE IS RESPONSIBLE FOR SCANNING
1=              307     ; THE HEXADECIMAL KEYPAD. PARAMETERS RELATED
1=              308     ; TO KEY BOUNCE PROPERTIES ARE ACCOMODATED
1=              309     ; BY "DBMAX" AND "UNLOCK".
```

```
                    1= 310
                    1= 311
                    1= 312    KEYPAD:
0100 8AFF           1= 313              ORL  P2,#0FFH              ; SELECT ROM, PAGE 3.
0102 BF1F           1= 314              MOV  R7,#(MASK+31D-768D)   ; ROM, PAGE 3 ADDRESS.
0104 BC04           1= 315              MOV  R4,#4D
                    1= 316    SCAN:
0106 FF             1= 317              MOV  A,R7
0107 E3             1= 318              MOVP3 A,@A                 ; GET MASK.
0108 43F0           1= 319              ORL  A,#0F0H               ; PUT 1'S IN Y-BITS.
010A 39             1= 320              OUTL P1,A                  ; SCAN KEYBOARD.
010B 09             1= 321              IN   A,P1
010C AD             1= 322              MOV  R5,A                  ; GET AND STORE RETURN.
010D BB04           1= 323              MOV  R3,#4D                ; NUMBER OF MASKS TO
                    1= 324                                         ; CHECK AGAINST THIS RETURN.
                    1= 325
                    1= 326    SCAN1:
010F FF             1= 327              MOV  A,R7
0110 E3             1= 328              MOVP3 A,@A
0111 DD             1= 329              XRL  A,R5
0112 C628           1= 330              JZ   HIT
0114 CF             1= 331              DEC  R7
0115 CF             1= 332              DEC  R7
0116 EB0F           1= 333              DJNZ R3,SCAN1
0118 EC06           1= 334              DJNZ R4,SCAN
                    1= 335
011A B81F           1= 336              MOV  R0,#31D
011C 80             1= 337              MOVX A,@R0                 ; GET REFRACTORY VARIABLE.
011D C622           1= 338              JZ   LBLK1
011F 07             1= 339              DEC  A
0120 90             1= 340              MOVX @R0,A
0121 93             1= 341              RETR
                    1= 342    LBLK1:
0122 A5             1= 343              CLR  F1                    ; CLEAR FLAG TO INDICATE
                    1= 344                                         ; THAT NO KEYS ARE DOWN.
0123 27             1= 345              CLR  A
0124 B80F           1= 346              MOV  R0,#15D
0126 90             1= 347              MOVX @R0,A                 ; CLEAR DEBOUNCE REGISTER.
                    1= 348
0127 93             1= 349              RETR
                    1= 350    HIT:
0128 B80F           1= 351              MOV  R0,#15D
012A 80             1= 352              MOVX A,@R0                 ; GET DEBOUNCE VARIABLE.
012B AD             1= 353              MOV  R5,A                  ; PUT ASIDE NON-INCREMENTED
                    1= 354                                         ; DEBOUNCE VARIABLE.
012C 17             1= 355              INC  A
0003                1= 356    DBMAX     SET  3                     ; SET VALUE OF
                    1= 357                                         ; DEBOUNCE PARAMETER.
012D D303           1= 358              XRL  A,#DBMAX
012F 964A           1= 359              JNZ  KEY1
                    1= 360
0131 764F           1= 361              JF1  KEY2
0133 B5             1= 362              CPL  F1                    ; KEY DOWN INDICATION.
0134 F5             1= 363              SEL  MB1
0135 D440           1= 364              CALL BEEP
0137 E5             1= 365              SEL  MB0
                    1= 366
```

```
                 1= 367
                 1= 368
0003             1= 369        UNLOCK   SET 3                  ; SET REFRACTORY PARAMETER.
0138 B81F        1= 370                 MOV R0,#31D
0139 2303        1= 371                 MOV A,#UNLOCK
013C 90          1= 372                 MOVX @R0,A             ; STORE UNLOCK VARIABLE AT MAX.
013D FF          1= 373                 MOV A,R7
013E 07          1= 374                 DEC A
013F E3          1= 375                 MOVP3 A,@A             ; GET AND STORE HEX CODE FOR THIS KEY.
0140 A9          1= 376                 MOV R1,A
0141 B810        1= 377                 MOV R0,#16D
0143 80          1= 378                 MOVX A,@R0
0144 17          1= 379                 INC A
0145 90          1= 380                 MOVX @R0,A
                 1= 381                                        ; UPDATE KEY BUFFER POINTER.
0146 A8          1= 382                 MOV R0,A
0147 F9          1= 383                 MOV A,R1
0148 90          1= 384                 MOVX @R0,A             ; STORE HEX CODE IN RAM BUFFER.
0149 93          1= 385                 RETR
                 1= 386        KEY1:
014A FD          1= 387                 MOV A,R5
014B 17          1= 388                 INC A
014C B80F        1= 389                 MOV R0,#15D
014E 90          1= 390                 MOVX @R0,A
                 1= 391        KEY2:
014F 93          1= 392                 RETR
                 1= 393
0150 00          1= 394        MKR:     NOP
                 1= 395
0300             1= 396                 ORG 768D               ; LOCATE MASK TABLE IN
                 1= 397                                        ; ROM PAGE 3.
                 1= 398        MASK:
0300 01          1= 399                 DB 01H,11101110B       ; HEX CODE AND
0301 EE          1=
0302 02          1= 400                 DB 02H,11011110B       ; CORRESPONDING SCAN
0303 DE          1=
0304 03          1= 401                 DB 03H,10111110B       ; AND RETURN BITS.
0305 BE          1=
0306 0A          1= 402                 DB 0AH,01111110B
0307 7E          1=
0308 04          1= 403                 DB 04H,11101101B
0309 ED          1=
030A 05          1= 404                 DB 05H,11011101B
030B DD          1=
030C 06          1= 405                 DB 06H,10111101B
030D BD          1=
030E 0B          1= 406                 DB 0BH,01111101B
030F 7D          1=
0310 07          1= 407                 DB 07H,11101011B
0311 EB          1=
0312 08          1= 408                 DB 08H,11011011B
0313 DB          1=
0314 09          1= 409                 DB 09H,10111011B
0315 BB          1=
0316 0C          1= 410                 DB 0CH,01111011B
0317 7B          1=
0318 0F          1= 411                 DB 0FH,11100111B
```

```
0319 E7    1=
031A 00    1= 412              DB 00H,11010111B
031B D7    1=
031C 0E    1= 413              DB 0EH,10110111B
031D B7    1=
031E 80    1= 414              DB 80H,01110111B
031F 77    1=
           1= 415
0150       1= 416              ORG MKR
           = 417 $EJECT
           = 418 $INCLUDE (TIME.SRC)
           1= 419
           1= 420      ;*********************************
           1= 421
           1= 422      ;         TIME
           1= 423
           1= 424      ;*********************************
           1= 425
           1= 426      TIME:
           1= 427
           1= 428      ; THIS ROUTINE PROVIDES A REAL TIME
           1= 429      ; CLOCK, WITH BCD SECONDS, MINUTES,
           1= 430      ; HOURS, AND, OPTIONALLY, DAYS
           1= 431      ; STORED IN PAGE THREE OFF-CHIP
           1= 432      ; RAM. AN AM/PM INDICATOR IS ALSO
           1= 433      ; PROVIDED.
           1= 434
0019       1= 435      TREG    EQU     25D
           1= 436      ; TREG IS THE NUMBER OF TIMER/COUNTER
           1= 437      ; INTERRUPTS WHICH CORRESPOND TO ONE
           1= 438      ; SECOND. THE TIMER INTERRUPT ROUTINE
           1= 439      ; IS RESPONSIBLE FOR UPDATING THE
           1= 440      ; OVERFLOW COUNT AT THE APPROPRIATE
           1= 441      ; TIMES.
           1= 442
0150 B98B  1= 443              MOV  R1,#139D      ; RAM ADDR OF OVERFLOW ACC
0152 81    1= 444              MOVX A,@R1         ; GET ACCUMULATED O-FLOWS.
0153 D319  1= 445              XRL  A,#TREG
0155 96CC  1= 446              JNZ  TDONE1
           1= 447
           1= 448      ; IT'S TIME FOR AN UPDATE. FIRST RESET THE OVERFLOW ACC.
0157 27    1= 449              CLR  A
0158 91    1= 450              MOVX @R1,A
           1= 451
           1= 452      ; REMOVE LEADING ZERO BLANKING CODE.
0159 B887  1= 453              MOV  R0,#135D
015B 80    1= 454              MOVX A,@R0
015C D3FF  1= 455              XRL  A,#0FFH       ; CHECK FOR BLANKING.
015E 9662  1= 456              JNZ  NOBLK
0160 27    1= 457              CLR  A
0161 90    1= 458              MOVX @R0,A
           1= 459      NOBLK:
           1= 460
           1= 461      ; NOW INCREMENT THE BCD TIME REGISTERS.
0162 B982  1= 462              MOV  R1,#130D      ; PAGE 3 RAM ADDR OF LS SEC BYTE.
0164 81    1= 463              MOVX A,@R1
0165 17    1= 464              INC  A
```

```
0166 91        1= 465           MOVX @R1,A        ; INCR AND PUT BACK
0167 D30A      1= 466           XRL A,#10D        ; TEST FOR "CARRY".
0169 96AA      1= 467           JNZ TDONE
               1= 468
               1= 469       ; CARRY DETECTED.
016B 27        1= 470           CLR A
016C 91        1= 471           MOVX @R1,A
016D 19        1= 472           INC R1
016E 81        1= 473           MOVX A,@R1        ; GET MS SEC BYTE.
016F 17        1= 474           INC A
0170 91        1= 475           MOVX @R1,A        ; INCR AND PUT BACK
0171 D306      1= 476           XRL A,#06D
0173 96AA      1= 477           JNZ TDONE
0175 27        1= 478           CLR A
0176 91        1= 479           MOVX @R1,A
0177 19        1= 480           INC R1
0178 81        1= 481           MOVX A,@R1        ; GET LS MIN BYTE.
0179 17        1= 482           INC A
017A 91        1= 483           MOVX @R1,A
017B D30A      1= 484           XRL A,#10D
017D 96AA      1= 485           JNZ TDONE
017F 27        1= 486           CLR A
0180 91        1= 487           MOVX @R1,A
               1= 488                             ; RESET LS MIN BYTE
0181 19        1= 489           INC R1
0182 81        1= 490           MOVX A,@R1        ; GET MS MIN BYTE.
0183 17        1= 491           INC A
0184 91        1= 492           MOVX @R1,A
0185 D306      1= 493           XRL A,#06D
0187 96AA      1= 494           JNZ TDONE
0189 27        1= 495           CLR A
018A 91        1= 496           MOVX @R1,A
               1= 497                             ; RESET MS MIN BYTE.
018B 19        1= 498           INC R1
018C 81        1= 499           MOVX A,@R1
               1= 500                             ; GET LS HOURS BYTE.
018D 17        1= 501           INC A
018E 91        1= 502           MOVX @R1,A
018F D30A      1= 503           XRL A,#10D
0191 969B      1= 504           JNZ T12
0193 27        1= 505           CLR A
0194 91        1= 506           MOVX @R1,A
0195 19        1= 507           INC R1
0196 2301      1= 508           MOV A,#01D
0198 91        1= 509           MOVX @R1,A        ; PUT "1" IN MS HRS BYTE.
0199 24AA      1= 510           JMP TDONE
               1= 511
               1= 512       T12:
019B 81        1= 513           MOVX A,@R1        ; GET LS HRS AGAIN
019C D303      1= 514           XRL A,#03D        ; CHECK TO SEE IF WE ARE
               1= 515                             ; AT "13 O'CLOCK"
019E 96AA      1= 516           JNZ TDONE
01A0 19        1= 517           INC R1
01A1 81        1= 518           MOVX A,@R1
01A2 C6AA      1= 519           JZ TDONE          ; JUMP FOR 3 O'CLOCK
01A4 27        1= 520           CLR A
01A5 91        1= 521           MOVX @R1,A        ; CLR MS HRS BYTE.
```

```
01A6 C9      1= 522              DEC R1
01A7 2301    1= 523              MOV A,#01D
01A9 91      1= 524              MOVX @R1,A           ; SET LS HRS TO 1 O'CLOCK.
             1= 525
             1= 526      TDONE:
01AA B887    1= 527              MOV R0,#135D
01AC 80      1= 528              MOVX A,@R0
01AD 96B2    1= 529              JNZ TDONE2
01AF 23FF    1= 530              MOV A,#0FFH          ; INSERT BLANKING CODE.
01B1 90      1= 531              MOVX @R0,A
             1= 532
             1= 533      TDONE2:
             1= 534
             1= 535      ; TOGGLE AM/PM INDICATOR WHEN NEEDED.
01B2 BD04    1= 536              MOV R5,#4D
01B4 B882    1= 537              MOV R0,#138D
             1= 538      AMPM:
01B6 80      1= 539              MOVX A,@R0
01B7 96CC    1= 540              JNZ TDONE1
01B9 18      1= 541              INC R0
01BA EDB6    1= 542              DJNZ R5,AMPM
01BC 80      1= 543              MOVX A,@R0
01BD D302    1= 544              XRL A,#20
01BF 96CC    1= 545              JNZ TDONE1
01C1 18      1= 546              INC R0
01C2 80      1= 547              MOVX A,@R0
01C3 D301    1= 548              XRL A,#1D
01C5 96CC    1= 549              JNZ TDONE1
01C7 B88A    1= 550              MOV R0,#138D
01C9 80      1= 551              MOVX A,@R0
01CA 37      1= 552              CPL A
01CB 90      1= 553              MOVX @R0,A
             1= 554      TDONE1:
01CC B83F    1= 555              MOV R0,#63D
01CE F0      1= 556              MOV A,@R0
01CF 3F      1= 557              MOVD P7,A
             1= 558
01D0 FE      1= 559              MOV A,R6
01D1 3A      1= 560              OUTL P2,A
01D2 FF      1= 561              MOV A,R7
01D3 93      1= 562              RETR
             1= 563
             1= 564      ;********************************************
             1= 565      ;     END OF "TIME" ROUTINE
             1= 566      ;********************************************
             1= 567
             1= 568
             1= 569
             =  570
             =  571 $EJECT
0200         =  572              ORG 512D
             =  573 $INCLUDE (DISPLA.SRC)
             1= 574
             1= 575      ;********************************************
             1= 576
             1= 577      ;      ----DISPLAY----
             1= 578
```

```
 1= 579      ;*********************************
 1= 580
 1= 581      ; THIS ROUTINE PROVIDES A SERIAL
 1= 582      ; DATA STREAM COMPATIBLE WITH THE
 1= 583      ; NSMA000A DISPLAY MODULE.  ELEVEN
 1= 584      ; BYTES OF OFF-CHIP PAGE 3 RAM ARE
 1= 585      ; DEDICATED TO PROVIDING THE
 1= 586      ; NECESSARY SOURCE DATA.
 1= 587      ; ON COMMAND, THE DISPLAY IS BLANKED
 1= 588      ; AND A "STANDBY POWER" INDICATOR
 1= 589      ; IS ENABLED.
 1= 590
 1= 591
 1= 592      DISPLA:
 1= 593
 1= 594      ; FIRST WE SAVE THE INPUT DATA FOR LATER RESTORATION.
0200 8A0F      1= 595           ORL P2,#0FH            ; RAM PAGE 3 SELECT.
0202 B86E      1= 596           MOV R0,#110D
0204 B979      1= 597           MOV R1,#121D
0206 BF0B      1= 598           MOV R7,#11D
               1= 599      DSAVE:
0208 80        1= 600           MOVX A,@R0
0209 91        1= 601           MOVX @R1,A
020A C8        1= 602           DEC R0
020B C9        1= 603           DEC R1
020C EF08      1= 604           DJNZ R7,DSAVE
               1= 605
020E 44E0      1= 606           JMP BLCK               ; LOOK FOR A
               1= 607                                  ; BLANKING COMMAND.
               1= 608
               1= 609      BACK:
0210 BF08      1= 610           MOV R7,#8D             ; NUMBER OF HEX CODED BYTES
               1= 611                                  ; TO BE TRANSLATED TO SEGMENT CODE.
0212 BE6E      1= 612           MOV R6,#110D           ; TOP ADDR OF HEX CODES,PG 3.
0214 238B      1= 613           MOV A,#10001011B       ; SELECT RAM (AS OPPOSED TO
               1= 614                                  ; MEMORY-MAPPED MODEM)
0216 3A        1= 615           OUTL P2,A              ; ALSO, LEAVE PORT 2 STABLE.
               1= 616
               1= 617      DLOOP:
0217 FE        1= 618           MOV A,R6               ; GET ADDR OF HEX CODES.
0218 A8        1= 619           MOV R0,A
0219 80        1= 620           MOVX A,@R0             ; GET HEX CODE BYTE.
021A AD        1= 621           MOV R5,A               ; PUT HEX CODE ASIDE.
021B BC60      1= 622           MOV R4,#(DMASK+56D-768D)
               1= 623      DTEST:
021D FC        1= 624           MOV A,R4
021E C628      1= 625           JZ DHIT                ; ERROR EXIT...INVALID CODE.
0220 E3        1= 626           MOVP3 A,@A             ; GET POTENTIAL HEX MATCH
0221 DD        1= 627           XRL A,R5               ; TEST FOR MATCH
0222 C628      1= 628           JZ DHIT
0224 CC        1= 629           DEC R4
0225 CC        1= 630           DEC R4
0226 441D      1= 631           JMP DTEST              ; HANG IN UNTIL MATCH FOUND
               1= 632      DHIT:
0228 1C        1= 633           INC R4
0229 FC        1= 634           MOV A,R4
022A E3        1= 635           MOVP3 A,@A             ;GET SEGMENT CODE
```

```
022B AD      1= 636              MOV R5,A         ; OVERWRITE HEX
022C FE      1= 637              MOV A,R6         ; APPROPRIATE RAM ADDR
022D A8      1= 638              MOV R0,A
022E FD      1= 639              MOV A,R5
022F 90      1= 640              MOVX @R0,A       ; STORE TRANSLATION
0230 CE      1= 641              DEC R6
0231 EF17    1= 642              DJNZ R7,DLOOP    ; DO ALL BYTES.
             1= 643       ;==================================
             1= 644       ; NEXT WE INSERT DECIMAL POINT INDICATORS
             1= 645       ; WHERE DIRECTED BY RAM LOC 101D.
             1= 646       ;==================================
             1= 647
0233 BF08    1= 648              MOV R7,#8D       ; NUMBER OF DIGITS
0235 BE6E    1= 649              MOV R6,#110D     ; RAM ADDR OF LEFT-MOST DISPL
0237 B865    1= 650              MOV R0,#101D
0239 80      1= 651              MOVX A,@R0       ; GET DP INDICATION BYTE
023A AD      1= 652              MOV R5,A         ; STORE DP BYTE
023B BC80    1= 653              MOV R4,#80H      ; MASK FOR GETTING FIRST DP
             1= 654       DPLOOP:
023D FC      1= 655              MOV A,R4
023E 5D      1= 656              ANL A,R5
023F C647    1= 657              JZ NODP
0241 FE      1= 658              MOV A,R6
0242 A8      1= 659              MOV R0,A
0243 80      1= 660              MOVX A,@R0
0244 4380    1= 661              ORL A,#80H       ; DP INSTALLED AS MSB
0246 90      1= 662              MOVX @R0,A
             1= 663       NODP:
0247 CE      1= 664              DEC R6
0248 FC      1= 665              MOV A,R4
0249 77      1= 666              RR A
024A AC      1= 667              MOV R4,A
024B EF3D    1= 668              DJNZ R7,DPLOOP   ; ALL DP'S INSTALLED
             1= 669
             1= 670       ; NOW SET UP PORT 2 MSN FOR DATA TRANSFER TO
             1= 671       ; NSM4000A MODULES.
             1= 672
024D 238B    1= 673              MOV A,#10001011B
024F 3A      1= 674              OUTL P2,A
0250 230B    1= 675              MOV A,#00001011B ; ENABLE DISPLAY DATA
0252 3A      1= 676              OUTL P2,A
0253 236B    1= 677              MOV A,#01101011B ; SET START BITS
0255 3A      1= 678              OUTL P2,A
0256 237B    1= 679              MOV A,#01111011B ; CLK HI
0258 3A      1= 680              OUTL P2,A
0259 236B    1= 681              MOV A,#01101011B ; CLK LO
025B 3A      1= 682              OUTL P2,A
025C 230B    1= 683              MOV A,#00001011B ; RESET MSN
025E 3A      1= 684              OUTL P2,A
025F BF04    1= 685              MOV R7,#4D       ; NUMBER OF BYTES FOR
             1= 686                               ; EACH HALF OF DISPLAY
0261 BE01    1= 687              MOV R6,#01H      ; STARTING MASK
0263 BD6A    1= 688              MOV R5,#106D     ; RIGHT HALF OF DISPLAY,
             1= 689                               ; FIRST BYTE LOCATION
0265 BC6E    1= 690              MOV R4,#110D     ; LEFT HALF FIRST BYTE LOC
             1= 691       BUF:
0267 FD      1= 692              MOV A,R5
```

```
0268 A8       1= 693             MOV R0,A
0269 80       1= 694             MOVX A,@R0
026A AB       1= 695             MOV R3,A              ; R-HALF, FIRST BYTE TO R3
026B CD       1= 696             DEC R5
026C FC       1= 697             MOV A,R4
026D A8       1= 698             MOV R0,A
026E 80       1= 699             MOVX A,@R0
026F AA       1= 700             MOV R2,A              ; L-HALF, FIRST BYTE TO R2
0270 CC       1= 701             DEC R4                ; GET READY FOR NEXT TIME
              1= 702     CIRCLE:
0271 FB       1= 703             MOV A,R3
0272 5E       1= 704             ANL A,R6
0273 C677     1= 705             JZ DATA2
0275 8A40     1= 706             ORL P2,#01000000B     ; DATA2 BIT SET (RIGHT SIDE)
              1= 707     DATA2:
0277 FA       1= 708             MOV A,R2
0278 5E       1= 709             ANL A,R6
0279 C67D     1= 710             JZ DATA1
027B 8A20     1= 711             ORL P2,#00100000B     ; DATA1 BIT SET (LEFT SIDE)
              1= 712     DATA1:
027D 8A10     1= 713             ORL P2,#00010000B     ; CLK HI
027F 9AEF     1= 714             ANL P2,#11101111B     ; CLK LO
0281 230B     1= 715             MOV A,#00001011B      ; RESET MSN
0283 3A       1= 716             OUTL P2,A
0284 FE       1= 717             MOV A,R6
0285 E7       1= 718             RL A                  ; ROTATE MASK
0286 AE       1= 719             MOV R6,A
0287 2301     1= 720             MOV A,#01H
0289 DE       1= 721             XRL A,R6
028A 9671     1= 722             JNZ CIRCLE            ; DO WHOLE BYTE
028C EF67     1= 723             DJNZ R7,BUF           ; DO ALL FOUR BYTES
              1= 724
              1= 725     ; ALL DIGITS AND DECIMAL POINTS NOW DONE.
              1= 726     ; NOW DO LED'S.
              1= 727
028E B866     1= 728             MOV R0,#102D
0290 80       1= 729             MOVX A,@R0
0291 AF       1= 730             MOV R7,A              ; STORE AM/PM DATA
0292 230F     1= 731             MOV A,#0FH
0294 DF       1= 732             XRL A,R7
0295 9699     1= 733             JNZ NOTAM
0297 8A40     1= 734             ORL P2,#01000000B     ; SET "AM" (R-H LED-1)
              1= 735     NOTAM:
0299 B964     1= 736             MOV R1,#100D
029B 81       1= 737             MOVX A,@R1            ; GET "STBY" AND "AUTO/MAN" INFO
029C 43F0     1= 738             ORL A,#0F0H           ; MASK MSN
029E AE       1= 739             MOV R6,A
029F 23FF     1= 740             MOV A,#0FFH
02A1 DE       1= 741             XRL A,R6
02A2 96A6     1= 742             JNZ NORMAL
02A4 8A20     1= 743             ORL P2,#00100000B     ; SET "MANUAL" ON (L-H LED-1)
              1= 744     NORMAL:
02A6 8A10     1= 745             ORL P2,#00010000B     ; CLK HI
02A8 9AEF     1= 746             ANL P2,#11101111B     ; CLK LO
02AA 230B     1= 747             MOV A,#00001011B      ; RESET MSN
02AC 3A       1= 748             OUTL P2,A
02AD 23F0     1= 749             MOV A,#0F0H           ; "PM" MASK
```

```
02AF DF        1= 750             XRL A,R7
02B0 96B4      1= 751             JNZ NOTPM
02B2 8A40      1= 752             ORL P2,#010000000B    ; SET "PM" (R-H LED 2)
               1= 753     NOTPM:
02B4 B964      1= 754             MOV R1,#100D          ; GET STBY/AUTO/MAN BYTE
02B6 81        1= 755             MOVX A,@R1            ; AGAIN.
02B7 43F0      1= 756             ORL A,#0F0H           ; MASK MSN.
02B9 AE        1= 757             MOV R6,A
02BA 23FF      1= 758             MOV A,#0FFH
02BC DE        1= 759             XRL A,R6
02BD C6C1      1= 760             JZ AUTO
02BF 8A20      1= 761             ORL P2,#001000000B    ; SET "AUTO" (L-H LED-2)
               1= 762     AUTO:
02C1 8A10      1= 763             ORL P2,#000100000B    ; CLK HI
02C3 9AEF      1= 764             ANL P2,#111011111B    ; CLK LO
               1= 765
               1= 766     ; NOW FLUSH BIT STREAM WITH ZEROS.
02C5 9A9F      1= 767             ANL P2,#100111111B
02C7 B828      1= 768             MOV R0,#40D
               1= 769     FLUSH:
               1= 770
02C9 8A10      1= 771             ORL P2,#000100000B    ; CLK HI
02CB 9AEF      1= 772             ANL P2,#111011111B    ; CLK LO
               1= 773
02CD E8C9      1= 774             DJNZ R0,FLUSH
               1= 775
02CF 8A80      1= 776             ORL P2,#100000000B    ; DISPLAY DISABLE
               1= 777
02D1 8A0B      1= 778             ORL P2,#000001011B
               1= 779
               1= 780     ; NOW WE RESTORE THE INPUT SOURCE DATA.
02D3 B86E      1= 781             MOV R0,#110D
02D5 B979      1= 782             MOV R1,#121D
02D7 BF0B      1= 783             MOV R7,#11D
               1= 784     UNSAV:
02D9 81        1= 785             MOVX A,@R1
02DA 90        1= 786             MOVX @R0,A
02DB C8        1= 787             DEC R0
02DC C9        1= 788             DEC R1
02DD EFD9      1= 789             DJNZ R7,UNSAV
               1= 790
02DF 93        1= 791             RETR
               1= 792     BLCK:
               1= 793                                   ; CHECK FOR BLANKING FLAG
               1= 794                                   ; (OCCURS ON PWR STBY)
02E0 B864      1= 795             MOV R0,#100D
02E2 80        1= 796             MOVX A,@R0
02E3 430F      1= 797             ORL A,#0FH            ; MASK LSN
02E5 D3FF      1= 798             XRL A,#0FFH
02E7 9610      1= 799             JNZ BACK
02E9 BF6E      1= 800             MOV R7,#110D
02EB BE08      1= 801             MOV R6,#8D
02ED 00        1= 802             NOP
               1= 803     WIPE:
02EE FF        1= 804             MOV A,R7
02EF A8        1= 805             MOV R0,A
02F0 27        1= 806             CLR A
```

```
02F1 37        1= 807              CPL A
02F2 90        1= 808              MOVX @R0,A
02F3 CF        1= 809              DEC R7
02F4 EEEE      1= 810              DJNZ R6,WIPE      ; WIPE DISPLAY CLEAN
02F6 B866      1= 811              MOV R0,#102D
02F8 27        1= 812              CLR A
02F9 90        1= 813              MOVX @R0,A
02FA C8        1= 814              DEC R0
               1= 815
02FB 90        1= 816              MOVX @R0,A
02FC 4410      1= 817              JMP BACK
02FE 00        1= 818      MKR0:   NOP
               1= 819
               1= 820      ;==================================================
               1= 821      ;**************************************************
               1= 822      ;   ROM TABLE OF MATCHING HEX CODES
               1= 823      ;           AND SEGMENT CODES
               1= 824
032B           1= 825              ORG (768D+40D)    ; PLACE IN ROM PAGE 3
               1= 826                                ; RIGHT AFTER KEYPAD TABLE
               1= 827
               1= 828      DMASK:
032B 00        1= 829              DB 00H,00111111B  ; DISPLAY CODES FOR
032C 3F        1=
032A 01        1= 830              DB 01H,00000110B  ; NUMERALS COME FIRST.
032B 06        1=
032C 02        1= 831              DB 02H,01011011B
032D 5B        1=
032E 03        1= 832              DB 03H,01001111B
032F 4F        1=
0330 04        1= 833              DB 04H,01100110B
0331 66        1=
0332 05        1= 834              DB 05H,01101101B
0333 6D        1=
0334 06        1= 835              DB 06H,01111100B
0335 7C        1=
0336 07        1= 836              DB 07H,00000111B
0337 07        1=
0338 08        1= 837              DB 08H,01111111B
0339 7F        1=
033A 09        1= 838              DB 09H,01100111B
033B 67        1=
033C 10        1= 839              DB 10H,00111001B  ; LETTER "C"
033D 39        1=
033E 20        1= 840              DB 20H,00111111B  ; LETTER "O"
033F 3F        1=
0340 30        1= 841              DB 30H,00111000B  ; LETTER "L"
0341 38        1=
0342 40        1= 842              DB 40H,01110110B  ; LETTER "H"
0343 76        1=
0344 50        1= 843              DB 50H,01111001B  ; LETTER "E"
0345 79        1=
0346 60        1= 844              DB 60H,01110111B  ; LETTER "A"
0347 77        1=
0348 70        1= 845              DB 70H,01111000B  ; LETTER "T"
0349 78        1=
034A 80        1= 846              DB 80H,01110001B  ; LETTER "F"
```

```
034B 71      1=
034C 81      1= 847            DB 81H,01101101B      ; LETTER "S"
034D 6D      1=
034E 82      1= 848            DB 82H,01110011B      ; LETTER "P"
034F 73      1=
0350 83      1= 849            DB 83H,00000100B      ; LOWER CASE "I"
0351 04      1=
0352 84      1= 850            DB 84H,01010100B      ; LOWER CASE "N"
0353 54      1=
0354 85      1= 851            DB 85H,01011100B      ; LOWER CASE "O"
0355 5C      1=
0356 86      1= 852            DB 86H,00011100B      ; LOWER CASE "U"
0357 1C      1=
0358 87      1= 853            DB 87H,01000000B      ; HYPHEN OR MINUS SIGN
0359 40      1=
035A 88      1= 854            DB 88H,01011110B      ; LOWER CASE "D"
035B 5E      1=
             1= 855
035C 89      1= 856            DB 89H,01010000B      ; LOWER CASE "R"
035D 50      1=
             1= 857
035E 90      1= 858            DB 90H,00001000B      ; UNDERSCORE CODE
035F 08      1=
0360 FF      1= 859            DB 0FFH,00000000B     ; BLANKING CODE
0361 00      1=
             1= 860
02FE         1= 861            ORG MKR0
             1= 862
             1= 863        ;===============================================
             1= 864        ;***********************************************
             = 865
             = 866
             = 867
             = 868 $EJECT
             = 869 $INCLUDE (KEYHLR.SRC)
             1= 870
             1= 871
             1= 872 ;        KEYHLR: KEYSTROKE SEQUENCING ROUTINE.
             1= 873
0400         1= 874            ORG 400H
             1= 875
             1= 876 KEYHLR:
0400 8A0B    1= 877            ORL P2,#00001011B
0402 941D    1= 878            CALL KEYCK
0404 37      1= 879            CPL A
0405 9608    1= 880            JNZ KHLR0
0407 93      1= 881            RETR
             1= 882 KHLR0:
0408 37      1= 883            CPL A
0409 AF      1= 884            MOV R7,A
040A D380    1= 885            XRL A,#80H           ; CHK FOR "CLEAR".
040C B920    1= 886            MOV R1,#32D
040E 961B    1= 887            JNZ KHLR1
             1= 888 KCLO:
0410 23AD    1= 889            MOV A,#(LOW D07)
0412 B87A    1= 890            MOV R0,#DCTRL
0414 90      1= 891            MOVX @R0,A           ; RETURN TO ROLLING DISPLAY.
```

```
0415 B87C      1= 892                  MOV R0,#124D
0417 27        1= 893                  CLR A
0418 90        1= 894                  MOVX @R0,A
0419 A405      1= 895                  JMP B2L0                ; RESET KEY SEQ STATUS AND AUTO.
               1= 896          KHLR1:
041B 81        1= 897                  MOVX A,@R1              ; FETCH STATUS BYTE.
041C 33        1= 898                  JMPP @A
               1= 899
               1= 900 $EJECT
               1= 901
               1= 902
               1= 903
               1= 904          KEYCK:
               1= 905
               1= 906 ; CHECK TO SEE IF A KEYSTROKE IS READY FOR PROCESSING.
               1= 907 ; IF SO, THE HEX CODE FOR THE KEY IS RETURNED IN ACC.
               1= 908 ; IF NOT, ACC IS FFH ON RETURN.  KEY BUFFER IS ALWAYS
               1= 909 ; IN RESET STATE ON RETURN.
               1= 910
041D B810      1= 911                  MOV R0,#16D
041F 80        1= 912                  MOVX A,@R0
0420 D8        1= 913                  XRL A,R0
0421 9625      1= 914                  JNZ KEYCK0
0423 37        1= 915                  CPL A
0424 93        1= 916                  RETR
               1= 917          KEYCK0:
0425 F8        1= 918                  MOV A,R0
0426 90        1= 919                  MOVX @R0,A
0427 18        1= 920                  INC R0
0428 80        1= 921                  MOVX A,@R0
0429 93        1= 922                  RETR
               1= 923
               1= 924 $EJECT
               1= 925
               1= 926
               1= 927
042A 2B        1= 928          QUO:    DB ((LOW QUO)+1)
042B A47F      1= 929                  JMP XQUO
042D 2E        1= 930          ZA:     DB ((LOW ZA)+1)         ; "ZA" INSTEAD OF "A"..."A" IS
               1= 931                                          ; RESERVED BY THE ASSEMBLER.
042E A411      1= 932                  JMP XA
               1= 933
0430 31        1= 934          AA:     DB ((LOW AA)+1)
0431 A4DB      1= 935                  JMP XAA
0433 34        1= 936          AA1:    DB ((LOW AA1)+1)
0434 C408      1= 937                  JMP XAA1
0436 37        1= 938          AA2:    DB ((LOW AA2)+1)
0437 C40F      1= 939                  JMP XAA2
0439 3A        1= 940          AA3:    DB ((LOW AA3)+1)
043A C41E      1= 941                  JMP XAA3
043C 3D        1= 942          AA4:    DB ((LOW AA4)+1)
043D C42D      1= 943                  JMP XAA4
043F 40        1= 944          AB:     DB ((LOW AB)+1)
0440 C45D      1= 945                  JMP XAB
0442 43        1= 946          AB1:    DB ((LOW AB1)+1)
0443 C487      1= 947                  JMP XAB1
0445 46        1= 948          AB2:    DB ((LOW AB2)+1)
```

```
0446 CA92    1= 949              JMP XAB2
0448 49      1= 950     AB2A:    DB ((LOW AB2A)+1)
0449 E400    1= 951              JMP XAB2A
044B 4C      1= 952     AB2A1:   DB ((LOW AB2A1)+1)
044C E40F    1= 953              JMP XAB2A1
044E 4F      1= 954     AB2B:    DB ((LOW AB2B)+1)
044F E45E    1= 955              JMP XAB2B
0451 52      1= 956     B:       DB ((LOW B)+1)
0452 84AE    1= 957              JMP XB
0454 55      1= 958     B1:      DB ((LOW B1)+1)
0455 84E3    1= 959              JMP XB1
0457 58      1= 960     B2:      DB ((LOW B2)+1)
0458 A400    1= 961              JMP XB2
045A 5B      1= 962     ZC:      DB ((LOW ZC)+1)         ; DITTO.
045B F5      1= 963              SEL MB1
045C C4CF    1= 964              JMP XC
045E 5F      1= 965     C1:      DB ((LOW C1)+1)
045F F5      1= 966              SEL MB1
0460 C4DC    1= 967              JMP XC1
0462 63      1= 968     C2:      DB ((LOW C2)+1)
0463 F5      1= 969              SEL MB1
0464 CAEB    1= 970              JMP XC2
0466 67      1= 971     C3:      DB ((LOW C3)+1)
0467 F5      1= 972              SEL MB1
0468 CAF3    1= 973              JMP XC3
046A 6B      1= 974     C4:      DB ((LOW C4)+1)
046B F5      1= 975              SEL MB1
046C E400    1= 976              JMP XC4
046E 6F      1= 977     D:       DB ((LOW D)+1)
046F E46D    1= 978              JMP XD
0471 72      1= 979     D1:      DB ((LOW D1)+1)
0472 E47C    1= 980              JMP XD1
0474 75      1= 981     D2:      DB ((LOW D2)+1)
0475 84C7    1= 982              JMP XD2
0477 78      1= 983     D3:      DB ((LOW D3)+1)
0478 F5      1= 984              SEL MB1
0479 CA79    1= 985              JMP XD3
047B 7C      1= 986     D4:      DB ((LOW D4)+1)
047C F5      1= 987              SEL MB1
047D C4A2    1= 988              JMP XD4
             1= 989
             1= 990 $EJECT
             1= 991
             1= 992     XQUO:
047F FF      1= 993              MOV A,R7
0480 D301    1= 994              XRL A,#01H              ; TEST FOR "ENTER" OR "DISPLAY"
0482 968C    1= 995              JNZ XQUO1
0484 232D    1= 996              MOV A,#(LOW ZA)
0486 91      1= 997              MOVX @R1,A
0487 F5      1= 998              SEL MB1
0488 9400    1= 999              CALL DBLANK
048A E5      1=1000              SEL MB0
048B 93      1=1001              RETR
             1=1002     XQUO1:
048C FF      1=1003              MOV A,R7
048D D30C    1=1004              XRL A,#0CH              ; TEST FOR "MANUAL"
048F 969F    1=1005              JNZ XQUO2
```

```
0491 2351      1=1006              MOV A,#(LOW B)
0493 91        1=1007              MOVX @R1,A
0494 F5        1=1008              SEL MB1
0495 9400      1=1009              CALL DBLANK
0497 E5        1=1010              SEL MB0
0498 B864      1=1011              MOV R0,#100D
049A 80        1=1012              MOVX A,@R0
049B 430F      1=1013              ORL A,#0FH         ; TURN ON "MANUAL" LED.
049D 90        1=1014              MOVX @R0,A
049E 93        1=1015              RETR
               1=1016      XQU02:
049F FF        1=1017              MOV A,R7
04A0 D30F      1=1018              XRL A,#0FH         ; TEST FOR "RESET"
04A2 96AD      1=1019              JNZ XQU03
04A4 B920      1=1020              MOV R1,#32D
04A6 235A      1=1021              MOV A,#(LOW ZC)
04A8 91        1=1022              MOVX @R1,A
04A9 F5        1=1023              SEL MB1
04AA 9400      1=1024              CALL DBLANK
04AC E5        1=1025              SEL MB0
               1=1026      XQU03:
04AD 93        1=1027              RETR
               1=1028
               1=1029 $EJECT
               1=1030
               1=1031      XB:
04AE FF        1=1032              MOV A,R7
04AF D308      1=1033              XRL A,#08H         ; CHK FOR "SETPOINT"
04B1 96C6      1=1034              JNZ BL1
04B3 B820      1=1035              MOV R0,#32D
04B5 2357      1=1036              MOV A,#(LOW B2)
04B7 90        1=1037              MOVX @R0,A
04B8 B801      1=1038              MOV R0,#1
04BA 27        1=1039              CLR A
               1=1040      BL3:                       ; ENTRY POINT.
04BB 90        1=1041              MOVX @R0,A
04BC B87C      1=1042              MOV R0,#124D
04BE 2304      1=1043              MOV A,#4D
04C0 90        1=1044              MOVX @R0,A
04C1 F5        1=1045              SEL MB1
04C2 9475      1=1046              CALL (D06+1)
04C4 E5        1=1047              SEL MB0
04C5 93        1=1048              RETR
               1=1049      BL1:
04C6 FF        1=1050              MOV A,R7
04C7 D307      1=1051              XRL A,#07H         ; TEST FOR "STAGE"
04C9 96E2      1=1052              JNZ BL2
04CB B820      1=1053              MOV R0,#32D
04CD 2354      1=1054              MOV A,#(LOW B1)
04CF 90        1=1055              MOVX @R0,A
04D0 F5        1=1056              SEL MB1
04D1 9400      1=1057              CALL DBLANK
04D3 E5        1=1058              SEL MB0
04D4 B86E      1=1059              MOV R0,#110D
04D6 2381      1=1060              MOV A,#81H
04D8 90        1=1061              MOVX @R0,A
04D9 C8        1=1062              DEC R0
```

```
04DA 2370    1=1063              MOV  A,#70H
04DC 90      1=1064              MOVX @R0,A
04DD B867    1=1065              MOV  R0,#103D
04DF 2390    1=1066              MOV  A,#90H
04E1 90      1=1067              MOVX @R0,A
             1=1068       BL2:
04E2 93      1=1069              RETR
             1=1070
             1=1071 $EJECT
             1=1072
             1=1073
             1=1074       XB1:
04E3 BE09    1=1075              MOV  R6,#9D
             1=1076       B1L1:
04E5 FF      1=1077              MOV  A,R7
04E6 DE      1=1078              XRL  A,R6
04E7 C6EF    1=1079              JZ   B1L2
04E9 EEE5    1=1080              DJNZ R6,B1L1
04EB FF      1=1081              MOV  A,R7
04EC C6EF    1=1082              JZ   B1L2
04EE 93      1=1083              RETR
             1=1084       B1L2:
04EF 3820    1=1085              MOV  R0,#32D
04F1 2357    1=1086              MOV  A,#(LOW B2)
04F3 90      1=1087              MOVX @R0,A
04F4 FE      1=1088              MOV  A,R6
04F5 B801    1=1089              MOV  R0,#1
04F7 84BB    1=1090              JMP  BL3
             1=1091
             1=1092 $EJECT
             1=1093
             1=1094
             1=1095
0500         1=1096              ORG  500H
             1=1097
             1=1098       XB2:
0500 FF      1=1099              MOV  A,R7
0501 D309    1=1100              XRL  A,#09H
0503 9610    1=1101              JNZ  B2L1
             1=1102       B2L0:
0505 9820    1=1103              MOV  R0,#32D
0507 232A    1=1104              MOV  A,#(LOW QU0)
0509 90      1=1105              MOVX @R0,A
050A B864    1=1106              MOV  R0,#100D
050C 80      1=1107              MOVX A,@R0
050D 53F0    1=1108              ANL  A,#11110000B
050F 90      1=1109              MOVX @R0,A
             1=1110       B2L1:
0510 93      1=1111              RETR
             1=1112
             1=1113 $EJECT
             1=1114
             1=1115       XA:
0511 FF      1=1116              MOV  A,R7
0512 C62D    1=1117              JZ   AL1         ; CELSIUS.
0514 D30E    1=1118              XRL  A,#0EH
0516 C641    1=1119              JZ   AL2         ; FAHRENHEIT.
```

```
0518 FF        1=1120              MOV A,R7
0519 D302      1=1121              XRL A,#02H
051B C646      1=1122              JZ AL3              ; TIME.
051D FF        1=1123              MOV A,R7
051E D304      1=1124              XRL A,#04H
0520 C650      1=1125              JZ AL4              ; DAY.
0522 FF        1=1126              MOV A,R7
0523 D305      1=1127              XRL A,#05H
0525 C66C      1=1128              JZ AL5              ; NIGHT.
0527 FF        1=1129              MOV A,R7
0528 D30F      1=1130              XRL A,#0FH
052A C673      1=1131              JZ AL6              ; ADDRESSES.
               1=1132
052C 93        1=1133              RETR
               1=1134
               1=1135 $EJECT
               1=1136
               1=1137
               1=1138
               1=1139      AL1:                        ; CELSIUS.
052D B800      1=1140              MOV R0,#0
052F 2301      1=1141              MOV A,#1
0531 90        1=1142              MOVX @R0,A
               1=1143      XEND:
0532 B920      1=1144              MOV R1,#32D         ; RESET STATUS.
0534 232A      1=1145              MOV A,#(LOW QUO)
0536 91        1=1146              MOVX @R1,A
0537 B87C      1=1147              MOV R0,#124D
0539 2301      1=1148              MOV A,#1
053B 90        1=1149              MOVX @R0,A
053C F5        1=1150              SEL MB1
053D 946C      1=1151              CALL (DB3+1)
053F E5        1=1152              SEL MB0
               1=1153
0540 93        1=1154              RETR
               1=1155
               1=1156 $EJECT
               1=1157
               1=1158      AL2:
0541 B800      1=1159              MOV R0,#0           ; FAHRENHEIT.
0543 90        1=1160              MOVX @R0,A
0544 A432      1=1161              JMP XEND
               1=1162
               1=1163      AL3:                        ; TIME.
0546 B920      1=1164              MOV R1,#32D
0548 2330      1=1165              MOV A,#(LOW AA)
054A 91        1=1166              MOVX @R1,A
054B B86E      1=1167              MOV R0,#110D
054D 2390      1=1168              MOV A,#90H
054F BA02      1=1169              MOV R2,#2D
               1=1170      AL31:
0551 90        1=1171              MOVX @R0,A
0552 C8        1=1172              DEC R0
0553 90        1=1173              MOVX @R0,A
0554 C8        1=1174              DEC R0
0555 C8        1=1175              DEC R0
0556 EA51      1=1176              DJNZ R2,AL31
```

```
0558 27        1=1177              CLR A
0559 90        1=1178              MOVX @R0,A
055A C8        1=1179              DEC R0
055B 90        1=1180              MOVX @R0,A
055C 93        1=1181              RETR
               1=1182 $EJECT
               1=1183
               1=1184      AL4:                        ; DAY.
055D B805      1=1185              MOV R0,#5D
055F 17        1=1186              INC A
0560 90        1=1187              MOVX @R0,A
               1=1188      AL41:
0561 2388      1=1189              MOV A,#88H
               1=1190      AL42:
0563 B86E      1=1191              MOV R0,#110D
0565 90        1=1192              MOVX @R0,A
0566 233F      1=1193              MOV A,#(LOW AB)
0568 B920      1=1194              MOV R1,#32D
056A 91        1=1195              MOVX @R1,A
056B 93        1=1196              RETR
               1=1197
               1=1198      AL5:                        ; NIGHT.
056C B805      1=1199              MOV R0,#5D
056E 90        1=1200              MOVX @R0,A
056F 2384      1=1201              MOV A,#84H
0571 A463      1=1202              JMP AL42
               1=1203
               1=1204 $EJECT
               1=1205
               1=1206      AL6:                        ; ADDRESSES.
0573 B832      1=1207              MOV R0,#50D
0575 A0        1=1208              MOV @R0,A           ; ON-CHIP POINTER.
0576 18        1=1209              INC R0
0577 A0        1=1210              MOV @R0,A           ; LOC 51 ON-CHIP IS FLAG
               1=1211                                  ; TO INDICATE THAT SENSOR
               1=1212                                  ; ADDRESSES HAVE BEEN DISPLAYED.
               1=1213      AL60:
0578 B832      1=1214              MOV R0,#50D
057A F0        1=1215              MOV A,@R0
057B A8        1=1216              MOV R0,A
057C 9AFE      1=1217              ANL P2,#11111110B   ; PAGE 2 RAM.
057E 80        1=1218              MOVX A,@R0
057F 530F      1=1219              ANL A,#00001111B
0581 07        1=1220              DEC A
0582 C6A5      1=1221              JZ AL61             ; JMP IF VENT PREFIX.
0584 B833      1=1222              MOV R0,#51D
0586 F0        1=1223              MOV A,@R0
0587 96A5      1=1224              JNZ AL61
0589 17        1=1225              INC A
058A A0        1=1226              MOV @R0,A           ; SET FLAG.
058B 8A0B      1=1227              ORL P2,#00001011B
058D B9A0      1=1228              MOV R1,#160D
058F 81        1=1229              MOVX A,@R1
0590 C698      1=1230              JZ AL63
0592 AE        1=1231              MOV R6,A
0593 19        1=1232              INC R1
0594 81        1=1233              MOVX A,@R1
```

```
0595 AD        1=1234           MOV R5,A
0596 B4BE      1=1235           CALL AL65
               1=1236     AL63:
0598 B99E      1=1237           MOV R1,#158D
059A 81        1=1238           MOVX A,@R1
059B C6A3      1=1239           JZ AL64
059D AE        1=1240           MOV R6,A
059E 19        1=1241           INC R1
059F 81        1=1242           MOVX A,@R1
05A0 AD        1=1243           MOV R5,A
05A1 B4BE      1=1244           CALL AL65
               1=1245     AL64:
05A3 9AFE      1=1246           ANL P2,#11111110B      ; PAGE 2.
               1=1247
               1=1248     AL61:
05A5 B932      1=1249           MOV R1,#50D
05A7 F1        1=1250           MOV A,@R1
05A8 A8        1=1251           MOV R0,A
05A9 17        1=1252           INC A
05AA 17        1=1253           INC A
05AB 17        1=1254           INC A
               1=1255
05AC A1        1=1256           MOV @R1,A
05AD 80        1=1257           MOVX A,@R0
05AE AE        1=1258           MOV R6,A
05AF D3FF      1=1259           XRL A,#0FFH            ; FFH MARKS ALL DONE.
05B1 96B7      1=1260           JNZ AL62
05B3 8A0B      1=1261           ORL P2,#00001011B      ; PAGE 3.
05B5 A432      1=1262           JMP XEND
               1=1263     AL62:
05B7 18        1=1264           INC R0
05B8 80        1=1265           MOVX A,@R0
05B9 AD        1=1266           MOV R5,A
05BA B4BE      1=1267           CALL AL65
05BC A478      1=1268           JMP AL60
               1=1269
               1=1270
               1=1271 $EJECT
               1=1272
               1=1273     AL65:                        ; DISPLAY ADDRESSES WITH
               1=1274                                  ; T0TP IN R6 AND
               1=1275                                  ; T2T1 IN R5.
05BE 8A0B      1=1276           ORL P2,#00001011B
05C0 B96E      1=1277           MOV R1,#110D
05C2 FE        1=1278           MOV A,R6
05C3 530F      1=1279           ANL A,#00001111B
05C5 91        1=1280           MOVX @R1,A
05C6 C9        1=1281           DEC R1
05C7 2387      1=1282           MOV A,#87H
05C9 91        1=1283           MOVX @R1,A
05CA C9        1=1284           DEC R1
05CB C9        1=1285           DEC R1
05CC FE        1=1286           MOV A,R6
05CD 53F0      1=1287           ANL A,#11110000B
05CF 47        1=1288           SWAP A
05D0 91        1=1289           MOVX @R1,A
05D1 19        1=1290           INC R1
```

```
05D2 FD      1=1291              MOV  A,R5
05D3 91      1=1292              MOVX @R1,A
05D4 5400    1=1293              CALL DISPLA
05D6 F5      1=1294              SEL  MB1
05D7 74C9    1=1295              CALL DSPHLD
05D9 E5      1=1296              SEL  MB0
05DA 93      1=1297              RETR
             1=1298
             1=1299 $EJECT
             1=1300
             1=1301
             1=1302     XAA:
05DB B4EA    1=1303              CALL NUMCK
05DD C6E0    1=1304              JZ   AAL1
05DF 93      1=1305              RETR
             1=1306     AAL1:
05E0 FF      1=1307              MOV  A,R7
05E1 B86E    1=1308              MOV  R0,#110D
05E3 90      1=1309              MOVX @R0,A
05E4 B820    1=1310              MOV  R0,#32D
05E6 2333    1=1311              MOV  A,#(LOW AA1)
05E8 90      1=1312              MOVX @R0,A
05E9 93      1=1313              RETR
             1=1314
             1=1315
             1=1316     NUMCK:
             1=1317                                  ; IF ENTRY IS NUMERIC, RETURN
             1=1318                                  ; ACC=0. IF NON-NUMERIC, RETURN
             1=1319                                  ; ACC=0FFH
05EA B80A    1=1320              MOV  R0,#10D
             1=1321     NC0:
05EC F8      1=1322              MOV  A,R0
05ED 07      1=1323              DEC  A
05EE DF      1=1324              XRL  A,R7
05EF 96F2    1=1325              JNZ  NC1
05F1 93      1=1326              RETR
             1=1327     NC1:
05F2 E8EC    1=1328              DJNZ R0,NC0
05F4 23FF    1=1329              MOV  A,#0FFH
05F6 93      1=1330              RETR
             1=1331
             1=1332
             1=1333 $EJECT
             1=1334
             1=1335
0600         1=1336              ORG  600H
             1=1337
             1=1338     XAA1:
0600 B4EA    1=1339              CALL NUMCK
0602 C605    1=1340              JZ   AA1L1
0604 93      1=1341              RETR
             1=1342     AA1L1:
0605 FF      1=1343              MOV  A,R7
0606 B96D    1=1344              MOV  R0,#109D
0608 90      1=1345              MOVX @R0,A
0609 B820    1=1346              MOV  R0,#32D
060B 2336    1=1347              MOV  A,#(LOW AA2)
```

```
060D 90        1=1348              MOVX @R0,A
060E 93        1=1349              RETR
               1=1350
               1=1351      XAA2:
060F B4EA      1=1352              CALL NUMCK
0611 C614      1=1353              JZ AA2L1
0613 93        1=1354              RETR
               1=1355      AA2L1:
0614 FF        1=1356              MOV A,R7
0615 B86B      1=1357              MOV R0,#107D
0617 90        1=1358              MOVX @R0,A
0618 B820      1=1359              MOV R0,#32D
061A 2339      1=1360              MOV A,#(LOW AA3)
061C 90        1=1361              MOVX @R0,A
061D 93        1=1362              RETR
               1=1363
               1=1364      XAA3:
061E B4EA      1=1365              CALL NUMCK
0620 C623      1=1366              JZ AA3L1
0622 93        1=1367              RETR
               1=1368      AA3L1:
0623 FF        1=1369              MOV A,R7
0624 B86A      1=1370              MOV R0,#106D
0626 90        1=1371              MOVX @R0,A
0627 B820      1=1372              MOV R0,#32D
0629 233C      1=1373              MOV A,#(LOW AA4)
062B 90        1=1374              MOVX @R0,A
062C 93        1=1375              RETR
               1=1376
               1=1377
               1=1378 $EJECT
               1=1379
               1=1380      XAA4:
062D 2303      1=1381              MOV A,#03H           ; "AM" TEST.
062F DF        1=1382              XRL A,R7
0630 9638      1=1383              JNZ AA4L1
0632 B90F      1=1384              MOV R1,#0FH
0634 BA00      1=1385              MOV R2,#0
0636 C441      1=1386              JMP AA4L2
               1=1387      AA4L1:
0638 230A      1=1388              MOV A,#0AH           ; "PM" TEST.
063A DF        1=1389              XRL A,R7
063B 965C      1=1390              JNZ AA4L3
063D B9F0      1=1391              MOV R1,#0F0H
063F BAFF      1=1392              MOV R2,#0FFH
               1=1393      AA4L2:
0641 F9        1=1394              MOV A,R1
0642 B866      1=1395              MOV R0,#102D
0644 90        1=1396              MOVX @R0,A
0645 FA        1=1397              MOV A,R2
0646 B88A      1=1398              MOV R0,#138D
0648 90        1=1399              MOVX @R0,A
0649 B887      1=1400              MOV R0,#135D
064B B96E      1=1401              MOV R1,#110D
064D BA03      1=1402              MOV R2,#3D
               1=1403      AA4L4:
064F 81        1=1404              MOVX A,@R1
```

```
0650 90      1=1405              MOVX @R0,A
0651 C8      1=1406              DEC R0
0652 C9      1=1407              DEC R1
0653 81      1=1408              MOVX A,@R1
0654 90      1=1409              MOVX @R0,A
0655 C8      1=1410              DEC R0
0656 C9      1=1411              DEC R1
0657 C9      1=1412              DEC R1
0658 EA4F    1=1413              DJNZ R2,AA4L4
065A 8410    1=1414              JMP KQUO
             1=1415      AA4L3:
065C 93      1=1416              RETR
             1=1417
             1=1418 $EJECT
             1=1419
             1=1420
             1=1421
             1=1422      XAB:
065D F5      1=1423              SEL MB1
065E 9400    1=1424              CALL DBLANK
0660 E5      1=1425              SEL MB0
0661 2307    1=1426              MOV A,#07H          ; TEST FOR "STAGE"
0663 DF      1=1427              XRL A,R7
0664 967B    1=1428              JNZ ABL1
0666 BE90    1=1429              MOV R6,#90H
0668 2342    1=1430              MOV A,#(LOW AB1)
             1=1431      ABL3:
066A B820    1=1432              MOV R0,#32D
066C 90      1=1433              MOVX @R0,A
066D B86E    1=1434              MOV R0,#110D
066F 2381    1=1435              MOV A,#81H
0671 90      1=1436              MOVX @R0,A
0672 C8      1=1437              DEC R0
0673 2370    1=1438              MOV A,#70H
0675 90      1=1439              MOVX @R0,A
0676 B867    1=1440              MOV R0,#103D
0678 FE      1=1441              MOV A,R6
0679 90      1=1442              MOVX @R0,A
067A 93      1=1443              RETR
             1=1444      ABL1:
067B 2308    1=1445              MOV A,#08H          ; TEST FOR "SETPOINT"
067D DF      1=1446              XRL A,R7
067E C681    1=1447              JZ ABL2
0680 93      1=1448              RETR
             1=1449      ABL2:
0681 BE00    1=1450              MOV R6,#0
0683 2345    1=1451              MOV A,#(LOW AB2)
0685 CA6A    1=1452              JMP ABL3
             1=1453
             1=1454
             1=1455
             1=1456      XAB1:
0687 B4EA    1=1457              CALL NUMCK
0689 C68C    1=1458              JZ AB1L1
068B 93      1=1459              RETR
             1=1460      AB1L1:
068C FF      1=1461              MOV A,R7
```

```
068D AE      1=1462              MOV R6,A
068E 2345    1=1463              MOV A,#(LOW AB2)
0690 C46A    1=1464              JMP AB L3          ; USE EARLIER ROUTINE.
             1=1465
             1=1466
             1=1467      XAB2:
             1=1468                                 ; FIRST STORE AWAY THE STAGE INFO.
0692 B867    1=1469              MOV R0,#103D
0694 80      1=1470              MOVX A,@R0
0695 AE      1=1471              MOV R6,A
0696 B806    1=1472              MOV R0,#6D
0698 90      1=1473              MOVX @R0,A
0699 C8      1=1474              DEC R0
069A 80      1=1475              MOVX A,@R0
069B AD      1=1476              MOV R5,A
069C 2306    1=1477              MOV A,#6D
069E DF      1=1478              XRL A,R7
069F C6A7    1=1479              JZ AB2L1
             1=1480      AB2L0:
06A1 2308    1=1481              MOV A,#08H         ; TEST FOR "DATA"
06A3 DF      1=1482              XRL A,R7
06A4 C6D6    1=1483              JZ AB2L6
06A6 93      1=1484              RETR
             1=1485      AB2L1:
06A7 F5      1=1486              SEL MB1
06A8 9400    1=1487              CALL DBLANK
06AA E5      1=1488              SEL MB0
06AB FE      1=1489              MOV A,R6
06AC C6BC    1=1490              JZ AB2L2
06AE 0328    1=1491              ADD A,#40D
06B0 AE      1=1492              MOV R6,A
06B1 FD      1=1493              MOV A,R5
06B2 96B8    1=1494              JNZ AB2L3
06B4 FE      1=1495              MOV A,R6
06B5 030A    1=1496              ADD A,#10D
06B7 AE      1=1497              MOV R6,A
             1=1498      AB2L3:
06B8 FE      1=1499              MOV A,R6
06B9 A8      1=1500              MOV R0,A
06BA C4C5    1=1501              JMP AB2L4
             1=1502
             1=1503
             1=1504      AB2L2:
06BC FD      1=1505              MOV A,R5
06BD C6C3    1=1506              JZ AB2L5
06BF B898    1=1507              MOV R0,#152D
06C1 C4C5    1=1508              JMP AB2L4
             1=1509      AB2L5:
06C3 B899    1=1510              MOV R0,#153D
             1=1511      AB2L4:
06C5 F5      1=1512              SEL MB1
06C6 B404    1=1513              CALL D041
06C8 E5      1=1514              SEL MB0
06C9 B86E    1=1515              MOV R0,#110D
06CB 27      1=1516              CLR A
06CC 37      1=1517              CPL A
06CD 90      1=1518              MOVX @R0,A
```

```
06CE C8        1=1519              DEC R0
06CF 90        1=1520              MOVX @R0,A
06D0 B820      1=1521              MOV R0,#32D
06D2 2348      1=1522              MOV A,#(LOW AB2A)
06D4 90        1=1523              MOVX @R0,A
06D5 93        1=1524              RETR
               1=1525      AB2L6:
06D6 B86E      1=1526              MOV R0,#110D
06D8 2368      1=1527              MOV A,#68H
06DA 90        1=1528              MOVX @R0,A
06DB C8        1=1529              DEC R0
06DC 2388      1=1530              MOV A,#88H
06DE 90        1=1531              MOVX @R0,A
06DF C8        1=1532              DEC R0
06E0 90        1=1533              MOVX @R0,A
06E1 C8        1=1534              DEC R0
06E2 2389      1=1535              MOV A,#89H
06E4 90        1=1536              MOVX @R0,A
06E5 C8        1=1537              DEC R0
06E6 2390      1=1538              MOV A,#90H
06E8 90        1=1539              MOVX @R0,A
06E9 C8        1=1540              DEC R0
06EA C8        1=1541              DEC R0
06EB 90        1=1542              MOVX @R0,A
06EC C8        1=1543              DEC R0
06ED 90        1=1544              MOVX @R0,A
06EE B869      1=1545              MOV R0,#105D
06F0 2387      1=1546              MOV A,#87H
06F2 90        1=1547              MOVX @R0,A
06F3 B820      1=1548              MOV R0,#32D
06F5 234E      1=1549              MOV A,#(LOW AB2B)
06F7 90        1=1550              MOVX @R0,A
06F8 93        1=1551              RETR
               1=1552
               1=1553 $EJECT
               1=1554
               1=1555
0700           1=1556              ORG 700H
               1=1557
               1=1558      XAB2A:
0700 B4EA      1=1559              CALL NUMCK
0702 C605      1=1560              JZ AB2AL1
0704 93        1=1561              RETR
               1=1562      AB2AL1:
0705 B869      1=1563              MOV R0,#105D
0707 FF        1=1564              MOV A,R7
0708 90        1=1565              MOVX @R0,A
0709 B820      1=1566              MOV R0,#32D
070B 2348      1=1567              MOV A,#(LOW AB2A1)
070D 90        1=1568              MOVX @R0,A
070E 93        1=1569              RETR
               1=1570
               1=1571
               1=1572      XAB2A1:
070F B4EA      1=1573              CALL NUMCK
0711 C614      1=1574              JZ AB2A11
0713 93        1=1575              RETR
```

```
                    l=1576          AB2A11:
0714 B868           l=1577                  MOV R0,#104D
0716 FF             l=1578                  MOV A,R7
0717 90             l=1579                  MOVX @R0,A
0718 18             l=1580                  INC R0
0719 80             l=1581                  MOVX A,@R0
071A C622           l=1582                  JZ AB2A12
071C A8             l=1583                  MOV R0,A
071D 27             l=1584                  CLR A
                    l=1585          AB2A13:
071E 030A           l=1586                  ADD A,#10D
0720 E81E           l=1587                  DJNZ R0,AB2A13
                    l=1588          AB2A12:
0722 6F             l=1589                  ADD A,R7
0723 AF             l=1590                  MOV R7,A
0724 B800           l=1591                  MOV R0,#0
0726 80             l=1592                  MOVX A,@R0
0727 C62F           l=1593                  JZ AB2A14
0729 FF             l=1594                  MOV A,R7
072A F5             l=1595                  SEL MB1
072B D400           l=1596                  CALL FC
072D E5             l=1597                  SEL MB0
072E AF             l=1598                  MOV R7,A
                    l=1599
                    l=1600          AB2A14:
072F FF             l=1601                  MOV A,R7
0730 035A           l=1602                  ADD A,#90D
0732 AC             l=1603                  MOV R4,A
0733 B806           l=1604                  MOV R0,#6D
0735 80             l=1605                  MOVX A,@R0
0736 AE             l=1606                  MOV R6,A
0737 C8             l=1607                  DEC R0
0738 80             l=1608                  MOVX A,@R0
0739 AD             l=1609                  MOV R5,A
073A FE             l=1610                  MOV A,R6
073B C64B           l=1611                  JZ AB2A15
073D 0328           l=1612                  ADD A,#40D
073F AE             l=1613                  MOV R6,A
0740 FD             l=1614                  MOV A,R5
0741 9647           l=1615                  JNZ AB2A16
0743 FE             l=1616                  MOV A,R6
0744 030A           l=1617                  ADD A,#10D
0746 AE             l=1618                  MOV R6,A
                    l=1619          AB2A16:
0747 FE             l=1620                  MOV A,R6
0748 A8             l=1621                  MOV R0,A
0749 E454           l=1622                  JMP AB2A17
                    l=1623          AB2A15:
074B FD             l=1624                  MOV A,R5
074C C652           l=1625                  JZ AB2A18
074E B898           l=1626                  MOV R0,#152D
0750 E454           l=1627                  JMP AB2A17
                    l=1628          AB2A18:
0752 B899           l=1629                  MOV R0,#153D
                    l=1630
                    l=1631          AB2A17:
0754 FC             l=1632                  MOV A,R4
```

```
0755 90      1=1633                MOVX @R0,A
0756 5400    1=1634                CALL DISPLA
0758 F5      1=1635                SEL MB1
0759 74C9    1=1636                CALL DSPHLD
075B E5      1=1637                SEL MB0
075C 8410    1=1638                JMP KQUO
             1=1639
             1=1640
             1=1641    XAB2B:
075E B4EA    1=1642                CALL NUMCK
0760 C663    1=1643                JZ AB2BL1
0762 93      1=1644                RETR
             1=1645    AB2BL1:
0763 B86A    1=1646                MOV R0,#106D
0765 FF      1=1647                MOV A,R7
0766 90      1=1648                MOVX @R0,A
0767 B820    1=1649                MOV R0,#32D
0769 236E    1=1650                MOV A,#(LOW D)
076B 90      1=1651                MOVX @R0,A
076C 93      1=1652                RETR
             1=1653
             1=1654    XD:
076D B4EA    1=1655                CALL NUMCK
076F C672    1=1656                JZ DL1
0771 93      1=1657                RETR
             1=1658    DL1:
0772 B868    1=1659                MOV R0,#104D
0774 FF      1=1660                MOV A,R7
0775 90      1=1661                MOVX @R0,A
0776 B820    1=1662                MOV R0,#32D
0778 2371    1=1663                MOV A,#(LOW D1)
077A 90      1=1664                MOVX @R0,A
077B 93      1=1665                RETR
             1=1666
             1=1667
             1=1668 $EJECT
             1=1669
             1=1670
             1=1671    XD1:
077C B4EA    1=1672                CALL NUMCK
077E C681    1=1673                JZ D1L1
0780 93      1=1674                RETR
             1=1675    D1L1:
0781 B867    1=1676                MOV R0,#103D
0783 FF      1=1677                MOV A,R7
0784 90      1=1678                MOVX @R0,A
0785 5400    1=1679                CALL DISPLA
0787 F5      1=1680                SEL MB1
0788 74C9    1=1681                CALL DSPHLD
078A E5      1=1682                SEL MB0
078B B867    1=1683                MOV R0,#103D
078D 80      1=1684                MOVX A,@R0
078E AF      1=1685                MOV R7,A
078F B820    1=1686                MOV R0,#32D
0791 2374    1=1687                MOV A,#(LOW D2)
0793 90      1=1688                MOVX @R0,A
0794 B868    1=1689                MOV R0,#104D
```

```
0796 80      1=1690              MOVX A,@R0
0797 AE      1=1691              MOV R6,A
0798 18      1=1692              INC R0
0799 18      1=1693              INC R0
079A 80      1=1694              MOVX A,@R0
079B 47      1=1695              SWAP A
079C 4F      1=1696              ORL A,R7
079D 47      1=1697              SWAP A
079E AF      1=1698              MOV R7,A
079F 9AFE    1=1699              ANL P2,#11111100B
07A1 B954    1=1700              MOV R1,#84D
07A3 B800    1=1701              MOV R0,#0
             1=1702      D1L2:
07A5 80      1=1703              MOVX A,@R0
07A6 DF      1=1704              XRL A,R7
07A7 C6AF    1=1705              JZ D1L3
07A9 18      1=1706              INC R0
             1=1707      D1L5:
07AA 18      1=1708              INC R0
07AB 18      1=1709              INC R0
07AC E9A5    1=1710              DJNZ R1,D1L2
07AE 93      1=1711              RETR
             1=1712      D1L3:
07AF 18      1=1713              INC R0
07B0 80      1=1714              MOVX A,@R0
07B1 DE      1=1715              XRL A,R6
07B2 C6B6    1=1716              JZ D1L4
07B4 E4AA    1=1717              JMP D1L5
             1=1718
             1=1719      D1L4:
07B6 18      1=1720              INC R0
07B7 80      1=1721              MOVX A,@R0
07B8 AD      1=1722              MOV R5,A
07B9 8A0B    1=1723              ORL P2,#00001011B
07BB FF      1=1724              MOV A,R7
07BC 530F    1=1725              ANL A,#00001111B
07BE B00E    1=1726              MOV R0,#14D
07C0 90      1=1727              MOVX @R0,A
07C1 C8      1=1728              DEC R0
07C2 B906    1=1729              MOV R1,#6D
07C4 AF      1=1730              MOV R7,A
07C5 D301    1=1731              XRL A,#1
07C7 C6E7    1=1732              JZ D1L6             ; VENT.
07C9 FF      1=1733              MOV A,R7
07CA D308    1=1734              XRL A,#8D
07CC C6E7    1=1735              JZ D1L6             ; MCI-201
07CE FF      1=1736              MOV A,R7
07CF D307    1=1737              XRL A,#7D
07D1 C6E7    1=1738              JZ D1L6             ; MCI-108
             1=1739
             1=1740                                  ; ASSUME MCI-101 ...
07D3 81      1=1741              MOVX A,@R1
07D4 AC      1=1742              MOV R4,A
07D5 D308    1=1743              XRL A,#8D
07D7 C6E1    1=1744              JZ D1L8
07D9 FC      1=1745              MOV A,R4
07DA D309    1=1746              XRL A,#9D
```

```
07DC C6E0      1=1747              JZ D1L9
07DE E4E3      1=1748              JMP D1L10
               1=1749      D1L9:
07E0 17        1=1750              INC A
               1=1751      D1L8:
07E1 AC        1=1752              MOV R4,A
07E2 1D        1=1753              INC R5
               1=1754      D1L10:
07E3 FD        1=1755              MOV A,R5
07E4 90        1=1756              MOVX @R0,A        ; STORE RAM LOC OF DATA.
07E5 E4EA      1=1757              JMP D1L7
               1=1758      D1L6:
07E7 81        1=1759              MOVX A,@R1
07E8 6D        1=1760              ADD A,R5
07E9 90        1=1761              MOVX @R0,A
               1=1762      D1L7:
07EA 23FF      1=1763              MOV A,#0FFH
07EC B808      1=1764              MOV R0,#8D
07EE 0464      1=1765              JMP D1L13
               1=1766
               1=1767      INITAD:
07F0 B89C      1=1768              MOV R0,#156D
07F2 2391      1=1769              MOV A,#91H
07F4 90        1=1770              MOVX @R0,A
07F5 18        1=1771              INC R0
07F6 2309      1=1772              MOV A,#09H
07F8 90        1=1773              MOVX @R0,A
07F9 93        1=1774              RETR
               1=1775
0064           1=1776              ORG 064H
               1=1777
               1=1778      D1L13:
0064 B96E      1=1779              MOV R1,#110D
               1=1780      D1L24:
0066 91        1=1781              MOVX @R1,A
0067 C9        1=1782              DEC R1
0068 E866      1=1783              DJNZ R0,D1L24
006A B80D      1=1784              MOV R0,#13D
006C 80        1=1785              MOVX A,@R0
006D A9        1=1786              MOV R1,A
006E B805      1=1787              MOV R0,#5D
0070 80        1=1788              MOVX A,@R0
0071 9AF8      1=1789              ANL P2,#11111000B
0073 C677      1=1790              JZ D1L14
0075 8A09      1=1791              ORL P2,#00001001B
               1=1792      D1L14:
0077 81        1=1793              MOVX A,@R1
0078 AF        1=1794              MOV R7,A
0079 8A0B      1=1795              ORL P2,#00001011B
007B B80E      1=1796              MOV R0,#14D
007D 80        1=1797              MOVX A,@R0
007E AE        1=1798              MOV R6,A
007F D301      1=1799              XRL A,#1
0081 C6A3      1=1800              JZ D1L15
0083 FE        1=1801              MOV A,R6
0084 D308      1=1802              XRL A,#8D
0086 C6A3      1=1803              JZ D1L15
```

```
0088 FE        1=1804              MOV A,R6
0089 D307      1=1805              XRL A,#7D
008B C6B0      1=1806              JZ D1L16
008D B967      1=1807              MOV R1,#103D
008F FC        1=1808              MOV A,R4
0090 969B      1=1809              JNZ D1L20
               1=1810    D1L22:
0092 2301      1=1811              MOV A,#1
0094 91        1=1812              MOVX @R1,A
0095 FF        1=1813              MOV A,R7
0096 129A      1=1814              JB0 D1L21
0098 27        1=1815              CLR A
0099 91        1=1816              MOVX @R1,A
               1=1817    D1L21:
009A 93        1=1818              RETR
               1=1819    D1L20:
009B A8        1=1820              MOV R0,A
009C FF        1=1821              MOV A,R7
               1=1822    D1L23:
009D 77        1=1823              RR A
009E E89D      1=1824              DJNZ R0,D1L23
00A0 AF        1=1825              MOV R7,A
00A1 0492      1=1826              JMP D1L22
               1=1827
               1=1828
               1=1829    D1L15:                          ; VENT OR MCI-201.
00A3 FF        1=1830              MOV A,R7
00A4 530F      1=1831              ANL A,#00001111B
00A6 B867      1=1832              MOV R0,#103D
00A8 90        1=1833              MOVX @R0,A
00A9 FF        1=1834              MOV A,R7
00AA 53F0      1=1835              ANL A,#11110000B
00AC 47        1=1836              SWAP A
00AD 18        1=1837              INC R0
00AE 90        1=1838              MOVX @R0,A
00AF 93        1=1839              RETR
               1=1840    D1L16:
               1=1841                                    ; MCI-108.
00B0 B86E      1=1842              MOV R0,#110D
00B2 B908      1=1843              MOV R1,#8D
00B4 BA80      1=1844              MOV R2,#10000000B
               1=1845    D1L19:
00B6 FF        1=1846              MOV A,R7
00B7 5A        1=1847              ANL A,R2
00B8 C6BE      1=1848              JZ D1L17
00BA 2301      1=1849              MOV A,#1
00BC 04BF      1=1850              JMP D1L18
               1=1851    D1L17:
00BE 27        1=1852              CLR A
               1=1853    D1L18:
00BF 90        1=1854              MOVX @R0,A
00C0 C8        1=1855              DEC R0
00C1 FA        1=1856              MOV A,R2
00C2 77        1=1857              RR A
00C3 AA        1=1858              MOV R2,A
00C4 E9B6      1=1859              DJNZ R1,D1L19
00C6 93        1=1860              RETR
```

```
                  1=1861
                  1=1862
                  1=1863  $EJECT
                  1=1864
                  1=1865          XD2:
00C7 B4EA         1=1866                  CALL NUMCK
00C9 C6CD         1=1867                  JZ D2L1
00CB C4A1         1=1868                  JMP AB2L0
                  1=1869          D2L1:
00CD B80E         1=1870                  MOV R0,#14D
00CF 80           1=1871                  MOVX A,@R0
00D0 AE           1=1872                  MOV R6,A
00D1 D301         1=1873                  XRL A,#1
00D3 96D7         1=1874                  JNZ D2L9
00D5 24EA         1=1875                  JMP D2L2
                  1=1876          D2L9:
00D7 FE           1=1877                  MOV A,R6
00D8 D308         1=1878                  XRL A,#8D
00DA 96DE         1=1879                  JNZ D2L10
00DC 24EA         1=1880                  JMP D2L2
                  1=1881          D2L10:
00DE FE           1=1882                  MOV A,R6
00DF D307         1=1883                  XRL A,#7D
00E1 96E5         1=1884                  JNZ D2L11
00E3 24F2         1=1885                  JMP D2L3
                  1=1886          D2L11:
00E5 FF           1=1887                  MOV A,R7
00E6 B867         1=1888                  MOV R0,#103D
00E8 90           1=1889                  MOVX @R0,A
00E9 B806         1=1890                  MOV R0,#6D
00EB BEFE         1=1891                  MOV R6,#11111110B
00ED 80           1=1892                  MOVX A,@R0
00EE A8           1=1893                  MOV R0,A
00EF C6F9         1=1894                  JZ D2L4
                  1=1895          D2L5:
00F1 FE           1=1896                  MOV A,R6
00F2 E7           1=1897                  RL A
00F3 AE           1=1898                  MOV R6,A
00F4 FF           1=1899                  MOV A,R7
00F5 E7           1=1900                  RL A
00F6 AF           1=1901                  MOV R7,A
00F7 E8F1         1=1902                  DJNZ R0,D2L5
                  1=1903          D2L4:
00F9 B90D         1=1904                  MOV R1,#13D
00FB 81           1=1905                  MOVX A,@R1
00FC A8           1=1906                  MOV R0,A
                  1=1907
00FD 24D4         1=1908                  JMP 1D4H
01D4              1=1909                  ORG 1D4H
                  1=1910
01D4 B905         1=1911                  MOV R1,#5D
01D6 81           1=1912                  MOVX A,@R1
01D7 9AF8         1=1913                  ANL P2,#11111000B
01D9 C6DD         1=1914                  JZ D2L7
01DB 8A09         1=1915                  ORL P2,#00001001B
                  1=1916          D2L7:
01DD 80           1=1917                  MOVX A,@R0
                  1=1918
```

```
                    I=1919
01DE 5E             I=1920              ANL A,R6
01DF 4F             I=1921              ORL A,R7
01E0 90             I=1922              MOVX @R0,A
                    I=1923      D2L8:
01E1 F5             I=1924              SEL MB1
01E2 C497           I=1925              JMP D3L4
                    I=1926      D2L6:
01E4 8A0B           I=1927              ORL P2,#00001011B
01E6 B820           I=1928              MOV R0,#32D
01E8 90             I=1929              MOVX @R0,A
01E9 93             I=1930              RETR
                    I=1931      D2L2:
01EA FF             I=1932              MOV A,R7
01EB B868           I=1933              MOV R0,#104D
01ED 90             I=1934              MOVX @R0,A
01EE 2377           I=1935              MOV A,#(LOW D3)
01F0 24E4           I=1936              JMP D2L6
                    I=1937
                    I=1938      D2L3:
01F2 FF             I=1939              MOV A,R7
01F3 B86E           I=1940              MOV R0,#110D
01F5 90             I=1941              MOVX @R0,A
01F6 B821           I=1942              MOV R0,#33D
01F8 236D           I=1943              MOV A,#109D
01FA 90             I=1944              MOVX @R0,A
01FB 237B           I=1945              MOV A,#(LOW D4)
01FD 24E4           I=1946              JMP D2L6
                    I=1947 $EJECT
                    I=1948
                    I=1949
0E79                I=1950              ORG 0E79H
                    I=1951
                    I=1952      XD3:
0E79 B4D6           I=1953              CALL NUMMB1
0E7B C67F           I=1954              JZ D3L1
0E7D E5             I=1955              SEL MB0
0E7E 93             I=1956              RETR
                    I=1957      D3L1:
0E7F B867           I=1958              MOV R0,#103D
0E81 FF             I=1959              MOV A,R7
0E82 90             I=1960              MOVX @R0,A
0E83 19             I=1961              INC R0
0E84 80             I=1962              MOVX A,@R0
0E85 47             I=1963              SWAP A
0E86 4F             I=1964              ORL A,R7
                    I=1965      D3L3:
0E87 AF             I=1966              MOV R7,A
0E88 B80D           I=1967              MOV R0,#13D
0E8A 30             I=1968              MOVX A,@R0
0E8B A8             I=1969              MOV R0,A
0E8C B905           I=1970              MOV R1,#5D
0E8E 81             I=1971              MOVX A,@R1
0E8F 9AF8           I=1972              ANL P2,#11111000B
0E91 C695           I=1973              JZ D3L2
0E93 8A09           I=1974              ORL P2,#00001001B
                    I=1975      D3L2:
```

```
0E95 FF      1=1976                 MOV  A,R7
0E96 90      1=1977                 MOVX @R0,A
             1=1978       D3L4:
0E97 8A0B    1=1979                 ORL  P2,#00001011B
0E99 E5      1=1980                 SEL  MB0
0E9A 5400    1=1981                 CALL DISPLA
0E9C F5      1=1982                 SEL  MB1
0E9D 74C9    1=1983                 CALL DSPHLD
0E9F E5      1=1984                 SEL  MB0
0EA0 C4D6    1=1985                 JMP  AB2L6
             1=1986
             1=1987 $EJECT
             1=1988
             1=1989       XD4:
0EA2 B4D6    1=1990                 CALL NUMMB1
0EA4 C6A8    1=1991                 JZ   D4L1
0EA6 E5      1=1992                 SEL  MB0
0EA7 93      1=1993                 RETR
             1=1994       D4L1:
0EA8 B821    1=1995                 MOV  R0,#33D
0EAA 80      1=1996                 MOVX A,@R0
0EAB AE      1=1997                 MOV  R6,A
0EAC 07      1=1998                 DEC  A
0EAD 90      1=1999                 MOVX @R0,A
0EAE FE      1=2000                 MOV  A,R6
0EAF A8      1=2001                 MOV  R0,A
0EB0 FF      1=2002                 MOV  A,R7
0EB1 90      1=2003                 MOVX @R0,A
0EB2 2367    1=2004                 MOV  A,#103D
0EB4 DE      1=2005                 XRL  A,R6
0EB5 C6B9    1=2006                 JZ   D4L2
0EB7 E5      1=2007                 SEL  MB0
0EB8 93      1=2008                 RETR
             1=2009       D4L2:
0EB9 B867    1=2010                 MOV  R0,#103D
0EBB 80      1=2011                 MOVX A,@R0
0EBC AD      1=2012                 MOV  R5,A
0EBD BF07    1=2013                 MOV  R7,#7D
0EBF B96E    1=2014                 MOV  R1,#110D
             1=2015       D4L4:
0EC1 FF      1=2016                 MOV  A,R7
0EC2 AE      1=2017                 MOV  R6,A
0EC3 81      1=2018                 MOVX A,@R1
0EC4 C9      1=2019                 DEC  R1
             1=2020       D4L3:
0EC5 E7      1=2021                 RL   A
0EC6 EEC5    1=2022                 DJNZ R6,D4L3
0EC8 4D      1=2023                 ORL  A,R5
0EC9 AD      1=2024                 MOV  R5,A
0ECA EFC1    1=2025                 DJNZ R7,D4L4
0ECC FD      1=2026                 MOV  A,R5
0ECD C487    1=2027                 JMP  D3L3
             1=2028
             1=2029 $EJECT
             1=2030
             1=2031       XC:
0ECF FF      1=2032                 MOV  A,R7
```

```
0ED0 D301      1=2033              XRL A,#1
0ED2 C6D7      1=2034              JZ CL1
0ED4 E5        1=2035              SEL MB0
0ED5 8410      1=2036              JMP KQUO
               1=2037      CL1:
0ED7 235E      1=2038              MOV A,#(LOW C1)
               1=2039      CL2:
0ED9 E5        1=2040              SEL MB0
0EDA 24E4      1=2041              JMP D2L6
               1=2042
               1=2043      XC1:
0EDC FF        1=2044              MOV A,R7
0EDD D30F      1=2045              XRL A,#0FH
0EDF C6E4      1=2046              JZ C1L1
               1=2047      C1L0:
0EE1 E5        1=2048              SEL MB0
0EE2 8410      1=2049              JMP KQUO
               1=2050      C1L1:
0EE4 2362      1=2051              MOV A,#(LOW C2)
0EE6 C4D9      1=2052              JMP CL2
               1=2053
               1=2054      XC2:
0EE8 FF        1=2055              MOV A,R7
0EE9 D302      1=2056              XRL A,#2D
0EEB C6EF      1=2057              JZ C2L1
0EED C4E1      1=2058              JMP C1L0
               1=2059      C2L1:
0EEF 2366      1=2060              MOV A,#(LOW C3)
0EF1 C4D9      1=2061              JMP CL2
               1=2062
               1=2063      XC3:
0EF3 FF        1=2064              MOV A,R7
0EF4 D30F      1=2065              XRL A,#0FH
0EF6 C6FA      1=2066              JZ C3L1
0EF8 C4E1      1=2067              JMP C1L0
               1=2068      C3L1:
0EFA 236A      1=2069              MOV A,#(LOW C4)
0EFC C4D9      1=2070              JMP CL2
               1=2071
               1=2072
               1=2073
               1=2074 $EJECT
               1=2075
0F00           1=2076              ORG 0F00H
               1=2077
               1=2078
               1=2079      XC4:
0F00 FF        1=2080              MOV A,R7
0F01 D303      1=2081              XRL A,#3D
0F03 C607      1=2082              JZ C4L1
0F05 C4E1      1=2083              JMP C1L0
               1=2084      C4L1:
0F07 E5        1=2085              SEL MB0
0F08 0400      1=2086              JMP 000
               1=2087
               1=2088
               1=2089 $EJECT
```

```
1=2090
 =2091
 =2092 $EJECT
 =2093
 =2094 $INCLUDE (VENT.MB1)
1=2095
1=2096
1=2097
1=2098 ;****************************************************************
1=2099
1=2100 ;        VENT CONTROL UNIT    MEMORY BANK 1
1=2101 ;        ================     ============
1=2102
1=2103
1=2104 ;      PAGE 0 ................ TSLOT
1=2105 ;                              MCI
1=2106 ;                              SENSOR
1=2107
1=2108
1=2109 ;      PAGE 1 ................ COMAND
1=2110 ;                              USRMCI
1=2111 ;                              TX
1=2112
1=2113
1=2114 ;      PAGE 2 ................ MATCH
1=2115
1=2116
1=2117 ;      PAGE 3 ................ RX
1=2118
1=2119
1=2120 ;      PAGE 4 ................ SUBFYL
1=2121 ;                              DSPHLR
1=2122
1=2123
1=2124 ;      PAGE 5 ................ DSPHLR
1=2125
1=2126
1=2127 ;****************************************************************
1=2128
1=2129
1=2130 $EJECT
1=2131
1=2132
1=2133
1=2134
1=2135
1=2136
1=2137
1=2138
1=2139
1=2140
1=2141
1=2142            ORG 800H
1=2143
1=2144
1=2145
1=2146
1=2147 $EJECT
```

```
             1=2148
             1=2149 ;===========================================
             1=2150
             1=2151 ;     TSLOT: INTERROGATION/COMMAND SEQUENCING AND
             1=2152 ;            TIME SLOT DETERMINATION...
             1=2153
             1=2154 ;===========================================
             1=2155
             1=2156        TSLOT:
0800 8A0B    1=2157            ORL P2,#00001011B
0802 B88C    1=2158            MOV R0,#140D
             1=2159                                    ; TIME SLOT OVERFLOW INDICATOR.
             1=2160
0804 80      1=2161            MOVX A,@R0
0805 C617    1=2162            JZ TSLOT3
0807 07      1=2163            DEC A
0808 C617    1=2164            JZ TSLOT3
080A 07      1=2165            DEC A
080B C617    1=2166            JZ TSLOT3
080D 27      1=2167            CLR A
080E 90      1=2168            MOVX @R0,A            ; CLEAR OVERFLOW COUNTER.
             1=2169
080F 1418    1=2170            CALL MCI              ; DETERMINE NEXT MCI TO BE ADDR.
0811 64D6    1=2171            JMP KSTAT
             1=2172        KSTATR:
             1=2173
0813 144D    1=2174            CALL SENSOR           ; CHECK TO SEE IF THIS IS AN
             1=2175                                  ; ACTIVE SENSOR ADDRESS, AND,
             1=2176                                  ; IF SO, INTERROGATE IT.
             1=2177
             1=2178
0815 3400    1=2179            CALL COMAND           ; CHECK TO SEE IF THIS IS AN
             1=2180                                  ; ACTIVE VENT MACHINE, AND, IF
             1=2181                                  ; SO, COMMAND IT.
             1=2182
             1=2183
             1=2184        TSLOT3:
0817 93      1=2185            RETR
             1=2186
             1=2187 $EJECT
             1=2188
             1=2189 ;===========================================
             1=2190
             1=2191 ;     MCI: ADDRESSES EACH MCI IN SEQUENCE...
             1=2192
             1=2193 ;===========================================
             1=2194
             1=2195        MCI:
0818 B89C    1=2196            MOV R0,#156D
081A 80      1=2197            MOVX A,@R0            ; GET CURRENT TOTP.
081B AF      1=2198            MOV R7,A
081C 53F0    1=2199            ANL A,#11110000B
081E 47      1=2200            SWAP A                ; ISOLATE T0.
081F D309    1=2201            XRL A,#9D
0821 C628    1=2202            JZ MCI1
0823 FF      1=2203            MOV A,R7
0824 0310    1=2204            ADD A,#10H            ; INCREMENT T0.
```

```
0826 90      1=2205            MOVX @R0,A
0827 93      1=2206            RETR
             1=2207
             1=2208
             1=2209      MCI1:
             1=2210                              ; T0 WAS FOUND TO BE 9.
0828 FF      1=2211            MOV A,R7         ; GET PREVIOUS T0TP.
0829 530F    1=2212            ANL A,#0FH       ; CLEAR T0.
082B 90      1=2213            MOVX @R0,A       ; PUT BACK T0TP.
082C 18      1=2214            INC R0
082D 80      1=2215            MOVX A,@R0       ; GET T2T1.
082E AF      1=2216            MOV R7,A
082F 530F    1=2217            ANL A,#00001111B
             1=2218                             ; ISOLATE T1.
0831 D309    1=2219            XRL A,#09D
0833 C639    1=2220            JZ MCI2
0835 FF      1=2221            MOV A,R7
0836 17      1=2222            INC A
0837 90      1=2223            MOVX @R0,A       ; INCREMENT T1 AND REPLACE.
0838 93      1=2224            RETR
             1=2225
             1=2226      MCI2:
0839 27      1=2227            CLR A
083A 90      1=2228            MOVX @R0,A       ; SET T2T1=00H SINCE PREVIOUS
             1=2229                             ; COUNT WAS T2T1T0=099
083B C8      1=2230            DEC R0
083C 80      1=2231            MOVX A,@R0
083D AF      1=2232            MOV R7,A
083E D309    1=2233            XRL A,#09D
0840 C646    1=2234            JZ MCI3
0842 FF      1=2235            MOV A,R7
0843 17      1=2236            INC A
             1=2237                             ; INCREMENT PREFIX.
0844 90      1=2238            MOVX @R0,A
0845 93      1=2239            RETR
             1=2240
             1=2241      MCI3:
0846 27      1=2242            CLR A
0847 90      1=2243            MOVX @R0,A
             1=2244                             ; T2T1T0=000
0848 E5      1=2245            SEL MB0
0849 74E1    1=2246            CALL COMINT
084B F5      1=2247            SEL MB1
             1=2248                             ; RE-INIT UART
             1=2249                             ; ONCE PER FRAME.
084C 93      1=2250            RETR
             1=2251
             1=2252 $EJECT
             1=2253
             1=2254
             1=2255 ;===============================================
             1=2256
             1=2257 ;     SENSOR: INTERROGATION OF ACTIVE SENSORS...
             1=2258
             1=2259 ;===============================================
             1=2260
             1=2261      SENSOR:
```

```
084D 34A1    1=2262              CALL USRMCI
084F 9652    1=2263              JNZ SENS1         ; JMP IF ACTIVE MCI.
0851 93      1=2264              RETR
             1=2265
             1=2266    SENS1:
0852 B89C    1=2267              MOV R0,#156D
0854 80      1=2268              MOVX A,@R0
0855 530F    1=2269              ANL A,#00001111B  ; ISOLATE PREFIX.
0857 AF      1=2270              MOV R7,A
0858 D303    1=2271              XRL A,#3
085A 967B    1=2272              JNZ SENS3
             1=2273
             1=2274                                ; OUTDOOR ASPIRATOR.
085C B80B    1=2275              MOV R0,#11D
085E 80      1=2276              MOVX A,@R0
085F 18      1=2277              INC R0
0860 90      1=2278              MOVX @R0,A
0861 27      1=2279              CLR A
0862 C8      1=2280              DEC R0
0863 90      1=2281              MOVX @R0,A        ; UPDATE WIND/RAIN HISTORY
             1=2282                                ; AND CLEAR PRESENT.
             1=2283
0864 1493    1=2284              CALL TSENS
0866 23FE    1=2285              MOV A,#0FEH
0868 DA      1=2286              XRL A,R2
0869 966C    1=2287              JNZ SENS2
086B 93      1=2288              RETR
             1=2289
             1=2290    SENS2:
086C B897    1=2291              MOV R0,#151D      ; OUTDOOR TEMP ADDR.
086E FA      1=2292              MOV A,R2
086F 90      1=2293              MOVX @R0,A
             1=2294
             1=2295    WR:
0870 FB      1=2296              MOV A,R3
0871 9677    1=2297              JNZ WR1
0873 B80B    1=2298              MOV R0,#11D
0875 90      1=2299              MOVX @R0,A
0876 93      1=2300              RETR
             1=2301    WR1:
             1=2302                                ; WIND AND/OR RAIN.
0877 B80B    1=2303              MOV R0,#11D
0879 90      1=2304              MOVX @R0,A
087A 93      1=2305    WR2:      RETR
             1=2306
             1=2307    SENS3:
087B FF      1=2308              MOV A,R7
087C D302    1=2309              XRL A,#2
087E 9692    1=2310              JNZ SENS4
             1=2311
             1=2312                                ; INDOOR ASPIRATOR.
0880 1493    1=2313              CALL TSENS
0882 23FE    1=2314              MOV A,#0FEH
0884 DA      1=2315              XRL A,R2
0885 9688    1=2316              JNZ SENS5
             1=2317                                ; NO NEW TEMP RETURN,
             1=2318                                ; STICK WITH PREVIOUS.
```

```
0887 93        1=2319              RETR
               1=2320
               1=2321       SENS5:
0888 B896      1=2322              MOV R0,#150D
088A FA        1=2323              MOV A,R2
088B 90        1=2324              MOVX @R0,A         ; STORE NEW TEMP.
               1=2325
               1=2326       DN:
088C FB        1=2327              MOV A,R3
088D B891      1=2328              MOV R0,#145D
088F 90        1=2329              MOVX @R0,A
0890 5495      1=2330              CALL MATCH         ; STAGE DECISION.
               1=2331
               1=2332       SENS9:
               1=2333       SENSA:
0892 93        1=2334              RETR
               1=2335
               1=2336
               1=2337       TSENS:                    ; ADDRESSES AN MCI ASPIRATOR
               1=2338                                 ; AND PLACES THE RETURNED
               1=2339                                 ; TEMP INTO R2.
               1=2340
0893 BB0A      1=2341              MOV R3,#10D
               1=2342       TSEN03:
0895 BA03      1=2343              MOV R2,#3D
0897 BD3C      1=2344              MOV R5,#60D
               1=2345       TSEN00:
0899 547D      1=2346              CALL RTSBAR
089B BFFF      1=2347              MOV R7,#0FFH
089D 5419      1=2348              CALL TX            ; SEND FRAMING BYTE.
               1=2349
089F B89C      1=2350              MOV R0,#156D
08A1 80        1=2351              MOVX A,@R0
08A2 AF        1=2352              MOV R7,A
08A3 5419      1=2353              CALL TX            ; SEND T0TP.
               1=2354
               1=2355
08A5 B89D      1=2356              MOV R0,#157D
08A7 80        1=2357              MOVX A,@R0
08A8 AF        1=2358              MOV R7,A
08A9 5419      1=2359              CALL TX            ; SEND T2T1.
               1=2360
08AB 548D      1=2361              CALL RTSRST
               1=2362
08AD 34E7      1=2363              CALL COMRST
               1=2364       TSENS0:
08AF BC02      1=2365              MOV R4,#2D
               1=2366       TSENS1:
08B1 B894      1=2367              MOV R0,#148D
08B3 23FE      1=2368              MOV A,#0FEH
08B5 90        1=2369              MOVX @R0,A
               1=2370       TSEN11:
08B6 B894      1=2371              MOV R0,#148D
08B8 80        1=2372              MOVX A,@R0
08B9 D3FE      1=2373              XRL A,#0FEH
08BB 96CF      1=2374              JNZ TSENS2
               1=2375
```

```
                    1=2376
08BD B88C           1=2377              MOV R0,#140D
08BF 80             1=2378              MOVX A,@R0
08C0 D306           1=2379              XRL A,#6D
08C2 C6CC           1=2380              JZ TSENS3
08C4 5400           1=2381              CALL REGSAV
08C6 7423           1=2382              CALL RX
08C8 544F           1=2383              CALL REGUSA
08CA 04B6           1=2384              JMP TSEN11
                    1=2385
                    1=2386   TSENS3:
                    1=2387                                        ; NO TEMP RETURN—
08CC 90             1=2388              MOVX @R0,A
08CD 04F7           1=2389              JMP TSEN04
                    1=2390   TSENS2:
08CF 80             1=2391              MOVX A,@R0
08D0 2D             1=2392              XCH A,R5
08D1 A8             1=2393              MOV R0,A
08D2 2D             1=2394              XCH A,R5
08D3 90             1=2395              MOVX @R0,A
08D4 1D             1=2396              INC R5
08D5 ECB1           1=2397              DJNZ R4,TSENS1
08D7 EA99           1=2398              DJNZ R2,TSEN00
08D9 B83C           1=2399              MOV R0,#60D
08DB 80             1=2400              MOVX A,@R0
08DC AA             1=2401              MOV R2,A
08DD B83E           1=2402              MOV R0,#62D
08DF 74E5           1=2403              CALL RCHK
08E1 96F7           1=2404              JNZ TSEN04
08E3 B840           1=2405              MOV R0,#64D
08E5 74E5           1=2406              CALL RCHK
08E7 96F7           1=2407              JNZ TSEN04
08E9 B83D           1=2408              MOV R0,#61D
08EB 80             1=2409              MOVX A,@R0
08EC C6F4           1=2410              JZ TSEN01
08EE 07             1=2411              DEC A
08EF C6F3           1=2412              JZ TSEN02
08F1 04F7           1=2413              JMP TSEN04
                    1=2414   TSEN02:
08F3 17             1=2415              INC A
                    1=2416   TSEN01:
08F4 AB             1=2417              MOV R3,A
08F5 04FB           1=2418              JMP TSEN05
                    1=2419   TSEN04:
08F7 EB95           1=2420              DJNZ R3,TSEN03
08F9 BAFE           1=2421              MOV R2,#0FEH    ; NO-COMM INDICATOR
08FB 24E7           1=2422   TSEN05: JMP COMRST
                    1=2423
08A5                1=2424              ORG 08A5H
                    1=2425
                    1=2426   COMTX:
08A5 B805           1=2427              MOV R0,#5D
08A7 AD             1=2428              MOV R5,A
08A8 FF             1=2429              MOV A,R7
08A9 AC             1=2430              MOV R4,A
                    1=2431   COMTX1:
08AA B98C           1=2432              MOV R1,#140D
```

```
0BAC 27      1=2433              CLR A
0BAD 91      1=2434              MOVX @R1,A
0BAE 5400    1=2435              CALL REGSAV
0BB0 547D    1=2436              CALL RTSBAR
0BB2 544F    1=2437              CALL REGUSA
0BB4 BFFF    1=2438              MOV R7,#0FFH
0BB6 5419    1=2439              CALL TX
0BB8 FC      1=2440              MOV A,R4
0BB9 AF      1=2441              MOV R7,A
0BBA 5419    1=2442              CALL TX
0BBC FE      1=2443              MOV A,R6
0BBD AF      1=2444              MOV R7,A
0BBE 5419    1=2445              CALL TX
0BC0 FD      1=2446              MOV A,R5
0BC1 AF      1=2447              MOV R7,A
0BC2 5419    1=2448              CALL TX
0BC4 E8AA    1=2449              DJNZ R0,COMTX1
0BC6 548D    1=2450              CALL RTSRST
0BC8 93      1=2451              RETR
             1=2452
             1=2453
             1=2454
             1=2455
             1=2456 $EJECT
             1=2457
             1=2458      DSPHLD:
0BC9 27      1=2459              CLR A
0BCA B88D    1=2460              MOV R0,#14lD
0BCC 90      1=2461              MOVX @R0,A
             1=2462      DHLD1:
0BCD B4E7    1=2463              CALL SLOTCK
0BCF B88D    1=2464              MOV R0,#14lD
0BD1 80      1=2465              MOVX A,@R0
0BD2 37      1=2466              CPL A
0BD3 92CD    1=2467              JB4 DHLD1
0BD5 93      1=2468              RETR
             1=2469
             1=2470      KSTAT:      ; KEYSTROKE ENTRY STATUS CHK.
0BD6 B820    1=2471              MOV R0,#32D
0BD8 80      1=2472              MOVX A,@R0
0BD9 D32A    1=2473              XRL A,#(LOW QU0)
0BDB 96DF    1=2474              JNZ KSTAT1
0BDD 0413    1=2475      KSTAT0: JMP KSTATR
             1=2476      KSTAT1:
0BDF 80      1=2477              MOVX A,@R0
0BE0 D357    1=2478              XRL A,#(LOW B2)
0BE2 C6DD    1=2479              JZ KSTAT0
0BE4 93      1=2480              RETR
             1=2481
             1=2482      RCHK:       ; TEMP REASONABLENESS CHK.
0BE5 80      1=2483              MOVX A,@R0
0BE6 DA      1=2484              XRL A,R2
0BE7 C6FD    1=2485              JZ RCHK1
0BE9 80      1=2486              MOVX A,@R0
0BEA 17      1=2487              INC A
0BEB DA      1=2488              XRL A,R2
0BEC C6FD    1=2489              JZ RCHK1
```

```
0BEE 80      1=2490            MOVX A,@R0
0BEF 07      1=2491            DEC A
0BF0 DA      1=2492            XRL A,R2
0BF1 C6FD    1=2493            JZ RCHK1
0BF3 80      1=2494            MOVX A,@R0
0BF4 17      1=2495            INC A
0BF5 17      1=2496            INC A
0BF6 DA      1=2497            XRL A,R2
0BF7 C6FD    1=2498            JZ RCHK1
0BF9 80      1=2499            MOVX A,@R0
0BFA 07      1=2500            DEC A
0BFB 07      1=2501            DEC A
0BFC DA      1=2502            XRL A,R2
             1=2503
0BFD 93      1=2504    RCHK1:  RETR
             1=2505
             1=2506
             1=2507 $EJECT
             1=2508
             1=2509
             1=2510
             1=2511
             1=2512
             1=2513
             1=2514
             1=2515
             1=2516
             1=2517
0900         1=2518            ORG 900H
             1=2519
             1=2520
             1=2521
             1=2522
             1=2523 $EJECT
             1=2524
             1=2525
             1=2526 ;================================================
             1=2527
             1=2528 ;         COMAND: COMMAND OF ACTIVE REMOTE ACTUATORS.
             1=2529
             1=2530 ;================================================
             1=2531
             1=2532
             1=2533    COMAND:
0900 34A1    1=2534            CALL USRMCI
0902 9605    1=2535            JNZ COM1
0904 93      1=2536            RETR
             1=2537    COM1:
0905 80      1=2538            MOVX A,@R0
0906 AD      1=2539            MOV R5,A       ; R5 CONTAINS DATA LOC.
             1=2540                           ; R6 CONTAINS T2T1.
             1=2541                           ; R7 CONTAINS T0TP.
0907 FF      1=2542            MOV A,R7
0908 530F    1=2543            ANL A,#00001111B
090A AC      1=2544            MOV R4,A       ; STORE TP IN R4.
090B D301    1=2545            XRL A,#1
090D C624    1=2546            JZ VMA
```

```
090F B803      1=2547              MOV R0,#30
0911 B904      1=2548              MOV R1,#4D
               1=2549      LP101:
0913 FC        1=2550              MOV A,R4
0914 D9        1=2551              XRL A,R1
0915 C655      1=2552              JZ MCI101
0917 19        1=2553              INC R1
0918 E813      1=2554              DJNZ R0,LP101
091A FC        1=2555              MOV A,R4
091B D9        1=2556              XRL A,R1
091C C624      1=2557              JZ VMA        ; USE VMA ROUTINE FOR
               1=2558                            ; MCI-108'S ... SAME
               1=2559                            ; DATA STORAGE STRUCTURE.
091E 19        1=2560              INC R1
091F FC        1=2561              MOV A,R4
0920 D9        1=2562              XRL A,R1
0921 C624      1=2563              JZ VMA        ; USE VMA ROUTINE FOR MCI-201'S ALSO.
               1=2564
0923 93        1=2565              RETR          ; OTHER PREFIXES NOT USED.
               1=2566 $EJECT
               1=2567
               1=2568      VMA:                  ; GET VMA % OPENING AND
               1=2569                            ; DETERMINE AUTO/MANUAL STATUS.
               1=2570                            ; STAGE NUMBER TO BE USED RETURNED
               1=2571                            ; IN THE ACCUMULATOR.
0924 3492      1=2572              CALL AUTMAN
0926 6D        1=2573              ADD A,R5
0927 AD        1=2574              MOV R5,A
0928 B895      1=2575              MOV R0,#149D
092A 80        1=2576              MOVX A,@R0
092B 9AF8      1=2577              ANL P2,#11111000B
092D C631      1=2578              JZ VMA0
092F 8A09      1=2579              ORL P2,#00001001B
               1=2580      VMA0:
0931 FD        1=2581              MOV A,R5
0932 A8        1=2582              MOV R0,A
0933 80        1=2583              MOVX A,@R0
0934 8A0B      1=2584              ORL P2,#00001011B
0936 AD        1=2585              MOV R5,A
0937 FF        1=2586              MOV A,R7
0938 F252      1=2587              JB7 VMA2      ; BYPASS VENTS WITH
               1=2588                            ; T0=8 OR 9
093A 530F      1=2589              ANL A,#00001111B  ; ISOLATE PREFIX.
093C D301      1=2590              XRL A,#1
093E 9652      1=2591              JNZ VMA2
               1=2592                            ; BYPASS WIND/RAIN CHECK
               1=2593                            ; IF THIS ROUTINE IS SIMPLY
               1=2594                            ; BEING USED BY A NON-VENT ACTUATOR.
0940 B864      1=2595              MOV R0,#100D
0942 80        1=2596              MOVX A,@R0
0943 530F      1=2597              ANL A,#00001111B
0945 9652      1=2598              JNZ VMA2      ; ALSO BYPASS WIND/RAIN CHECK
               1=2599                            ; IF CONTROLLER IS IN "MANUAL" MODE.
0947 B80B      1=2600              MOV R0,#11D
0949 80        1=2601              MOVX A,@R0
094A A9        1=2602              MOV R1,A
094B 18        1=2603              INC R0
```

```
094C 80      1=2604            MOVX A,@R0
094D 69      1=2605            ADD A,R1
094E C652    1=2606            JZ VMA2
0950 27      1=2607            CLR A
0951 AD      1=2608            MOV R5,A
             1=2609
             1=2610   VMA2:
0952 FD      1=2611            MOV A,R5          ; RETRIEVE VENT %.
0953 64A5    1=2612            JMP COMTX
             1=2613
             1=2614 $EJECT
             1=2615
             1=2616   MCI101:                    ; GET MCI-101 ON/OFF DATA.
0955 3492    1=2617            CALL AUTMAN
0957 AC      1=2618            MOV R4,A
0958 B895    1=2619            MOV R0,#149D
095A 80      1=2620            MOVX A,@R0
095B 9AF8    1=2621            ANL P2,#11111000B
095D C661    1=2622            JZ NYT101
             1=2623   DAY101:
095F 8A09    1=2624            ORL P2,#00001001B
             1=2625   NYT101:
0961 FC      1=2626            MOV A,R4
0962 D308    1=2627            XRL A,#8D
0964 C67E    1=2628            JZ A101
0966 FC      1=2629            MOV A,R4
0967 D309    1=2630            XRL A,#9D
0969 C67E    1=2631            JZ A101
096B FD      1=2632            MOV A,R5
096C A8      1=2633            MOV R0,A
096D 80      1=2634            MOVX A,@R0
096E 8A0B    1=2635            ORL P2,#00001011B
0970 AD      1=2636            MOV R5,A
0971 FC      1=2637            MOV A,R4
0972 C679    1=2638            JZ B101
0974 FD      1=2639            MOV A,R5
             1=2640   C101:
0975 77      1=2641            RR A
0976 EC75    1=2642            DJNZ R4,C101
0978 AD      1=2643            MOV R5,A
             1=2644   B101:
0979 FD      1=2645            MOV A,R5
097A 5301    1=2646            ANL A,#00000001B
097C 64A5    1=2647            JMP COMTX         ; SEND ADDR AND COMMAND.
             1=2648   A101:
097E 1D      1=2649            INC R5
097F FD      1=2650            MOV A,R5
0980 A8      1=2651            MOV R0,A
0981 80      1=2652            MOVX A,@R0
0982 8A0B    1=2653            ORL P2,#00001011B
0984 AD      1=2654            MOV R5,A
0985 FC      1=2655            MOV A,R4
0986 D308    1=2656            XRL A,#8D
0988 C68D    1=2657            JZ D101
098A FD      1=2658            MOV A,R5
098B 77      1=2659            RR A
098C AD      1=2660            MOV R5,A
```

```
                    1=2661
                    1=2662      D101:
098D FD             1=2663              MOV A,R5
098E 5301           1=2664              ANL A,#00000001B
0990 64A5           1=2665              JMP CONTX              ; SEND ADDRESS AND COMMAND.
                    1=2666
                    1=2667
                    1=2668 $EJECT
                    1=2669
                    1=2670      AUTMAN:
                    1=2671                                     ; CHECK AUTO/MANUAL STATUS.
                    1=2672                                     ; RETURN STAGE NUMBER TO BE
                    1=2673                                     ; USED FOR COMMANDS IN ACC.
0992 8A0B           1=2674              ORL P2,#00001011B
0994 B864           1=2675              MOV R0,#100D
0996 80             1=2676              MOVX A,@R0
0997 1290           1=2677              JB0 MSTAT
0999 B89A           1=2678              MOV R0,#154D
099B 249F           1=2679              JMP ASTAT
                    1=2680      MSTAT:
099D B801           1=2681              MOV R0,#1D
                    1=2682      ASTAT:
099F 80             1=2683              MOVX A,@R0
09A0 93             1=2684              RETR
                    1=2685
                    1=2686 $EJECT
                    1=2687
                    1=2688
                    1=2689
                    1=2690
                    1=2691 ;============================================
                    1=2692 ;    USRMCI: CHECKS TO SEE IF THE CURRENT TIME SLOT'S
                    1=2693 ;            MCI HAS BEEN ASSIGNED BY THE OPERATOR.
                    1=2694
                    1=2695 ;============================================
                    1=2696
                    1=2697
                    1=2698      USRMCI:
                    1=2699                                     ; THIS ROUTINE RETURNS A "1"
                    1=2700                                     ; IN THE ACC IF THIS IS AN
                    1=2701                                     ; ACTIVE MCI, AND A "0" IF NOT.
09A1 8A0B           1=2702              ORL P2,#00001011B
09A3 B89C           1=2703              MOV R0,#156D
09A5 80             1=2704              MOVX A,@R0
09A6 AF             1=2705              MOV R7,A               ; CURRENT T0TP.
09A7 18             1=2706              INC R0
09A8 80             1=2707              MOVX A,@R0
09A9 AE             1=2708              MOV R6,A               ; CURRENT T2T1.
                    1=2709
09AA B89E           1=2710              MOV R0,#158D
09AC 80             1=2711              MOVX A,@R0
09AD DF             1=2712              XRL A,R7               ; CHECK OUTASP ADDR.
09AE 96B8           1=2713              JNZ USR1
09B0 18             1=2714              INC R0
09B1 80             1=2715              MOVX A,@R0
09B2 DE             1=2716              XRL A,R6
09B3 96B8           1=2717              JNZ USR1
```

```
09B5 2301      1=2718            MOV A,#1
09B7 93        1=2719            RETR
               1=2720
               1=2721   USR1:
09B8 B8A0      1=2722            MOV R0,#160D
09BA 80        1=2723            MOVX A,@R0         ; CHECK INASP ADDR.
09BB DF        1=2724            XRL A,R7
09BC 96C6      1=2725            JNZ USR2
09BE 18        1=2726            INC R0
09BF 80        1=2727            MOVX A,@R0
09C0 DE        1=2728            XRL A,R6
09C1 96C6      1=2729            JNZ USR2
09C3 2301      1=2730            MOV A,#1
09C5 93        1=2731            RETR
               1=2732
               1=2733   USR2:                       ; NOT AN ASPIRATOR.
09C6 9AF0      1=2734            ANL P2,#11110000B
09C8 8A0A      1=2735            ORL P2,#00001010B  ; RAM PAGE 2.
09CA B800      1=2736            MOV R0,#0
               1=2737   USR4:
09CC 80        1=2738            MOVX A,@R0
09CD DF        1=2739            XRL A,R7
09CE C6DB      1=2740            JZ USR3
               1=2741   USR6:
09D0 23FC      1=2742            MOV A,#252D
09D2 D8        1=2743            XRL A,R0
09D3 18        1=2744            INC R0
09D4 18        1=2745            INC R0
09D5 18        1=2746            INC R0
09D6 96CC      1=2747            JNZ USR4
09D8 8A0B      1=2748            ORL P2,#00001011B
09DA 93        1=2749            RETR
               1=2750   USR3:
09DB 18        1=2751            INC R0
09DC 80        1=2752            MOVX A,@R0
09DD DE        1=2753            XRL A,R6
09DE C6E3      1=2754            JZ USR5
09E0 C8        1=2755            DEC R0
09E1 24D0      1=2756            JMP USR6
               1=2757   USR5:
09E3 18        1=2758            INC R0
09E4 2301      1=2759            MOV A,#1
09E6 93        1=2760            RETR
               1=2761
               1=2762
               1=2763   COMRST:
09E7 B8FF      1=2764            MOV R0,#0FFH
09E9 E8E9      1=2765   CRST1:   DJNZ R0,CRST1
09EB B8FF      1=2766            MOV R0,#0FFH
09ED EBED      1=2767   CRST2:   DJNZ R0,CRST2
09EF E5        1=2768            SEL MB0
09F0 74E1      1=2769            CALL COMINT
09F2 F5        1=2770            SEL MB1
09F3 27        1=2771            CLR A
09F4 B88C      1=2772            MOV R0,#140D
09F6 90        1=2773            MOVX @R0,A
09F7 93        1=2774            RETR
```

```
1=2775
1=2776
1=2777  $EJECT
1=2778
1=2779  ;===========================================
1=2780
1=2781  ;   USART TRANSMIT DATA PROCESSOR...
1=2782
1=2783  ;            THIS IS A GENERAL-PURPOSE ROUTINE FOR
1=2784  ;            INTERFACE TO THE TRANSMIT FUNCTION OF
1=2785  ;            THE 8251A USART.  WHEN DATA NEEDS TO
1=2786  ;            BE TRANSMITTED, THE DATA BYTE IS PLACED
1=2787  ;            IN R7, AND THIS ROUTINE IS CALLED.
1=2788
1=2789  ;===========================================
1=2790
0A00              1=2791          ORG 0A00H
                  1=2792
                  1=2793  REGSAV:
                  1=2794
0A00 8A0B         1=2795          ORL P2,#00001011B
0A02 F8           1=2796          MOV A,R0
0A03 B846         1=2797          MOV R0,#78D
0A05 90           1=2798          MOVX @R0,A
0A06 18           1=2799          INC R0
0A07 F9           1=2800          MOV A,R1
0A08 90           1=2801          MOVX @R0,A
0A09 18           1=2802          INC R0
0A0A FA           1=2803          MOV A,R2
0A0B 90           1=2804          MOVX @R0,A
0A0C B84D         1=2805          MOV R0,#77D
0A0E B907         1=2806          MOV R1,#7D
0A10 BA05         1=2807          MOV R2,#5D
                  1=2808  REGSA1:
0A12 F1           1=2809          MOV A,@R1
0A13 90           1=2810          MOVX @R0,A
0A14 C8           1=2811          DEC R0
0A15 C9           1=2812          DEC R1
0A16 EA12         1=2813          DJNZ R2,REGSA1
0A18 93           1=2814          RETR
                  1=2815
                  1=2816
                  1=2817  TX:
0A19 5400         1=2818          CALL REGSAV
                  1=2819  TX4:
0A1B 5462         1=2820          CALL DISCOM
0A1D 546B         1=2821          CALL STACOM
0A1F 80           1=2822          MOVX A,@R0          ; GET STATUS.
0A20 37           1=2823          CPL A
0A21 121B         1=2824          JB0 TX4
0A23 521B         1=2825          JB2 TX4
                  1=2826
                  1=2827
0A25 5462         1=2828          CALL DISCOM
0A27 B84D         1=2829          MOV R0,#77D
0A29 80           1=2830          MOVX A,@R0
0A2A AF           1=2831          MOV R7,A
0A2B 5474         1=2832          CALL DATCOM
```

```
0A2D FF      1=2834           MOV  A,R7
0A2E 90      1=2835           MOVX @R0,A              ; SEND DATA.
             1=2836
             1=2837
             1=2838   TX5:
0A2F 5462    1=2839           CALL DISCOM
0A31 B88C    1=2840           MOV  R0,#140D
0A33 80      1=2841           MOVX A,@R0
0A34 D30A    1=2842           XRL  A,#10D
0A36 C642    1=2843           JZ   TX6
0A38 546B    1=2844           CALL STACOM
0A3A 80      1=2845           MOVX A,@R0
0A3B 37      1=2846           CPL  A
0A3C 122F    1=2847           JB0  TX5
0A3E 322F    1=2848           JB1  TX5
0A40 522F    1=2849           JB2  TX5
             1=2850   TX6:
             1=2851
0A42 5474    1=2852           CALL DATCOM
0A44 80      1=2853           MOVX A,@R0
0A45 B8FF    1=2854           MOV  R0,#0FFH
0A47 E847    1=2855   TX7:    DJNZ R0,TX7
0A49 80      1=2856           MOVX A,@R0
0A4A 5462    1=2857           CALL DISCOM
0A4C 544F    1=2858           CALL REGUSA             ; REGISTER UNSAVE.
0A4E 93      1=2859           RETR
             1=2860
             1=2861
             1=2862
             1=2863   REGUSA:
0A4F B84D    1=2864           MOV  R0,#77D
0A51 B907    1=2865           MOV  R1,#7D
             1=2866   REGUS1:
0A53 80      1=2867           MOVX A,@R0
0A54 A1      1=2868           MOV  @R1,A
0A55 C8      1=2869           DEC  R0
0A56 C9      1=2870           DEC  R1
0A57 2347    1=2871           MOV  A,#71D
0A59 D8      1=2872           XRL  A,R0
0A5A 9653    1=2873           JNZ  REGUS1
0A5C 80      1=2874           MOVX A,@R0
0A5D A9      1=2875           MOV  R1,A
0A5E C8      1=2876           DEC  R0
0A5F 80      1=2877           MOVX A,@R0
0A60 A8      1=2878           MOV  R0,A
             1=2879
             1=2880
0A61 93      1=2881           RETR
             1=2882
             1=2883
             1=2884
             1=2885   DISCOM:
0A62 B83F    1=2886           MOV  R0,#63D
0A64 2303    1=2887           MOV  A,#00000011B
0A66 A0      1=2888           MOV  @R0,A
0A67 3F      1=2889           MOVD P7,A
```

```
0A68 8A0B      1=2890            ORL P2,#00001011B
0A6A 93        1=2891            RETR
               1=2892
               1=2893
               1=2894        STACOM:
0A6B B83F      1=2895            MOV R0,#63D
0A6D 2302      1=2896            MOV A,#00000010B
0A6F A0        1=2897            MOV @R0,A
0A70 3F        1=2898            MOVD P7,A
0A71 9AF7      1=2899            ANL P2,#11110111B
0A73 93        1=2900            RETR
               1=2901
               1=2902
               1=2903        DATCOM:
0A74 B83F      1=2904            MOV R0,#63D
0A76 2300      1=2905            MOV A,#00000000B
0A78 A0        1=2906            MOV @R0,A
0A79 3F        1=2907            MOVD P7,A
0A7A 9AF7      1=2908            ANL P2,#11110111B
0A7C 93        1=2909            RETR
               1=2910
               1=2911
               1=2912
               1=2913 $EJECT
               1=2914
               1=2915        RTSBAR:
0A7D 546B      1=2916            CALL STACOM
0A7F 2335      1=2917            MOV A,#00110101B
0A81 90        1=2918            MOVX @R0,A       ; RTS-BAR, RX AND TX ENABLE.
0A82 5462      1=2919            CALL DISCOM
0A84 B909      1=2920            MOV R1,#9D
0A86 B8AA      1=2921    RTS1:   MOV R0,#170D
0A88 E888      1=2922    RTS2:   DJNZ R0,RTS2
0A8A E986      1=2923            DJNZ R1,RTS1     ; 15 MS DELAY.
               1=2924
0A8C 93        1=2925            RETR
               1=2926
               1=2927
               1=2928        RTSRST:
0A8D 546B      1=2929            CALL STACOM
0A8F 2315      1=2930            MOV A,#00010101B
0A91 90        1=2931            MOVX @R0,A
0A92 5462      1=2932            CALL DISCOM
0A94 93        1=2933            RETR
               1=2934
               1=2935
               1=2936 $EJECT
               1=2937
               1=2938
               1=2939
               1=2940
               1=2941
               1=2942
               1=2943
               1=2944 ;================================================
               1=2945 ;
               1=2946 ;    MATCH: FIND THE STAGE WHICH MATCHES THE CURRENT TEMP...
```

```
                    1=2947
                    1=2948 ;================================================================
                    1=2949
                    1=2950
                    1=2951          MATCH:
                    1=2952
                    1=2953
0A95 8A0B           1=2954          ORL  P2,#00001011B     ; ADDR. ROM, PAGE 3.
0A97 B892           1=2955          MOV  R0,#146D
0A99 80             1=2956          MOVX A,@R0             ; OLD D/N.
0A9A AE             1=2957          MOV  R6,A
0A9B C8             1=2958          DEC  R0
0A9C 80             1=2959          MOVX A,@R0             ; NEW D/N.
0A9D 18             1=2960          INC  R0
0A9E 90             1=2961          MOVX @R0,A             ; UPDATE HISTORY.
0A9F DE             1=2962          XRL  A,R6
0AA0 96A6           1=2963          JNZ  MATCH0
0AA2 B895           1=2964          MOV  R0,#149D
0AA4 FE             1=2965          MOV  A,R6              ; REQUIRE TWO
0AA5 90             1=2966          MOVX @R0,A             ; IN A ROW.
                    1=2967          MATCH0:
0AA6 B896           1=2968          MOV  R0,#150D
0AA8 80             1=2969          MOVX A,@R0             ; GET INDOOR TEMP.
0AA9 AF             1=2970          MOV  R7,A
0AAA B895           1=2971          MOV  R0,#149D
0AAC 80             1=2972          MOVX A,@R0             ; GET DAY/NIGHT.
0AAD C6B3           1=2973          JZ   MATCH1            ; JMP IF NIGHT.
0AAF B898           1=2974          MOV  R0,#152D
0AB1 44B5           1=2975          JMP  MATCH2
                    1=2976          MATCH1:
0AB3 B899           1=2977          MOV  R0,#153D
                    1=2978          MATCH2:
0AB5 80             1=2979          MOVX A,@R0             ; GET SETPOINT.
0AB6 AE             1=2980          MOV  R6,A
0AB7 FF             1=2981          MOV  A,R7
0AB8 AD             1=2982          MOV  R5,A
0AB9 DE             1=2983          XRL  A,R6
0ABA 96BE           1=2984          JNZ  MATCH3
0ABC 44E7           1=2985          JMP  MATC11
                    1=2986
                    1=2987          MATCH3:
0ABE FE             1=2988          MOV  A,R6
0ABF DD             1=2989          XRL  A,R5
0AC0 C6C8           1=2990          JZ   MATCH5            ; JMP IF TEMP.GT.SETPOINT
0AC2 FD             1=2991          MOV  A,R5
0AC3 C6F7           1=2992          JZ   MATCH6            ; JMP IF TEMP.LT.SETPOINT
0AC5 CD             1=2993          DEC  R5
0AC6 44BE           1=2994          JMP  MATCH3
                    1=2995
                    1=2996 ; NOTE: MATCH4 IS NOT USED AS A LABEL.
                    1=2997
                    1=2998          MATCH5:                ; TEMP.GT.SETPOINT
0AC8 FF             1=2999          MOV  A,R7
0AC9 AD             1=3000          MOV  R5,A
0ACA B895           1=3001          MOV  R0,#149D
0ACC 80             1=3002          MOVX A,@R0
0ACD C6D3           1=3003          JZ   MATCH7            ; JMP IF NIGHT.
```

```
0ACF BC31    1=3004            MOV R4,#49D        ; STAGE TEMP ADDR, DAY.
0AD1 44D5    1=3005            JMP MATCH8
             1=3006    MATCH7:
0AD3 BC3B    1=3007            MOV R4,#59D        ; STAGE TEMP ADDR, NIGHT.
             1=3008    MATCH8:
0AD5 B909    1=3009            MOV R1,#9D
0AD7 FC      1=3010            MOV A,R4
0AD8 A8      1=3011            MOV R0,A
             1=3012    MATCH9:
0AD9 80      1=3013            MOVX A,@R0         ; GET STAGE TEMP.
0ADA DD      1=3014            XRL A,R5           ; COMPARE WITH DECREMENTED TEMP.
0ADB C6E9    1=3015            JZ MATC10          ; JMP FOR MATCH.
0ADD C8      1=3016            DEC R0             ; NEXT STAGE.
0ADE E9D9    1=3017            DJNZ R1,MATCH9
             1=3018
0AE0 CD      1=3019            DEC R5
0AE1 FD      1=3020            MOV A,R5
0AE2 DE      1=3021            XRL A,R6           ; COMPARE WITH SETPOINT.
0AE3 C6E7    1=3022            JZ MATC11
             1=3023
0AE5 44D5    1=3024            JMP MATCH8
             1=3025
             1=3026    MATC11:
0AE7 B900    1=3027            MOV R1,#0          ; SETPOINT, STAGE "0"
             1=3028
             1=3029    MATC10:
0AE9 B88F    1=3030            MOV R0,#143D
0AEB 80      1=3031            MOVX A,@R0
0AEC D9      1=3032            XRL A,R1
0AED C6F2    1=3033            JZ MATC21
             1=3034    MATC20:
0AEF F9      1=3035            MOV A,R1
0AF0 90      1=3036            MOVX @R0,A
0AF1 93      1=3037            RETR
             1=3038    MATC21:
0AF2 B89A    1=3039            MOV R0,#154D
0AF4 44EF    1=3040            JMP MATC20
             1=3041
             1=3042    MATC12:
             1=3043
0AF6 93      1=3044            RETR
             1=3045
             1=3046
             1=3047    MATCH6:
0AF7 6400    1=3048            JMP 0B00H
             1=3049
             1=3050
             1=3051
             1=3052 $EJECT
             1=3053
0B00         1=3054            ORG 0B00H
             1=3055
             1=3056                               ; TEMP.LT.SETPOINT
0B00 FF      1=3057            MOV A,R7
0B01 AD      1=3058            MOV R5,A           ; CURRENT TEMP INTO R5
0B02 B895    1=3059            MOV R0,#149D
0B04 80      1=3060            MOVX A,@R0
```

```
0805 C60B    1=3061              JZ MATC13           ; JMP IF NIGHT.
0807 BC31    1=3062              MOV R4,#49D         ; STAGE TEMP ADDR, DAY.
0809 640D    1=3063              JMP MATC14
             1=3064
             1=3065    MATC13:
080B BC3B    1=3066              MOV R4,#59D         ; STAGE TEMP ADDR, NIGHT.
             1=3067    MATC14:
080D B909    1=3068              MOV R1,#9D
080F FC      1=3069              MOV A,R4
0810 A8      1=3070              MOV R0,A
             1=3071    MATC15:
0811 80      1=3072              MOVX A,@R0          ; GET STAGE TEMP.
0812 DD      1=3073              XRL A,R5            ; COMPARE WITH INCREMENTED TEMP.
             1=3074
0813 9617    1=3075              JNZ MATCX
0815 44E9    1=3076              JMP MATC10
             1=3077    MATCX:
             1=3078
0817 C8      1=3079              DEC R0
0818 E911    1=3080              DJNZ R1,MATC15
             1=3081
081A 1D      1=3082              INC R5
081B FD      1=3083              MOV A,R5
081C DE      1=3084              XRL A,R6
             1=3085
081D 9621    1=3086              JNZ MATCY
081F 44E7    1=3087              JMP MATC11
             1=3088    MATCY:
             1=3089
             1=3090
0821 640D    1=3091              JMP MATC14
             1=3092
             1=3093 $EJECT
             1=3094
             1=3095
             1=3096
             1=3097
             1=3098
             1=3099 ; ==============================
             1=3100
             1=3101 ;    USART RECEIVE DATA PROCESSOR...
             1=3102 ;             THIS IS A GENERAL-PURPOSE RECEIVE
             1=3103 ;             DATA HANDLER FOR INTERFACE WITH THE
             1=3104 ;             8251A USART.  WHEN DATA IS READY
             1=3105 ;             FOR THE CPU, THIS ROUTINE PLACES
             1=3106 ;             THE RECEIVED BYTE INTO DECIMAL
             1=3107 ;             LOCATION 148 OF PAGE THREE OF
             1=3108 ;             OFF-CHIP RAM.  IT ALSO MONITORS
             1=3109 ;             TRANSMISSIONS OF ANY OTHER
             1=3110 ;             NET MASTERS WHO MAY BE PRESENT,
             1=3111 ;             AND CONTINUALLY UPDATES TIME SLOT
             1=3112 ;             SYNCHRONIZATION.
             1=3113
             1=3114 ; ==============================
             1=3115
             1=3116
             1=3117    RX:
```

```
0B23 5468    1=3118              CALL STACOM
             1=3119
0B25 80      1=3120              MOVX A,@R0          ; GET STATUS.
             1=3121
0B26 AF      1=3122              MOV R7,A
0B27 43FD    1=3123              ORL A,#11111101B
0B29 37      1=3124              CPL A
0B2A C630    1=3125              JZ RX1              ; JMP IF DATA READY.
             1=3126
0B2C 5462    1=3127              CALL DISCOM
0B2E 649C    1=3128              JMP RX3
             1=3129
             1=3130       RX1:
             1=3131                                  ; DATA READY.
0B30 FF      1=3132              MOV A,R7            ; FIRST CHECK PARITY.
0B31 5308    1=3133              ANL A,#00001000B
0B33 C63E    1=3134              JZ RX2              ; JMP IF NO PARITY ERROR.
0B35 2315    1=3135              MOV A,#00010101B    ; RESET PARITY ERROR FLAG.
0B37 90      1=3136              MOVX @R0,A
0B38 5474    1=3137              CALL DATCOM
0B3A 80      1=3138              MOVX A,@R0
0B3B 5462    1=3139              CALL DISCOM
0B3D 93      1=3140              RETR
             1=3141       RX2:                       ; PARITY CHECK OKAY.
0B3E 5474    1=3142              CALL DATCOM
0B40 80      1=3143              MOVX A,@R0          ; READ IN THE DATA.
0B41 AF      1=3144              MOV R7,A
0B42 5462    1=3145              CALL DISCOM
0B44 FF      1=3146              MOV A,R7
             1=3147
             1=3148
0B45 B894    1=3149              MOV R0,#148D
0B47 90      1=3150              MOVX @R0,A          ; UPDATE RX DATA STORAGE.
             1=3151
0B48 D3FF    1=3152              XRL A,#0FFH
0B4A 964F    1=3153              JNZ RX10
0B4C B855    1=3154              MOV R0,#85D
0B4E 90      1=3155              MOVX @R0,A
             1=3156       RX10:
0B4F B851    1=3157              MOV R0,#81D
0B51 80      1=3158              MOVX A,@R0
0B52 18      1=3159              INC R0
0B53 90      1=3160              MOVX @R0,A
0B54 B850    1=3161              MOV R0,#80D
0B56 80      1=3162              MOVX A,@R0
0B57 18      1=3163              INC R0
0B58 90      1=3164              MOVX @R0,A
0B59 C8      1=3165              DEC R0
0B5A FF      1=3166              MOV A,R7
0B5B 90      1=3167              MOVX @R0,A
0B5C B852    1=3168              MOV R0,#82D
0B5E 80      1=3169              MOVX A,@R0
0B5F D3FF    1=3170              XRL A,#0FFH
0B61 969C    1=3171              JNZ RX3
0B63 C8      1=3172              DEC R0
             1=3173       RX9:
0B64 80      1=3174              MOVX A,@R0
```

```
0B65 530F    1=3175              ANL A,#00001111B
0B67 C69C    1=3176              JZ RX3
0B69 729C    1=3177              JB3 RX3
             1=3178    RX8:
0B6B BF0A    1=3179              MOV R7,#10D
0B6D 80      1=3180    RX5:      MOVX A,@R0
0B6E 53F0    1=3181              ANL A,#11110000B
0B70 47      1=3182              SWAP A
0B71 17      1=3183              INC A
0B72 DF      1=3184              XRL A,R7
0B73 C679    1=3185              JZ RX4
0B75 EF6D    1=3186              DJNZ R7,RX5
0B77 649C    1=3187              JMP RX3              ; T0 NON-NUMERIC.
             1=3188    RX4:
0B79 C8      1=3189              DEC R0
0B7A 80      1=3190              MOVX A,@R0
0B7B C68B    1=3191              JZ RX7
0B7D 53F0    1=3192              ANL A,#11110000B
0B7F 969C    1=3193              JNZ RX3              ; T2.NE.0
0B81 BF09    1=3194              MOV R7,#9D
0B83 80      1=3195    RX6:      MOVX A,@R0
0B84 DF      1=3196              XRL A,R7
0B85 C68B    1=3197              JZ RX7
0B87 EF83    1=3198              DJNZ R7,RX6
0B89 649C    1=3199              JMP RX3              ; T1 NON-NUMERIC.
             1=3200    RX7:
0B8B B855    1=3201              MOV R0,#85D
0B8D 80      1=3202              MOVX A,@R0
0B8E 329C    1=3203              JB1 RX3
0B90 B89C    1=3204              MOV R0,#156D
0B92 B951    1=3205              MOV R1,#81D
0B94 81      1=3206              MOVX A,@R1
0B95 90      1=3207              MOVX @R0,A
0B96 18      1=3208              INC R0
0B97 C9      1=3209              DEC R1
0B98 81      1=3210              MOVX A,@R1
0B99 90      1=3211              MOVX @R0,A
0B9A B4DB    1=3212              CALL TIMADJ
             1=3213
             1=3214    RX3:
0B9C B855    1=3215              MOV R0,#85D
0B9E 80      1=3216              MOVX A,@R0
0B9F 37      1=3217              CPL A
0BA0 3223    1=3218              JB1 RX
0BA2 93      1=3219              RETR
             1=3220
             1=3221
             1=3222
             1=3223
             1=3224
             =3225 $EJECT
             =3226
0C00         =3227              ORG 0C00H
             =3228 $INCLUDE (SUBFYL.SRC)
             1=3229
             1=3230
             1=3231 ;****************************************************
```

```
              1=3232
              1=3233 ;          SUBFYL--FILE OF SHORT SUBROUTINES
              1=3234
              1=3235 ;*************************************************
              1=3236
              1=3237          DBLANK:
              1=3238 ;  THIS ROUTINE BLANKS THE DISPLAY, WITHOUT DISTURBING
              1=3239 ;  THE AUTO/MAN LED'S.
              1=3240
0C00 B86E     1=3241          MOV R0,#110D
0C02 B908     1=3242          MOV R1,#8D
0C04 27       1=3243          CLR A
0C05 37       1=3244          CPL A
              1=3245          DBLAN1:
0C06 90       1=3246          MOVX @R0,A
0C07 C8       1=3247          DEC R0
0C08 E906     1=3248          DJNZ R1,DBLAN1
0C0A B866     1=3249          MOV R0,#102D
0C0C 27       1=3250          CLR A
0C0D 90       1=3251          MOVX @R0,A
0C0E C8       1=3252          DEC R0
0C0F 90       1=3253          MOVX @R0,A
              1=3254
0C10 93       1=3255          RETR
              1=3256
              1=3257 ;=================================================
              1=3258
              1=3259          DFILL:
              1=3260 ;  THIS ROUTINE FILLS THE DISPLAY WITH ZEROS AND
              1=3261 ;  DECIMAL POINTS, BUT NO AUX LED'S, SAVE AUTO/MAN.
              1=3262
0C11 B86E     1=3263          MOV R0,#110D
0C13 B908     1=3264          MOV R1,#8D
0C15 27       1=3265          CLR A
              1=3266          DFILL1:
0C16 90       1=3267          MOVX @R0,A
0C17 C8       1=3268          DEC R0
0C18 E916     1=3269          DJNZ R1,DFILL1
0C1A B866     1=3270          MOV R0,#102D
0C1C 27       1=3271          CLR A
0C1D 90       1=3272          MOVX @R0,A
0C1E 37       1=3273          CPL A
0C1F C8       1=3274          DEC R0
0C20 90       1=3275          MOVX @R0,A
0C21 C8       1=3276          DEC R0
0C22 27       1=3277          CLR A
0C23 90       1=3278          MOVX @R0,A
              1=3279
0C24 93       1=3280          RETR
              1=3281
              1=3282 ;=================================================
              1=3283
              1=3284
              1=3285
              =3286 $EJECT
              =3287
              =3288
```

```
             =3289 $INCLUDE (DSPHLR.SRC)
             1=3290
             1=3291
             1=3292 ;###############################################################
             1=3293
             1=3294 ;           SUBROUTINE "DSPHLR"...
             1=3295
             1=3296 ; THIS ROUTINE DIRECTS WHAT INFO IS SHOWN IN THE DISPLAY.
             1=3297 ; LOCATION #DCTRL=#122 (DECIMAL) IN OFF-CHIP PAGE THREE
             1=3298 ; RAM IS USED TO SELECT THE DESIRED DISPLAY ROUTINE, DENOTED
             1=3299 ; BY THESE LABELS:
             1=3300
             1=3301 ;      LABEL                    INFO DISPLAYED
             1=3302 ;      -----                    --------------
             1=3303
             1=3304 ;      D00                      ALL DIGITS=0. ALL
             1=3305 ;                               DP'S ON. NO EXT LED'S ON,
             1=3306 ;                               EXCEPT AUTO/MAN.
             1=3307
             1=3308 ;      D01                      BLANK DISPLAY EXCEPT FOR
             1=3309 ;                               "AUTO/MAN" OR "STBY" LED'S
             1=3310 ;                               WHEN APPROPRIATE.
             1=3311
             1=3312 ;      D02                      TIME OF DAY.
             1=3313
             1=3314 ;      D03                      INDOOR TEMPERATURE.
             1=3315
             1=3316 ;      D04                      OUTDOOR TEMPERATURE.
             1=3317
             1=3318 ;      D05                      TEMP SET POINT.
             1=3319
             1=3320
             1=3321 ;      D06                      CURRENT STAGE.
             1=3322
             1=3323
             1=3324 ;      D07                      SEQUENCED DATA.
             1=3325
             1=3326
             1=3327
             1=3328
             1=3329 ; NOTE*****NO DISPLAY MODS ARE MADE BY THIS ROUTINE
             1=3330 ; UNTIL LOCATION #32D OF PAGE 3 RAM IS VERIFIED TO CONTAIN
             1=3331 ; "QUO".
             1=3332
             1=3333
             1=3334       DSPHLR:
             1=3335
007A         1=3336       DCTRL   EQU 122D
             1=3337
0C25 8A0F    1=3338               ORL P2,#0FH         ; SELECT PAGE 3 RAM
             1=3339
0C27 B82D    1=3340               MOV R0,#32D
0C29 80      1=3341               MOVX A,@R0
0C2A AF      1=3342               MOV R7,A
0C2B D32A    1=3343               XRL A,#(LOW QUO)    ; INHIBIT DISPLAY MODS
0C2D C635    1=3344               JZ DSPMOD           ; WHEN KEYSTROKES IN PROGRESS.
0C2F FF      1=3345               MOV A,R7
```

```
0C30 D357      1=3346              XRL A,#(LOW B2)
0C32 C635      1=3347              JZ DSPMOD
               1=3348
0C34 93        1=3349              RETR
               1=3350
               1=3351     DSPMOD:
0C35 B87A      1=3352              MOV R0,#DCTRL
0C37 80        1=3353              MOVX A,@R0
0C38 B3        1=3354              JMPP @A
               1=3355
0C39 3A        1=3356     D00:     DB ((LOW D00)+1)
0C3A 9411      1=3357              CALL DFILL
0C3C 93        1=3358              RETR
               1=3359
0C3D 3E        1=3360     D01:     DB ((LOW D01)+1)
0C3E 9400      1=3361              CALL DBLANK
0C40 93        1=3362              RETR
               1=3363
0C41 42        1=3364     D02:     DB ((LOW D02)+1)
0C42 B86E      1=3365              MOV R0,#110D         ; DISPLAY TIME.
0C44 B987      1=3366              MOV R1,#135D
0C46 BF02      1=3367              MOV R7,#2D
               1=3368     D021:
0C48 81        1=3369              MOVX A,@R1
0C49 90        1=3370              MOVX @R0,A
0C4A C8        1=3371              DEC R0
0C4B C9        1=3372              DEC R1
0C4C 81        1=3373              MOVX A,@R1
0C4D 90        1=3374              MOVX @R0,A
0C4E C8        1=3375              DEC R0
0C4F 27        1=3376              CLR A
0C50 37        1=3377              CPL A
0C51 90        1=3378              MOVX @R0,A
0C52 C8        1=3379              DEC R0
0C53 C9        1=3380              DEC R1
0C54 EF48      1=3381              DJNZ R7,D021
0C56 81        1=3382              MOVX A,@R1
0C57 90        1=3383              MOVX @R0,A
0C58 C8        1=3384              DEC R0
0C59 C9        1=3385              DEC R1
0C5A 81        1=3386              MOVX A,@R1
0C5B 90        1=3387              MOVX @R0,A
               1=3388
0C5C B866      1=3389              MOV R0,#102D         ; AM/PM INDICATION
0C5E B98A      1=3390              MOV R1,#138D
0C60 81        1=3391              MOVX A,@R1
0C61 C667      1=3392              JZ D022              ; JMP FOR "AM"
0C63 23F0      1=3393              MOV A,#0F0H
0C65 90        1=3394              MOVX @R0,A
0C66 93        1=3395              RETR
               1=3396     D022:
0C67 230F      1=3397              MOV A,#00FH
0C69 90        1=3398              MOVX @R0,A
               1=3399
0C6A 93        1=3400              RETR
               1=3401
0C6B 6C        1=3402     D03:     DB ((LOW D03)+1)     ; DISPLAY INDOOR TEMPERATURE.
```

```
0C6C A408    1=3403              JMP XD03
0C6E 6F      1=3404      D04:    DB ((LOW D04)+1)      ; DISPLAY OUTDOOR TEMP.
0C6F A493    1=3405              JMP XD04
0C71 72      1=3406      D05:    DB ((LOW D05)+1)      ; DISPLAY SET POINT.
0C72 A4A7    1=3407              JMP XD05
0C74 75      1=3408      D06:    DB ((LOW D06)+1)      ; DISPLAY CURRENT STAGE.
             1=3409
             1=3410
0C75 9400    1=3411              CALL DBLANK
0C77 B995    1=3412              MOV R1,#149D
0C79 81      1=3413              MOVX A,@R1
0C7A B988    1=3414              MOV R1,#88H           ; DAY CODE.
0C7C 9688    1=3415              JNZ D060
0C7E B984    1=3416              MOV R1,#84H           ; NIGHT CODE.
             1=3417      D060:
0C80 F9      1=3418              MOV A,R1
0C81 B86E    1=3419              MOV R0,#110D
0C83 90      1=3420              MOVX @R0,A
0C84 B86B    1=3421              MOV R0,#107D
0C86 2381    1=3422              MOV A,#81H
0C88 90      1=3423              MOVX @R0,A
0C89 C8      1=3424              DEC R0
0C8A 2370    1=3425              MOV A,#70H
0C8C 90      1=3426              MOVX @R0,A
0C8D B89A    1=3427              MOV R0,#154D
0C8F 80      1=3428              MOVX A,@R0
             1=3429
0C90 AF      1=3430              MOV R7,A
0C91 B864    1=3431              MOV R0,#100D
0C93 80      1=3432              MOVX A,@R0
0C94 530F    1=3433              ANL A,#00001111B
0C96 C69E    1=3434              JZ D061
0C98 B801    1=3435              MOV R0,#1
0C9A 80      1=3436              MOVX A,@R0            ; GET MANUAL STAGE.
0C9B AF      1=3437              MOV R7,A
0C9C 84A8    1=3438              JMP D062
             1=3439      D061:
             1=3440
0C9E B80B    1=3441              MOV R0,#11D
0CA0 80      1=3442              MOVX A,@R0
0CA1 A9      1=3443              MOV R1,A
0CA2 18      1=3444              INC R0
0CA3 80      1=3445              MOVX A,@R0
0CA4 69      1=3446              ADD A,R1
0CA5 C6A8    1=3447              JZ D062
0CA7 93      1=3448              RETR
             1=3449      D062:
0CA8 FF      1=3450              MOV A,R7
0CA9 B867    1=3451              MOV R0,#103D
0CAB 90      1=3452              MOVX @R0,A
0CAC 93      1=3453              RETR
             1=3454
0CAD AE      1=3455      D07:    DB ((LOW D07)+1)
             1=3456                                    ; DISPLAY SEQUENCED DATA,
             1=3457                                    ; TIME, SET. PT., IN TEMP,
             1=3458                                    ; OUT TEMP, CURRENT STAGE.
0CAE B882    1=3459              MOV R0,#130D
```

```
0CB0 80      1=3460              MOVX A,@R0
0CB1 C6BD    1=3461              JZ D075
0CB3 D305    1=3462              XRL A,#5D
0CB5 C6BD    1=3463              JZ D075
             1=3464
0CB7 B87C    1=3465              MOV R0,#124D
0CB9 80      1=3466              MOVX A,@R0
0CBA C642    1=3467              JZ (D02+1)
             1=3468
0CBC 93      1=3469              RETR
             1=3470   D075:
0CBD B882    1=3471              MOV R0,#130D
0CBF 80      1=3472              MOVX A,@R0
0CC0 AF      1=3473              MOV R7,A
0CC1 B87D    1=3474              MOV R0,#125D
0CC3 80      1=3475              MOVX A,@R0
0CC4 AE      1=3476              MOV R6,A
0CC5 FF      1=3477              MOV A,R7
0CC6 90      1=3478              MOVX @R0,A
             1=3479                              ; UPDATE 'DLAST'
0CC7 FE      1=3480              MOV A,R6
0CC8 DF      1=3481              XRL A,R7
0CC9 96D1    1=3482              JNZ D076
             1=3483
0CCB B87C    1=3484              MOV R0,#124D
0CCD 80      1=3485              MOVX A,@R0
0CCE C642    1=3486              JZ (D02+1)
             1=3487
0CD0 93      1=3488              RETR
             1=3489   D076:
0CD1 FF      1=3490              MOV A,R7
0CD2 90      1=3491              MOVX @R0,A
             1=3492
0CD3 B87C    1=3493              MOV R0,#124D
0CD5 80      1=3494              MOVX A,@R0        ; GET DPTR.
0CD6 17      1=3495              INC A
0CD7 AF      1=3496              MOV R7,A
0CD8 D305    1=3497              XRL A,#5D
0CDA 96DD    1=3498              JNZ D070
0CDC AF      1=3499              MOV R7,A
             1=3500   D070:
0CDD FF      1=3501              MOV A,R7
0CDE 90      1=3502              MOVX @R0,A
             1=3503
0CDF 96E3    1=3504              JNZ D071
0CE1 8442    1=3505              JMP (D02+1)       ; DSP TIME.
             1=3506   D071:
0CE3 FF      1=3507              MOV A,R7
0CE4 D301    1=3508              XRL A,#1
0CE6 96EA    1=3509              JNZ D072
0CE8 8472    1=3510              JMP (D05+1)       ; DSP SET POINT.
             1=3511   D072:
0CEA FF      1=3512              MOV A,R7
0CEB D302    1=3513              XRL A,#2D
0CED 96F1    1=3514              JNZ D073
0CEF 846C    1=3515              JMP (D03+1)       ; DSP INDOOR TEMP.
             1=3516   D073:
```

```
0CF1 FF        1=3517              MOV A,R7
0CF2 D303      1=3518              XRL A,#3D
0CF4 96F8      1=3519              JNZ D074
0CF6 846F      1=3520              JMP (D04+1)         ; DSP OUTDOOR TEMP.
               1=3521      D074:
0CF8 8475      1=3522              JMP (D06+1)         ; DSP CURRENT STAGE.
               1=3523
               1=3524
               1=3525
               1=3526
               1=3527
0D00           1=3528              ORG 0D00H
               1=3529
               1=3530
               1=3531 $EJECT
               1=3532
               1=3533      XD03:
0D00 9400      1=3534              CALL DBLANK
0D02 B896      1=3535              MOV R0,#150D        ; INDOOR ADDR.
               1=3536
               1=3537      D041:                       ; ENTRY POINT FOR D04 ROUTINE.
               1=3538
               1=3539
               1=3540
0D04 80        1=3541              MOVX A,@R0          ; GET INDOOR TEMP
               1=3542
0D05 B481      1=3543              CALL FASP           ; CONVERT ASPIRATOR CODE
               1=3544                                  ; TO FAHRENHEIT.
0D07 AF        1=3545              MOV R7,A
0D08 B800      1=3546              MOV R0,#0
0D0A 80        1=3547              MOVX A,@R0
0D0B C611      1=3548              JZ D031
0D0D FF        1=3549              MOV A,R7
0D0E D412      1=3550              CALL CF
0D10 AF        1=3551              MOV R7,A
               1=3552
               1=3553      D031:
0D11 B900      1=3554              MOV R1,#0
0D13 2383      1=3555              MOV A,#83H
0D15 B86E      1=3556              MOV R0,#110D
0D17 90        1=3557              MOVX @R0,A
0D18 2384      1=3558              MOV A,#84H
0D1A C8        1=3559              DEC R0
0D1B 90        1=3560              MOVX @R0,A
0D1C 27        1=3561              CLR A
0D1D 37        1=3562              CPL A
0D1E C8        1=3563              DEC R0
0D1F 90        1=3564              MOVX @R0,A
0D20 C8        1=3565              DEC R0
0D21 90        1=3566              MOVX @R0,A
0D22 C8        1=3567              DEC R0
0D23 90        1=3568              MOVX @R0,A
0D24 FF        1=3569              MOV A,R7
0D25 37        1=3570              CPL A
0D26 C680      1=3571              JZ D03RET
0D28 F233      1=3572              JB7 D032
0D2A 2387      1=3573              MOV A,#87H
```

```
0D2C 90      1=3574              MOVX @R0,A      ; MINUS SIGN.
             1=3575
0D2D FF      1=3576              MOV A,R7
0D2E 37      1=3577              CPL A
0D2F 17      1=3578              INC A
0D30 AF      1=3579              MOV R7,A
             1=3580
0D31 A448    1=3581              JMP D035
             1=3582      D032:
             1=3583                              ; POS. TEMP.
0D33 FF      1=3584              MOV A,R7
0D34 AE      1=3585              MOV R6,A        ; CHK WHETHER OVER 99 DEG.
             1=3586
             1=3587      D033:
0D35 C648    1=3588              JZ D035
0D37 D364    1=3589              XRL A,#100D
0D39 C63F    1=3590              JZ D034
0D3B CE      1=3591              DEC R6
0D3C FE      1=3592              MOV A,R6
0D3D A435    1=3593              JMP D033
             1=3594      D034:
             1=3595                              ; T.GT.99
0D3F 2301    1=3596              MOV A,#1
0D41 90      1=3597              MOVX @R0,A
0D42 FF      1=3598              MOV A,R7
0D43 37      1=3599              CPL A
0D44 0364    1=3600              ADD A,#100D     ; SUBTR. 100 FROM TEMP.
0D46 37      1=3601              CPL A
0D47 AF      1=3602              MOV R7,A
             1=3603
             1=3604      D035:                   ; T.LE.99 OR NEG.
0D48 BD0A    1=3605              MOV R5,#10D
             1=3606
0D4A BE5A    1=3607              MOV R6,#90D
             1=3608
             1=3609      D036:
0D4C FF      1=3610              MOV A,R7
0D4D 0E      1=3611              XRL A,R6
0D4E C65C    1=3612              JZ D037
0D50 FE      1=3613              MOV A,R6
0D51 37      1=3614              CPL A
0D52 030A    1=3615              ADD A,#10D
0D54 37      1=3616              CPL A
0D55 AE      1=3617              MOV R6,A
0D56 ED4C    1=3618              DJNZ R5,D036
0D58 CF      1=3619              DEC R7
0D59 19      1=3620              INC R1
0D5A A448    1=3621              JMP D035
             1=3622
             1=3623      D037:
0D5C B869    1=3624              MOV R0,#105D
             1=3625
0D5E 27      1=3626              CLR A
0D5F AC      1=3627              MOV R4,A
0D60 FE      1=3628              MOV A,R6
0D61 C66E    1=3629              JZ D0310
             1=3630
```

```
                    1=3631      D0311:
0D63 BD0A           1=3632          MOV R5,#10D
                    1=3633      D039:
0D65 CE             1=3634          DEC R6
0D66 ED65           1=3635          DJNZ R5,D039
0D68 1C             1=3636          INC R4
0D69 FE             1=3637          MOV A,R6
0D6A C66E           1=3638          JZ D0310
0D6C A463           1=3639          JMP D0311
                    1=3640      D0310:
0D6E FC             1=3641          MOV A,R4
                    1=3642
0D6F 90             1=3643          MOVX @R0,A
0D70 C8             1=3644          DEC R0
0D71 F9             1=3645          MOV A,R1
0D72 90             1=3646          MOVX @R0,A
0D73 C8             1=3647          DEC R0
0D74 B900           1=3648          MOV R1,#0
0D76 81             1=3649          MOVX A,@R1
0D77 C67D           1=3650          JZ D038
0D79 2310           1=3651          MOV A,#10H
0D7B 90             1=3652          MOVX @R0,A
0D7C 93             1=3653          RETR
                    1=3654      D038:
0D7D 2380           1=3655          MOV A,#80H
0D7F 90             1=3656          MOVX @R0,A
                    1=3657
                    1=3658      D03RET:
0D80 93             1=3659          RETR
                    1=3660
                    1=3661      FASP:                       ; ASP CODE IN ACC ON ENTRY.
                    1=3662                                  ; DEG F, 2'S COMP, ON EXIT.
0D81 37             1=3663          CPL A
0D82 9686           1=3664          JNZ FASP0
0D84 37             1=3665          CPL A
0D85 93             1=3666          RETR
                    1=3667      FASP0:
0D86 37             1=3668          CPL A
0D87 BE5A           1=3669          MOV R6,#90D
                    1=3670
                    1=3671      FASP1:
0D89 C68F           1=3672          JZ FASP2
0D8B 07             1=3673          DEC A
0D8C EE89           1=3674          DJNZ R6,FASP1
0D8E 93             1=3675          RETR
                    1=3676
                    1=3677      FASP2:
0D8F FE             1=3678          MOV A,R6
0D90 37             1=3679          CPL A
0D91 17             1=3680          INC A
0D92 93             1=3681          RETR
                    1=3682
                    1=3683
                    1=3684
                    1=3685      XD04:
0D93 9408           1=3686          CALL DBLANK
0D95 B897           1=3687          MOV R0,#151D
```

```
0D97 B404    1=3688              CALL D041
0D99 B86E    1=3689              MOV R0,#110D
0D9B 2385    1=3690              MOV A,#85H
0D9D 90      1=3691              MOVX @R0,A
0D9E C8      1=3692              DEC R0
0D9F 2386    1=3693              MOV A,#86H
0DA1 90      1=3694              MOVX @R0,A
0DA2 C8      1=3695              DEC R0
0DA3 2370    1=3696              MOV A,#70H
0DA5 90      1=3697              MOVX @R0,A
             1=3698
0DA6 93      1=3699              RETR
             1=3700
             1=3701
             1=3702      XD05:
0DA7 9400    1=3703              CALL DBLANK
             1=3704
0DA9 B895    1=3705              MOV R0,#149D
0DAB 80      1=3706              MOVX A,@R0
0DAC 96B2    1=3707              JNZ D051
             1=3708
0DAE B899    1=3709              MOV R0,#153D        ; NIGHT SP ADDR.
0DB0 A4B4    1=3710              JMP D052
             1=3711      D051:
0DB2 B898    1=3712              MOV R0,#152D        ; DAY SP ADDR.
             1=3713
             1=3714      D052:
0DB4 80      1=3715              MOVX A,@R0          ; GET SP, ASP CODE.
0DB5 B481    1=3716              CALL FASP           ; TRANSLATE TO DEG F.
0DB7 AF      1=3717              MOV R7,A
0DB8 B800    1=3718              MOV R0,#0
0DBA 80      1=3719              MOVX A,@R0
0DBB C6C1    1=3720              JZ D053
0DBD FF      1=3721              MOV A,R7
0DBE D412    1=3722              CALL CF             ; F TO C.
0DC0 AF      1=3723              MOV R7,A
             1=3724      D053:
0DC1 FF      1=3725              MOV A,R7
0DC2 B411    1=3726              CALL D031           ; BORROW ROUTINE TO CONVERT
             1=3727                                  ; TO DISPLAY BCD FORMAT.
0DC4 B86E    1=3728              MOV R0,#110D
0DC6 2381    1=3729              MOV A,#81H
0DC8 90      1=3730              MOVX @R0,A
0DC9 C8      1=3731              DEC R0
0DCA 2370    1=3732              MOV A,#70H
0DCC 90      1=3733              MOVX @R0,A
0DCD C8      1=3734              DEC R0
0DCE 2382    1=3735              MOV A,#82H
0DD0 90      1=3736              MOVX @R0,A
0DD1 C8      1=3737              DEC R0
0DD2 2370    1=3738              MOV A,#70H
0DD4 90      1=3739              MOVX @R0,A
0DD5 93      1=3740              RETR
             1=3741      NUMMB1:
0DD6 E5      1=3742              SEL MB0
0DD7 B4EA    1=3743              CALL NUMCK
0DD9 F5      1=3744              SEL MB1
```

```
0DDA 93         1=3745                  RETR
                1=3746
                1=3747
                1=3748          TIMADJ:
0DDB B88C       1=3749                  MOV R0,#140D
0DDD 42         1=3750                  MOV A,T
0DDE F2E4       1=3751                  JB7 TADJ1
0DE0 2301       1=3752                  MOV A,#1D
0DE2 90         1=3753                  MOVX @R0,A
0DE3 93         1=3754                  RETR
                1=3755          TADJ1:
0DE4 27         1=3756                  CLR A
0DE5 90         1=3757                  MOVX @R0,A
0DE6 93         1=3758                  RETR
                1=3759
                1=3760          SLOTCK:         ; CHECK FOR T-SLOTS
                1=3761                          ; DURING WAIT
                1=3762                          ; ROUTINES LIKE
                1=3763                          ; "DSPHLD" AND
                1=3764                          ; "BEEP".
0DE7 B88C       1=3765                  MOV R0,#140D
0DE9 80         1=3766                  MOVX A,@R0
0DEA D303       1=3767                  XRL A,#3D
0DEC C6F4       1=3768                  JZ SCK1
0DEE 80         1=3769                  MOVX A,@R0
0DEF D304       1=3770                  XRL A,#4D
0DF1 C6F4       1=3771                  JZ SCK1
0DF3 93         1=3772                  RETR
                1=3773          SCK1:
0DF4 90         1=3774                  MOVX @R0,A      ; CLEAR SLOT TIMER.
0DF5 5400       1=3775                  CALL REGSAV
0DF7 1418       1=3776                  CALL MCI
0DF9 54AF       1=3777                  CALL REGUSA
0DFB 93         1=3778                  RETR
                1=3779                                  ; AND RETURN THRU
                1=3780                                  ; THE UPDATE
                1=3781                                  ; ROUTINE.
                1=3782
                1=3783
                1=3784
                1=3785 $EJECT
                1=3786
                1=3787
0E00            1=3788                  ORG 0E00H
                1=3789
                1=3790          FC:
0E00 AF         1=3791                  MOV R7,A
0E01 BE7E       1=3792                  MOV R6,#126D
0E03 BDFF       1=3793                  MOV R5,#0FFH
                1=3794          FCL1:
0E05 FE         1=3795                  MOV A,R6
0E06 D412       1=3796                  CALL CF
0E08 DF         1=3797                  XRL A,R7
0E09 C610       1=3798                  JZ FCL2
0E0B CE         1=3799                  DEC R6
0E0C ED05       1=3800                  DJNZ R5,FCL1
0E0E BEFF       1=3801                  MOV R6,#0FFH
```

```
                1=3802      FCL2:
0E10 FE         1=3803                  MOV A,R6
0E11 93         1=3804                  RETR
                1=3805
                1=3806
                1=3807
                1=3808 $EJECT
                1=3809
                1=3810
                1=3811      CF:
0E12 37         1=3812                  CPL A
0E13 9617       1=3813                  JNZ CF0
0E15 37         1=3814                  CPL A
0E16 93         1=3815                  RETR
                1=3816      CF0:
0E17 37         1=3817                  CPL A
                1=3818
0E18 BA00       1=3819                  MOV R2,#0
0E1A 37         1=3820                  CPL A
0E1B 0320       1=3821                  ADD A,#32D
0E1D 37         1=3822                  CPL A
0E1E AC         1=3823                  MOV R4,A
0E1F F23C       1=3824                  JB7 CF2         ; JMP FOR NEG (F-32)
                1=3825      CF1:
0E21 FC         1=3826                  MOV A,R4        ; BIT 7 = 0.
0E22 E7         1=3827                  RL A
0E23 AB         1=3828                  MOV R3,A
0E24 FC         1=3829                  MOV A,R4
0E25 77         1=3830                  RR A
0E26 537F       1=3831                  ANL A,#01111111B
0E28 77         1=3832                  RR A
0E29 537F       1=3833                  ANL A,#01111111B
0E2B 6B         1=3834                  ADD A,R3
0E2C 77         1=3835                  RR A
0E2D 537F       1=3836                  ANL A,#01111111B
0E2F 77         1=3837                  RR A
0E30 537F       1=3838                  ANL A,#01111111B
0E32 AB         1=3839                  MOV R3,A
0E33 FA         1=3840                  MOV A,R2
0E34 C63A       1=3841                  JZ CF3
0E36 FB         1=3842                  MOV A,R3
0E37 37         1=3843                  CPL A
0E38 17         1=3844                  INC A
0E39 AB         1=3845                  MOV R3,A
                1=3846      CF3:
0E3A FB         1=3847                  MOV A,R3
0E3B 93         1=3848                  RETR
                1=3849      CF2:
0E3C 37         1=3850                  CPL A
0E3D 17         1=3851                  INC A
0E3E AC         1=3852                  MOV R4,A
0E3F 2301       1=3853                  MOV A,#1
0E41 AA         1=3854                  MOV R2,A
0E42 C421       1=3855                  JMP CF1
                1=3856
                1=3857
                1=3858
                1=3859 $EJECT
```

```
                 1=3860
                 1=3861
                 1=3862
                 1=3863
                 1=3864
                 1=3865      WAITER:
0E44 BEFF        1=3866              MOV R6,#0FFH
                 1=3867      WAIT0:
0E46 BFFF        1=3868              MOV R7,#0FFH
                 1=3869      WAIT1:
0E48 EF48        1=3870              DJNZ R7,WAIT1
0E4A EE46        1=3871              DJNZ R6,WAIT0
0E4C 93          1=3872              RETR
                 1=3873
                 1=3874 $EJECT
                 1=3875
                 1=3876
                 1=3877
                 1=3878
                 1=3879
                 1=3880      BEEP:
0E4D 27          1=3881              CLR A
0E4E 3C          1=3882              MOVD P4,A
0E4F 8A0F        1=3883              ORL P2,#00FH
0E51 B856        1=3884              MOV R0,#86D
0E53 23FF        1=3885              MOV A,#0FFH
0E55 90          1=3886              MOVX @R0,A
0E56 B4E7        1=3887      BEEP1:  CALL SLOTCK
0E58 B856        1=3888              MOV R0,#86D
0E5A 80          1=3889              MOVX A,@R0
0E5B 07          1=3890              DEC A
0E5C 90          1=3891              MOVX @R0,A
0E5D 9656        1=3892              JNZ BEEP1
0E5F 23FF        1=3893              MOV A,#0FFH
0E61 3C          1=3894              MOVD P4,A
0E62 8A0F        1=3895              ORL P2,#00FH
0E64 93          1=3896              RETR
                 1=3897
                 1=3898
                 1=3899
                 1=3900
                 1=3901 $EJECT
                 1=3902
                 1=3903
                 1=3904
                 1=3905
                 1=3906
0F80             1=3907              ORG 0F80H
                 1=3908
                 1=3909      ADDR:
0F80 55          1=3910              STRT T
0F8E D44D        1=3911              CALL BEEP
                 1=3912
0F10 F4E0        1=3913              CALL KEY
0F12 D30F        1=3914              XRL A,#0FH
0F14 9680        1=3915              JNZ ADDR
                 1=3916
```

```
0F16 B830   1=3917           MOV R0,#48D        ; ON-CHIP STORE OF RAM P.2 ADDR OF
            1=3918                              ; NEXT ADDR AND PTR STORAGE.
0F18 A0     1=3919           MOV @R0,A
0F19 18     1=3920           INC R0
0F1A A0     1=3921           MOV @R0,A
            1=3922   ADDR6:
0F1B F49F   1=3923           CALL PRMT
0F1D F4B5   1=3924           CALL ETRY
0F1F FA     1=3925           MOV A,R2
0F20 C623   1=3926           JZ ADDR0
0F22 93     1=3927           RETR
            1=3928   ADDR0:
0F23 B867   1=3929           MOV R0,#103D
0F25 80     1=3930           MOVX A,@R0
0F26 47     1=3931           SWAP A
0F27 AF     1=3932           MOV R7,A
0F28 B86A   1=3933           MOV R0,#106D
0F2A 80     1=3934           MOVX A,@R0
0F2B 4F     1=3935           ORL A,R7
0F2C AF     1=3936           MOV R7,A           ; T0TP.
0F2D 80     1=3937           MOVX A,@R0
0F2E D302   1=3938           XRL A,#2D
0F30 C639   1=3939           JZ ADDR8
0F32 80     1=3940           MOVX A,@R0
0F33 D303   1=3941           XRL A,#3D
0F35 C63D   1=3942           JZ ADDR9
0F37 E441   1=3943           JMP ADDR7
            1=3944   ADDR8:
0F39 F4FB   1=3945           CALL ISEN
0F3B E43F   1=3946           JMP ADDR10
            1=3947   ADDR9:
0F3D F4F1   1=3948           CALL OSEN
            1=3949   ADDR10:
0F3F E41B   1=3950           JMP ADDR6
            1=3951   ADDR7:
0F41 B830   1=3952           MOV R0,#48D
0F43 F0     1=3953           MOV A,@R0
0F44 17     1=3954           INC A
0F45 17     1=3955           INC A
0F46 17     1=3956           INC A
0F47 A0     1=3957           MOV @R0,A
0F48 07     1=3958           DEC A
0F49 07     1=3959           DEC A
0F4A 07     1=3960           DEC A
0F4B A9     1=3961           MOV R1,A
0F4C FF     1=3962           MOV A,R7
0F4D 9AFA   1=3963           ANL P2,#11111010B
0F4F 91     1=3964           MOVX @R1,A
0F50 8A08   1=3965           ORL P2,#00001011B
0F52 B868   1=3966           MOV R0,#104D
0F54 80     1=3967           MOVX A,@R0         ; T2T1.
0F55 19     1=3968           INC R1
0F56 9AFA   1=3969           ANL P2,#11111010B
0F58 91     1=3970           MOVX @R1,A
0F59 19     1=3971           INC R1             ; P.2 ADDR FOR DATA.
0F5A B831   1=3972           MOV R0,#49D
0F5C F0     1=3973           MOV A,@R0          ; BASE ADDR FOR DATA.
```

```
0F5D 91        1=3974                  MOVX @R1,A
0F5E 8A0B      1=3975                  ORL P2,#00001011B
               1=3976                                          ; NOW DECIDE HOW MUCH TO INCREASE R49.
               1=3977
0F60 B86A      1=3978                  MOV R0,#106D
0F62 80        1=3979                  MOVX A,@R0
0F63 AF        1=3980                  MOV R7,A                ; TP.
0F64 D301      1=3981                  XRL A,#1
0F66 C676      1=3982                  JZ ADDR1
0F68 FF        1=3983                  MOV A,R7
0F69 D307      1=3984                  XRL A,#7D
0F6B C676      1=3985                  JZ ADDR1
0F6D FF        1=3986                  MOV A,R7
0F6E D308      1=3987                  XRL A,#8D
               1=3988
0F70 C676      1=3989                  JZ ADDR1
               1=3990
               1=3991                                          ; ASSUME MCI-101.
0F72 BC02      1=3992                  MOV R4,#2D
0F74 E478      1=3993                  JMP ADDR2
               1=3994          ADDR1:
0F76 BC0A      1=3995                  MOV R4,#10D
               1=3996          ADDR2:
0F78 B831      1=3997                  MOV R0,#49D
0F7A F0        1=3998                  MOV A,@R0
0F7B 6C        1=3999                  ADD A,R4
0F7C A0        1=4000                  MOV @R0,A               ; R49 READY FOR NEXT TIME.
0F7D AF        1=4001                  MOV R7,A
0F7E B8FF      1=4002                  MOV R0,#255D
0F80 B90A      1=4003                  MOV R1,#10D
               1=4004          ADDR4:
0F82 FF        1=4005                  MOV A,R7                ; CHECK FOR FULL RAM, P.0 AND P.1.
0F83 D8        1=4006                  XRL A,R0
0F84 9687      1=4007                  JNZ ADDR3
0F86 93        1=4008                  RETR
               1=4009          ADDR3:
0F87 C8        1=4010                  DEC R0
0F88 E982      1=4011                  DJNZ R1,ADDR4
0F8A B83D      1=4012                  MOV R0,#46D
0F8C F0        1=4013                  MOV A,@R0
0F8D AF        1=4014                  MOV R7,A
0F8E D3FD      1=4015                  XRL A,#253D
0F90 C69E      1=4016                  JZ ADDR5
0F92 FF        1=4017                  MOV A,R7
0F93 D3FE      1=4018                  XRL A,#254D
0F95 C69E      1=4019                  JZ ADDR5
0F97 FF        1=4020                  MOV A,R7
0F98 D3FF      1=4021                  XRL A,#255D
0F9A C69E      1=4022                  JZ ADDR5
0F9C E41B      1=4023                  JMP ADDR6
               1=4024          ADDR5:
0F9E 93        1=4025                  RETR
               1=4026
               1=4027 $EJECT
               1=4028
               1=4029
               1=4030          PRMT:                           ; PROMPT ROUTINE FOR ADDRESS ENTRY.
```

```
0F9F 9400    1=4831              CALL DBLANK
0FA1 2390    1=4832              MOV  A,#90H
0FA3 B86A    1=4833              MOV  R0,#106D
0FA5 90      1=4834              MOVX @R0,A
0FA6 C8      1=4835              DEC  R0
0FA7 C8      1=4836              DEC  R0
0FA8 90      1=4837              MOVX @R0,A
0FA9 C8      1=4838              DEC  R0
0FAA 90      1=4839              MOVX @R0,A
0FAB B869    1=4840              MOV  R0,#105D
0FAD 2387    1=4841              MOV  A,#87H
0FAF 90      1=4842              MOVX @R0,A
0FB0 E5      1=4843              SEL  MB0
0FB1 5400    1=4844              CALL DISPLA
0FB3 F5      1=4845              SEL  MB1
             1=4846
0FB4 93      1=4847              RETR
             1=4848
             1=4849 $EJECT
             1=4850
             1=4851
             1=4852      ETRY:                   ; ADDRESS DIGIT ENTRY HANDLER.
0FB5 B86A    1=4853              MOV  R0,#106D
             1=4854      ETRY0:
0FB7 2369    1=4855              MOV  A,#105D
0FB9 D8      1=4856              XRL  A,R0
0FBA 96BE    1=4857              JNZ  ETRY1
0FBC B868    1=4858              MOV  R0,#104D
             1=4859      ETRY1:
0FBE 2366    1=4860              MOV  A,#102D
0FC0 D8      1=4861              XRL  A,R0
0FC1 96C8    1=4862              JNZ  ETRY2
0FC3 D444    1=4863              CALL WAITER
0FC5 BA00    1=4864              MOV  R2,#0
0FC7 93      1=4865              RETR
             1=4866      ETRY2:
0FC8 D5      1=4867              SEL  RB1
0FC9 F4E8    1=4868              CALL KEY
0FCB C5      1=4869              SEL  RB0
0FCC D30F    1=4870              XRL  A,#0FH
0FCE 96D3    1=4871              JNZ  ETRY3
0FD0 BA01    1=4872              MOV  R2,#1
0FD2 93      1=4873              RETR
             1=4874      ETRY3:
0FD3 D5      1=4875              SEL  RB1
0FD4 FF      1=4876              MOV  A,R7
0FD5 C5      1=4877              SEL  RB0
0FD6 90      1=4878              MOVX @R0,A
0FD7 E5      1=4879              SEL  MB0
0FD8 D5      1=4880              SEL  RB1
0FD9 5400    1=4881              CALL DISPLA
0FDB C5      1=4882              SEL  RB0
0FDC F5      1=4883              SEL  MB1
0FDD C8      1=4884              DEC  R0
0FDE E4B7    1=4885              JMP  ETRY0
             1=4886
             1=4887 $EJECT
```

```
                1=4088
                1=4089
                1=4090           KEY:
                1=4091
                1=4092
0FE0 E5         1=4093                   SEL MB0
0FE1 3400       1=4094                   CALL KEYPAD
0FE3 F5         1=4095                   SEL MB1
0FE4 B810       1=4096                   MOV R0,#16D
0FE6 80         1=4097                   MOVX A,@R0
0FE7 D310       1=4098                   XRL A,#16D
0FE9 C6E0       1=4099                   JZ KEY
0FEB F8         1=4100                   MOV A,R0
0FEC 90         1=4101                   MOVX @R0,A
0FED 18         1=4102                   INC R0
0FEE 80         1=4103                   MOVX A,@R0
0FEF AF         1=4104                   MOV R7,A
                1=4105
0FF0 93         1=4106                   RETR
                1=4107
                1=4108 $EJECT
                1=4109
                1=4110
                1=4111           OSEN:
0FF1 B09E       1=4112                   MOV R0,#158D
                1=4113           OSEN1:
0FF3 FF         1=4114                   MOV A,R7
0FF4 90         1=4115                   MOVX @R0,A
0FF5 18         1=4116                   INC R0
0FF6 B968       1=4117                   MOV R1,#104D
0FF8 81         1=4118                   MOVX A,@R1
0FF9 90         1=4119                   MOVX @R0,A
                1=4120
0FFA 93         1=4121                   RETR
                1=4122
                1=4123
                1=4124
                1=4125
                1=4126
                1=4127           ISEN:
0FFB B8A0       1=4128                   MOV R0,#160D
0FFD E4F3       1=4129                   JMP OSEN1
                1=4130
                1=4131
                1=4132
                1=4133
                1=4134
                1=4135 ;========================================
                1=4136
                1=4137
                1=4138
                =4139 $EJECT
; RETURN WITH KEY CODE IN ACC
; AND IN R7.  NO RETURN AT ALL
; UNTIL A KEY IS PRESSED.
                4140
                4141 $EJECT
```

4142
4143                    END

USER SYMBOLS

| Symbol | Val | Symbol | Val | Symbol | Val | Symbol | Val | Symbol | Val | Symbol | Val | Symbol | Val |
|---|---|---|---|---|---|---|---|---|---|---|---|---|---|
| A101 | 097E | AA | 0430 | AA1 | 0433 | AA1L1 | 0605 | AA2 | 0436 | AA2L1 | 0614 | AA3 | 0439 | AA3.1 | 0623 |
| AA4 | 043C | AA4L1 | 0638 | AA4L2 | 0641 | AA4L3 | 065C | AA4L4 | 064F | AAL1 | 05E0 | AB | 043F | AB1 | 0442 |
| AB1L1 | 068C | AB2 | 0445 | AB2A | 0448 | AB2A1 | 044B | AB2A11 | 0714 | AB2A12 | 0722 | AB2A13 | 071E | AB2A14 | 072F |
| AB2A15 | 074B | AB2A16 | 0747 | AB2A17 | 0754 | AB2A18 | 0752 | AB2AL1 | 0705 | AB2B | 044E | AB2BL1 | 0763 | AB2L0 | 06A1 |
| AB2L1 | 06A7 | AB2L2 | 06BC | AB2L3 | 06B8 | AB2L4 | 06C5 | AB2L5 | 06C3 | AB2L6 | 06D6 | ABL1 | 067B | ABL2 | 0681 |
| ABL3 | 066A | ACPWR | 002C | ADDR | 0F0D | ADDR0 | 0F23 | ADDR1 | 0F76 | ADDR10 | 0F3F | ADDR2 | 0F78 | ADDR3 | 0F87 |
| ADDR4 | 0F82 | ADDR5 | 0F9E | ADDR6 | 0F1B | ADDR7 | 0F41 | ADDR8 | 0F39 | ADDR9 | 0F3D | AL1 | 052D | AL2 | 0541 |
| AL3 | 0546 | AL31 | 0551 | AL4 | 055D | AL41 | 0561 | AL42 | 0563 | AL5 | 056C | AL6 | 0573 | AL61 | 0578 |
| AL61 | 05A5 | AL62 | 05B7 | AL63 | 0598 | AL64 | 05A3 | AL65 | 05BE | AMPM | 01B6 | ASTAT | 099F | AUTMAN | 0992 |
| AUTO | 02C1 | B | 0451 | B1 | 0454 | B101 | 0979 | B1L1 | 04E5 | B1L2 | 04EF | B2 | 0457 | B2L0 | 0505 |
| B2L1 | 0510 | BACK | 0210 | BEEP | 0E4D | BEEP1 | 0E56 | BL1 | 04C6 | BL2 | 04E2 | BL3 | 04BB | BLCK | 02E0 |
| BUF | 0267 | C1 | 045E | C101 | 0975 | C1L0 | 0EE1 | C1L1 | 0EE4 | C2 | 0462 | C2L1 | 0EEF | C3 | 0465 |
| C3L1 | 0EFA | C4 | 046A | CAL1 | 0F07 | CF | 0E12 | CF0 | 0E17 | CF1 | 0E21 | CF2 | 0E3C | CF3 | 0E3A |
| CIRCLE | 0271 | CL1 | 0ED7 | CL2 | 0ED9 | COM1 | 0905 | COMAND | 0900 | COMINT | 03E1 | COMRST | 09E7 | CONTX | 0BA5 |
| CONTX1 | 0BAA | CRST1 | 09E9 | CRST2 | 09ED | D | 046E | D00 | 0C39 | D01 | 0C3D | D02 | 0C41 | D021 | 0C48 |
| D022 | 0C67 | D03 | 0C6B | D031 | 0D11 | D0310 | 0D6E | D0311 | 0D63 | D032 | 0D33 | D033 | 0D35 | D034 | 0D3F |
| D035 | 0D48 | D036 | 0D4C | D037 | 0D5C | D038 | 070D | D039 | 0D65 | D03RET | 0D80 | D04 | 0C6E | D041 | 0D04 |
| D05 | 0C71 | D051 | 0DB2 | D052 | 0DB4 | D053 | 0DC1 | D06 | 0C74 | D060 | 0C80 | D061 | 0C9E | D062 | 0CF8 |
| D07 | 0CAD | D070 | 0CDD | D071 | 0CE3 | D072 | 0CEA | D073 | 0CF1 | D074 | 0CF8 | D075 | 0CBD | D076 | 0CD1 |
| D1 | 0471 | D101 | 098D | D1L1 | 0781 | D1L10 | 07E3 | D1L13 | 0064 | D1L14 | 0077 | D1L15 | 00A3 | D1L16 | 00B0 |
| D1L17 | 00BE | D1L18 | 00BF | D1L19 | 00B6 | D1L2 | 07A5 | D1L20 | 009B | D1L21 | 009A | D1L22 | 0092 | D1L23 | 029D |
| D1L24 | 0066 | D1L3 | 07AF | D1L4 | 07B6 | D1L5 | 07AA | D1L6 | 07E7 | D1L7 | 07EA | D1L8 | 07E1 | D1L9 | 07E2 |
| D2 | 0474 | D2L1 | 00CD | D2L10 | 00DE | D2L11 | 00E5 | D2L2 | 01EA | D2L3 | 01F2 | D2L4 | 00F9 | D2L5 | 02F1 |
| D2L6 | 01E4 | D2L7 | 01DD | D2L8 | 01E1 | D2L9 | 00D7 | D3 | 0477 | D3L1 | 0E7F | D3L2 | 0E95 | D3L3 | 0E87 |
| D3L4 | 0E97 | D4 | 047B | D4L1 | 0EA8 | D4L2 | 0EB9 | D4L3 | 0EC5 | D4L4 | 0EC1 | DATA1 | 027D | DATA2 | 0277 |
| DATCOM | 0A74 | DAY101 | 095F | DBLAN1 | 0C06 | DBLANK | 0C00 | DBMAX | 0003 | DCTRL | 007A | DFILL | 0C11 | DFILL1 | 0C16 |
| DHI7 | 0228 | DHLD1 | 0BCD | DISCOM | 0A62 | DISPLA | 0C00 | DL1 | 0772 | DLOOP | 0217 | DMASK | 032A | DN | 085C |
| DPLOOP | 023D | DSAVE | 0208 | DSPHLD | 0BC9 | DSPHLR | 0C25 | DSPMOD | 0C35 | DTEST | 0210 | ETRY | 0FB5 | ETRY0 | 0FB7 |
| ETRY1 | 0FBE | ETRY2 | 0FC8 | ETRY3 | 0FD3 | FASP | 0D81 | FASP0 | 0D86 | FASP1 | 0D89 | FASP2 | 0D8F | FC | 0E0C |
| FCL1 | 0E05 | FCL2 | 0E10 | FLUSH | 02C9 | HIT | 0128 | ICLR | 036C | ICLR0 | 0377 | ICLR1 | 0378 | INIT | 0363 |
| INITAD | 07F0 | INITFL | 0055 | ISEN | 0FFB | JCLR | 037A | KEY | 0FE0 | KEY1 | 014A | KEY2 | 014F | KEYCK | 0410 |
| KEYCK0 | 0425 | KEYHLR | 0400 | KEYPAD | 0100 | KHLR0 | 0408 | KHLR1 | 041B | KQUO | 0410 | KSTAT | 0BD6 | KSTAT0 | 0BDD |
| KSTAT1 | 0BDF | KSTATR | 0813 | LBLK1 | 0122 | LP101 | 0913 | MAINLP | 0089 | MASK | 0300 | MATC10 | 0AE9 | MATC11 | 0AE7 |
| MATC12 | 0AF6 | MATC13 | 0B0B | MATC14 | 0B0D | MATC15 | 0B11 | MATC20 | 0AEF | MATC21 | 0AF2 | MATCH | 0A95 | MATCH0 | 0AA6 |
| MATCH1 | 0AB3 | MATCH2 | 0AB5 | MATCH3 | 0ABE | MATCH5 | 0AC8 | MATCH6 | 0AF7 | MATCH7 | 0AD3 | MATCH8 | 0AD5 | MATCH9 | 0AD9 |
| MATCX | 0B17 | MATCY | 0B21 | MCI | 0818 | MCI1 | 0828 | MCI101 | 0955 | MCI2 | 0839 | MCI3 | 0846 | MKR | 0152 |
| MKR0 | 02FE | MSTAT | 099D | NC0 | 05EC | NC1 | 05F2 | NOBLK | 0162 | NODP | 0247 | NORMAL | 02A6 | NOTAM | 0299 |
| NUTPM | 02B4 | NUMCK | 05EA | NUMCB1 | 0DD6 | NYT101 | 0961 | OSEN | 0FF1 | OSEN1 | 0FF3 | PRMT | 0F9F | QUO | 042A |
| RCHK | 0BE5 | RCHK1 | 0BFD | REGSA1 | 0A12 | REGSAV | 0A00 | REGUS1 | 0A53 | REGUSA | 0A4F | RTS1 | 0A86 | RTS2 | 0A88 |
| RTSBAR | 0A7D | RTSRST | 0A8D | RX | 0B23 | RX1 | 0B30 | RX10 | 0B4F | RX2 | 0B3E | RX3 | 0B9C | RX4 | 0B79 |
| RX5 | 0B6D | RX6 | 0B83 | RX7 | 0B8B | RX8 | 0B6B | RX9 | 0B64 | SCAN | 0106 | SCAN1 | 010F | SCK1 | 0DF4 |
| SENS1 | 0852 | SENS2 | 086C | SENS3 | 087B | SENS4 | 0892 | SENS5 | 0888 | SENS9 | 0892 | SENSOR | 084D | SLOTCK | 0DE7 |
| STACOM | 0A6B | T12 | 019B | TADJ1 | 0DE4 | TDONE | 01AA | TDONE1 | 01CC | TDONE2 | 01B2 | TEMP1 | 03AA | TEMP2 | 03B2 |
| TIMADJ | 0DDB | TIME | 0150 | TIMINT | 0036 | TINT1 | 0053 | TKRS | 03D6 | TREG | 0019 | TSEN20 | 0899 | TSEN21 | 08F4 |
| TSEN02 | 08F3 | TSEN03 | 0895 | TSEN04 | 08F7 | TSEN05 | 08FB | TSEN11 | 08B6 | TSENS | 0893 | TSENS0 | 08AF | TSENS1 | 08B1 |
| TSENS2 | 08CF | TSENS3 | 08CC | TSLOT | 0800 | TSLOT3 | 0817 | TX | 0A19 | TX4 | 0A1B | TX5 | 0A2F | TX6 | 0A42 |
| TX7 | 0A47 | UNLOCK | 0203 | UNSAV | 02D9 | USR1 | 09B8 | USR2 | 09C6 | USR3 | 09DB | USR4 | 09CC | USR5 | 09F3 |
| USR6 | 09D0 | USRMCI | 09A1 | VMA | 0924 | VMA0 | 0931 | VMA2 | 0952 | WAIT0 | 0E46 | WAIT1 | 0E48 | WAITER | 0E44 |
| WIPE | 02EE | WR | 0870 | WR1 | 0877 | WR2 | 087A | XA | 0511 | XAA | 05DB | XAA1 | 0603 | XAA2 | 060F |
| XAA3 | 061E | XAA4 | 062D | XAB | 065D | XAB1 | 0687 | XAB2 | 0692 | XAB2A | 0700 | XAB2A1 | 070F | XAB2B | 075E |
| XB | 04AE | XB1 | 04E3 | XB2 | 0500 | XC | 0ECF | XC1 | 0EDC | XC2 | 0EE8 | XC3 | 0EF3 | XC4 | 0F02 |
| XD | 076D | XD03 | 0D00 | XD04 | 0D93 | XD05 | 00A7 | XD1 | 077C | XD2 | 00C7 | XD3 | 0E79 | XD4 | 0EA2 |
| XEND | 0532 | XQUO | 047F | XQUO1 | 048C | XQUO2 | 049F | XQUO3 | 04AD | ZA | 042D | ZC | 045A |

ASSEMBLY COMPLETE, NO ERRORS

```
LOC  OBJ        LINE   SOURCE STATEMENT 1
                2   ;****************************************************************
                3
                4   ;   VMA OPERATIONAL SOFTWARE...VERSION 4.2
                5
                6   ;   ***CHECK HERE WHEN THIS VERSION OBSOLETE: __
                7
                8   ;   COPYRIGHT 1983 BY Q-COM, INC.
                9
               10   ;   AUTHOR: T. LAPP
               11
               12   ;   ASSEMBLY DATE: 10-11-83
               13   ;   (THIS VERSION REQUIRES
               14   ;   2 IDENTICAL COMMANDS
               15   ;   TO CAUSE POSITION CHANGE.)
               16
               17   ;   !!! REQUIRES 3.579545 MHZ CRYSTAL !!!
               18
               19
               20   ;****************************************************************
               21
0000           22              ORG 0
0000 0434      23              JMP INIT
               24
               25
0007           26              ORG 7
0007 8918      27              ORL P1,#00011000B
0009 8AFF      28              ORL P2,#0FFH
000B 2400      29              JMP TMRINT          ; TIMER INTERRUPT.
               30
               31
               32   MAINLP:
000D 5400      33              CALL TWAIT
000F 35        34              DIS TCNTI
0010 B820      35              MOV R0,#32D
0012 2342      36              MOV A,#(LOW RX0)
0014 A0        37              MOV @R0,A
0015 3418      38              CALL COMM           ; UPDATE RECEIVED DATA BUFFER
0017 25        39              EN TCNTI
               40
0018 54D0      41              CALL INITCX
               42
               43   T1L0:
001A 99DF      44              ANL P1,#11011111B   ; PILOT LED ON.
001C 8624      45              JNI T1L1
001E 74E1      46              CALL SAMCOM         ; WAIT FOR 2 IDENT
0020 968D      47              JNZ MAINLP          ; BEFORE MOVING VENT.
0022 0426      48              JMP T1L2
               49   T1L1:
0024 349B      50              CALL MANVMA
               51   T1L2:
0026 7400      52              CALL MAGIN
               53   T1L3:
0028 5400      54              CALL TWAIT
```

```
002A 544B    55          CALL POSADJ         ; VENT POSITION ADJUST.
             56
002C 7408    57          CALL SENSE          ; UPDATE VENT STATUS BASED
             58                              ; ON MAGNET COUNTING.
             59
002E B628    60          JF0 T1L3
0030 7628    61          JF1 T1L3
0032 0480    62          JMP MAINLP
             63
             64 $EJECT
             65
             66 ;==========================================================
             67
             68 ;           INITIALIZATION ROUTINE...RESPONSIBLE FOR
             69 ;                TYPE-DEPENDENT SYSGEN.  IN VENT
             70 ;                CONTROL MODE (TYPE 1), THE NUMBER
             71 ;                OF RACK TEETH (TUTHMX) IS COUNTED
             72 ;                BY CLOSING VENT ALL THE WAY, AND
             73 ;                THEN OPENING ALL THE WAY, AND
             74 ;                COUNTING TEETH.
             75
             76 ;           THE COMMUNICATION FUNCTION IS INITIAL-
             77 ;                IZED AS: ASYNCHRONOUS, X64, EVEN-PARITY,
             78 ;                8-BIT CHARACTERS, AND SINGLE STOP BIT.
             79
             80 ;==========================================================
             81
             82       INIT:
0034 993F    83          ANL P1,#001111111B
             84                                  ; MOTOR OFF (IF THIS IS A
             85                                  ; VENT CONTROLLER).
0036 7488    86          CALL STWAIT
0038 7488    87          CALL STWAIT
             88
003A 27      89          CLR A
003B B83F    90          MOV R0,#63D
003D 891F    91          MOV R1,#31D
             92       ICLR:
003F A0      93          MOV @R0,A              ; CLEAR RAM.
0040 C8      94          DEC R0
0041 E93F    95          DJNZ R1,ICLR
             96
0043 74CE    97          CALL ADDR
             98
0045 B828    99          MOV R0,#32D            ; INITIALIZE COMM PROTOCOL.
0047 2342   100          MOV A,#(LOW RX0)
0049 A0     101          MOV @R0,A
            102
            103
            104                                 ; THIS IS A VENT CONTROLLER.
            105       INIT3:
004A 99DF   106          ANL P1,#110111111B     ; PILOT LED ON.
004C 7464   107          CALL CLCHK             ; CLOSED-LIMIT CHECK.
004E C676   108          JZ .INIT2
            109
0050 85     110          CLR F0
0051 A5     111          CLR F1
```

```
0052 B5        112            CPL F1
0053 8980      113            ORL P1,#10000000B      ; CLOSE VENT.
0055 8A        114            IN A,P2
0056 8AFF      115            ORL P2,#0FFH
0058 433F      116            ORL A,#00111111B       ; TEST FOR FULL OPEN OR
               117                                   ; TORQUE LIMITS.
005A 37        118            CPL A                  ; ACC=0 FOR NO LIMITS.
005B C64A      119            JZ INIT3
               120
005D 14CB      121            CALL TYMLIM
005F 044A      122            JMP INIT3
               123    INIT4:
0061 993F      124            ANL P1,#00111111B      ; MOTOR OFF!!!
0063 B5        125            CLR F0
0064 A5        126            CLR F1
0065 3411      127            CALL TMRRST
0067 8680      128            JNI MAINLP
               129
0069 7480      130            CALL STWAIT
006B 09        131            IN A,P1
006C B272      132            JB5 WARN3
006E 8920      133            ORL P1,#00100000B
0070 0461      134            JMP INIT4
               135    WARN3:
0072 990F      136            ANL P1,#11011111B
0074 0461      137            JMP INIT4              ; LIMIT VIOLATION, MOTOR
               138                                   ; GOING WRONG WAY,
               139                                   ; OR IT'S JUST STUCK (TORQUE).
               140            ; ENDLESS LOOP... REQUIRES RESET (POWER OFF/ON)
               141            ;                      FOR RECOVERY.
               142
               143    INIT2:
0076 993F      144            ANL P1,#00111111B
0078 A5        145            CLR F1
               146                                   ; MOTOR OFF.
               147
0079 8A        148            IN A,P2
               149
007A 37        150            CPL A
007B 928B      151            JB4 VINIT3             ; BYPASS 3 MIN WAIT IF
               152                                   ; CPU PIN 35 IS GROUNDED
               153                                   ; AT THIS TIME ( TO FACILITATE
               154                                   ; FACTORY TEST PROCEDURE ).
007D 868B      155            JNI VINIT3             ; ALSO BYPASS WAIT IF MANUAL MODE
               156                                   ; IS ACTIVATED.
007F B8FF      157            MOV R0,#255D
0081 B9FF      158    VINIT0: MOV R1,#255D
0083 BAFF      159    VINIT1: MOV R2,#255D
0085 EA85      160    VINIT2: DJNZ R2,VINIT2
0087 E983      161            DJNZ R1,VINIT1
0089 E881      162            DJNZ R0,VINIT0         ; 3 MINUTE WAIT.
               163
               164    VINIT3:
008B 25        165            EN TCNTI
008C 55        166            STRT T
008D 3411      167            CALL TMRRST
008F 040D      168            JMP MAINLP
```

```
                    169
                    170
                    171 $EJECT
                    172     UART:              ; SERIAL DATA IN ON PIN 1.
                    173                        ; XTAL = 3.579545 MHZ.
0091 BB2D           174           MOV R3,#2D
0093 EB93           175     HERE: DJNZ R3,HERE
0095 BF00           176           MOV R7,#0
0097 BE00           177           MOV R6,#0
0099 BD08           178           MOV R5,#8D
009B BC01           179           MOV R4,#00000001B
                    180     UARTL0:
009D 74C4           181           CALL MS
009F 26A6           182           JNT0 UARTL1
00A1 FC             183           MOV A,R4
00A2 7485           184           CALL ONE
00A4 04A8           185           JMP UARTL2
                    186     UARTL1:
00A6 7488           187           CALL ZERO
                    188     UARTL2:
00A8 FC             189           MOV A,R4
00A9 E7             190           RL A
00AA AC             191           MOV R4,A
00AB ED9D           192           DJNZ R5,UARTL0
                    193
00AD 74C4           194           CALL MS
00AF 26B6           195           JNT0 UARTL3
                    196
00B1 FE             197           MOV A,R6
00B2 37             198           CPL A
00B3 AE             199           MOV R6,A
00B4 04BB           200           JMP UARTL4
                    201     UARTL3:
00B6 00             202           NOP
00B7 00             203           NOP
00B8 00             204           NOP
00B9 00             205           NOP
00BA 00             206           NOP
                    207     UARTL4:
00BB B841           208           MOV R0,#65D
00BD EBBD           209     UARTL5: DJNZ R0,UARTL5
                    210
00BF FE             211           MOV A,R6
00C0 96C9           212           JNZ UARTL6
00C2 FF             213           MOV A,R7
00C3 B821           214           MOV R0,#33D
00C5 A0             215           MOV @R0,A        ; STORE BYTE.
                    216
00C6 27             217           CLR A
00C7 37             218           CPL A
00C8 93             219           RETR
                    220
                    221
                    222     UARTL6:
00C9 27             223           CLR A
00CA 93             224           RETR
                    225
                    226     ; IN THE ABOVE...R7--RX DATA
```

```
                227 ;               R6—PARITY
                228 ;               R5—BIT COUNT
                229 ;               R4—BIT MASK
                230
                231 $EJECT
                232
                233
                234
                235     TMLIM:
00CB 8604       236             JNI TLIM0
00CD B934       237             MOV R1,#52D
00CF 23FF       238             MOV A,#255D
00D1 A1         239             MOV @R1,A
00D2 04D5       240             JMP TLIM1
                241     TLIM0:
00D4 83         242             RET
                243     TLIM1:
00D5 74DB       244             CALL SENSE
00D7 B9FF       245             MOV R1,#255D
                246     TLIM6:
00D9 8AFF       247             ORL P2,#0FFH
00DB 0A         248             IN A,P2
00DC F2E0       249             JB7 TLIM2
00DE 04F1       250             JMP TLIM3
                251     TLIM2:
00E0 B6E5       252             JF0 TLIM4
00E2 76EC       253             JF1 TLIM5
00E4 83         254             RET
                255     TLIM4:
00E5 8AFF       256             ORL P2,#0FFH
00E7 0A         257             IN A,P2
00E8 B2D4       258             JB5 TLIM0
00EA 04F1       259             JMP TLIM3
                260     TLIM5:
00EC 8AFF       261             ORL P2,#0FFH
00EE 0A         262             IN A,P2
00EF D2D4       263             JB6 TLIM0
                264     TLIM3:
00F1 00         265             NOP
00F2 00         266             NOP
00F3 E9D9       267             DJNZ R1,TLIM6
00F5 B934       268             MOV R1,#52D
00F7 F1         269             MOV A,@R1
00F8 07         270             DEC A
00F9 A1         271             MOV @R1,A
00FA 96D5       272             JNZ TLIM1
00FC 0461       273             JMP INIT4
                274
                275 $EJECT
                276
0100            277             ORG 100H
                278
                279 ;==========================================
                280
                281 ;       TIMER INTERRUPT ROUTINE...
                282
                283 ;                   USED FOR TIMING THE 10 SEC
```

```
                        284 ;                    DEAD ZONE REQUIRED AFTER EACH
                        285 ;                    MOTOR TURN-OFF.
                        286
                        287 ;========================================================
                        288
                        289            TMRINT:
0100 D5                 290                    SEL RB1
0101 AF                 291                    MOV R7,A
                        292
0102 B824               293            .       MOV R0,#36D
0104 F0                 294 ,                  MOV A,@R0
0105 17                 295                    INC A
0106 AE                 296                    MOV R6,A
0107 D3FB               297                    XRL A,#251D         ; TEN SEC MARK PLUS ONE COUNT.
0109 9680               298                    JNZ TMR1
010B FF                 299                    MOV A,R7
010C 93                 300                    RETR
                        301
                        302            TMR1:
010D FE                 303                    MOV A,R6
010E A0                 304                    MOV @R0,A
010F FF                 305                    MOV A,R7
0110 93                 306                    RETR
                        307
                        308 ; END OF TIMER INTERRUPT ROUTINE.
                        309
                        310 $EJECT
                        311
                        312
                        313 ;========================================================
                        314
                        315 ;          TIMER RESET ROUTINE...
                        316 ;                  STARTS TIMER AGAIN AT ZERO.
                        317
                        318 ;========================================================
                        319
                        320            TMRRST:
0111 B824               321                    MOV R0,#36D
0113 27                 322                    CLR A
0114 A0                 323                    MOV @R0,A
0115 25                 324                    EN TCNTI
0116 55                 325                    STRT T
0117 93                 326                    RETR
                        327
                        328 $EJECT
                        329
                        330
                        331
                        332 ;========================================================
                        333
                        334 ;          DATA COMMUNICATIONS ROUTINE...
                        335 ;                  SOFTWARE IMPLEMENTATION
                        336 ;                  OF THE UART FUNCTION.
                        337
                        338 ;  NOTE: MANY FEATURES OF THIS INTERFACE
                        339 ;        ARE HIGHLY DEPENDENT ON THE MESSAGE
                        340 ;        SEQUENCING AND PROTOCOL DEFINED FOR
```

```
                341 ;            EACH OPERATIONAL MODE.
                342 ;
                343 ;=========================================
                344
                345         COMM:
0118 861E       346.            JF0 COMM1
011A 761E       347             JF1 COMM1
011C 241F       348             JMP COMM2
011E 83         349     COMM1:  RET
011F 2627       350     COMM2:  JNT0 COMM3      ; T0 CARRIES RXD
0121 993F       351             ANL P1,#00111111B       ; BE SURE MOTOR OFF.
0123 861E       352             JNI COMM1
0125 241F       353             JMP COMM2
                354     COMM3:
0127 00         355             NOP
0128 00         356             NOP
0129 00         357             NOP
012A 00         358             NOP
012B 00         359             NOP
012C 74C9       360             CALL HALFNS
012E 00         361             NOP
012F 00         362             NOP
0130 00         363             NOP
0131 361F       364             JT0 COMM2
0133 1491       365             CALL UART
0135 963E       366             JNZ COMM5
0137 B820       367     COMM4:  MOV R0,#32D
0139 2342       368             MOV A,#(LOW RX0)
013B A0         369             MOV @R0,A
013C 241F       370             JMP COMM2
                371     COMM5:
013E B820       372             MOV R0,#32D
0140 F0         373             MOV A,@R0
                374
0141 B3         375             JMPP @A
                376
                377
                378
0142 43         379     RX0:    DB (LOW RX0+1)          ; WAIT FOR FRAMING BYTE.
0143 B821       380             MOV R0,#33D
0145 F0         381             MOV A,@R0
0146 D3FF       382             XRL A,#0FFH
0148 9637       383             JNZ COMM4
014A C8         384             DEC R0
014B 2350       385             MOV A,#(LOW RX1)
014D A0         386             MOV @R0,A
014E 241F       387             JMP COMM2
                388
0150 51         389     RX1:    DB (LOW RX1+1)
0151 345E       390             CALL XRX1
0153 241F       391             JMP COMM2
                392
0155 56         393     RX2:    DB (LOW RX2+1)
0156 3479       394             CALL XRX2
0158 241F       395             JMP COMM2
                396
015A 5B         397     RX3:    DB (LOW RX3+1)
```

```
015B 3491      398            CALL XRX3
015D 83        399            RET
               400
               401
               402     XRX1:
               403                            ; TEST TO SEE IF MOST
               404                            ; MOST RECENTLY RECEIVED
               405                            ; BYTE IS LS PART OF
               406                            ; MCI ADDRESS.
015E B82D      407            MOV R0,#45D
0160 F0        408            MOV A,@R0
0161 AF        409            MOV R7,A         ; T0TP IN R7.
               410
0162 B821      411            MOV R0,#33D
0164 F0        412            MOV A,@R0        ; GET RECEIVED BYTE.
0165 DF        413            XRL A,R7
0166 C673      414            JZ XRX11
0168 F0        415            MOV A,@R0
0169 D3FF      416            XRL A,#0FFH      ; SYNC BYTE ?
016B C672      417            JZ XRX10
               418                             ; WRONG ADDRESS.
016D B820      419            MOV R0,#32D
016F 2342      420            MOV A,#(LOW RX0)
0171 A0        421            MOV @R0,A        ; UPDATE STATUS BYTE.
               422     XRX10:
0172 93        423            RETR
               424
               425     XRX11:
0173 B820      426            MOV R0,#32D      ; LS ADDR MATCHES.
0175 2355      427            MOV A,#(LOW RX2)
0177 A0        428            MOV @R0,A
0178 93        429            RETR
               430
               431     XRX2:
0179 8AFF      432            ORL P2,#0FFH     ; TEST TO SEE IF
               433                             ; MOST RECENTLY RECEIVED
               434                             ; BYTE IS MS PART OF ADDRESS.
017B B82E      435            MOV R0,#46D
017D F0        436            MOV A,@R0
017E AF        437            MOV R7,A         ; T2T1 IN R7.
               438
017F B821      439            MOV R0,#33D
0181 F0        440            MOV A,@R0        ; GET RECEIVED BYTE.
0182 DF        441            XRL A,R7
0183 C68B      442            JZ XRX21
               443
0185 B820      444            MOV R0,#32D      ; WRONG ADDR.
0187 2342      445            MOV A,#(LOW RX0)
0189 A0        446            MOV @R0,A        ; UPDATE STATUS.
               447
018A 93        448            RETR
               449     XRX21:                  ; WHOLE ADDRESS MATCHES.
               450
               451
               452     VENT:
018B B820      453            MOV R0,#32D
018D 235A      454            MOV A,#(LOW RX3) ; LOOK FOR VENT PERCENT NEXT.
```

```
018F A0         455              MOV @R0,A
0190 93         456              RETR
                457
                458
                459      XRX3:
0191 8695       460              JNI IGCOMM          ; IGNORE COMM IN MAN MODE.
0193 5408       461              CALL VDATA          ; UPDATE "TUTHST"
                462      IGCOMM:
                463
                464
0195 B820       465              MOV R0,#320
0197 2342       466              MOV A,#(LOW RX0)
0199 A0         467              MOV @R0,A           ; UPDATE STATUS.
019A 93         468              RETR
                469
                470 $EJECT
                471
                472
                473      MANVMA:
                474                                  ; MANUAL OVERRIDE HANDLER.
019B 86C1       475              JF0 MVMAL0
019D 76C1       476              JF1 MVMAL0
019F 8918       477              ORL P1,#00011000B
01A1 09         478              IN A,P1
01A2 37         479              CPL A
01A3 5318       480              ANL A,#00011000B    ; BIT 3 HI FOR MAN CLOSE.
                481                                  ; BIT 4 HI FOR MAN OPEN.
                482                                  ; ACC=0 FOR MAN STOP.
01A5 7480       483              CALL STWAIT         ; SWITCH DEBOUNCE LATENCY.
01A7 96C9       484              JNZ MVMAL1
01A9 993F       485              ANL P1,#00111111B
01AB 869B       486              JNI MANVMA
                487      MVMAL2:
01AD 5400       488              CALL TWAIT
01AF 8980       489              ORL P1,#10000000B
01B1 8A20       490              ORL P2,#00100000B
01B3 7464       491              CALL CLCHK
01B5 96AD       492              JNZ MVMAL2
01B7 B823       493              MOV R0,#35D
01B9 A0         494              MOV @R0,A
01BA C8         495              DEC R0
01BB A0         496              MOV @R0,A
01BC 993F       497              ANL P1,#00111111B
01BE 3411       498              CALL TWRRST
01C0 83         499              RET
                500      MVMAL0:
01C1 993F       501              ANL P1,#00111111B   ; STOP MOTOR.
01C3 85         502              CLR F0
01C4 A5         503              CLR F1
01C5 3411       504              CALL TWRRST
01C7 249B       505              JMP MANVMA
                506      MVMAL1:
01C9 72E2       507              JB3 MANC
                508      MANO:
01CB 5400       509              CALL TWAIT
01CD 86D5       510              JNI MANO1
01CF 993F       511              ANL P1,#00111111B
```

```
01D1 3411      512              CALL TWRRST
01D3 24AD      513              JMP MVMAL2
               514      MANO1:
01D5 8940      515              ORL P1,#01000000B ; OPEN.
01D7 09        516              IN A,P1
01D8 92DC      517              JB4 MANO2
01DA 24CB      518              JMP MANO
               519      MANO2:
01DC 993F      520              ANL P1,#00111111B
01DE 3411      521              CALL TWRRST
01E0 249B      522              JMP MANVMA
               523      MANC:
01E2 5400      524              CALL TWAIT
01E4 86EC      525              JNI MANC1
01E6 993F      526              ANL P1,#00111111B
01E8 3411      527              CALL TWRRST
01EA 24AD      528              JMP MVMAL2
               529      MANC1:
01EC 8980      530              ORL P1,#10000000B ; CLOSE.
01EE 09        531              IN A,P1
01EF 72F3      532              JB3 MANC2
01F1 24E2      533              JMP MANC
               534      MANC2:
01F3 993F      535              ANL P1,#00111111B
01F5 3411      536              CALL TWRRST
01F7 249B      537              JMP MANVMA
               538
               539
               540
0200           541              ORG 0200H
               542
               543      TWAIT:
0200 B824      544              MOV R0,#36D
0202 F0        545              MOV A,@R0
0203 D3FA      546              XRL A,#250D
0205 9600      547              JNZ TWAIT
0207 93        548              RETR
               549
               550
               551
               552
               553      VDATA:                        ; UPDATE TUTHST
               554
               555      ; FIND THE NUMBER OF RACK TEETH CORRESPONDING TO THE
               556      ; RECEIVED DATA.
               557
0208 B821      558              MOV R0,#33D
020A F0        559              MOV A,@R0
020B AF        560              MOV R7,A           ; GET BCD DATA.
020C 6489      561              JMP NUMCK
               562      NUMRET:
020E 64A8      563              JMP PREV           ; ALLOW TUTHST UPDATE
               564                                 ; ONLY AFTER 2 IDENT
               565                                 ; COMMANDS REC'D
               566      PREVR:
0210 B82B      567              MOV R0,#43D
0212 A0        568              MOV @R0,A          ; STORE BCD.
```

```
0213 530F      569              ANL A,#00001111B    ; ISOLATE LSN.
0215 AB        570              MOV R3,A
               571
0216 FF        572              MOV A,R7
0217 53F0      573              ANL A,#11110000B
0219 47        574              SWAP A
021A AC        575              MOV R4,A
               576
021B B825      577              MOV R0,#37D
021D F0        578              MOV A,@R0           ; GET TUTHMX
021E C64A      579              JZ VRET             ; INIT NOT YET DONE.
0220 AD        580              MOV R5,A
               581
0221 27        582              CLR A
0222 AF        583              MOV R7,A
0223 AE        584              MOV R6,A
0224 AA        585              MOV R2,A
0225 A9        586              MOV R1,A
               587
0226 FB        588              MOV A,R3
0227 C62D      589              JZ VDATA1
               590   VDATA0:
0229 543D      591              CALL SETINC
022B EB29      592              DJNZ R3,VDATA0
               593   VDATA1:
022D FC        594              MOV A,R4
022E C638      595              JZ VDATA2
               596   VDATA3:
0230 B90A      597              MOV R1,#10D
               598   VDATA4:
0232 543D      599              CALL SETINC
0234 E932      600              DJNZ R1,VDATA4
0236 EC30      601              DJNZ R4,VDATA3
               602   VDATA2:
0238 B822      603              MOV R0,#34D         ; STORE NEW TUTHST.
023A FF        604              MOV A,R7
023B A0        605              MOV @R0,A
023C 93        606              RETR
               607
               608   SETINC:
023D FD        609              MOV A,R5
023E AA        610              MOV R2,A            ; GET TUTHMX.
               611   SETIN1:
023F 1E        612              INC R6
0240 FE        613              MOV A,R6
0241 D364      614              XRL A,#100D
0243 9648      615              JNZ SETIN2
0245 1F        616              INC R7
0246 BE00      617              MOV R6,#0
               618   SETIN2:
0248 EA3F      619              DJNZ R2,SETIN1
               620
               621   VRET:
024A 93        622              RETR
               623
               624
               625
               626   $EJECT
```

```
627
628
629
630 ;==============================================
631
632 ;          VENT POSITION ADJUST ROUTINE...
633
634 ;     THIS SUBROUTINE COMPARES CURRENT VENT POSITION WITH
635 ;     THAT COMMANDED, AND TAKES APPROPRIATE MOTOR CONTROL
636 ;     ACTION. COMMANDS TO START THE MOTOR ARE FORCED TO
637 ;     COMMENCE NO SOONER THAN TEN SECONDS AFTER THE
638 ;     MOTOR WAS LAST TURNED OFF.
639
640 ;==============================================
641
642       POSADJ:
024B 8658  643       JNI    POS1
024D B822  644       MOV    R0,#34D
024F B923  645       MOV    R1,#35D
0251 F0    646       MOV    A,@R0         ; GET TUTHST.
0252 AF    647       MOV    R7,A
           648
0253 F1    649       MOV    A,@R1         ; GET TUTHCT.
0254 AE    650       MOV    R6,A
0255 DF    651       XRL    A,R7
0256 965F  652       JNZ    POS3          ; JMP IF TUTHCT.NE.TUTHST.
           653       POS1:
0258 993F  654       ANL    P1,#001111111B ; TURN MOTOR OFF.
025A 3411  655       CALL   TMRRST        ; RESET 10 SEC TIMER.
025C A5    656       CLR    F1
025D 85    657       CLR    F0
           658       POS2:
025E 83    659       RET
           660
           661       POS3:
           662
           663
           664 ;          VENT IS NOT AT DESIRED POSITION. FIRST
           665 ;     DETERMINE APPROPRIATE MOTOR DIRECTION (OPEN/CLOSE). IF
           666 ;     TUTHCT.LT.TUTHST, THEN WE NEED TO OPEN VENT MORE. IF
           667 ;     TUTHCT.GT.TUTHST, THEN WE NEED TO CLOSE VENT MORE.
           668 ;     WE FIND OUT WHICH IS GREATER BY INCREMENTING A
           669 ;     REGISTER WHICH INITIALLY CONTAINS TUTHCT. IF WE
           670 ;     REACH TUTHST BEFORE WE REACH FFH, THEN WE KNOW THAT
           671 ;     TUTHCT.LT.TUTHST, AND THEREFORE THE VENT MUST BE
           672 ;     COMMANDED TO OPEN FURTHER. ON THE OTHER HAND, IF WE
           673 ;     REACH FFH FIRST, THEN WE KNOW THAT TUTHCT.GT.TUTHST,
           674 ;     AND SO WE MUST CLOSE THE VENT.
           675
           676 ;     ACTUAL COMMAND TO OPEN OR CLOSE IS PRECEDED BY A
           677 ;     CHECK FOR LIMIT VIOLATIONS, AND A CHECK TO BE SURE THAT 10
           678 ;     SEC. HAVE ELAPSED SINCE LAST MOTOR TURN-OFF (EITHER
           679 ;     DIRECTION).
           680
           681 ;     F0 IS SET WHEN MOTOR IS OPENING VENT; F1 WHEN CLOSING.
           682
025F 1E    683       INC    R6
```

```
0260 FF       684            MOV A,R7
0261 DE       685            XRL A,R6
0262 C66B     686            JZ OPEN
0264 23FF     687            MOV A,#0FFH
0266 DE       688            XRL A,R6
0267 C69A     689            JZ CLOSE
0269 445F     690            JMP POS3
              691
              692    OPEN:
026B 7472     693            CALL OLCHK      ; OPEN-LIMIT CHECK.
026D C68D     694            JZ POS4         ; JMP IF FULL OPEN.
026F 0A       695            IN A,P2
0270 437F     696            ORL A,#01111111B ; IF NOT AT TORQUE LIMIT, ACC=FFH.
0272 37       697            CPL A
0273 C677     698            JZ POS5
              699
0275 14CB     700            CALL TYMLIM     ; TORQUE CHECK.
              701    ; NO LIMITS SET.
              702
              703    POS5:
0277 7693     704            JF1 POS6        ; JMP IF MOTOR NOW CLOSING.
0279 B824     705            MOV R0,#36D
027B F0       706            MOV A,@R0
027C D3FA     707            XRL A,#250D
027E 968C     708            JNZ POS7        ; JMP IF NOT YET 10 SEC.
              709
0280 997F     710            ANL P1,#01111111B ; DISABLE CLOSING.
0282 8940     711            ORL P1,#01000000B ; ENABLE OPENING.
0284 85       712            CLR F0
0285 95       713            CPL F0          ; SET "OPENING" FLAG.
              714
              715
0286 7464     716            CALL CLCHK      ; CLOSED LIMIT CHECK.
0288 968C     717            JNZ POS7        ; JMP IF NOT FULL CLOSED.
028A 14CB     718            CALL TYMLIM
              719
              720    POS7:
028C 83       721            RET
              722    POS4:
028D B823     723            MOV R0,#35D     ; PUT TUTHMX IN TUTHCT,
              724                            ; SINCE WE KNOW THAT WE ARE AT
              725                            ; FULL-OPEN.
028F B925     726            MOV R1,#37D
0291 F1       727            MOV A,@R1
0292 A0       728            MOV @R0,A
              729    POS6:
0293 993F     730            ANL P1,#00111111B ; TURN MOTOR OFF.
0295 A5       731            CLR F1
0296 85       732            CLR F0
0297 3411     733            CALL TMRRST
              734
0299 83       735            RET
              736
              737    CLOSE:
029A 7464     738            CALL CLCHK      ; CLOSED-LIMIT CHECK.
029C C6C5     739            JZ POS8         ; JMP IF FULL CLOSED.
              740
```

```
029E 0A      741              IN A,P2
029F 437F    742              ORL A,#01111111B    ; IF NOT AT TORQUE LIMIT,
             743                                  ; ACC=FFH.
02A1 37      744              CPL A
02A2 C6A6    745              JZ POS9
             746
02A4 14CB    747              CALL TYMLIM         ; TORQUE CHECK.
             748                                  ; NO LIMITS SET.
             749
             750     POS9:
             751
02A6 B6C9    752              JF0 POS10           ; JMP IF NOW OPENING.
02A8 B824    753              MOV R0,#36D
02AA F0      754              MOV A,@R0
02AB D3FA    755              XRL A,#25BD
02AD 96C4    756              JNZ POS12           ; JMP IF NOT YET 10 SEC.
             757
02AF 99BF    758              ANL P1,#10111111B   ; DISABLE OPENING.
02B1 8980    759              ORL P1,#10000000B   ; ENABLE CLOSING.
             760
02B3 A5      761              CLR F1
02B4 B5      762              CPL F1              ; SET CLOSING FLAG.
             763
             764
02B5 7472    765              CALL OLCHK          ; OPEN LIMIT CHECK.
02B7 96B8    766              JNZ POS11           ; JMP IF NOT FULL OPEN.
02B9 14CB    767              CALL TYMLIM
             768     POS11:
02BB B822    769              MOV R0,#34D
02BD F0      770              MOV A,@R0           ; GET TUTHST.
02BE 96C4    771              JNZ POS12
02C0 86C4    772              JNI POS12
02C2 449A    773              JMP CLOSE           ; WAIT FOR LIMIT SWITCH IN THIS
             774                                  ; LOOP WHEN TUTHST=0.
             775     POS12:
02C4 83      776              RET
             777
             778     POS8:
02C5 B823    779              MOV R0,#35D
02C7 27      780              CLR A               ; SET TUTHCT=0, SINCE
02C8 A0      781              MOV @R0,A           ; VENT CLOSED.
             782
             783
             784     POS10:
02C9 993F    785              ANL P1,#00111111B   ; TURN MOTOR OFF.
             786
02CB A5      787              CLR F1
02CC 85      788              CLR F0
02CD 3411    789              CALL THRRST
             790
02CF 83      791              RET
             792
             793
             794     ; END OF POSITION-ADJUST ROUTINE...
             795
             796     $EJECT
             797
```

```
                    798         INITCK:
0200 B827           799                 MOV R0,#39D
0202 F0             800                 MOV A,@R0
0203 C606           801                 JZ ICK1
0205 83             802                 RET
                    803         ICK1:
0206 B832           804                 MOV R0,#50D
0208 F0             805                 MOV A,@R0
0209 960C           806                 JNZ ICK2
020B 83             807                 RET
                    808         ICK2:
020C 7441           809                 CALL TUTHSN
020E B827           810                 MOV R0,#39D
0210 23FF           811                 MOV A,#0FFH
0212 A0             812                 MOV @R0,A
0213 B832           813                 MOV R0,#50D
0215 F0             814                 MOV A,@R0
0216 B821           815                 MOV R0,#33D
0218 A0             816                 MOV @R0,A
0219 5408           817                 CALL VDATA
021B 93             818                 RETR
                    819
                    820 $EJECT
                    821
                    822
                    823
                    824
0300                825                 ORG 300H
                    826
                    827
                    828
                    829
                    830
                    831 ;===========================================
                    832
                    833 ;         MAGNET-SENSING ROUTINE...
                    834
                    835
                    836 ;===========================================
                    837         MAGIN:          ; MAGNET PRESENCE INITIALIZATION.
0300 B82C           838                 MOV R0,#44D
0302 4608           839                 JNT1 MAG1
0304 2301           840                 MOV A,#1
0306 6409           841                 JMP MAG2
                    842         MAG1:
0308 27             843                 CLR A
                    844         MAG2:
0309 A0             845                 MOV @R0,A
                    846
030A 93             847                 RETR
                    848
                    849         SENSE:
030B B82C           850                 MOV R0,#44D
030D F0             851                 MOV A,@R0       ; 1 IF T1 HI
                    852                                 ; 0 IF T1 LO
030E C61D           853                 JZ SENSE1
                    854                                 ; LAST=HI
```

```
0310 5637      855              JT1 SENRET      ; NO CHANGE
0312 7438      856              CALL DBNC
0314 5637      857              JT1 SENRET
               858                              ; STILL LO
0316 27        859              CLR A
0317 A0        860              MOV @R0,A
0318 B62B      861              JF0 SENINC
031A 7631      862              JF1 SENDEC
031C 83        863              RET
               864      SENSE1:                 ; LAST=LO
031D 4637      865              JNT1 SENRET     ; NO CHANGE
031F 7438      866              CALL DBNC
0321 4637      867              JNT1 SENRET
               868                              ; STILL HI
0323 2301      869              MOV A,#1
0325 A0        870              MOV @R0,A
0326 B62B      871              JF0 SENINC
0328 7631      872              JF1 SENDEC
032A 83        873              RET
               874
               875      SENINC:
032B B823      876              MOV R0,#35D
032D F0        877              MOV A,@R0
032E 17        878              INC A
032F A0        879              MOV @R0,A
0330 83        880              RET
               881
               882      SENDEC:
0331 B823      883              MOV R0,#35D
0333 F0        884              MOV A,@R0
0334 07        885              DEC A
0335 A0        886              MOV @R0,A
0336 83        887              RET
               888
               889      SENRET:
0337 83        890              RET
               891
               892
               893      DBNC:
0338 BF28      894              MOV R7,#40D
033A BEFF      895      DB1:    MOV R6,#255D
033C EE3C      896      DB2:    DJNZ R6,DB2
033E EF3A      897              DJNZ R7,DB1
0340 83        898              RET
               899
               900 $EJECT
               901
               902      TUTHEN:
0341 7400      903              CALL MAGIN
               904
0343 85        905              CLR F0
0344 95        906              CPL F0
0345 A5        907              CLR F1
               908      INIT6:
0346 8940      909              ORL P1,#01000000B
               910                              ; OPEN VENT.
0348 8658      911              JNI INIT71      ; ESCAPE PATH.
```

```
034A 7408    912             CALL SENSE          ; UPDATE TUTHCT.
034C 0A      913             IN A,P2
034D 435F    914             ORL A,#00101111B   ; TORQUE AND C/L TEST.
034F 37      915             CPL A
0350 C654    916             JZ INIT7            ; JMP ON NO TORQUE LIMIT.
0352 14CB    917             CALL TMLIM
             918     INIT7:
0354 7472    919             CALL OLCHK          ; OPEN LIMIT CHECK.
0356 9646    920             JNZ INIT6           ; JMP IF NOT FULL OPEN.
             921
             922             ; NOW AT FULL OPEN.
             923
             924     INIT71:
0358 85      925             CLR F0
             926
0359 993F    927             ANL P1,#00111111B  ; STOP MOTOR.
035B B83D    928             MOV R0,#3DD
035D B93D    929             MOV R1,#3DD
035F F0      930             MOV A,@R0           ; GET TUTHCT.
0360 A1      931             MOV @R1,A           ; SET TUTHMX.
             932
0361 3411    933             CALL TMRRST
             934
0363 83      935             RET
             936
             937
             938
             939 $EJECT
             940
             941
             942     CLCHK:                      ; CHECK FOR FULL-CLOSED LIMIT
             943                                 ; SWITCH. IF LIMIT SWITCH IS
             944                                 ; DEPRESSED, RETURN ACC=0.
             945                                 ; IF LIMIT SWITCH NOT DEPRESSED,
             946                                 ; RETURN ACC=NOT 0.
0364 B819    947             MOV R0,#25D
             948     CLCHK1:
0366 8AFF    949             ORL P2,#0FFH
0368 0A      950             IN A,P2
0369 8AFF    951             ORL P2,#0FFH
036B 5320    952             ANL A,#00100000B
036D 9671    953             JNZ CLCHK2
036F E866    954             DJNZ R0,CLCHK1
             955     CLCHK2:
0371 93      956             RETR
             957
             958
             959
             960
             961
             962     OLCHK:                      ; CHECK FOR FULL-OPEN LIMIT
             963                                 ; SWITCH. ON RETURN, ACC IS CODED
             964                                 ; IN SAME MANNER AS IN "CLCHK".
0372 B819    965             MOV R0,#25D
             966     OLCHK1:
0374 8AFF    967             ORL P2,#0FFH
0376 0A      968             IN A,P2
```

```
0377 8AFF      969            ORL P2,#0FFH
0379 5340      970            ANL A,#01000000B
037B 967F      971            JNZ OLCHK2
037D E874      972            DJNZ R0,OLCHK1
               973   OLCHK2:
037F 93        974            RETR
               975
               976
               977
               978
               979 $EJECT
               980
               981
               982   STWAIT:
0380 B8FF      983            MOV R0,#255D
0382 B9FF      984   STL1:    MOV R1,#255D
0384 E984      985   STL2:    DJNZ R1,STL2
0386 E882      986            DJNZ R0,STL1
0388 93        987            RETR
               988
               989
               990
               991
               992
               993 $EJECT
               994
               995
               996
               997
               998
               999
              1000
              1001   NUMCK:                    ; CHECK TO SEE IF RECEIVED
              1002                             ; VENT % IS A VALID BCD VALUE.
0389 530F     1003            ANL A,#00001111B
038B 749C     1004            CALL CHK
038D C690     1005            JZ NUMCK1
038F 93       1006            RETR
              1007   NUMCK1:
0390 FF       1008            MOV A,R7
0391 53F0     1009            ANL A,#11110000B
0393 47       1010            SWAP A
0394 749C     1011            CALL CHK
0396 C699     1012            JZ NUMCK2
0398 93       1013            RETR
              1014   NUMCK2:
0399 FF       1015            MOV A,R7
039A 440E     1016            JMP NUMRET
              1017
              1018   CHK:
039C AB       1019            MOV R3,A
039D C6A7     1020            JZ CHK0
039F B809     1021            MOV R0,#9D
              1022   CHK1:
03A1 FB       1023            MOV A,R3
03A2 D8       1024            XRL A,R0
03A3 C6A7     1025            JZ CHK0
```

```
03A5 E8A1      1026              DJNZ R0,CHK1
               1027      CHK0:
03A7 93        1028              RETR
               1029
               1030
               1031 $EJECT
               1032
               1033
               1034      PREV:
03A8 B832      1035              MOV R0,#50D
03AA F0        1036              MOV A,@R0
03AB DF        1037              XRL A,R7
03AC C6B2      1038              JZ PREV1
03AE FF        1039              MOV A,R7
03AF A0        1040              XCH A,@R0
03B0 444A      1041              JMP VRET
               1042      PREV1:
03B2 FF        1043              MOV A,R7
03B3 4410      1044              JMP PREVR
               1045
               1046
               1047 $EJECT
               1048
               1049      ONE:
03B5 4F        1050              ORL A,R7
03B6 AF        1051              MOV R7,A
03B7 FE        1052              MOV A,R6
03B8 37        1053              CPL A
03B9 AE        1054              MOV R6,A
               1055
03BA 93        1056              RETR
               1057
               1058      ZERO:
03BB 00        1059              NOP
03BC 00        1060              NOP
03BD 00        1061              NOP
03BE 00        1062              NOP
03BF 00        1063              NOP
03C0 00        1064              NOP
03C1 00        1065              NOP
03C2 00        1066              NOP
               1067
03C3 93        1068              RETR
               1069
               1070      M6:
03C4 74C9      1071              CALL HALFMS
03C6 74C9      1072              CALL HALFMS
03C8 93        1073              RETR
               1074
               1075      HALFMS:        ; ONE MILLISEC, BUT
               1076                     ; ADJUSTED FOR OTHER
               1077                     ; DELAYS IN CALLING
               1078                     ; ROUTINE (UART).
03C9 B833      1079              MOV R0,#51D
03CB E8CB      1080      HMSL1:  DJNZ R0,HMSL1
03CD 93        1081              RETR
               1082
               1083 $EJECT
```

```
                          1084
                          1085     ADDR:          ; READ ADDRESS SWITCHES
                          1086                    ; ON POWER-UP.
03CE B82D                 1087            MOV R0,#45D
03D0 8D                   1088            MOVD A,P5
03D1 00                   1089            NOP
03D2 8D                   1090            MOVD A,P5
03D3 530F                 1091            ANL A,#0FH
03D5 4310                 1092            ORL A,#10H
03D7 47                   1093            SWAP A
03D8 A0                   1094            MOV @R0,A        ; STORE T0TP
03D9 18                   1095            INC R0
03DA 8E                   1096            MOVD A,P6
03DB 00                   1097            NOP
03DC 8E                   1098            MOVD A,P6
03DD 530F                 1099            ANL A,#0FH
03DF A0                   1100            MOV @R0,A        ; STORE T2T1
03E0 93                   1101            RETR
                          1102     SAMCOM:
03E1 B82B                 1103            MOV R0,#43D
03E3 F0                   1104            MOV A,@R0
03E4 A9                   1105            MOV R1,A
03E5 B832                 1106            MOV R0,#50D
03E7 F0                   1107            MOV A,@R0
03E8 D9                   1108            XRL A,R1
03E9 93                   1109            RETR
                          1110
                          1111            END
```

USER SYMBOLS

| | | | | | | | | | | | | | | | |
|---|---|---|---|---|---|---|---|---|---|---|---|---|---|---|---|
| ADDR | 03CE | CHK | 039C | CHK0 | 03A7 | CHK1 | 03A1 | CLCHK | 0364 | CLCHK1 | 0366 | CLCHK2 | 0371 | CLOSE | 029A |
| COMM | 0118 | COMM1 | 011E | COMM2 | 011F | COMM3 | 0127 | COMM4 | 0137 | COMM5 | 013E | DB1 | 033A | DB2 | 033C |
| DBNC | 0338 | HALFMS | 03C9 | HERE | 0093 | HMSL1 | 03CB | ICK1 | 02D6 | ICK2 | 02DC | ICLR | 003F | IGCOMM | 0195 |
| INIT | 0034 | INIT2 | 0076 | INIT3 | 004A | INIT4 | 0061 | INIT6 | 0346 | INIT7 | 0354 | INIT71 | 0358 | INITCK | 0200 |
| MAG1 | 0308 | MAG2 | 0309 | MAGIN | 0300 | MAINLP | 000D | MANC | 01E2 | MANC1 | 01EC | MANC2 | 01F3 | MANO | 01CB |
| MANO1 | 01D5 | MANO2 | 01DC | MANVMA | 0198 | MS | 03C4 | MVMAL0 | 01C1 | MVMAL1 | 01C9 | MVMAL2 | 01AD | NUMCK | 0389 |
| NUMCK1 | 0390 | NUMCK2 | 0399 | NUMRET | 020E | OLCHK | 0372 | OLCHK1 | 0374 | OLCHK2 | 037F | ONE | 0385 | OPEN | 0268 |
| POS1 | 0258 | POS10 | 02C9 | POS11 | 02BB | POS12 | 02C4 | POS2 | 025E | POS3 | 025F | POS4 | 028D | POS5 | 0277 |
| POS6 | 0293 | POS7 | 028C | POS8 | 02C5 | POS9 | 02A6 | POSADJ | 024B | PREV | 03A8 | PREV1 | 03B2 | PREVR | 0210 |
| RX0 | 0142 | RX1 | 0150 | RX2 | 0155 | RX3 | 015A | SAMCOM | 03E1 | SENDEC | 0331 | SENINC | 032B | SENRET | 0337 |
| SENSE | 030B | SENSE1 | 031D | SETIN1 | 023F | SETIN2 | 0248 | SETINC | 023D | STL1 | 0382 | STL2 | 0384 | STWAIT | 0388 |
| T1L0 | 001A | T1L1 | 0024 | T1L2 | 0026 | T1L3 | 0028 | TLIM0 | 00D4 | TLIM1 | 00D5 | TLIM2 | 00E9 | TLIM3 | 00F1 |
| TLIM4 | 00E5 | TLIM5 | 00EC | TLIM6 | 00D9 | TMR1 | 010D | TMRINT | 0100 | TMRRST | 0111 | TUTHSN | 0341 | TWAIT | 0200 |
| TYMLIM | 00CB | UART | 0091 | UARTL0 | 009D | UARTL1 | 00A6 | UARTL2 | 00A8 | UARTL3 | 00B6 | UARTL4 | 00BB | UARTL5 | 00BD |
| UARTL6 | 00C9 | VDATA | 0208 | VDATA0 | 0229 | VDATA1 | 022D | VDATA2 | 0238 | VDATA3 | 0230 | VDATA4 | 0232 | VENT | 018B |
| VINIT0 | 0081 | VINIT1 | 0083 | VINIT2 | 0085 | VINIT3 | 008B | VRET | 024A | WARN3 | 0072 | XRX1 | 015E | XRX10 | 0172 |
| XRX11 | 0173 | XRX2 | 0179 | XRX21 | 018D | XRX3 | 0191 | ZERO | 03BB | | | | | | |

ASSEMBLY COMPLETE,   NO ERRORS

```
LOC  OBJ       LINE      SOURCE STATEMENT 1
                          2
                          3  ;========================================
                          4
                          5  ;        SENSOR SOFTWARE...INDOOR AND OUTDOOR
                          6
                          7  ;        USED WITH HARDWARE DEFINED AS:  PC102A
```

```
8
9  ;       SOFTWARE FILE NAMES:  PC102A.SRC
10 ;                                     .LST
11 ;                                     .HEX
12
13 ;       SOFTWARE VERSION: 1.1
14 ;       COPYRIGHT 11-25-83 BY Q-COM, INC.
15
16
17 ;===============================================
18
19
20
21
0000            22              ORG 000H
                23
0000 1422       24              CALL INIT
0002 0410       25              JMP MAINLP
                26
                27
0010            28              ORG 010H
                29
                30
                31      MAINLP:
0010 34AD       32              CALL AUTOR
0012 261A       33              JNT0 PATGEN
0014 5618       34              JT1 MLP1
0016 144C       35              CALL COMM
                36      MLP1:
0018 0410       37              JMP MAINLP
                38
                39
                40      PATGEN:
001A 2300       41              MOV A,#00001101B
001C 9AEF       42              ANL P2,#11101111B
001E 3473       43              CALL SEND
0020 0400       44              JMP 000H
                45
                46 $EJECT
                47
                48
                49
                50
                51
                52      INIT:
0022 89FF       53              ORL P1,#0FFH
0024 8AFF       54              ORL P2,#0FFH
0026 90         55              MOVX @R0,A            ; ADC START PULSE GEN.
0027 B81E       56              MOV R0,#30D
0029 B93F       57              MOV R1,#63D
002B 27         58              CLR A
                59      INITL1:
002C A1         60              MOV @R1,A
002D C9         61              DEC R1
002E E82C       62              DJNZ R0,INITL1
                63
0030 09         64              IN A,P1               ; BIT 6 HIGH (JUMPER CUT) FOR
```

```
                                    65                                  ; OUTDOOR SENSOR. BIT 6 LOW
                                    66                                  ; FOR INDOOR SENSOR.
                                    67
0031 D23E                           68              JB6 INITL2
0033 37                             69              CPL A
0034 530F                           70              ANL A,#00001111B    ; INVERT NEG LOGIC.
                                    71
                                    72
0036 4320                           73              ORL A,#00100000B    ; PREFIX "2"
                                    74      INITL3:
0038 47                             75              SWAP A
0039 B83C                           76              MOV R0,#60D
003B A0                             77              MOV @R0,A           ; T0TP IN LOC 60
003C 0445                           78              JMP INITL4
                                    79      INITL2:
003E 37                             80              CPL A
003F 530F                           81              ANL A,#00001111B
                                    82                                  ; INVERT NEG LOGIC.
0041 4330                           83              ORL A,#00110000B    ; PREFIX "3"
0043 0438                           84              JMP INITL3
                                    85
                                    86      INITL4:
0045 0A                             87              IN A,P2
0046 37                             88              CPL A               ; INVERT NEG LOGIC.
0047 530F                           89              ANL A,#00001111B
0049 C8                             90              DEC R0
004A A0                             91              MOV @R0,A           ; T2T1 IN LOC 59
                                    92
004B 93                             93              RETR
                                    94
                                    95  $EJECT
                                    96
                                    97
                                    98
                                    99      COMM:
004C 00                            100              NOP
004D 00                            101              NOP
004E 344E                          102              CALL HALFNS
0050 00                            103              NOP
0051 00                            104              NOP
0052 00                            105              NOP
0053 00                            106              NOP
0054 565A                          107              JT1 COMM1
0056 3400                          108              CALL UART
0058 965C                          109              JNZ COMM2
                                   110      COMM1:
005A 0400                          111              JMP 0000H
                                   112      COMM2:
                                   113                                  ; ASSEMBLED CHAR READY.
005C B830                          114              MOV R0,#61D
005E F0                            115              MOV A,@R0
005F C669                          116              JZ SED0
0061 07                            117              DEC A
0062 C674                          118              JZ SED1
0064 07                            119              DEC A
0065 C68B                          120              JZ SED2
0067 045A                          121              JMP COMM1
```

```
                122
                123 $EJECT
                124
                125
                126
                127         SEQ0:
0069 17         128             INC A
006A A0         129             MOV @R0,A
006B 18         130             INC R0
006C F0         131             MOV A,@R0        ; GET RX BYTE.
006D D3FF       132             XRL A,#0FFH
006F C673       133             JZ SEQ0L1
0071 045A       134             JMP COMM1
                135         SEQ0L1:
0073 93         136             RETR
                137
                138 $EJECT
                139
                140
                141
                142         SEQ1:
0074 B83E       143             MOV R0,#3ED
0076 F0         144             MOV A,@R0
0077 AF         145             MOV R7,A
0078 B83C       146             MOV R0,#3CD
007A F0         147             MOV A,@R0        ; CHECK FOR TOTP MATCH.
007B DF         148             XRL A,R7
007C C685       149             JZ SEQ1L1
007E 23FF       150             MOV A,#0FFH      ; IF THIS BYTE IS FFH, THEN
0080 DF         151             XRL A,R7         ; PREVIOUS FFH WAS POSS
0081 C68A       152             JZ SEQ1L2        ; MCI-100 DATA IN ALL ONES
                153                              ; CONFIGURATION. THUS, STAY
                154                              ; IN 'SEQ1' MODE.
0083 045A       155             JMP COMM1
                156         SEQ1L1:
0085 B83D       157             MOV R0,#3DD
0087 2302       158             MOV A,#20
0089 A0         159             MOV @R0,A        ; UPDATE 'SEQ'
                160         SEQ1L2:
008A 93         161             RETR
                162
                163 $EJECT
                164
                165
                166
                167         SEQ2:
008B B83E       168             MOV R0,#3ED
008D F0         169             MOV A,@R0
008E AF         170             MOV R7,A
008F B83B       171             MOV R0,#3BD
0091 F0         172             MOV A,@R0
0092 DF         173             XRL A,R7
0093 C697       174             JZ SEQ2L1
0095 045A       175             JMP COMM1
                176         SEQ2L1:
0097 B83C       177             MOV R0,#3CD
0099 F0         178             MOV A,@R0
```

```
009A 12B0    179              JB0 OUTDAT            ; JMP FOR OUTDOOR SENSOR.
             180      INDAT:
009C 09      181              IN A,P1
009D 92A4    182              JB4 INDAT1            ; JMP FOR DAY.
009F 8920    183              ORL P1,#00100000B     ; DAY LED OFF.
00A1 27      184              CLR A
00A2 04A8    185              JMP SEQ2L2
             186      INDAT1:
00A4 99DF    187              ANL P1,#11011111B     ; DAY LED ON.
00A6 2301    188              MOV A,#1              ; DATA = DAY.
             189      SEQ2L2:
00A8 B835    190              MOV R0,#S3D
00AA A0      191              MOV @R0,A
             192
00AB 90      193              MOVX @R0,A            ; START ADC.
             194
00AC 3453    195              CALL TX
00AE 045A    196              JMP COMM1
             197
             198      OUTDAT:
00B0 0A      199              IN A,P2
00B1 37      200              CPL A
00B2 D2B8    201              JB6 ODAT1
00B4 8A80    202              ORL P2,#10000000B     ; RAIN LED OFF.
00B6 B2BD    203              JB5 ODAT2
00B8 27      204              CLR A
00B9 04A8    205              JMP SEQ2L2
             206      ODAT1:
00BB 9A7F    207              ANL P2,#01111111B     ; RAIN LED ON.
             208      ODAT2:
00BD 2301    209              MOV A,#1
             210
00BF 04A8    211              JMP SEQ2L2
             212
             213
             214
             215
             216
             217
0100         218              ORG 100H
             219
             220
             221      UART:                         ; RECEIVE AND DECODE SERIAL
             222                                    ; DATA ON PIN 39 (T1).
             223                                    ; ON ENTRY, TIME IS MIDDLE OF
             224                                    ; START BIT. ON EXIT, ACC=0
             225                                    ; MEANS NO BYTE SUCCESSFULLY
             226                                    ; RECEIVED. ACC=NOT 0 MEANS
             227                                    ; BYTE SUCCESSFULLY RECEIVED.
             228
0100 BB04    229              MOV R3,#4D
0102 EB02    230      HERE:   DJNZ R3,HERE
0104 BF00    231              MOV R7,#0
0106 BE00    232              MOV R6,#0
0108 BD08    233              MOV R5,#8D
010A BC01    234              MOV R4,#00000001B
             235      UARTL0:
```

```
010C 3449    236             CALL NS
010E 4615    237             JNT1 UARTL1
0110 FC      238             MOV A,R4
0111 343A    239             CALL ONE
0113 2417    240             JMP UARTL2
             241     UARTL1:
0115 3440    242             CALL ZERO
             243     UARTL2:
0117 FC      244             MOV A,R4
0118 E7      245             RL A
0119 AC      246             MOV R4,A
011A EDOC    247             DJNZ R5,UARTL0
             248
011C 3449    249             CALL NS
011E 4625    250             JNT1 UARTL3
             251
0120 FE      252             MOV A,R6
0121 37      253             CPL A
0122 AE      254             MOV R6,A
0123 242A    255             JMP UARTL4
             256     UARTL3:
0125 00      257             NOP
0126 00      258             NOP
0127 00      259             NOP
0128 00      260             NOP
0129 00      261             NOP
             262     UARTL4:
012A B841    263             MOV R0,#65D
012C EB2C    264     UARTL5: DJNZ R0,UARTL5
             265
012E FE      266             MOV A,R6
012F 9638    267             JNZ UARTL6
             268
0131 FF      269             MOV A,R7
0132 B83E    270             MOV R0,#62D
0134 A0      271             MOV @R0,A
             272
0135 27      273             CLR A
0136 37      274             CPL A
             275
0137 93      276             RETR
             277
             278     UARTL6:
0138 27      279             CLR A
0139 93      280             RETR
             281
             282     ; IN THE ABOVE...R7—RX DATA
             283     ;                 R6—PARITY
             284     ;                 R5—BIT COUNT
             285     ;                 R4—BIT MASK
             286
             287 $EJECT
             288
             289
             290
             291     ONE:
013A 4F      292             ORL A,R7
```

```
0139 AF        293              MOV R7,A
013C FE        294              MOV A,R6
013D 37        295              CPL A
013E AE        296              MOV R6,A
               297
013F 93        298              RETR
               299
               300
               301     ZERO:
0140 00        302              NOP
0141 00        303              NOP
0142 00        304              NOP
0143 00        305              NOP
0144 00        306              NOP
0145 00        307              NOP
0146 00        308              NOP
0147 00        309              NOP
               310
0148 93        311              RETR
               312
               313 $EJECT
               314
               315
               316     MS:
0149 344E      317              CALL HALFMS
014B 344E      318              CALL HALFMS
014D 93        319              RETR
               320
               321     HALFMS:
014E B833      322              MOV R0,#51D
0150 E850      323     HMSL1:   DJNZ R0,HMSL1
0152 93        324              RETR
               325
               326 $EJECT
               327
               328
               329
               330
               331
               332
               333
               334
               335     TX:
0153 8980      336              ORL P1,#01000000B     ; TXD=1
0155 9AEF      337              ANL P2,#11101111B     ; RTSBAR=0
0157 BE08      338              MOV R6,#8D
0159 34A0      339              CALL AUTOR
015B BDFF      340     TX1:     MOV R5,#255D
015D EDD0      341     TX2:     DJNZ R5,TX2
015F EE5B      342              DJNZ R6,TX1            ; 17 MS WAIT
               343
0161 B834      344              MOV R0,#52D
0163 80        345              MOVX A,@R0             ; READ ADC.
0164 A0        346              MOV @R0,A              ; STORE TEMP.
0165 34A0      347              CALL AUTOR
0167 3473      348              CALL SEND              ; SEND TEMP
0169 B835      349              MOV R0,#53D
```

```
016B F0         350              MOV A,@R0
016C 34A0       351              CALL AUTOR
016E 3473       352              CALL SEND           ; SEND SEC BYTE
                353
0170 8A10       354              ORL P2,#00010000B   ; RTSBAR=1
                355
0172 93         356              RETR
                357
                358
                359 $EJECT
                360
                361
                362      SEND:                       ; SEND BYTE IN ACC AT
                363                                  ; 1000 BPS, LSB FIRST,
                364                                  ; APPEND EVEN PARITY.
                365
0173 A5         366              CLR F1              ; PARITY COUNTER
0174 997F       367              ANL P1,#01111111B   ; START BIT
0176 00         368              NOP
0177 00         369              NOP
0178 00         370              NOP
0179 00         371              NOP
017A 34A8       372              CALL BITYM          ; 238 INSTR CYCLES
                373                                  ; (1 BIT TIME=238.6 CYCLES)
017C BF08       374              MOV R7,#8D
                375      SEND0:
                376
                377
017E 1284       378              JB0 SEND1
0180 997F       379              ANL P1,#01111111B
0182 2488       380              JMP SEND2
                381      SEND1:
0184 8980       382              ORL P1,#10000000B
0186 B5         383              CPL F1
0187 00         384              NOP
                385      SEND2:
0188 77         386              RR A
0189 34A8       387              CALL BITYM
018B EF7E       388              DJNZ R7,SEND0
018D 7693       389              JF1 SEND3
018F 997F       390              ANL P1,#01111111B
0191 2497       391              JMP SEND4
                392      SEND3:
0193 8980       393              ORL P1,#10000000B
0195 00         394              NOP
0196 00         395              NOP
                396      SEND4:
0197 34A8       397              CALL BITYM
0199 00         398              NOP
019A 00         399              NOP
019B 00         400              NOP
019C 00         401              NOP
019D 00         402              NOP
019E 00         403              NOP
019F 8980       404              ORL P1,#10000000B
01A1 BF06       405              MOV R7,#6D
                406      SEND5:
```

```
01A3 34A8       407             CALL BITYM
01A5 EFA3       408             DJNZ R7,SEND5
                409
01A7 93         410             RETR
                411
                412
                413     BITYM:
                414                                     ; 230 INSTR CYCLES,
                415                                     ; INCLUDING THE CALL.
01A8 BB7D       416             MOV R3,#112D
01AA EBAA       417     BTYM1:  DJNZ R3,BTYM1
                418
01AC 93         419             RETR
                420
                421     AUTOR:
01AD 8A80       422             ORL P2,#10000000B
01AF 9A7F       423             ANL P2,#01111111B
01B1 8A80       424             ORL P2,#10000000B
01B3 93         425             RETR
                426
                427
                428                     END
```

USER SYMBOLS
AUTOR  01AD   BITYM  01A8   BTYM1  01AA   COMM   004C   COMM1  005A   COMM2  005C   HALFMS 014E   HERE   0102
HMSL1  0150   INDAT  009C   INDAT1 00A4   INIT   0022   INITL1 002C   INITL2 003E   INITL3 0038   INITL4 0045
MAINLP 0010   MLP1   0018   MS     0149   ODAT1  00BB   ODAT2  00BD   ONE    013A   OUTDAT 00B0   PATGEN 001A
SEND   0173   SEND0  017E   SEND1  0184   SEND2  0188   SEND3  0193   SEND4  0197   SEND5  01A3   SEQ0   0069
SEQ0L1 0073   SEQ1   0074   SEQ1L1 0085   SEQ1L2 008A   SEQ2   008B   SEQ2L1 0097   SEQ2L2 00A8   TX     0153
TX1    015B   TX2    015D   UART   0100   UARTL0 010C   UARTL1 0115   UARTL2 0117   UARTL3 0125   UARTL4 012A
UARTL5 012C   UARTL6 0138   ZERO   0148

ASSEMBLY COMPLETE, NO ERRORS

```
LOC OBJ         LINE    SOURCE STATEMENT 1
                2
                3
                4
                5
                6
                7
                8
                9
                10
                11
                12
                13
                14
                15
                16      ;**************************************************************
                17
                18      ; REMOTE MCI SOFTWARE.... R-COM
                19
                20      ;               VERSION 2.3
                21      ; (REQUIRES 2 IDENTICAL
                22      ; COMMANDS TO BE RECEIVED
```

```
23 ; BEFORE ANY ACTION TAKEN.)
24
25 ;     USE WITH PREFIXES 4,5,6,7 (NOT 8)
26
27 ;************************************************
28
29
30 $EJECT
31
32
0000              33              ORG 0000H
                  34
0000 1410         35              CALL INIT
0002 0404         36              JMP MAINLP
                  37
                  38
                  39      MAINLP:
0004 7458         40              CALL AUTOR      ; AUTO-RESET STROBE UPDATE.
0006 B835         41              MOV R0,#53D
0008 F0           42              MOV A,@R0
0009 02           43              OUTL BUS,A      ; BUS STATE CONFIRMATION.
000A 560E         44              JT1 MLP1
000C 1448         45              CALL COMM
                  46      MLP1:
000E 0404         47              JMP MAINLP
                  48
                  49 $EJECT
                  50
                  51
                  52      INIT:                   ; TURN OFF ALL RELAYS.  CLEAR
                  53                              ; RAM SCRATCHPAD.  SET COMM SEQUENCE
                  54                              ; BYTE TO ZERO.  READ AND STORE
                  55                              ; T0T0 AND T2T1.
0010 27           56              CLR A
0011 02           57              OUTL BUS,A
                  58
0012 89FF         59              ORL P1,#0FFH
0014 8AFF         60              ORL P2,#0FFH
0016 B81E         61              MOV R0,#30D
0018 B93F         62              MOV R1,#63D
                  63      INITL1:
001A A1           64              MOV @R1,A
001B C9           65              DEC R1
001C E81A         66              DJNZ R0,INITL1
001E D5           67              SEL RB1
001F B835         68              MOV R0,#53D
0021 B936         69              MOV R1,#54D
0023 BA0C         70              MOV R2,#12D
0025 BB0D         71              MOV R3,#13D
0027 BC0E         72              MOV R4,#14D
0029 BD0F         73              MOV R5,#15D
002B BE10         74              MOV R6,#16D
002D BF11         75              MOV R7,#17D
002F C5           76              SEL RB0
0030 1433         77              CALL ADDR        ; READ ADDRESS FROM PINS.
0032 93           78              RETR
                  79
```

```
                80        ADDR:
0033 89FF       81                  ORL P1,#0FFH
0035 8AFF       82                  ORL P2,#0FFH
0037 0A         83                  IN  A,P2
0038 530F       84                  ANL A,#00001111B
003A AF         85                  MOV R7,A
003B 09         86                  IN  A,P1
003C 53F0       87                  ANL A,#11110000B
003E 4F         88                  ORL A,R7                ; ACC=T0TP.
003F B83C       89                  MOV R0,#60D
0041 A0         90                  MOV @R0,A               ; STORE T0TP.
0042 09         91                  IN  A,P1
0043 530F       92                  ANL A,#00001111B
0045 C8         93                  DEC R0
0046 A0         94                  MOV @R0,A               ; STORE T2T1.
0047 93         95                  RETR
                96
                97 $EJECT
                98
                99
                100
                101       COMM:
0048 B832       102                 MOV R0,#50D
004A E84A       103       COMM0:    DJNZ R0,COMM0
004C 5652       104                 JT1 COMM1
004E 7400       105                 CALL UART
0050 9659       106                 JNZ COMM2
                107       COMM1:
0052 27         108                 CLR A
0053 B830       109                 MOV R0,#61D
0055 A0         110                 MOV @R0,A               ; RESET COMM SEQ BYTE.
0056 1433       111                 CALL ADDR               ; RE-READ ADDRESS FROM PINS.
0058 93         112                 RETR
                113       COMM2:
                114                                         ; ASSEMBLED CHARACTER READY.
0059 B830       115                 MOV R0,#61D
005B F0         116                 MOV A,@R0
005C C669       117                 JZ  SEQ0
005E 07         118                 DEC A
005F C674       119                 JZ  SEQ1
0061 07         120                 DEC A
0062 C68B       121                 JZ  SEQ2
0064 07         122                 DEC A
0065 C690       123                 JZ  SEQ3
0067 0452       124                 JMP COMM1
                125
                126 $EJECT
                127
                128
                129
                130       SEQ0:
0069 17         131                 INC A
006A A0         132                 MOV @R0,A               ; INCREMENT 'SEQ'
006B 18         133                 INC R0
006C F0         134                 MOV A,@R0               ; GET RX BYTE.
006D D3FF       135                 XRL A,#0FFH
006F C673       136                 JZ  SEQ0L1
```

```
0071 0452      137              JMP COMM1
               138      SEQ0L1:
0073 93        139              RETR
               140
               141 $EJECT
               142
               143
               144      SEQ1:
0074 B83E      145              MOV R0,#62D
0076 F0        146              MOV A,@R0
0077 AF        147              MOV R7,A
0078 B83C      148              MOV R0,#60D
007A F0        149              MOV A,@R0              ; CHECK FOR T0T P MATCH.
007B DF        150              XRL A,R7
007C C685      151              JZ SEQ1L1
007E 23FF      152              MOV A,#0FFH            ; IF THIS BYTE IS FFH, THEN
0080 DF        153              XRL A,R7               ; PREVIOUS FFH WAS PROBABLY
0081 C68A      154              JZ SEQ1L2              ; NCI-108 DATA IN ALL ONES
               155                                     ; CONFIGURATION. THUS, STAY
               156                                     ; IN "SEQ1" MODE.
0083 0452      157              JMP COMM1
               158      SEQ1L1:
0085 B83D      159              MOV R0,#61D
0087 2302      160              MOV A,#2D
0089 A0        161              MOV @R0,A              ; UPDATE 'SEQ'
               162      SEQ1L2:
008A 93        163              RETR
               164
               165 $EJECT
               166
               167
               168      SEQ2:
008B B83E      169              MOV R0,#62D
008D F0        170              MOV A,@R0
008E AF        171              MOV R7,A
008F B83D      172              MOV R0,#59D
0091 F0        173              MOV A,@R0              ; CHECK FOR T2T1 MATCH.
0092 DF        174              XRL A,R7
0093 C697      175              JZ SEQ2L1
0095 0452      176              JMP COMM1
               177      SEQ2L1:
0097 B83D      178              MOV R0,#61D
0099 2303      179              MOV A,#3D
009B A0        180              MOV @R0,A              ; UPDATE 'SEQ'
               181
009C 93        182              RETR
               183
               184 $EJECT
               185
               186
               187
               188      SEQ3:
009D B834      189              MOV R0,#52D
009F F0        190              MOV A,@R0
00A0 AF        191              MOV R7,A               ; PREVIOUS COMMAND.
00A1 B83E      192              MOV R0,#62D
00A3 F0        193              MOV A,@R0
```

```
00A4 DF          194              XRL A,R7
00A5 96D1        195              JNZ SEQ3L6
00A7 FF          196              MOV A,R7
00A8 B835        197              MOV R0,#35D
00AA A0          198              MOV @R0,A      ; UPDATE BUS IMAGE.
00AB 18          199              INC R0
00AC A0          200              MOV @R0,A      ; OTHER BUS IMAGE.
00AD B83C        201              MOV R0,#60D
00AF F0          202              MOV A,@R0                    ; FETCH T0TP.
00B0 530F        203              ANL A,00001111B
00B2 AF          204              MOV R7,A
                 205      SEQ3L1:
00B3 2307        206              MOV A,#7D
00B5 DF          207              XRL A,R7
00B6 968A        208              JNZ SEQ3L2
00B8 2400        209              JMP M100       ; MCI-100.
                 210      SEQ3L2:
00BA 2306        211              MOV A,#6D
00BC DF          212              XRL A,R7
00BD 96C1        213              JNZ SEQ3L3
00BF 04D7        214              JMP M101       ; MCI-101.
                 215      SEQ3L3:
00C1 2305        216              MOV A,#5D
00C3 DF          217              XRL A,R7
00C4 96C8        218              JNZ SEQ3L4
00C6 04D7        219              JMP M101       ; MCI-101.
                 220      SEQ3L4:
00C8 2304        221              MOV A,#4D
00CA DF          222              XRL A,R7
00CB 96CF        223              JNZ SEQ3L5
00CD 04D7        224              JMP M101       ; MCI-101.
                 225      SEQ3L5:
00CF 0452        226              JMP COMM1
                 227      SEQ3L6:
00D1 F0          228              MOV A,@R0
00D2 B834        229              MOV R0,#52D
00D4 A0          230              MOV @R0,A      ; UPDATE HISTORY.
00D5 0452        231              JMP COMM1
                 232
                 233
                 234 $EJECT
                 235
                 236
                 237      M101:
00D7 B03E        238              MOV R0,#62D
00D9 F0          239              MOV A,@R0
00DA 96DF        240              JNZ M101L1
00DC 27          241              CLR A
00DD 04E4        242              JMP M101L2
                 243      M101L1:
00DF 07          244              DEC A
00E0 96E5        245              JNZ M101L3
00E2 27          246              CLR A
00E3 37          247              CPL A
00E4 02          248      M101L2:  OUTL BUS,A
00E5 0452        249      M101L3:  JMP COMM1
                 250
```

```
                251 $EJECT
                252
                253
0100            254             ORG 0100H
                255
                256     M100:
0100 B83E       257             MOV R0,#62D
0102 BA80       258             MOV R2,#10000000B       ; OUTPUT MASK.
0104 BB08       259             MOV R3,#8D
                260     M100L1:
0106 F0         261             MOV A,@R0
0107 5A         262             ANL A,R2
0108 A9         263             MOV R1,A
0109 08         264             INS A,BUS
010A 49         265             ORL A,R1
010B 02         266             OUTL BUS,A
010C F9         267             MOV A,R1
010D 9615       268             JNZ M100L2
010F FA         269             MOV A,R2
0110 37         270             CPL A
0111 A9         271             MOV R1,A
0112 08         272             INS A,BUS
0113 59         273             ANL A,R1
0114 02         274             OUTL BUS,A
                275
                276     M100L2:
0115 FA         277             MOV A,R2
0116 77         278             RR A
0117 AA         279             MOV R2,A
0118 341E       280             CALL DELAY
011A EB06       281             DJNZ R3,M100L1
011C 0452       282             JMP COMM1
                283
                284     DELAY:
011E BC01       285             MOV R4,#1       ; 1 SEC DELAY (CAN
                286                             ; BE ADJUSTED FOR
                287                             ; LONGER INTERVALS)
0120 BDFA       288     DELAY1: MOV R5,#250D            ; 1 SEC
0122 BE04       289     DELAY2: MOV R6,#4D             ; 4 MSEC
0124 7458       290             CALL AUTOR             ; AUTO-RESET STROBE.
0126 7453       291     DELAY3: CALL MILSEC
0128 EE26       292             DJNZ R6,DELAY3
012A ED22       293             DJNZ R5,DELAY2
012C EC20       294             DJNZ R4,DELAY1
012E 93         295             RETR
                296
                297 $EJECT
                298
                299
                300
                301
                302
                303
                304
                305
                306
                307
```

```
                308
0300            309             ORG 0300H
                310
                311
                312     UART:                   ; RECEIVE AND DECODE
                313                             ; SERIAL DATA ON PIN 39 (T1).
                314                             ; ON ENTRY, TIME IS MIDDLE OF
                315                             ; THE START BIT. ON EXIT,
                316                             ; ACC=0 MEANS NO BYTE SUCCESSFULLY
                317                             ; RECEIVED. ACC=NOT 0 MEANS BYTE
                318                             ; SUCCESSFULLY RECEIVED.
                319
                320
0300 BB04       321             MOV R3,#4D
0302 EB02       322     HERE:   DJNZ R3,HERE
0304 BF00       323             MOV R7,#0       ; RXDATA.
0306 BE00       324             MOV R6,#0       ; PARITY.
0308 BD08       325             MOV R5,#8D      ; BIT COUNT.
030A BC01       326             MOV R4,#00000001B ; BIT MASK.
                327     UARTL0:
030C 7449       328             CALL MS
030E 4615       329             JNT1 UARTL1
0310 FC         330             MOV A,R4
0311 743A       331             CALL ONE
0313 6417       332             JMP UARTL2
                333     UARTL1:
0315 7440       334             CALL ZERO
                335     UARTL2:
0317 FC         336             MOV A,R4
0318 E7         337             RL A
0319 AC         338             MOV R4,A
031A ED0C       339             DJNZ R5,UARTL0
                340
031C 7449       341             CALL MS
031E 4625       342             JNT1 UARTL3
                343
0320 FE         344             MOV A,R6
0321 37         345             CPL A
0322 AE         346             MOV R6,A
0323 642A       347             JMP UARTL4
                348     UARTL3:
0325 00         349             NOP
0326 00         350             NOP
0327 00         351             NOP
0328 00         352             NOP
0329 00         353             NOP
                354     UARTL4:
032A B841       355             MOV R0,#65D
032C E82C       356     UARTL5: DJNZ R0,UARTL5
                357
032E FE         358             MOV A,R6
032F 9638       359             JNZ UARTL6
                360
0331 FF         361             MOV A,R7
0332 B83E       362             MOV R0,#62D
0334 A0         363             MOV @R0,A
                364
```

```
0335 27      365              CLR A
0336 37      366              CPL A
             367
0337 93      368              RETR
             369
             370    UARTL6:
0338 27      371              CLR A
0339 93      372              RETR
             373
             374 $EJECT
             375
             376
             377    ONE:
033A 4F      378              ORL A,R7
033B AF      379              MOV R7,A
033C FE      380              MOV A,R6
033D 37      381              CPL A
033E AE      382              MOV R6,A
             383
033F 93      384              RETR
             385
             386
             387    ZERO:
0340 00      388              NOP
0341 00      389              NOP
0342 00      390              NOP
0343 00      391              NOP
0344 00      392              NOP
0345 00      393              NOP
0346 00      394              NOP
0347 00      395              NOP
034A 93      396              RETR
             397
             398
             399 $EJECT
             400
             401
             402
             403
             404
             405
             406
             407
             408
             409
             410    NS:
0349 744E    411              CALL HALFMS
034B 744E    412              CALL HALFMS
034D 93      413              RETR
             414
             415
             416
             417    HALFMS:
034E B833    418              MOV R0,#51D
0350 E850    419    HMSL1:    DJNZ R0,HMSL1
0352 93      420              RETR
             421
```

```
                        422
                        423             MILSEC:
0353 BF73               424                     MOV  R7,#115D
0355 EF55               425     MILL1:  DJNZ R7,MILL1
0357 93                 426                     RETR
                        427
                        428 $EJECT
                        429
                        430
                        431
                        432             AUTOR:          ; AUTO-RESET STROBE UPDATE.
0358 D5                 433                     SEL  RB1
0359 F0                 434                     MOV  A,@R0          ; CHECK FOR
035A D1                 435                     XRL  A,@R1          ; IDENTICAL STORED
035B 955B               436     AUTOR0: JNZ  AUTOR0         ; BUS IMAGES.
035D 6A                 437                     ADD  A,R2
035E 6B                 438                     ADD  A,R3
035F 6C                 439                     ADD  A,R4
0360 6D                 440                     ADD  A,R5
0361 6E                 441                     ADD  A,R6
0362 6F                 442                     ADD  A,R7
0363 D357               443                     XRL  A,#87D
0365 9665               444     AUTOR1: JNZ  AUTOR1
0367 0A                 445                     IN   A,P2
0368 37                 446                     CPL  A
0369 3A                 447                     OUTL P2,A
036A 93                 448                     RETR
                        449
                        450
                        451             END
```

USER SYMBOLS
ADDR  0033    AUTOR  0358    AUTOR0 035B    AUTOR1 0365    COMM  0048    COMM0 004A    COMM1 0052    COMM2 0059
DELAY 011E    DELAY1 0120    DELAY2 0122    DELAY3 0126    HALFMS 034E   HERE  0302    HMSL1 0350    INIT  0010
INITL1 001A   M101   0007    M101L1 000F    M101L2 00E4    M101L3 00E5   M108  0100    M108L1 0106   M108L2 0115
MAINLP 0004   MILL1  0355    MILSEC 0353    MLP1   000E    MS    0349    ONE   033A    SEQ0  0069    SEQ0L1 0073
SEQ1  0074    SEQ1L1 0085    SEQ1L2 008A    SEQ2   008B    SEQ2L1 0097   SEQ3  0090    SEQ3L1 00B3    SEQ3L2 008A
SEQ3L3 00C1   SEQ3L4 00C8    SEQ3L5 00CF    SEQ3L6 00D1    UART  0300    UARTL0 030C   UARTL1 0315    UARTL2 0317
UARTL3 0325   UARTL4 032A    UARTL5 032C    UARTL6 0338    ZERO  034D

ASSEMBLY COMPLETE,   NO ERRORS
LOC  OBJ        LINE      SOURCE STATEMENT

```
                    1
                    2
                    3
                    4
                    5
                    6
                    7
                    8
                    9
                   10 ; **********************************************************
                   11
                   12 ; REMOTE MCI SOFTWARE.... Q-COM
                   13
                   14 ;         VERSION 1.8
                   15
```

```
16 ; SERVICES REMOTE UNITS WITH PREFIX 8.
17
18 ;################################################
19
20
21 $EJECT
22
23
0000                24              ORG 0000H
                    25
0000 140C           26              CALL INIT
0002 0404           27              JMP MAINLP
                    28
                    29
                    30     MAINLP:
0004 5608           31              JT1 MLP1
0006 142D           32              CALL COMM
                    33     MLP1:
0008 342A           34              CALL ANALOG
000A 0404           35              JMP MAINLP
                    36
                    37 $EJECT
                    38
                    39
                    40     INIT:                        ; TURN OFF ALL RELAYS. SET MCI-201
                    41                                  ; OUTPUT VOLTAGE TO ZERO. CLEAR
                    42                                  ; RAM SCRATCHPAD. SET COMM SEQUENCE
                    43                                  ; BYTE TO ZERO. READ AND STORE
                    44                                  ; T0TP AND T2T1.
000C 27             45              CLR A
000D 02             46              OUTL BUS,A
                    47
000E 89FF           48              ORL P1,#0FFH
0010 8AFF           49              ORL P2,#0FFH
0012 9A0F           50              ANL P2,#00001111B    ; VOLTAGE (MCI-201) = 0
0014 B81E           51              MOV R0,#30D
0016 B93F           52              MOV R1,#63D
                    53     INITL1:
0018 A1             54              MOV @R1,A
0019 C9             55              DEC R1
001A E818           56              DJNZ R0,INITL1
                    57
001C 0A             58              IN A,P2
001D 530F           59              ANL A,#00001111B
001F AF             60              MOV R7,A
0020 09             61              IN A,P1
0021 53F0           62              ANL A,#11110000B
0023 4F             63              ORL A,R7             ; ACC=T0TP.
0024 B83C           64              MOV R0,#60D
0026 A0             65              MOV @R0,A            ; STORE T0TP.
0027 09             66              IN A,P1
0028 530F           67              ANL A,#00001111B
002A C8             68              DEC R0
002B A0             69              MOV @R0,A            ; STORE T2T1.
002C 93             70              RETR
                    71
                    72 $EJECT
```

```
                    73
                    74
                    75
                    76          COMM:
002D 00             77              NOP
002E 00             78              NOP
002F 744E           79              CALL HALFMS
0031 00             80              NOP
0032 00             81              NOP
0033 00             82              NOP
0034 00             83              NOP
0035 563B           84              JT1 COMM1
0037 7400           85              CALL UART
0039 9640           86              JNZ COMM2
                    87          COMM1:
003B 27             88              CLR A
003C B83D           89              MOV R0,#61D
003E A0             90              MOV @R0,A              ; RESET COMM SEQ BYTE.
003F 93             91              RETR
                    92          COMM2:
                    93                                     ; ASSEMBLED CHARACTER READY.
0040 B83D           94              MOV R0,#61D
0042 F0             95              MOV A,@R0
0043 C650           96              JZ SEQ0
0045 07             97              DEC A
0046 C65B           98              JZ SEQ1
0048 07             99              DEC A
0049 C672           100             JZ SEQ2
004B 07             101             DEC A
004C C684           102             JZ SEQ3
004E 043B           103             JMP COMM1
                    104
                    105 $EJECT
                    106
                    107
                    108
                    109         SEQ0:
0050 17             110             INC A
0051 A0             111             MOV @R0,A              ; INCREMENT 'SEQ'
0052 18             112             INC R0
0053 F0             113             MOV A,@R0              ; GET RX BYTE.
0054 D3FF           114             XRL A,#0FFH
0056 C65A           115             JZ SEQ0L1
0058 043B           116             JMP COMM1
                    117         SEQ0L1:
005A 93             118             RETR
                    119
                    120 $EJECT
                    121
                    122
                    123         SEQ1:
005B B83E           124             MOV R0,#62D
005D F0             125             MOV A,@R0
005E AF             126             MOV R7,A
005F B83C           127             MOV R0,#60D
0061 F0             128             MOV A,@R0              ; CHECK FOR T0TP MATCH.
0062 DF             129             XRL A,R7
```

```
0063 C66C   130             JZ  SEQ1L1
0065 23FF   131             MOV A,#0FFH         ; IF THIS BYTE IS FFH, THEN
0067 DF     132             XRL A,R7            ; PREVIOUS FFH WAS PROBABLY
0068 C671   133             JZ  SEQ1L2          ; MCI-108 DATA IN ALL ONES
            134                                 ; CONFIGURATION. THUS, STAY
            135                                 ; IN "SEQ1" MODE.
006A 843B   136             JMP COMM1
            137     SEQ1L1:
006C B83D   138             MOV R0,#61D
006E 2302   139             MOV A,#2D
0070 A0     140             MOV @R0,A           ; UPDATE 'SEQ'
            141     SEQ1L2:
0071 93     142             RETR
            143
            144 $EJECT
            145
            146
            147     SEQ2:
0072 B83E   148             MOV R0,#62D
0074 F0     149             MOV A,@R0
0075 AF     150             MOV R7,A
0076 B83B   151             MOV R0,#59D
0078 F0     152             MOV A,@R0           ; CHECK FOR T2T1 MATCH.
0079 DF     153             XRL A,R7
007A C67E   154             JZ  SEQ2L1
007C 843B   155             JMP COMM1
            156     SEQ2L1:
007E B83D   157             MOV R0,#61D
0080 2303   158             MOV A,#3D
0082 A0     159             MOV @R0,A           ; UPDATE 'SEQ'
            160
0083 93     161             RETR
            162
            163 $EJECT
            164
            165
            166
            167     SEQ3:
0084 B83C   168             MOV R0,#60D
0086 F0     169             MOV A,@R0           ; FETCH T0TP.
0087 530F   170             ANL A,#00001111B
0089 AF     171             MOV R7,A
008A 2308   172             MOV A,#8D
008C DF     173             XRL A,R7
008D 9691   174             JNZ SEQ3L1
008F 240F   175             JMP M201            ; MCI-201.
            176     SEQ3L1:
0091 2307   177             MOV A,#7D
0093 DF     178             XRL A,R7
0094 9698   179             JNZ SEQ3L2
0096 04BF   180             JMP M108            ; MCI-108.
            181     SEQ3L2:
0098 2306   182             MOV A,#6D
009A DF     183             XRL A,R7
009B 969F   184             JNZ SEQ3L3
009D 04AF   185             JMP M101            ; MCI-101.
            186     SEQ3L3:
```

```
009F 2305      187            MOV A,#5D
00A1 DF        188            XRL A,R7
00A2 96A6      189            JNZ SEQ3L4
00A4 04AF      190            JMP M101                    ; MCI-101.
               191    SEQ3L4:
00A6 2304      192            MOV A,#4D
00A8 DF        193            XRL A,R7
00A9 96AD      194            JNZ SEQ3L5
00AB 04AF      195            JMP M101                    ; MCI-101.
               196    SEQ3L5:
00AD 043B      197            JMP COMM1
               198
               199
               200 $EJECT
               201
               202
               203    M101:
00AF B83E      204            MOV R0,#62D
00B1 F0        205            MOV A,@R0
00B2 96B7      206            JNZ M101L1
00B4 27        207            CLR A
00B5 04BC      208            JMP M101L2
               209    M101L1:
00B7 07        210            DEC A
00B8 96BD      211            JNZ M101L3
00BA 27        212            CLR A
00BB 37        213            CPL A
00BC 02        214    M101L2: OUTL BUS,A
00BD 043B      215    M101L3: JMP COMM1
               216
               217 $EJECT
               218
               219
               220
               221    M108:
00BF B83E      222            MOV R0,#62D
00C1 BA80      223            MOV R2,#10000000B           ; OUTPUT MASK.
00C3 BB08      224            MOV R3,#8D
               225    M108L1:
00C5 F0        226            MOV A,@R0
00C6 5A        227            ANL A,R2
00C7 A9        228            MOV R1,A
00C8 08        229            INS A,BUS
00C9 49        230            ORL A,R1
00CA 02        231            OUTL BUS,A
00CB F9        232            MOV A,R1
00CC 96D4      233            JNZ M108L2
00CE FA        234            MOV A,R2
00CF 37        235            CPL A
00D0 A9        236            MOV R1,A
00D1 08        237            INS A,BUS
00D2 59        238            ANL A,R1
00D3 02        239            OUTL BUS,A
               240
               241    M108L2:
00D4 FA        242            MOV A,R2
00D5 77        243            RR A
```

```
00D6 AA         244            MOV R2,A
00D7 3400       245            CALL DELAY
00D9 EBC5       246            DJNZ R3,M108L1
00DB 043B       247            JMP COMM1
0100            248            ORG 0100H
                249
                250    DELAY:
0100 BC01       251            MOV R4,#1          ; 1 SEC DELAY (CAN
                252                               ; BE ADJUSTED FOR
                253                               ; LONGER INTERVALS)
0102 BDFA       254    DELAY1: MOV R5,#250D                   ; 1 SEC
0104 BE04       255    DELAY2: MOV R6,#4D                     ; 4 MSEC
0106 745F       256    DELAY3: CALL MILSEC
0108 EE06       257            DJNZ R6,DELAY3
010A ED04       258            DJNZ R5,DELAY2
010C ED02       259            DJNZ R4,DELAY1
010E 93         260            RETR
                261
                262 $EJECT
                263
                264
                265
                266
                267    M201:
010F B83E       268            MOV R0,#62D
0111 F0         269            MOV A,@R0
0112 C626       270            JZ M201L3
0114 53F0       271            ANL A,#11110000B
0116 C61F       272            JZ M201L2
0118 47         273            SWAP A
0119 AF         274            MOV R7,A
011A 27         275            CLR A
                276    M201L1:
011B 030A       277            ADD A,#10D
011D EF1B       278            DJNZ R7,M201L1
                279    M201L2:
011F AF         280            MOV R7,A
0120 F0         281            MOV A,@R0
0121 530F       282            ANL A,#00001111B
0123 6F         283            ADD A,R7
0124 0326       284            ADD A,#38D
                285    M201L3:
0126 18         286            INC R0
0127 A0         287            MOV @R0,A          ; STORE BINARY % PLUS OFFSET.
                288
0128 043B       289            JMP COMM1
                290
                291 $EJECT
                292
                293
                294
                295    ANALOG:                    ; MAINTAIN AN OUTPUT VOLTAGE
                296                               ; (MCI-201) BASED ON THE BINARY
                297                               ; PERCENT STORED IN LOC 63.
                298                               ; 0%=2 VOLTS. 100%=5 VOLTS.
                299    ; ZERO'S WRITTEN TO P2(UPPER) PRODUCE GROUND POTENTIAL ON THE
                300    ; COLLECTOR OF TRANSISTOR Q5 (NPN). ONE'S PRODUCE 10 VOLTS.
```

```
                301
012A B838       302             MOV R0,#56D
012C F0         303             MOV A,@R0
012D 17         304             INC A
012E A0         305             MOV @R0,A
012F D38C       306             XRL A,#140D
0131 9655       307             JNZ ALOGL4
0133 A0         308             MOV @R0,A
0134 00         309             NOP
                310     ALOGL1:
0135 F0         311             MOV A,@R0               ; STORE COUNTER VALUE IN R7.
0136 AF         312             MOV R7,A
0137 B83F       313             MOV R0,#63D
0139 F0         314             MOV A,@R0
013A AE         315             MOV R6,A                ; STORE COMMAND.
013B C646       316             JZ ALOGL2
013D FF         317             MOV A,R7
013E C64F       318             JZ ALOGL3
0140 DE         319             XRL A,R6
0141 C657       320             JZ ALOGL5
0143 00         321             NOP
0144 00         322             NOP
0145 83         323             RET
                324     ALOGL2:
0146 9A0F       325             ANL P2,#00001111B       ; TURN OFF P2 (UPPER).
0148 00         326             NOP
0149 00         327             NOP
014A 00         328             NOP
014B 00         329             NOP
014C 00         330             NOP
014D 00         331             NOP
014E 83         332             RET
                333     ALOGL3:
014F 8AF0       334             ORL P2,#11110000B       ; TURN ON P2 (UPPER).
0151 00         335             NOP
0152 00         336             NOP
0153 00         337             NOP
0154 83         338             RET
                339     ALOGL4:
0155 2435       340             JMP ALOGL1
                341     ALOGL5:
0157 9A0F       342             ANL P2,#00001111B
0159 83         343             RET
                344
                345 $EJECT
                346
                347
                348
0300            349             ORG 0300H
                350
                351
                352     UART:                           ; RECEIVE AND DECODE
                353                                     ; SERIAL DATA ON PIN 39 (T1).
                354                                     ; ON ENTRY, TIME IS MIDDLE OF
                355                                     ; THE START BIT. ON EXIT,
                356                                     ; ACC=0 MEANS NO BYTE SUCCESSFULLY
                357                                     ; RECEIVED. ACC=NOT 0 MEANS BYTE
```

```
                358                                ; SUCCESSFULLY RECEIVED.
                359
                360
0300 B804       361             MOV  R3,#4D
0302 EB02       362    HERE:    DJNZ R3,HERE
0304 BF00       363             MOV  R7,#0            ; RXDATA.
0306 BE00       364             MOV  R6,#0            ; PARITY.
0308 BD08       365             MOV  R5,#8D           ; BIT COUNT.
030A BC01       366             MOV  R4,#00000001B    ; BIT MASK.
                367    UARTL0:
030C 7449       368             CALL MS
030E 4615       369             JNT1 UARTL1
0310 FC         370             MOV  A,R4
0311 743A       371             CALL ONE
0313 6417       372             JMP  UARTL2
                373    UARTL1:
0315 7440       374             CALL ZERO
                375    UARTL2:
0317 FC         376             MOV  A,R4
0318 E7         377             RL   A
0319 AC         378             MOV  R4,A
031A ED0C       379             DJNZ R5,UARTL0
                380
031C 7449       381             CALL MS
031E 4625       382             JNT1 UARTL3
                383
0320 FE         384             MOV  A,R6
0321 37         385             CPL  A
0322 AE         386             MOV  R6,A
0323 642A       387             JMP  UARTL4
                388    UARTL3:
0325 00         389             NOP
0326 00         390             NOP
0327 00         391             NOP
0328 00         392             NOP
0329 00         393             NOP
                394    UARTL4:
032A B841       395             MOV  R0,#65D
032C EB2C       396    UARTL5:  DJNZ R0,UARTL5
                397
032E FE         398             MOV  A,R6
032F 9638       399             JNZ  UARTL6
                400
0331 FF         401             MOV  A,R7
0332 B83E       402             MOV  R0,#62D
0334 A0         403             MOV  @R0,A
                404
0335 27         405             CLR  A
0336 37         406             CPL  A
                407
0337 93         408             RETR
                409
                410    UARTL6:
0338 27         411             CLR  A
0339 93         412             RETR
                413
                414 $EJECT
```

```
                    415
                    416
                    417         ONE:
033A 4F             418                 ORL A,R7
033B AF             419                 MOV R7,A
033C FE             420                 MOV A,R6
033D 37             421                 CPL A
033E AE             422                 MOV R6,A
                    423
033F 93             424                 RETR
                    425
                    426
                    427         ZERO:
0340 00             428                 NOP
0341 00             429                 NOP
0342 00             430                 NOP
0343 00             431                 NOP
0344 00             432                 NOP
0345 00             433                 NOP
0346 00             434                 NOP
0347 00             435                 NOP
0348 93             436                 RETR
                    437
                    438
                    439 $EJECT
                    440
                    441
                    442
                    443
                    444
                    445
                    446
                    447
                    448
                    449
                    450         MS:
0349 744E           451                 CALL HALFMS
034B 744E           452                 CALL HALFMS
034D 93             453                 RETR
                    454
                    455
                    456
                    457         HALFMS:
034E D5             458                 SEL RB1
034F AA             459                 MOV R2,A
0350 342A           460                 CALL ANALOG
0352 00             461                 NOP
0353 00             462                 NOP
0354 00             463                 NOP
0355 342A           464                 CALL ANALOG
0357 00             465                 NOP
0358 00             466                 NOP
0359 00             467                 NOP
035A 342A           468                 CALL ANALOG
035C FA             469                 MOV A,R2
035D C5             470                 SEL RB0
035E 93             471                 RETR
```

```
                472
                473
                474         MILSEC:
035F BF73       475                 MOV R7,#115D
0361 EF61       476         MILL1:  DJNZ R7,MILL1
0363 93         477                 RETR
                478
                479 $EJECT
                480
                481
                482
                483
                484
                485                 END
```

USER SYMBOLS
ALOGL1 0135  ALOGL2 0146  ALOGL3 014F  ALOGL4 0155  ALOGL5 0157  ANALOG 012A  COMM 002D  COMM1 0033
COMM2 0040  DELAY 0100  DELAY1 0102  DELAY2 0104  DELAY3 0106  HALFMS 034E  HERE 0302  INIT 002C
INITL1 0018  M101 00AF  M101L1 00B7  M101L2 00BC  M101L3 00BD  M108 00BF  M108L1 00C5  M108L2 00D4
M201 010F  M201L1 011B  M201L2 011F  M201L3 0126  MAINLP 0004  MILL1 0361  MILSEC 035F  MLP1 0026
MS 0349  ONE 033A  SEQ0 0050  SEQ0L1 005A  SEQ1 005B  SEQ1L1 006C  SEQ1L2 0071  SEQ2 0072
SEQ2L1 007E  SEQ3 0084  SEQ3L1 0091  SEQ3L2 0098  SEQ3L3 009F  SEQ3L4 00A6  SEQ3L5 00AD  UART 0300
UARTL0 030C  UARTL1 0315  UARTL2 0317  UARTL3 0325  UARTL4 032A  UARTL5 032C  UARTL6 0338  ZERO 0340

ASSEMBLY COMPLETE,  NO ERRORS

What is claimed is:

1. A control system for varying at least one controlled paramater to control the environment of a greenhouse structure with a plurality of remotely controlled elements, said control system comprising:
   a programmed controller for communicating with the plurality of remotely controlled elements over an AC power line;
   said programmed controller including a stored control program defining the state of operation of each of said remotely controlled elements during a plurality of parameter stages away from a set point value for said at least one controlled parameter, said control program regulating the operation of said remotely controlled elements during each stage in said defined states to move the actual value of said controlled parameter of the greenhouse toward said set point value;
   means for determining the parameter stage corresponding to the actual value of said controlled parameter of the greenhouse; and
   means for commanding said remotely controlled elements to operate in accordance with said stored program for said determined stage.

2. A control system as defined in claim 1 wherein said plurality of remotely controlled elements include:
   means for heating the greenhouse.

3. A control system as defined in claim 1 wherein said plurality of remotely controlled elements include:
   means for cooling the greenhouse.

4. A control system as defined in claim 3 wherein said plurality of remotely controlled elements include:
   means for ventilating the greenhouse with outside air; and
   means for circulating the air within the greenhouse.

5. A control system as defined in claim 1 which further include:
   a vent motor controller;
   a remote sensor controller; and
   an address controller.

6. A control system as defined in claim 5: wherein said plurality of remotely controlled elements include a vent whose percent of opening is controlled by a motor; and
   wherein said vent motor controller includes means for receiving commands from said programmed controller as to the desired percent of opening of said vent;
   means for determining the present percent of opening of said vent; and
   means for controlling said motor to move said vent from said present percent of opening to said commanded percent of opening.

7. A control system as defined in claim 6 wherein said vent motor controller further includes:
   means for overriding said percent of opening commands in response to a manual mode signal;
   means, enabled by said manual mode signal, for controlling said motor to open said vent; and
   means, enabled by said manual mode signal, for controlling said motor to close said vent.

8. A control system as defined in claim 6:
   wherein said vent includes means for generating pulses indicative of incremental movements of said vent,
   means for generating a fully open vent signal when said vent is fully open, and
   means for generating a fully closed vent signal when said vent is fully closed; and
   wherein said present percent of opening determining means includes:
   means for sensing said fully closed vent signal;
   means for sensing said fully opened vent signal;
   means for sensing said pulses;

means for generating a calibration count by counting the number of pulses between said fully opened and fully closed vent condition;

means, utilizing said calibration count, for translating said percent opening commands into a commanded number of pulses; and said means for controlling said motor moving said vent said commanded number pulses.

9. A control as defined in claim 6 wherein said vent motor controller further includes:

means for sensing the torque on said motor; and means for disabling said motor controlling means if the sensed torque is in excess of a threshold.

10. A control system as defined in claim 5 having at least one remote sensor:

wherein said at least one remote sensor includes a sensor for measuring an actual temperature; and wherein said remote sensor controller includes:

means for storing an actual temperature word indicative of said actual measured temperature;

means for receiving interrogations from said programmed controller; and means for transmitting said stored temperature word to said programmed controller in response to said interrogations.

11. A control system as defined in claim 10 wherein said temperature sensor measures outdoor temperature and said at least one remote sensor further includes:

means for measuring the occurrence of rain in excess of a predetermined amount; and means for measuring the occurrence of wind in excess of a predetermined amount.

12. A control system as defined in claim 11 wherein:

said tranmitting means additionally transmits an indication of said measured wind and said measured rain to said programmed controller in response to said interrogations.

13. A control system as defined in claim 10 wherein said at least one sensor measures indoor temperature and said at least one remote sensor further includes:

means for measuring the indoor light level of said greenhouse.

14. A control system as defined in claim 13 wherein:

said transmitting means additionally transmits an indication of said measured light level to said programmed controller in response to said interrogations.

15. A control system as defined in claim 5 wherein said address controller includes:

means for receiving commands from said programmed controller as to the state of at least one actuator;

means for distributing actuation signals based on said received commands; and means, controlled by said actuation signals, for controlling a plurality of actuators to determine the operational state of said remotely controlled elements.

16. A control system as defined in claim 15 wherein:

one of said remotely controlled elements is a ventilation fan.

17. A control system as defined in claim 15 wherein:

one of said remotely controlled elements is a fuel valve of a heater element.

18. A control system as defined in claim 15 wherein:

one of said remotely controlled elements is a fan motor of a heater element.

19. A control system as defined in claim 15 wherein:

one of said remotely controlled elements is a pump supplying water to a cooling pad.

20. A control system as defined in claim 5 wherein said address controller includes:

means for receiving commands from said programmed controller indicative of the position of one of said controlled elements; and means for converting said commands into a proportional signal which positions said controlled element to the commanded position.

21. The control system as in claim 1 further including means for communicating on sidebands about a center frequency over said AC power line, comprising:

transmitter means for convering a digital binary signal having two binary levels into an upper sideband signal in response to one of said binary levels, and a lower sideband signal in response to the other binary level, means for coupling said sideband signals to said AC power line; and receiver means, coupled to receive said sideband signals from said AC power line, for converting said upper and lower sideband signals to respective binary logic level digital output signals.

* * * * *